United States Patent
Miyata

(10) Patent No.: US 12,441,818 B2
(45) Date of Patent: Oct. 14, 2025

(54) CURABLE COMPOSITION, CURED FILM, INFRARED TRANSMITTING FILTER, LAMINATE, SOLID-STATE IMAGING ELEMENT, SENSOR, AND PATTERN FORMING METHOD

(71) Applicant: FUJIFILM Corporation, Tokyo (JP)

(72) Inventor: Tetsushi Miyata, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 644 days.

(21) Appl. No.: 17/173,855

(22) Filed: Feb. 11, 2021

(65) Prior Publication Data

US 2021/0163634 A1    Jun. 3, 2021

Related U.S. Application Data

(63) Continuation of application No. PCT/JP2019/034895, filed on Sep. 5, 2019.

(30) Foreign Application Priority Data

Sep. 20, 2018  (JP) .................................. 2018-176455
Aug. 8, 2019   (JP) .................................. 2019-146457

(51) Int. Cl.
| | | |
|---|---|---|
| C08F 2/44 | (2006.01) | |
| B32B 27/08 | (2006.01) | |
| C08F 2/50 | (2006.01) | |
| C08L 101/00 | (2006.01) | |
| G02B 5/20 | (2006.01) | |
| G02B 5/22 | (2006.01) | |

(52) U.S. Cl.
CPC ................ *C08F 2/44* (2013.01); *B32B 27/08* (2013.01); *C08F 2/50* (2013.01); *C08L 101/00* (2013.01); *G02B 5/208* (2013.01); *G02B 5/223* (2013.01); *B32B 2457/00* (2013.01)

(58) Field of Classification Search
CPC ........ C08F 2/44; C08F 2/50; C08F 220/1807; C08F 220/283; C08F 265/06; C08F 20/00; B32B 27/08; B32B 2457/00; C08L 101/00; G02B 5/208; G02B 5/223; G02B 5/201; G02B 5/22; C08K 5/0041; C09D 4/06; C09D 151/003; H01L 31/02164

See application file for complete search history.

(56) References Cited

U.S. PATENT DOCUMENTS

| 2001/0005278 A1 | 6/2001 | Onomichi et al. | |
| 2011/0012075 A1* | 1/2011 | Nii ....................... | C07D 487/04 546/256 |
| 2012/0119171 A1* | 5/2012 | Ohashi ................... | G02B 5/223 252/587 |
| 2014/0091419 A1* | 4/2014 | Hasegawa ............. | G02B 13/005 359/359 |
| 2017/0010528 A1 | 1/2017 | Takishita et al. | |
| 2017/0038507 A1 | 2/2017 | Norizuki et al. | |
| 2018/0039171 A1 | 2/2018 | Oota et al. | |
| 2019/0094431 A1 | 3/2019 | Mori et al. | |

FOREIGN PATENT DOCUMENTS

| JP | 2000-267265 A | 9/2000 |
| JP | 2001-207142 A | 7/2001 |
| JP | 2005-165265 A | 6/2005 |
| JP | 2008-208742 A | 8/2006 |
| JP | 2008-291183 A | 10/2006 |
| JP | 2007-279676 A | 10/2007 |
| JP | 2008-58903 A | 3/2008 |
| JP | 2010-249964 A | 11/2010 |
| JP | 2011-16879 A | 1/2011 |
| JP | 2012-7038 A | 1/2012 |
| JP | 2012-117030 A | 6/2012 |
| JP | 2015-507218 A | 3/2015 |
| JP | 2015-161731 A | 9/2015 |
| JP | 2016-74753 A | 5/2016 |
| JP | 2017-115032 A | 6/2017 |
| JP | 2019-168611 A | 10/2019 |
| TW | 472158 B | 1/2002 |
| WO | WO 2013/172145 A1 | 11/2013 |
| WO | WO 2015/166779 A1 | 11/2015 |
| WO | WO 2015/166873 A1 | 11/2015 |
| WO | WO 2016/178346 A1 | 11/2016 |
| WO | WO 2018/016232 A1 | 1/2018 |

OTHER PUBLICATIONS

Triphenylsulphonium Triflate Data Sheet (No Date).*
Shimada, Machine English translation of JP 2006-150630 (Year: 2006).*
Japanese Office Action for corresponding Japanese Application No. 2020-548299, dated Dec. 21, 2021, with English translation.
Japanese Notice of Reasons for Refusal for corresponding Japanese Application No. 2022-119984, dated Jun. 20, 2023, with an English translation.
Chinese Office Action and Search Report for corresponding Chinese Application No. 201980055446.5, dated Aug. 8, 2022, with English translation.
Extended European Search Report for corresponding European Application No. 19863093.1, dated Oct. 20, 2021.
Chinese Office Action for corresponding Chinese Application No. 201980055446.5, dated Mar. 8, 2023, with a partial English translation.
International Preliminary Report on Patentability and Written Opinion of the International Searching Authority (Forms PCT/IB/326, PCT/IB/373 and PCT/ISA/237) for corresponding International Application No. PCT/JP2019/034895, dated Apr. 1, 2021, with English translation.
International Search Report (Form PCT/ISA/210) for corresponding International Application No. PCT/JP2019/034895, dated Oct. 15, 2019, with English translation.

(Continued)

*Primary Examiner* — Jessica M Roswell
(74) *Attorney, Agent, or Firm* — Birch, Stewart, Kolasch & Birch, LLP

(57) ABSTRACT

A curable composition includes a specific infrared absorber and a curable compound and has specific wavelength characteristics.

14 Claims, 4 Drawing Sheets

(56) References Cited

OTHER PUBLICATIONS

Taiwanese Office Action and Search Report for corresponding Taiwanese Application No. 108133488, dated Jan. 12, 2023, with a partial English translation.
Chinese Office Action for corresponding Chinese Application No. 201980055446.5, dated Aug. 25, 2023, with a partial English translation.
Japanese Office Action for corresponding Japanese Application No. 2022-119984, dated Nov. 14, 2023, with English translation.
English machine translation of JP 2016-74753-A, dated May 12, 2016.
European Communication pursuant to Article 94(3) EPC for corresponding European Application No. 19863093.1, dated Jan. 23, 2024.

\* cited by examiner

CURABLE COMPOSITION, CURED FILM, INFRARED TRANSMITTING FILTER, LAMINATE, SOLID-STATE IMAGING ELEMENT, SENSOR, AND PATTERN FORMING METHOD

CROSS-REFERENCE TO RELATED APPLICATIONS

This application is a Continuation of PCT International Application No. PCT/JP2019/034895 filed on Sep. 5, 2019, which claims priority under 35 U.S.C § 119(a) to Japanese Patent Application No. 2018-176455 filed on Sep. 20, 2018, and Japanese Patent Application No. 2019-146457 filed on Aug. 8, 2019. Each of the above application(s) is hereby expressly incorporated by reference, in its entirety, into the present application.

BACKGROUND OF THE INVENTION

1. Field of the Invention

The present disclosure relates to a curable composition, a cured film, an infrared transmitting filter, a laminate, a solid-state imaging element, a sensor, and a pattern forming method.

2. Description of the Related Art

It is presumed that a technique of recognizing "where things are" using AI or the like, for example, a smartphone, a surveillance camera, a vehicle-mounted camera, a camera for Internet of things (IoT), or an infrared sensor will be important in the future.

Here, in the camera, the sensor, or the like, the use of infrared light is considered. It is presumed that, since infrared light has a characteristic absorption depending on the material or the like of an object, the recognition accuracy of a material or the like of an object can be improved.

As an infrared transmitting filter for using the infrared light, for example, an infrared transmitting filter described in JP2015-161731A or WO2015/166873A is known.

JP2015-161731A describes a near infrared cut filter including: a transparent resin substrate; and a multi-layer film that is formed on each of both surfaces of the transparent resin substrate and has a structure in which a dielectric film having a high refractive index and a dielectric film having a low refractive index are alternately laminated, in which transmission of 90% or higher of visible light in a wavelength range of 420 nm to 740 nm is allowed, and near infrared light in a wavelength range of 770 nm to 1,800 nm is blocked. In the near infrared filter, near infrared light in a short wavelength range is blocked in a first multi-layer film formed on one surface of the transparent resin substrate, and near infrared light in a long wavelength range other than the short wavelength range is blocked in a second multi-layer film formed on another surface of the transparent resin substrate. As a result, near infrared light is blocked from both the surfaces of the transparent resin substrate such that an average transmittance of near infrared light is 15% or lower with respect to a cumulative irradiation dose of sunlight in a wavelength range of 770 nm to 1,800 nm.

WO2015/166873A describes an infrared sensor including an infrared transmitting filter and a near infrared absorbing filter, in which an object is detected by detecting light in a wavelength range of 900 nm to 1,000 nm, and the near infrared absorbing filter includes a near infrared absorbing material having a maximum absorption wavelength in a wavelength range of 900 nm to 1,000 nm.

SUMMARY OF THE INVENTION

For the infrared absorbing filter, it is desired to suppress the generation of noise from visible light.

For example, in a case where the near infrared absorbing filter described in WO2015/166873A is used, it is desired to detect infrared light in a wavelength range of 900 nm to 1,000 nm that is relatively short and is similar to that of visible light. Therefore, it is presumed that, from the viewpoint of suppressing noise generated from visible light, there is room for further improvement.

Further, for the infrared absorbing filter, it is desired that dependence on humidity is low and image blurring even in a high-humidity environment is suppressed (high humidity sensitivity is excellent), that dependence on the angle of incidence ray is (angle dependence) is low and transmission of infrared light at a wide angle is allowed, and that the thickness of the obtained pattern can be reduced (a reduction in the height of the pattern can be realized).

The infrared absorbing filter described in JP2015-161731A is formed by laminating the dielectric films and has a problem in that, for example, the angle dependence is poor.

An object of an embodiment of the present invention is to provide a curable composition capable of forming a cured film in which the generation of noise from visible light is suppressed, high humidity sensitivity is excellent, angle dependence is excellent, and a reduction in height can be realized.

In addition, another object of an embodiment of the present invention is to provide: a cured film that is formed by curing the curable composition; an infrared transmitting filter including the cured film; a laminate including the cured film or the infrared transmitting filter and a dielectric multi-layer film; a solid-state imaging element or a sensor including the cured film, the infrared transmitting filter, or the laminate; or a pattern forming method using the curable composition.

Configurations for achieving the objects include the following aspects.

<1> A curable composition comprising:
an infrared absorber; and
a curable compound,
in which an absorbance X of the infrared absorber at a maximum absorption wavelength in a wavelength range of 400 nm to 1,300 nm and a maximum absorbance Y in a wavelength range of longer than 950 nm and 1,300 nm or shorter satisfy Expression 1,
in a case where the curable composition is applied at any thickness of 0.1 μm to 100 μm, a wavelength Tb having a transmittance of 50% is present in a wavelength range of 1,000 nm to 1,300 nm, and
in a case where a wavelength that is shorter than the wavelength Tb by 200 nm is represented by Ta and a wavelength that is longer than the wavelength Tb by 200 nm is represented by Tc, a ratio A/C of a minimum value A of an absorbance in a wavelength range of the wavelength Ta±50 nm to a maximum value C of an absorbance in a wavelength range of the wavelength Tc±50 nm is 4.5 or higher, $Y > X \times 0.5$                    Expression 1.

<2> The curable composition according to <1>, further comprising a compound having a maximum absorption wavelength in a wavelength range of 400 nm to 700 nm, in which in a case where a wavelength that is shorter than the wavelength Tb by 150 nm is represented by Ta', a ratio A'/C of a minimum value A' of an absorbance in a wavelength range of 400 nm to the wavelength Ta' to the maximum value C is 4.5 or higher.

<3> The curable composition according to <2>, comprising:
two or more compounds having a maximum absorption wavelength in a wavelength range of 400 nm to 700 nm.

<4> The curable composition according to <2> or <3>, comprising:
at least one compound selected from the group consisting of a red colorant, a blue colorant, a green colorant, a yellow colorant, a black colorant, a violet colorant, and a brown colorant as the compound having a maximum absorption wavelength in a wavelength range of 400 nm to 700 nm.

<5> The curable composition according to any one of <1> to <4>,
in which the infrared absorber includes at least one compound selected from the group consisting of a cyanine compound, a phthalocyanine compound, a squarylium compound, a croconium compound, a diimmonium compound, a perylene compound, a pyrrolopyrrole compound, a metal complex, and a compound semiconductor.

<6> The curable composition according to any one of <1> to <5>, further comprising:
an infrared absorber that does not satisfy Expression 1.

<7> The curable composition according to any one of <1> to <6>, further comprising:
a photopolymerization initiator.

<8> The curable composition according to any one of <1> to <7>, which is used for forming an infrared transmitting filter.

<9> A cured film which is formed by curing the curable composition according to any one of <1> to <8>.

<10> An infrared transmitting filter comprising:
the cured film according to <9>.

<11> A laminate comprising:
the cured film according to <9> or the infrared transmitting filter according to <10>; and
a dielectric multi-layer film.

<12> A solid-state imaging element comprising:
the cured film according to <9>, the infrared transmitting filter according to <10>, or the laminate according to <11>.

<13> A sensor comprising:
the cured film according to <9>, the infrared transmitting filter according to <10>, or the laminate according to <11>.

<14> A pattern forming method comprising:
a step of exposing a curable composition layer including the curable composition according to any one of <1> to <8> in a pattern shape; and
a step of removing a non-exposed portion to form a pattern.

According to an embodiment of the present invention, it is possible to provide a curable composition capable of forming a cured film in which the generation of noise from visible light is suppressed, high humidity sensitivity is excellent, angle dependence is excellent, and a reduction in height can be realized.

In addition, according to another embodiment of the present invention it is possible to provide: a cured film that is formed by curing the curable composition; an infrared transmitting filter including the cured film; a laminate including the cured film or the infrared transmitting filter and a dielectric multi-layer film; a solid-state imaging element or a sensor including the cured film, the infrared transmitting filter, or the laminate; or a pattern forming method using the curable composition.

DESCRIPTION OF THE PREFERRED EMBODIMENTS

Figure 1:
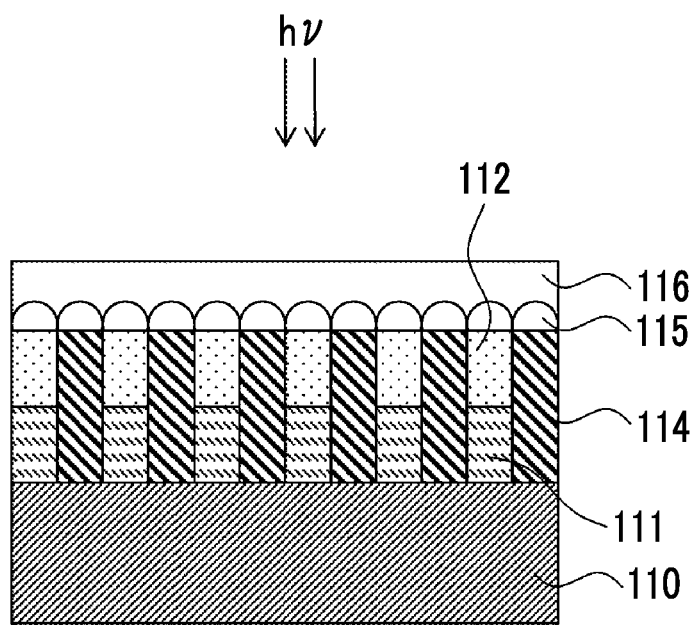
FIG. 1 is a schematic cross-sectional view showing a configuration of an embodiment of an infrared sensor according to the present disclosure.

Hereinafter, the details of the present disclosure will be described. The following description regarding components has been made based on a representative embodiment of the present disclosure. However, the present disclosure is not limited to the embodiment.

In the present disclosure, "to" representing a numerical range is used to represent a numerical range including numerical values before and after "to" as a lower limit value and an upper limit value.

In the present disclosure, unless specified otherwise, "exposure" denotes not only exposure using light but also drawing using a corpuscular beam such as an electron beam or an ion beam. Examples of the light used for exposure include an actinic ray or radiation, for example, a bright light spectrum of a mercury lamp, a far ultraviolet ray represented by excimer laser, an extreme ultraviolet ray (EUV ray), an X-ray, or an electron beam.

In addition, in the present disclosure, unless specified as a substituted group or as an unsubstituted group, a group (atomic group) denotes not only a group having no substituent but also a group having a substituent. For example, "alkyl group" denotes not only an alkyl group having no substituent (unsubstituted alkyl group) but also an alkyl group having a substituent (substituted alkyl group).

In the present disclosure, in a chemical formula, Me represents a methyl group, Et represents an ethyl group, Pr represents a propyl group, Bu represents a butyl group, and Ph represents a phenyl group.

In the present disclosure, "(meth)acryl" is used as a term including both acryl and methacryl, and "(meth)acryloyl" is used as a term including both acryloyl and methacryloyl.

In addition, in the present disclosure, the term "step" denotes not only an individual step but also a step which is not clearly distinguishable from another step as long as an effect expected from the step can be achieved. In addition, in the present disclosure, "mass %" has the same definition as "wt %", and "part(s) by mass" has the same definition as "part(s) by weight".

In the present disclosure, unless specified otherwise, the unit of a wavelength is nm.

Unless specified otherwise, as each component in a composition or each constitutional unit in a polymer in the present disclosure, one kind may be used alone, or two or more kinds may be used in combination.

Further, in a case where a plurality of materials or constitutional units corresponding to each component in a composition or each constitutional unit in a polymer in the present disclosure are present, unless specified otherwise, the amount of the component in the composition or the constitutional unit in the polymer refers to the total amount of the plurality of corresponding materials present in the composition or the total amount of the plurality of corresponding constitutional units present in the polymer.

Further, in the present disclosure, a combination of two or more preferable aspects is a more preferable aspect.

As a method of measuring the weight-average molecular weight and the number-average molecular weight of a compound used in the present disclosure, the measurement can be performed by gel permeation chromatography (GPC), and the weight-average molecular weight and the number-average molecular weight is defined as a value in terms of polystyrene obtained by GPC. For example, the weight-average molecular weight and the number-average molecular weight can be obtained by using HLC-8220 (manufactured by Tosoh Corporation), using TSKgel Super AWM-H (manufactured by Tosoh Corporation; 6.0 mm ID×15.0 cm) as a column, and using a 10 mmol/L lithium bromide N-methylpyrrolidinone (NMP) solution as an eluent.

Near infrared light denotes light (electromagnetic wave) having a maximum absorption wavelength in a wavelength range of 700 nm to 2,500 nm.

In the present disclosure, a total solid content denotes the total mass of all the components of a composition excluding a solvent. The solid content in the present disclosure refers to a solid content at 25° C.

Hereinafter, the present disclosure will be described in detail.

(Curable Composition)

A curable composition (hereinafter also simply referred to as "composition") according to the present disclosure comprises:
an infrared absorber; and
a curable compound,
in which an absorbance X of the infrared absorber at a maximum absorption wavelength in a wavelength range of 400 nm to 1,300 nm and a maximum absorbance Y in a wavelength range of longer than 700 nm and 1,300 nm or shorter satisfy Expression 1,
in a case where the curable composition is applied at any thickness of 0.1 μm to 100 μm, a wavelength Tb having a transmittance of 50% is present in a wavelength range of 1,000 nm to 1,300 nm, and
in a case where a wavelength that is shorter than the wavelength Tb by 200 nm is represented by Ta and a wavelength that is longer than the wavelength Tb by 200 nm is represented by Tc, a ratio A/C of a minimum value A of an absorbance in a wavelength range of the wavelength Ta±50 nm to a maximum value C of an absorbance in a wavelength range of the wavelength Tc±50 nm is 4.5 or higher, $$Y > X \times 0.5 \quad \text{Expression 1.}$$

In addition, it is preferable that the curable composition according to the present disclosure is a curable composition used for forming an infrared transmitting filter.

The present inventors conducted a thorough investigation and found that, by adopting the above-described configuration, it is possible to provide a curable composition capable of forming a cured film in which the generation of noise from visible light is suppressed, high humidity sensitivity is excellent, angle dependence is excellent, and a reduction in height can be realized.

The detailed mechanism for obtaining the above-described effect is not clear but is presumed to be as follows.

The curable composition includes the infrared absorber and the ratio A/C is 4.5 or higher. As a result, it is presumed that since a change in absorbance in a range from a visible range to an infrared light is sharp, the generation of noise from visible light is suppressed.

In addition, in a case where the curable composition includes the infrared absorber satisfying Expression 1 and the ratio A/C is 4.5 or higher, an infrared absorbing filter that allows transmission of infrared light in a wavelength range of 1,000 nm to 1,300 nm can be obtained. In a case where infrared light in the above-described wavelength range is used, the influence of water (water vapor) on infrared light absorption is small as compared to a case where an infrared absorbing filter that allows transmission of infrared light having a wavelength of, for example, 1,400 nm or longer is used. Therefore, it is presumed that high humidity sensitivity is excellent.

Further, it is presumed that a cured film of the curable composition including the infrared absorber according to the embodiment of the present disclosure has excellent angle dependence as compared to a case where, for example, only a dielectric multi-layer film is used.

Further, in a case where the curable composition according to the embodiment of the present disclosure is applied at any thickness of 0.1 μm to 100 Tb is present. Therefore, it is presumed that the height can be further reduced as compared to a case where a composition where Tb is present during application at a thickness of more than 100 μm is used.

Hereinafter, each of requirements for the curable composition according to the embodiment of the present disclosure will be described in detail.

<Wavelength Characteristics>

In a case where the curable composition according to the embodiment of the present disclosure is applied at any thickness of 0.1 μm to 100 μm, a wavelength Tb having a transmittance of 50% is present in a wavelength range of 1,000 nm to 1,300 nm, and in a case where a wavelength that is shorter than the wavelength Tb by 200 nm is represented by Ta and a wavelength that is longer than the wavelength Tb by 200 nm is represented by Tc, a ratio A/C of a minimum value A of an absorbance in a wavelength range of the wavelength Ta±50 nm to a maximum value C of an absorbance in a wavelength range of the wavelength Tc±50 nm is 4.5 or higher.

In the present disclosure, for example, "the wavelength range of the wavelength Ta±50 nm" refers to "a wavelength range of Ta−50 nm to Ta+50 nm".

A/C is preferably 10 or higher, more preferably 15 or higher, and still more preferably 20 or higher.

The minimum value A is preferably 0.8 or higher, more preferably 1.0 or higher, and still more preferably 1.3 or higher.

The maximum value C is preferably 0.2 or lower, more preferably 0.15 or lower, and still more preferably 0.10 or lower.

In the present disclosure, the absorbances and the transmittances at Ta, Tb, and Tc can be designed by adjusting the kinds and the contents of the infrared absorber and a compound having a maximum absorption wavelength in a wavelength range of 400 nm to 700 nm in the curable composition.

An absorbance $A\lambda$ at a wavelength $\lambda$ is defined by the following Expression (1).

$$A\lambda = -\log(T\lambda) \qquad (1)$$

$A\lambda$ represents the absorbance at the wavelength $\lambda$, and $T\lambda$ represents a transmittance at the wavelength $\lambda$.

During the measurement of the value of absorbance, a film that is prepared by applying the curable composition to a glass substrate using a method such as spin coating such that the thickness of the dried film is a predetermined thickness, curing the applied curable composition using a method (for example, exposure or heating) appropriate for the curable composition, and optionally drying the cured film is used. The thickness of the film can be obtained by performing the measurement on the substrate including the film using a stylus surface profilometer (DEKTAK 150, manufactured by ULVAC Inc.).

In addition, an absorbance and a transmittance at one wavelength can be measured using an ultraviolet-visible-near infrared spectrophotometer (manufactured by Hitachi High-Technologies Corporation, U-4100).

In addition, unless specified otherwise, an absorbance and a transmittance in the present disclosure are values measured under conditions of 25° C. and a relative humidity of 40%.

In addition, in one aspect of the curable composition according to the embodiment of the present disclosure, a transmittance at a wavelength of 1,600 nm is 20% or lower (preferably 10% or lower).

By using the above-described curable composition, a so-called band pass filter that allows transmission of light, for example, in a wavelength range of 1,000 nm to 1,300 nm and blocks light at a wavelength that is shorter or longer than the above-described range can also be formed.

<Infrared Absorber>

The infrared absorber used in the present disclosure is a compound in which an absorbance X of the infrared absorber at a maximum absorption wavelength in a wavelength range of 400 nm to 1,300 nm and a maximum absorbance Y in a wavelength range of longer than 700 nm and 1,300 nm or shorter satisfy Expression 1, and is preferably a compound in which an absorbance X of the infrared absorber at a maximum absorption wavelength in a wavelength range of 400 nm to 1,300 nm and a maximum absorbance Y in a wavelength range of longer than 950 nm and 1,300 nm or shorter satisfy Expression 1.

The infrared absorber used in the present disclosure is preferably a compound in which X and Y satisfy Expression 2 and more preferably a compound in which X and Y satisfy Expression 3.

$$Y > X \times 0.5 \qquad \text{Expression 1}$$

$$Y > X \times 0.7 \qquad \text{Expression 2}$$

$$Y > X \times 0.9 \qquad \text{Expression 3}$$

In addition, it is preferable that the infrared absorber used in the present disclosure has an absorption maximum in a wavelength range of 950 nm to 1,300 nm in a wavelength range of 350 nm to 1,500 nm.

In the present disclosure, "having an absorption maximum in a wavelength range of A nm to B nm in a wavelength range of 350 nm to 1,300 nm" represents having a wavelength at which a maximum absorbance is exhibited in a wavelength range of A nm to B nm in an absorption spectrum in a wavelength range of 350 nm to 1,300 nm.

The infrared absorber used in the present disclosure is not particularly limited, and it is preferable that the infrared absorber is at least one compound selected from the group consisting of a cyanine compound, a phthalocyanine compound, a squarylium compound, a croconium compound, a diimmonium compound, a perylene compound, a pyrrolopyrrole compound, a metal complex, and a compound semiconductor, it is more preferable that the infrared absorber includes at least one compound selected from the group consisting of a cyanine compound and a squarylium compound, and it is still more preferable that the infrared absorber includes a cyanine compound.

[Cyanine Compound]

Preferable examples of the cyanine compound include a compound represented by Formula (I).

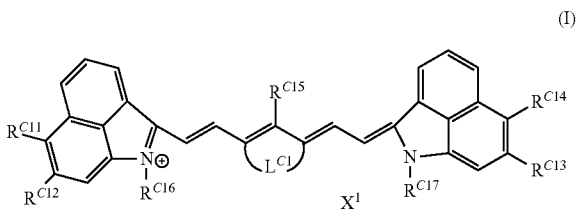

In Formula (I), $L^{C1}$ represents an alkylene group, $R^{C11}$ and $R^{C12}$ each independently represent a hydrogen atom, a halogen atom, or a monovalent organic group, $R^{C11}$ and $R^{C12}$ may be bonded to form a ring structure, $R^{C13}$ and $R^{C14}$ each independently represent a hydrogen atom, a halogen atom, or a monovalent organic group, $R^{C13}$ and $R^{C14}$ may be bonded to form a ring structure, $R^{C15}$ represents an alkyl group, an alkenyl group, an alkynyl group, an aralkyl group, an aryl group, or a hydrogen atom, $R^{C16}$ and $R^{C17}$ each independently represent an alkyl group, an alkenyl group, an alkynyl group, an aralkyl group, or an aryl group, $X^1$ represents an anion or a cation required for charge neutralization, and in a case where a structure other than the structure represented by $X^1$ in Formula (I) is electrically neutral, $X^1$ is not necessarily present.

In Formula (I), $L^{C1}$ represents an alkylene group and preferably an ethylene group or a propylene group. $L^{C1}$ may have a substituent, and examples of the substituent include an alkyl group. In particular, an alkyl group having 1 to 4 carbon atoms is preferable.

In Formula (I), $R^{C11}$ and $R^{C12}$ each independently represent a hydrogen atom, a halogen atom, or a monovalent organic group, preferably a hydrogen atom, an alkyl group, or an alkoxy group, more preferably a hydrogen atom, an alkyl group having 1 to 10 carbon atoms, or an alkoxy group having 1 to 10 carbon atoms, and still more preferably a hydrogen atom, an alkyl group having 1 to 4 carbon atoms, or an alkoxy group having 1 to 4 carbon atoms.

In addition, it is preferable that $R^{C11}$ represents the alkyl group or the alkoxy group and $R^{C12}$ represents a hydrogen atom.

As the ring structure that is formed by $R^{C11}$ and $R^{C12}$, a 5-membered ring structure or a 6-membered ring structure is preferable, a 5-membered ring structure is more preferable, and a tetrahydrofuran ring structure is still more preferable. The above-described ring structure may have a substituent, and examples of the substituent include an alkyl group. In particular, an alkyl group having 1 to 4 carbon atoms is preferable.

In Formula (I), $R^{C13}$ and $R^{C14}$ each independently represent a hydrogen atom, a halogen atom, or a monovalent organic group, preferably a hydrogen atom, an alkyl group, or an alkoxy group, more preferably a hydrogen atom, an alkyl group having 1 to 10 carbon atoms, or an alkoxy group having 1 to 10 carbon atoms, and still more preferably a hydrogen atom, an alkyl group having 1 to 4 carbon atoms, or an alkoxy group having 1 to 4 carbon atoms.

In addition, it is preferable that $R^{C13}$ represents the alkyl group or the alkoxy group and $R^{C14}$ represents a hydrogen atom.

As the ring structure that is formed by $R^{C13}$ and $R^{C14}$, a 5-membered ring structure or a 6-membered ring structure is preferable, a 5-membered ring structure is more preferable, and a tetrahydrofuran ring structure is still more preferable. The above-described ring structure may have a substituent, and examples of the substituent include an alkyl group. In particular, an alkyl group having 1 to 4 carbon atoms is preferable.

In Formula (I), $R^{C15}$ represents an alkyl group, an alkenyl group, an alkynyl group, an aralkyl group, an aryl group, or a hydrogen atom, preferably an alkyl group, an aryl group, or a hydrogen atom, and more preferably an aryl group or a hydrogen atom. As the alkyl group, an alkyl group having 1 to 20 carbon atoms is preferable, an alkyl group having 1 to 12 carbon atoms is more preferable, and an alkyl group having 1 to 8 carbon atoms is still more preferable. As the alkenyl group, an alkenyl group having 2 to 20 carbon atoms is preferable, an alkenyl group having 2 to 12 carbon atoms is more preferable, and an alkenyl group having 2 to 8 carbon atoms is still more preferable. As the alkynyl group, an alkynyl group having 2 to 20 carbon atoms is preferable, an alkynyl group having 2 to 12 carbon atoms is more preferable, and an alkynyl group having 2 to 8 carbon atoms is still more preferable.

As the aralkyl group, an aralkyl group having 7 to 20 carbon atoms is preferable, and an aralkyl group having 7 to 13 carbon atoms is more preferable. As the aryl group, an aryl group having 6 to 20 carbon atoms is preferable, and an aryl group having 6 to 12 carbon atoms is more preferable.

In the present disclosure, unless specified otherwise, each of an alkyl group, an alkenyl group, and an alkynyl group may be linear or branched or may have a ring structure.

In Formula (I), $R^{C16}$ and $R^{C17}$ each independently represent an alkyl group, an alkenyl group, an alkynyl group, an aralkyl group, or an aryl group and preferably an alkyl group. The alkyl group, the alkenyl group, the alkynyl group, the aralkyl group, or the aryl group has the same preferable aspect as that of $R^{C15}$. In addition, the alkyl group, the alkenyl group, the alkynyl group, the aralkyl group, or the aryl group may further have a substituent.

Examples of the substituent include a halogen atom, a hydroxy group, a carboxy group, a sulfo group, an alkoxy group, and an amino group. Among these, a carboxy group or a sulfo group is preferable, and a sulfo group is more preferable. In the carboxy group and the sulfo group, a hydrogen atom may be dissociable or may be in the form of a salt.

$X^1$ represents an anion or a cation required for charge neutralization.

Examples of the anion include a halide ion ($Cl^-$, $Br^-$, $F^-$), a p-toluenesulfonate ion, an ethyl sulfate ion, $PF_6^-$, $BF_4^-$, $ClO_4^-$, a tris(halogenoalkylsulfonyl)methide anion (for example, $(CF_3SO_2)_3C^-$), a di(halogenoalkylsulfonyl)imide anion (for example, $(CF_3SO_2)_2N^-$), and a tetracyanoborate anion.

Examples of the cation include an alkali metal ion, an alkali earth metal ion, a transition metal ion, and other metal ions (an ammonium ion, a triethylammonium ion, a tributylammonium ion, a pyridinium ion, a tetrabutylammonium ion, a guanidinium ion, a tetramethylguanidium ion, and diazabicycloundecenium).

SPECIFIC EXAMPLES

Specific examples of the infrared absorber used in the present disclosure include compounds shown below, but the infrared absorber is not limited thereto.

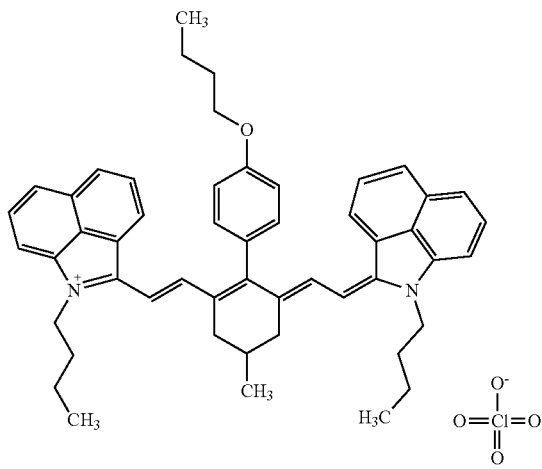
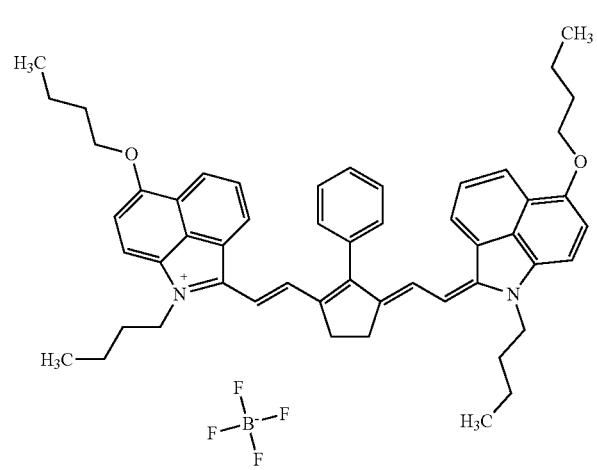

-continued

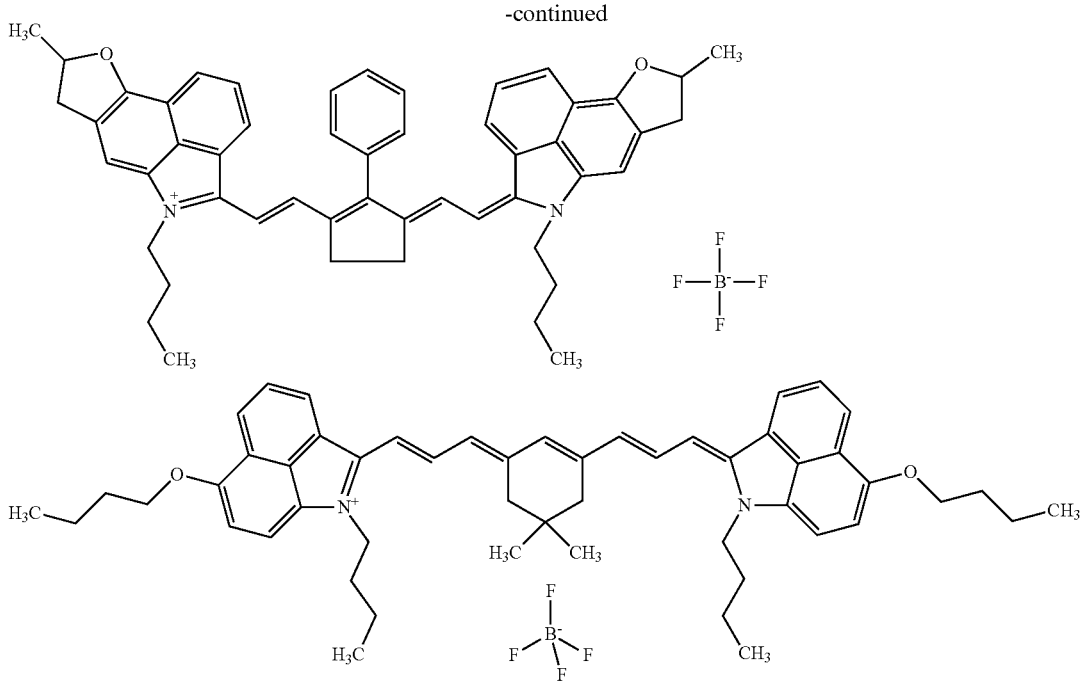

In addition, as the infrared absorber, a commercially available product may be used. Examples of the commercially available product include S09425, S04046, S04290, S12008, and S01983 manufactured by Spectrum Info Ltd.
[Content]

In the composition according to the present disclosure, the content of the infrared absorber is preferably 0.1 mass % to 95 mass % with respect to the total solid content of the composition. The upper limit of the content is more preferably 75 mass % or lower and still more preferably 50 mass % or lower. The lower limit of the content is more preferably 0.2 mass % or higher and still more preferably 0.5 mass % or higher.

<Infrared Absorber not Satisfying Expression 1>

The curable composition according to the embodiment of the present disclosure may further include an infrared absorber (hereinafter, also referred to as "other infrared absorber") not satisfying Expression 1. The other infrared absorber is a compound in which an absorbance X at a maximum absorption wavelength and a maximum absorbance Y in a wavelength range of longer than 950 nm and 1,300 nm or shorter do not satisfy Expression 1.

In addition, it is preferable that the other infrared absorber is a compound having a maximum absorption wavelength in a wavelength range of 700 nm to 950 nm.

In addition, it is preferable that the other infrared absorber used in the present disclosure has an absorption maximum in a wavelength range of 700 nm to 950 nm in a wavelength range of 350 nm to 1,300 nm, and it is more preferable that the other infrared absorber used in the present disclosure has an absorption maximum in a wavelength range of 800 nm to 950 nm in a wavelength range of 350 nm to 1,300 nm.

Further, by using a compound having an absorption maximum in a wavelength range of 1,500 nm to 2,000 nm (preferably in a wavelength range of 1,600 nm to 1,900 nm) in a wavelength range of 350 nm to 2,000 nm as the other infrared absorber, the curable composition according to the embodiment of the present disclosure can also be used for forming a band pass filter.

The other infrared absorber used in the present disclosure is not particularly limited, and examples thereof include a pyrrolopyrrole compound, a cyanine compound, a squarylium compound, a pyrylium compound, a phthalocyanine compound, a naphthalocyanine compound, a diiminium compound, lanthanum boride, flat metal particles, a quantum dot, and a rare earth-containing ceramic. In particular, it is preferable that the other infrared absorber includes at least one selected from the group consisting of a pyrrolopyrrole compound, a cyanine compound, a squarylium compound, a pyrylium compound, and a diiminium compound, and it is more preferable that the other infrared absorber includes at least one selected from the group consisting of a pyrrolopyrrole compound, a pyrylium compound, a squarylium compound, and a cyanine compound.

[Pyrrolopyrrole Compound]

As the pyrrolopyrrole compound, an infrared absorber having a well-known pyrrolopyrrole structure can be used without any particular limitation.

It is preferable that the pyrrolopyrrole compound used in the present disclosure forms a J-aggregate.

A slip angle of the J-aggregate that is formed by the pyrrolopyrrole compound is preferably 1° to 54°, more preferably 2° to 45°, and still more preferably 3° to 40°.

The distance between transition moments of the J-aggregate that is formed by the pyrrolopyrrole compound is preferably 2.0 Å to 30 Å and more preferably 3.0 Å to 25 Å. In this case, 1 Å=0.1 nm.

In addition, it is preferable that the pyrrolopyrrole compound used in the present disclosure includes a group that has a boron atom on a nitrogen atom of a pyrrolopyrrole ring. In addition, it is preferable that the nitrogen atom and the boron atom are directly bonded. By including a substituent on the boron atom directly bonded to the nitrogen atom, the pyrrolopyrrole compound functions as a steric hindrance group for controlling the overlap of planes of the pyrrolopyrrole ring structure between molecules and suitably forms a J-aggregate.

In addition, the J-aggregate may be a J-aggregate consisting of two or more different colorant compounds (infrared absorbers), that is, a mixed J-aggregate. By forming the mixed J-aggregate, an effect of freely controlling a maximum absorption wavelength (λmax) based on a mixing ratio between two colorant compounds can be obtained. The ratio between the respective colorant compounds in the mixed J-aggregate can be freely selected. In a case where the mixed J-aggregate consists of two kinds including a colorant A and a colorant B, a ratio (molar ratio) between the colorant A and the colorant B is preferably 1:99 to 99:1 and more preferably 10:90 to 90:10.

A ratio (absorbance of subsidiary absorption/absorbance at maximum absorption wavelength) of an absorbance of a subsidiary absorption to an absorbance at a maximum absorption wavelength (λmax) is preferably 0 to 0.1, more preferably 0 to 0.07, and still more preferably 0 to 0.05. The absorbance of the subsidiary absorption is an absorbance at 400 nm.

The half-width of the maximum absorption wavelength (λmax) is not particularly limited and is preferably 5 nm to 300 nm.

FIGS. 3 to 7 show examples of absorption spectra of pyrrolopyrrole compounds. PP-a to PP-t in FIGS. 4 to 7 are pyrrolopyrrole compounds. In addition, in FIGS. 3 to 7, the vertical axis represents an absorbance (absorbance unit), and the horizontal axis represents a wavelength (nm).

Figure 3:
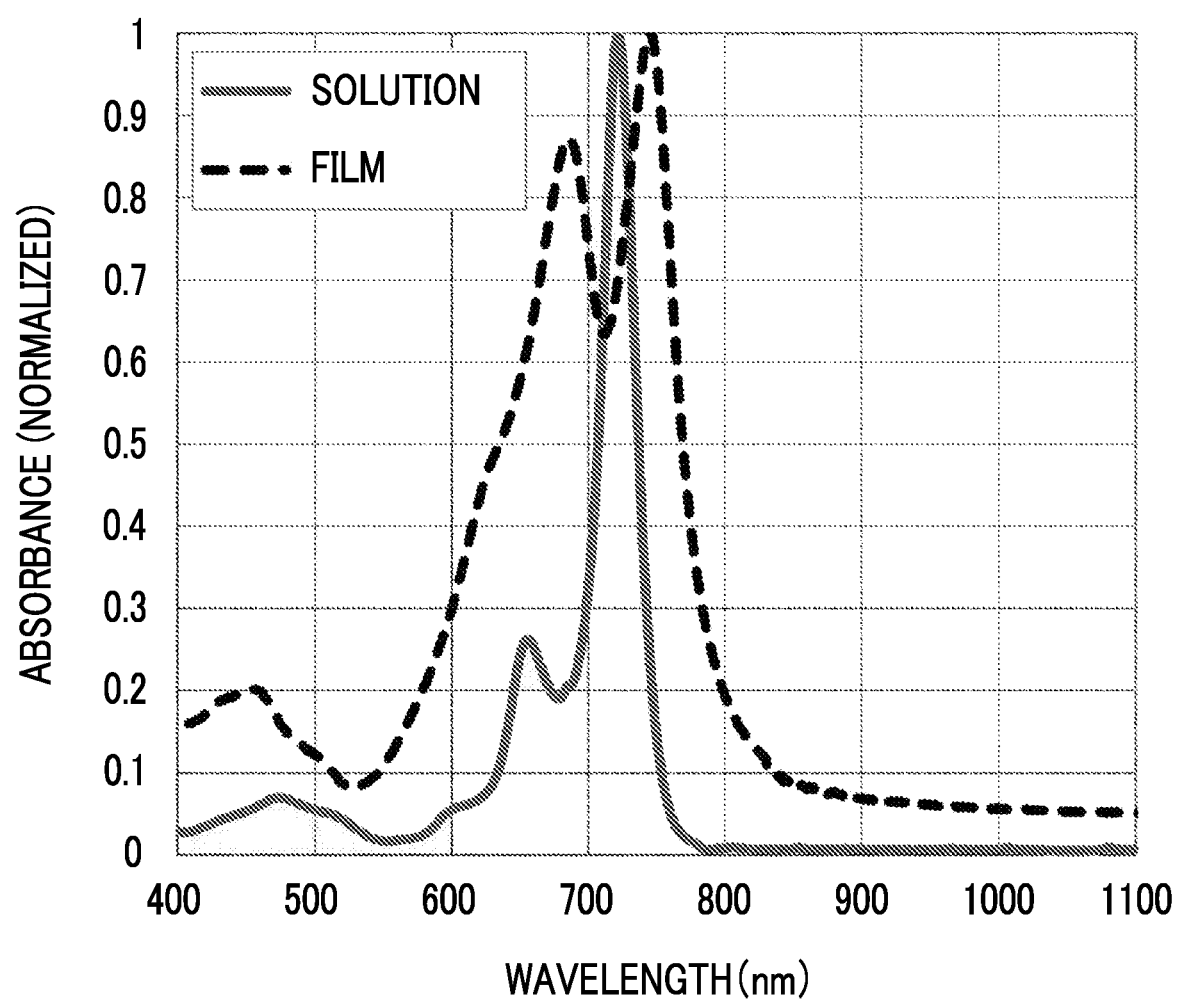
FIG. 3 is a diagram showing absorption spectra of an example of a pyrrolopyrrole compound in a solution and a film.

FIG. 3 is a diagram showing absorption spectra of an example of a pyrrolopyrrole compound in a solution and a film.

Figure 4:
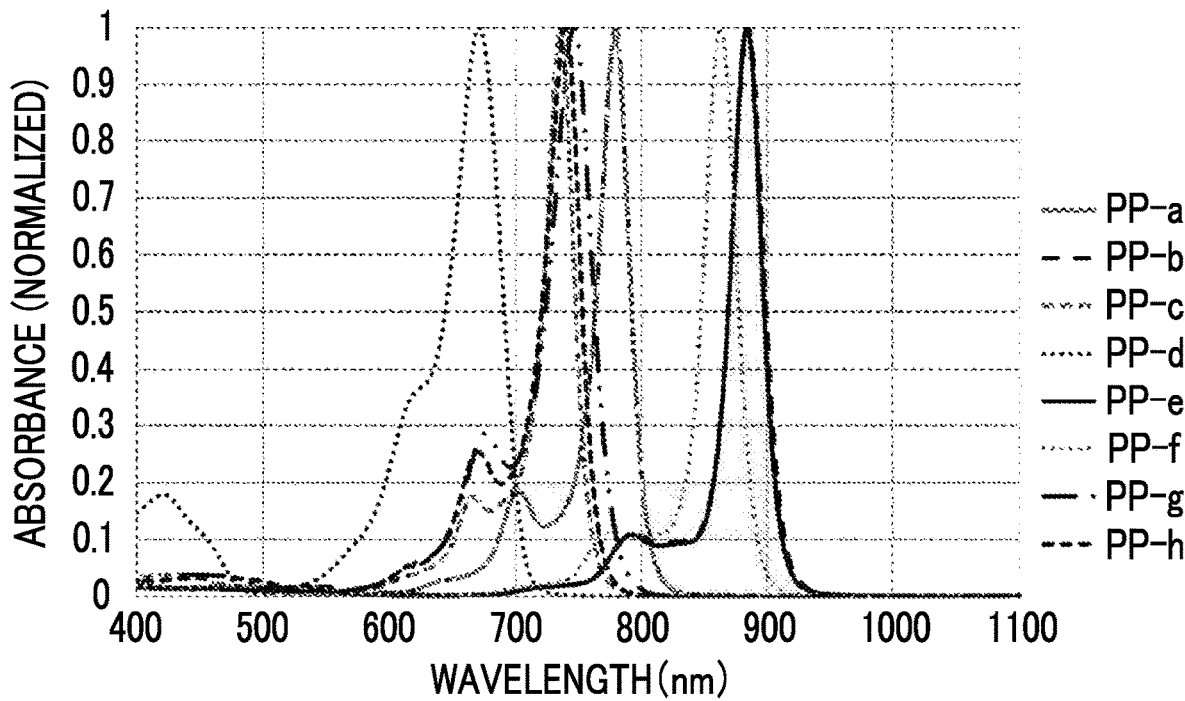
FIG. 4 is a diagram showing absorption spectra of pyrrolopyrrole compounds PP-a to PP-h in a solution.

FIG. 4 is a diagram showing absorption spectra of the pyrrolopyrrole compounds PP-a to PP-h in a solution.

Figure 5:
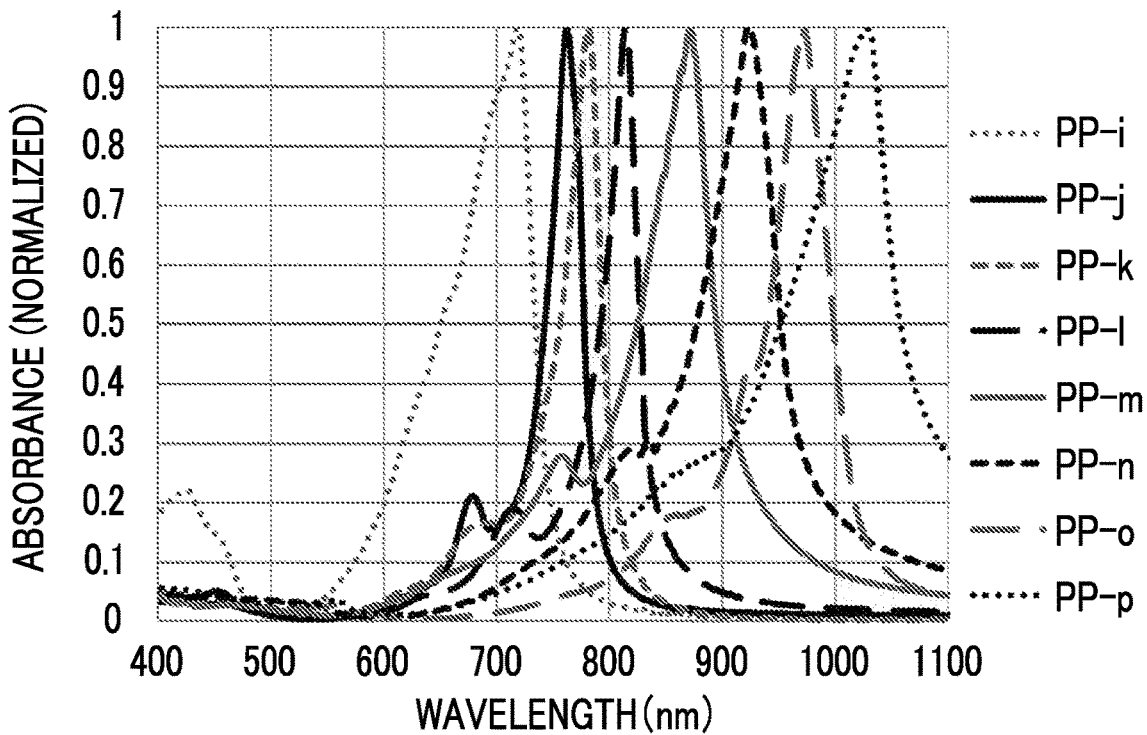
FIG. 5 is a diagram showing absorption spectra of pyrrolopyrrole compounds PP-i to PP-p in a film.

FIG. 5 is a diagram showing absorption spectra of the pyrrolopyrrole compounds PP-i to PP-p in a film.

Figure 6:
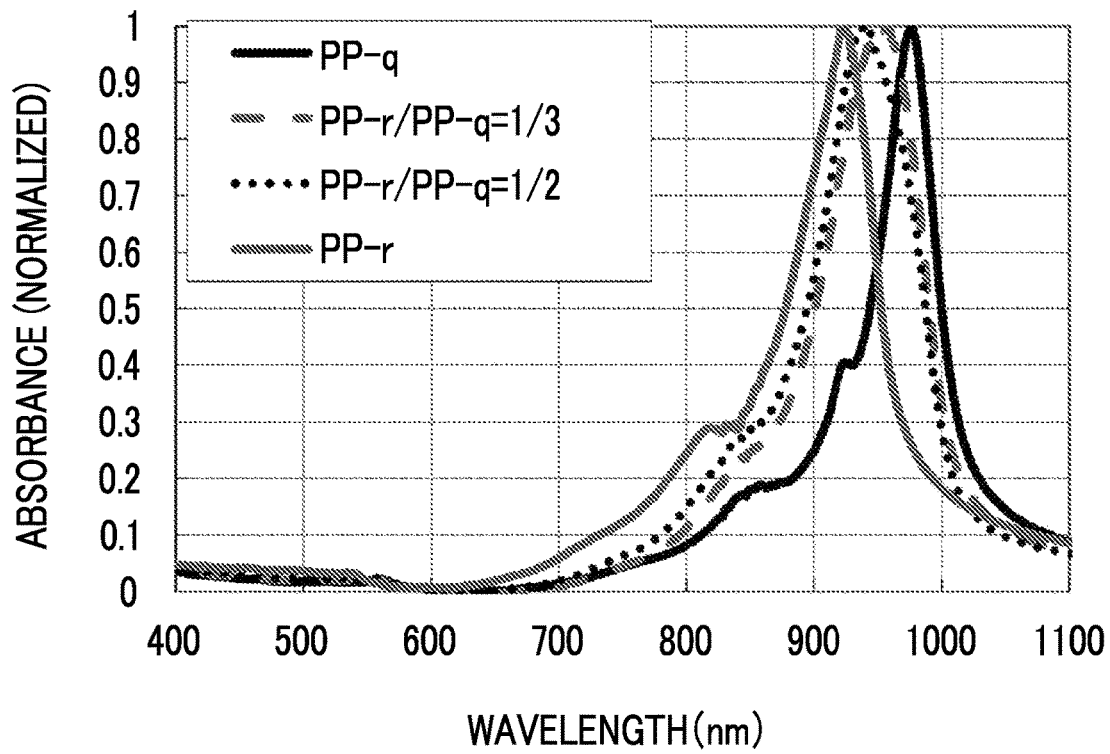
FIG. 6 is a diagram showing a change in absorption spectrum caused by formation of a J-aggregate in a case where a content mass ratio of a pyrrolopyrrole compound PP-r to a pyrrolopyrrole compound PP-q changes.

FIG. 6 is a diagram showing a change in absorption spectrum caused by formation of a J-aggregate in a case where a content mass ratio of a pyrrolopyrrole compound PP-r to a pyrrolopyrrole compound PP-q changes.

Figure 7:
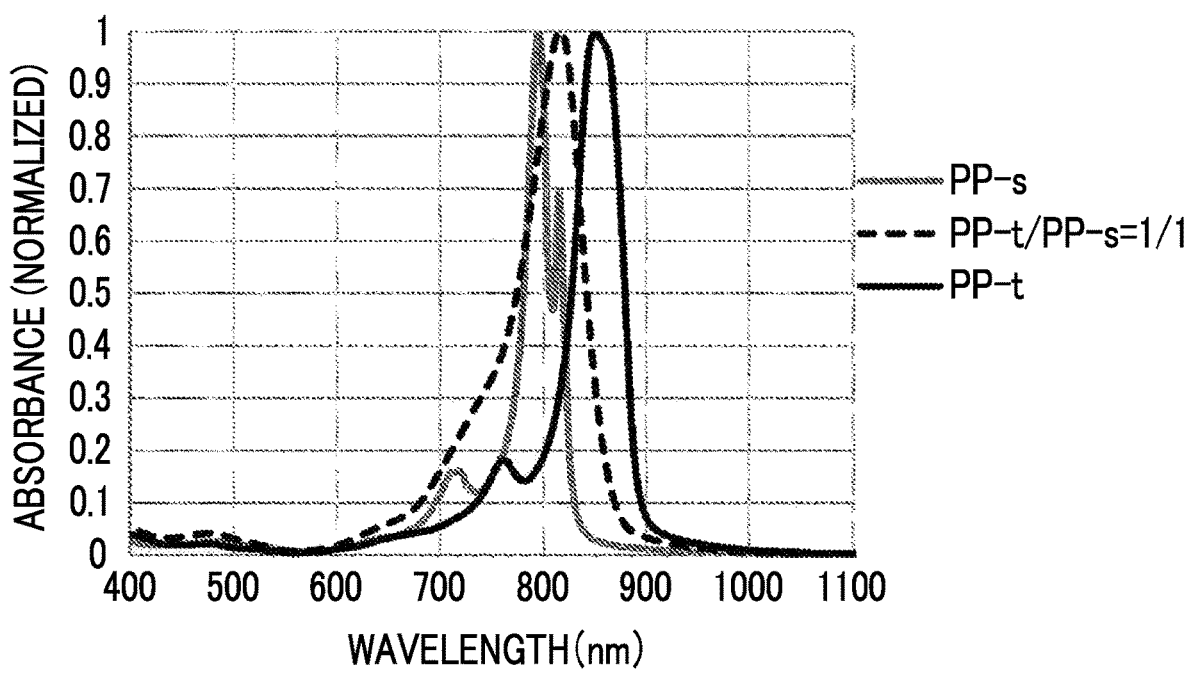
FIG. 7 is a diagram showing a change in absorption spectrum caused by formation of a J-aggregate in a case where a content mass ratio of a pyrrolopyrrole compound PP-t to a pyrrolopyrrole compound PP-s changes.

FIG. 7 is a diagram showing a change in absorption spectrum caused by formation of a J-aggregate in a case where a content mass ratio of a pyrrolopyrrole compound PP-t to a pyrrolopyrrole compound PP-s changes.

In addition, as the pyrrolopyrrole compound, a compound represented by Formula (PP) is preferable.

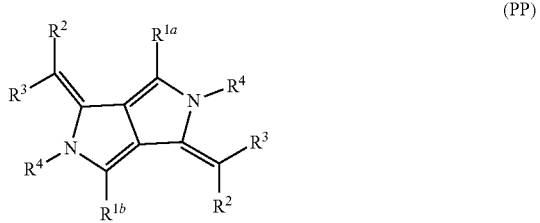

(PP)

In Formula (PP), $R^{1a}$ and $R^{1b}$ each independently represent an alkyl group, an aryl group, or a heteroaryl group, $R^2$ and $R^3$ each independently represent a hydrogen atom or a substituent, $R^2$ and $R^3$ may be bonded to each other to form a ring, $R^4$'s each independently represent a hydrogen atom, an alkyl group, an aryl group, a heteroaryl group, $-BR^{4A}R^{4B}$, or a metal atom, $R^4$ may form a covalent bond or a coordinate bond with at least one selected from $R^{1a}$, $R^{1b}$ or $R^3$, and $R^{4A}$ and $R^{4B}$ each independently represent a substituent. The details of Formula (PP) can be found in paragraphs "0017" to "0047" of JP2009-263614A, paragraphs "0011" to "0036" of JP2011-068731A, and paragraphs "0010" to "0024" of WO2015/166873A, the contents of which are incorporated herein by reference.

In Formula (PP), $R^{1a}$ and $R^{1b}$ each independently represent preferably an aryl group or a heteroaryl group, and more preferably an aryl group. In addition, the alkyl group, the aryl group, and the heteroaryl group represented by $R^{1a}$ to $R^{1b}$ may have a substituent or may be unsubstituted. Examples of the substituent include a substituent T described below.

In Formula (PP), $R^2$ and $R^3$ each independently represent a hydrogen atom or a substituent. Examples of the substituent include the substituent T described below. It is preferable that at least one of $R^2$ or $R^3$ represents an electron-withdrawing group, it is more preferable that at least one of $R^2$ or $R^3$ represents a cyano group, a carboxy group, an acyl group, an alkoxycarbonyl group, an aryloxycarbonyl group, a carbamoyl group, an alkylcarbonyl group, an arylcarbonyl group, an alkylsulfonyl group, or an arylsulfonyl group, and it is preferable that at least one of $R^2$ or $R^3$ represents a cyano group.

In Formula (PP), it is preferable that $R^2$ represents an electron-withdrawing group (preferably a cyano group) and $R^3$ represents a heteroaryl group. It is preferable that the heteroaryl group is a 5- or 6-membered ring. The heteroaryl group is preferably a monocycle or a fused ring, more preferably a monocycle or a fused ring composed of 2 to 8 rings, and still more preferably a monocycle or a fused ring composed of 2 to 4 rings. The number of heteroatoms constituting the heteroaryl group is preferably 1 to 3 and more preferably 1 or 2. Examples of the heteroatom include a nitrogen atom, an oxygen atom, and a sulfur atom. It is preferable that the heteroaryl group has one or more nitrogen atoms. Two $R^2$'s in Formula (PP) may be the same as or different from each other. In addition, two $R^3$'s in Formula (PP) may be the same as or different from each other.

In Formula (PP), $R^4$ represents preferably a hydrogen atom, an alkyl group, an aryl group, a heteroaryl group, or a group represented by $-BR^{4A}R^{4B}$, more preferably a hydrogen atom, an alkyl group, an aryl group, or a group represented by $-BR$ and still more preferably a group represented by $-BR^{4A}R^{4B}$. As the substituent represented by $R^{4A}$ and $R^{4B}$, a halogen atom, an alkyl group, an alkoxy group, an aryl group, or a heteroaryl group is preferable, an alkyl group, an aryl group, or a heteroaryl group is more preferable, and an aryl group is still more preferable. Each of the groups may further have a substituent. Two $R^4$'s in Formula (PP) may be the same as or different from each other. $R^{4A}$ and $R^{4B}$ may be bonded to each other to form a ring.

Specific examples of the compound represented by Formula (PP) include the following compounds. In the following structural formulae, Me represents a methyl group, and Ph represents a phenyl group. In addition, examples of the pyrrolopyrrole compound include a compound described in paragraphs "0016" to "0058" of JP2009-263614A and a compound described in paragraphs "0037" to "0052" of JP2011-068731A, the contents of which are incorporated herein by reference. In addition, as specific examples of the pyrrolopyrrole compound, IP-1 and IP-2 described in Examples described below are also preferable.

PP-1
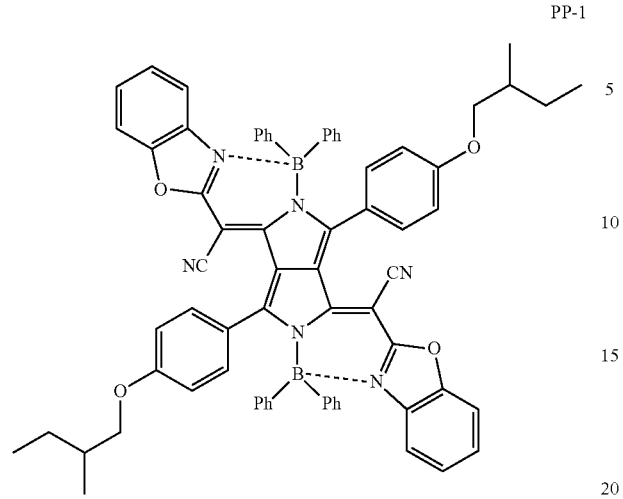
PP-2
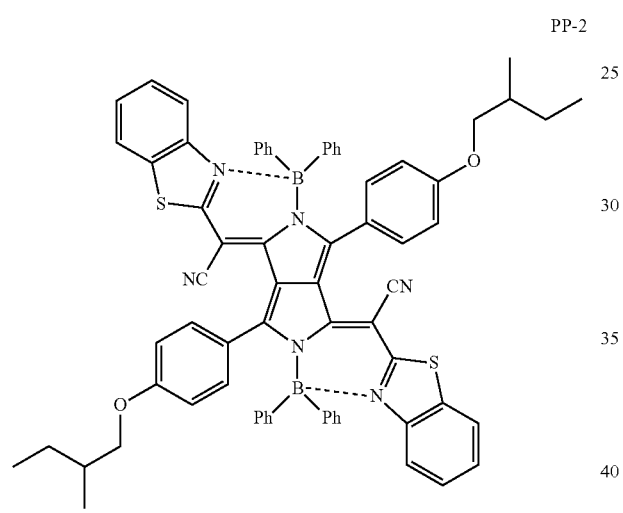
PP-3
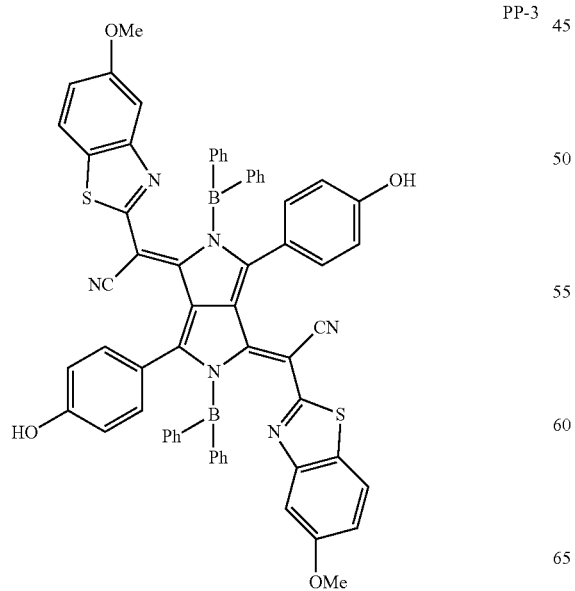
PP-4
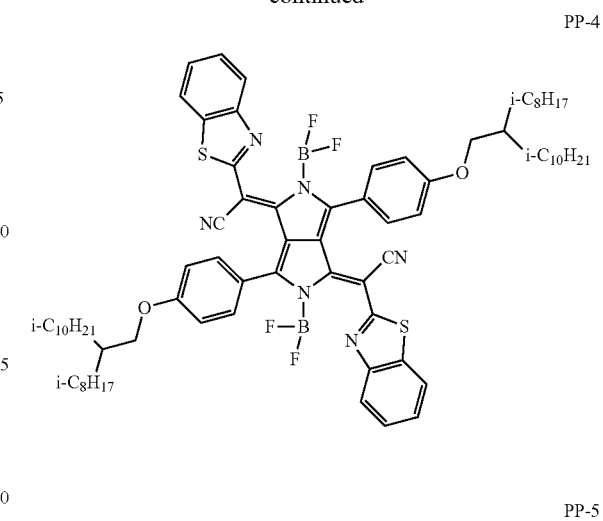
PP-5
PP-6
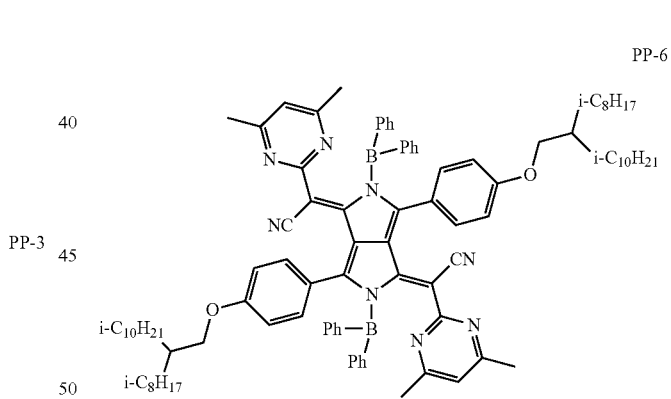
PP-7
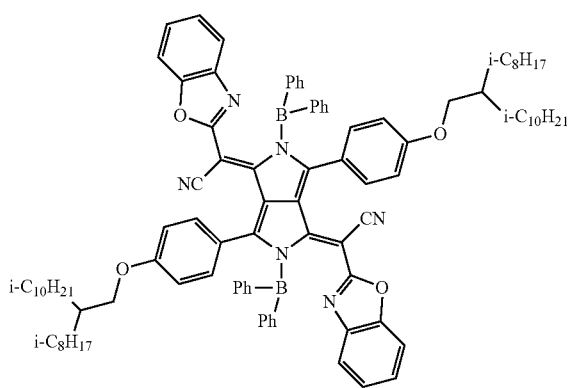

-continued
PP-8
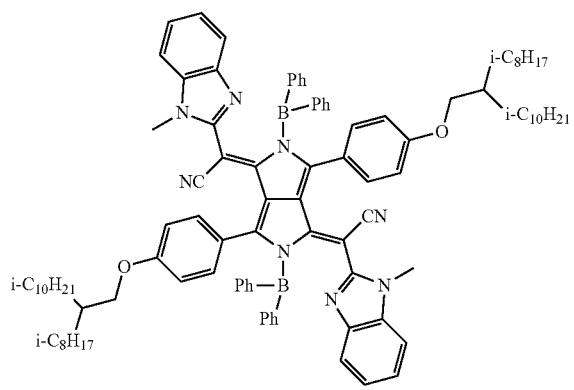
PP-9
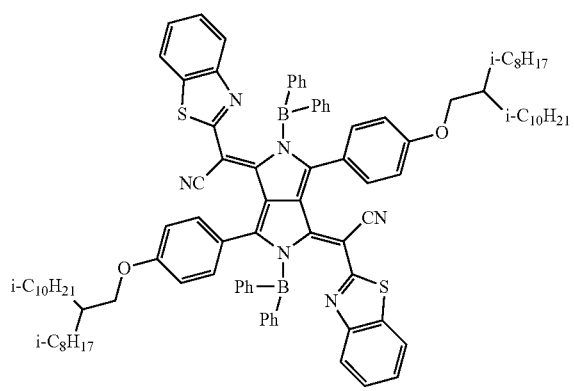
PP-10
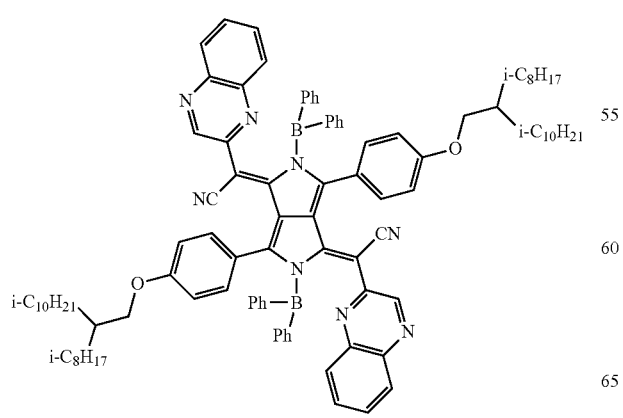
-continued
PP-11
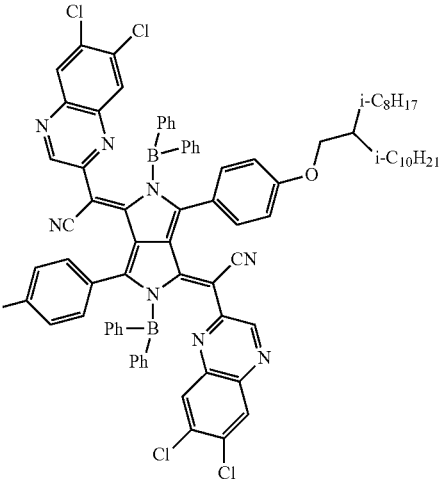
PP-12
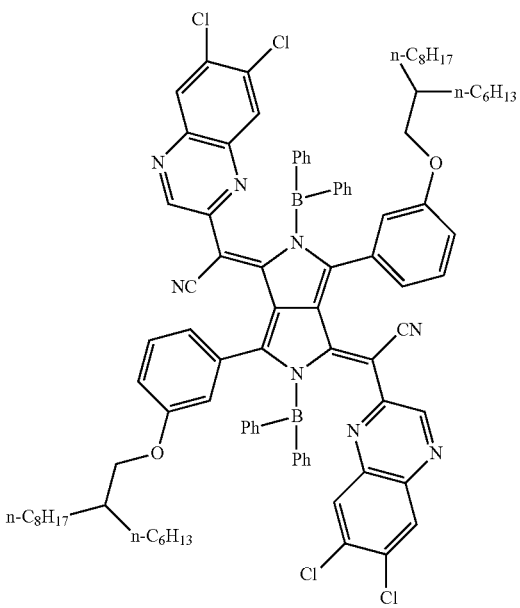
PP-13
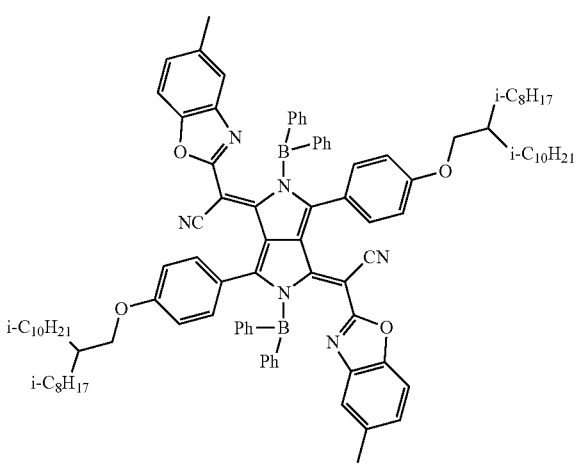

PP-14

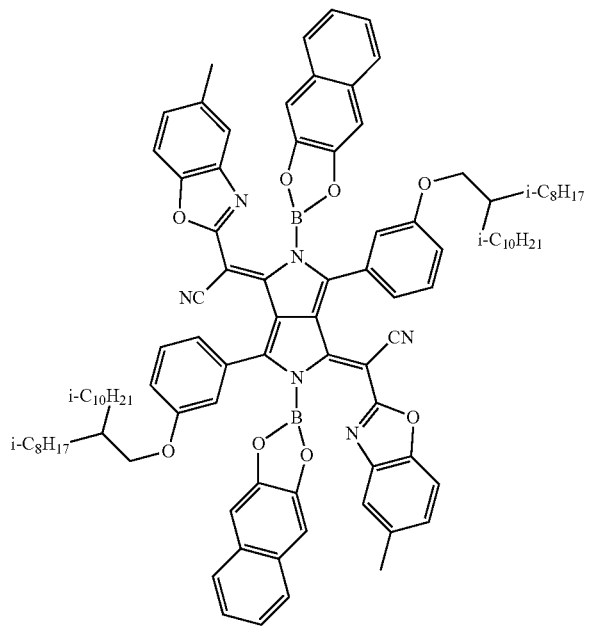

[Cyanine Compound]

As the cyanine compound, a compound represented by Formula (C) is preferable.

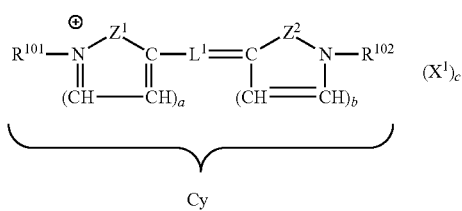

In Formula (C), $Z^1$ and $Z^2$ each independently represent a non-metal atomic group for forming a 5-membered or 6-membered nitrogen-containing heterocycle which may be fused.

$R^{101}$ and $R^{102}$ each independently represent an alkyl group, an alkenyl group, an alkynyl group, an aralkyl group, or an aryl group.

$L^1$ represents a methine chain including an odd number of methine groups.

a and b each independently represent 0 or 1.

In a case where a represents 0, a carbon atom and a nitrogen atom are bonded through a double bond. In a case where b represents 0, a carbon atom and a nitrogen atom are bonded through a single bond.

In a case where a site represented by Cy in the formula is a cation site, $X^1$ represents an anion, and c represents the number of $X^1$'s for balancing charge. In a case where a site represented by Cy in the formula is an anion site, $X^1$ represents a cation, and c represents the number of $X^1$'s for balancing charge. In a case where charge of a site represented by Cy in the formula is neutralized in a molecule, c represents 0.

In addition, examples of the cyanine compound include a compound described in paragraphs "0044" and "0045" of JP2009-108267A, a compound described in paragraphs "0026" to "0030" of JP2002-194040A, a compound described in JP2015-172004A, a compound described in JP2015-172102A, a compound described in JP2008-088426A, and a compound described in JP2017-031394A, the contents of which are incorporated herein by reference.

Squarylium Compound]

As the squarylium compound, a compound represented by the following Formula (SQ) is preferable.

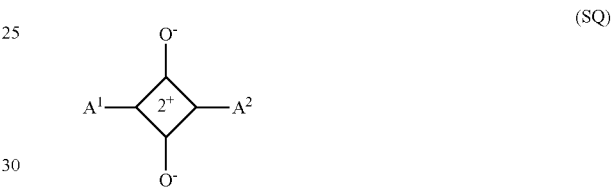

In Formula (SQ), $A^1$ and $A^2$ each independently represent an aryl group, a heteroaryl group, or a group represented by Formula (A-1).

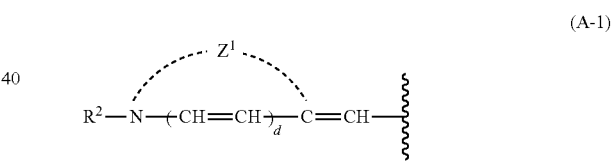

In Formula (A-1), $Z^1$ represents a non-metal atomic group for forming a nitrogen-containing heterocycle, $R^2$ represents an alkyl group, an alkenyl group, or an aralkyl group, d represents 0 or 1, and a wave line represents a direct bond. The details of Formula (SQ) can be found in paragraphs "0020" to "0049" of JP2011-208101A, paragraphs "0043" to "0062" of JP6065169B, and paragraphs "0024" to "0040" of WO2016/181987A, the contents of which are incorporated herein by reference.

As shown below, cations in Formula (SQ) are present without being localized.

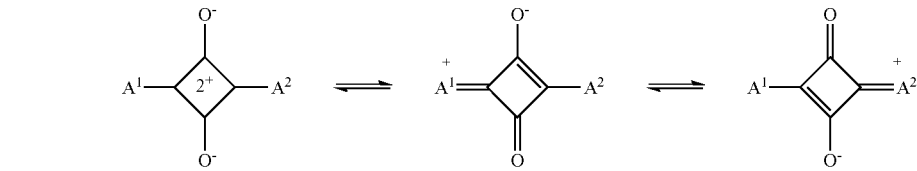

It is preferable that the squarylium compound is a compound represented by the following Formula (SQ-1).

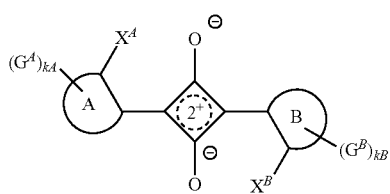
(SQ-1)

A ring A and a ring B each independently represent an aromatic ring.

$X^A$ and $X^B$ each independently represent a substituent.

$G^A$ and $G^B$ each independently represent a substituent.

kA represents an integer of 0 to $n_A$, and kB represents an integer of 0 to $n_B$.

$n_A$ and $n_B$ represent integers representing the maximum numbers of $G^A$'s and $G^B$'s which may be substituted in the ring A and the ring B, respectively.

$X^A$ and $G^A$, $X^B$ and $G^B$, or $X^A$ and $X^B$ may be bonded to each other to form a ring, and in a case where a plurality of $G^A$'s and a plurality of $G^B$'s are present, $G^A$'s and $G^B$'s may be bonded to each other to form ring structures, respectively.

Examples of the substituent represented by $G^A$ and $G^B$ include the substituent T described below.

As the substituent represented by $X^A$ and $X^B$, a group having active hydrogen is preferable, —OH, —SH, —COOH, —SO$_3$H, —NR$^{X1}$R$^{X2}$, —NHCOR$^{X1}$, —CONR$^{X1}$R$^{X2}$, —NHCONR$^{X1}$R$^{X2}$, —NHCOOR$^{X1}$, —NHSO$_2$R$^{X1}$, —B(OH)$_2$, or —PO(OH)$_2$ is more preferable, and —OH, —SH, or —NR$^{X1}$R$^{X2}$ is still more preferable. R$^{X1}$ and R$^{X2}$ each independently represent a hydrogen atom or a substituent. Examples of the substituents R$^{X1}$ and R$^{X2}$ in $X^A$ and $X^B$ include an alkyl group, an aryl group, and a heteroaryl group. Among these, an alkyl group is preferable.

The ring A and the ring B each independently represent an aromatic ring. The aromatic ring may be a monocycle or a fused ring. Specific examples of the aromatic ring include a benzene ring, a naphthalene ring, a pentalene ring, an indene ring, an azulene ring, a heptalene ring, an indacene ring, a perylene ring, a pentacene ring, an acenaphthene ring, a phenanthrene ring, an anthracene ring, a naphthacene ring, a chrysene ring, a triphenylene ring, a fluorene ring, a biphenyl ring, a pyrrole ring, a furan ring, a thiophene ring, an imidazole ring, an oxazole ring, a thiazole ring, a pyridine ring, a pyrazine ring, a pyrimidine ring, a pyridazine ring, an indolizine ring, an indole ring, a benzofuran ring, a benzothiophene ring, an isobenzofuran ring, a quinolizine ring, a quinoline ring, a phthalazine ring, a naphthyridine ring, a quinoxaline ring, a quinoxazoline ring, an isoquinoline ring, a carbazole ring, a phenanthridine ring, an acridine ring, a phenanthroline ring, a thianthrene ring, a chromene ring, a xanthene ring, a phenoxathiin ring, a phenothiazine ring, and a phenazine ring. Among these, a benzene ring or a naphthalene ring is preferable. The aromatic ring may be unsubstituted or may have a substituent. Examples of the substituent include the substituent T described below.

$X^A$ and $G^A$, $X^B$ and $G^B$, or $X^A$ and $X^B$ may be bonded to each other to form a ring, and in a case where a plurality of $G^A$'s and a plurality of $G^B$'s are present, $G^A$'s and $G^B$'s may be bonded to each other to form rings, respectively. It is preferable that the ring is a 5- or 6-membered ring. The ring may be a monocycle or a fused ring.

In a case where $X^A$ and $G^A$, $X^B$ and $G^B$, $X^A$ and $X^B$, $G^A$'s, or $G^B$'s are bonded to each other to form a ring, the groups may be directly bonded to each other to form a ring, or may be bonded to each other through a divalent linking group selected from an alkylene group, —CO—, —O—, —NH—, —BR—, or a combination thereof to form a ring. R represents a hydrogen atom or a substituent. Examples of the substituent include the substituent T described below. Among these, an alkyl group or an aryl group is preferable.

kA represents an integer of 0 to $n_A$, kB represents an integer of 0 to $n_B$. $n_A$ represents an integer representing the maximum number of $G^A$'s which may be substituted in the ring A, and $n_B$ represents an integer representing the maximum number of $G^B$'s which may be substituted in the ring B. kA and kB each independently represent preferably an integer of 0 to 4, more preferably 0 to 2, and still more preferably 0 or 1.

It is also preferable that the squarylium compound is a compound represented by the following Formula (SQ-10), Formula (SQ-11), or Formula (SQ-12).

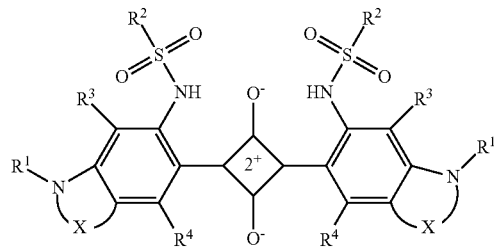
Formula (SQ-10)

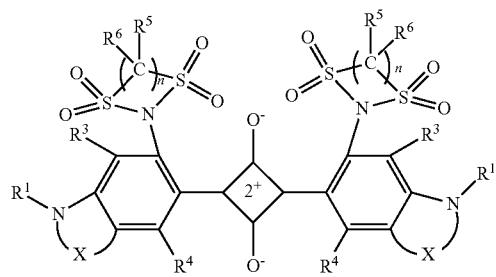
Formula (SQ-11)

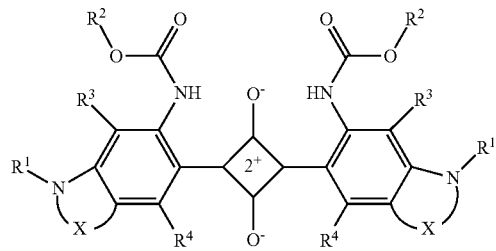
Formula (SQ-12)

In Formulae (SQ-10) to (SQ-12), X's each independently represent a divalent organic group represented by Formula (1) or Formula (2) in which one or more hydrogen atoms may be substituted with a halogen atom, an alkyl group having 1 to 12 carbon atoms, or an alkoxy group.

—(CH$_2$)$_{n1}$—     (1)

In Formula (1), n1 represents 2 or 3.

—(CH$_2$)$_{n2}$—O—(CH$_2$)$_{n3}$—     (2)

In Formula (2), n2 and n3 each independently represent an integer of 0 to 2, and n2+n3 represents 1 or 2.

$R^1$ and $R^2$ each independently represent an alkyl group or an aryl group. The alkyl group and the aryl group may have a substituent or may be unsubstituted. Examples of the substituent include a substituent T described below.

$R^3$ to $R^6$ each independently represent a hydrogen atom, a halogen atom, an alkyl group, or an alkoxy group.

n represents 2 or 3.

Examples of the squarylium compound include a compound having the following structure. In addition, examples of the squarylium compound include a compound described in paragraphs "0044" to "0049" of JP2011-208101A, a compound described in paragraphs "0060" and "0061" of JP6065169B, a compound described in paragraph "0040" of WO2016/181987A, a compound described in WO2013/133099A, a compound described in WO2014/088063A, a compound described in JP2014-126642A, a compound described in JP2016-146619A, a compound described in JP2015-176046A, a compound described in JP2017-025311A, a compound described in WO2016/154782A, a compound described in JP5884953B, a compound described in JP6036689B, a compound described in JP5810604B, and a compound described in JP2017-068120A, the contents of which are incorporated herein by reference.

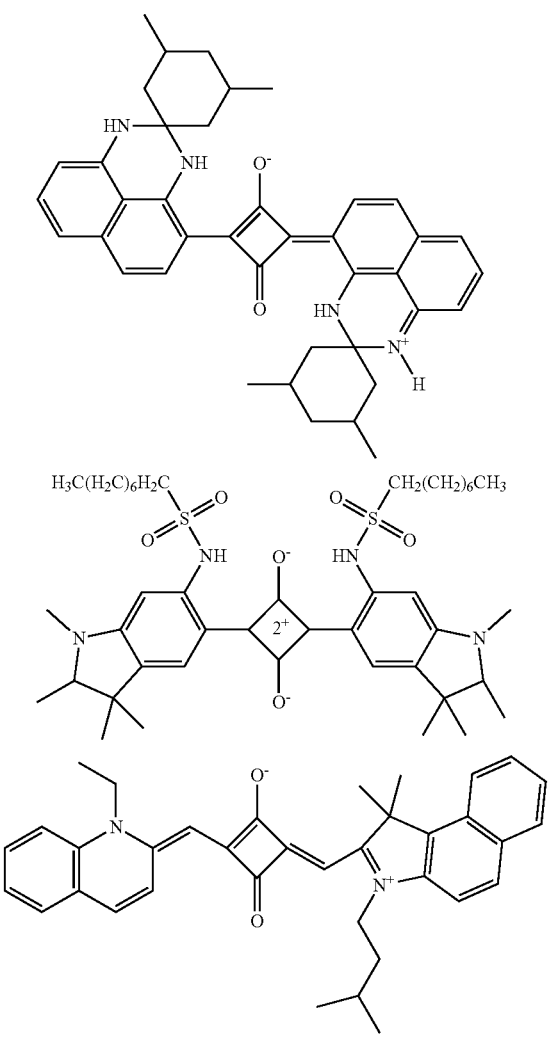

[Pyrylium Compound]

Examples of the pyrylium compound include a compound having the following structure. In addition, examples of the pyrylium compound include substituted arylbenzo(thio)pyrylium salts described in U.S. Pat. No. 3,881,924A, trimethinethiapyrylium salts described in JP1982-142645A (JP-S57-142645A), pyrylium compounds described in JP1983-181051A (JP-S58-181051A), JP1983-220143A (JP-S58-220143A), JP1984-041363A (JP-S59-041363A), JP1984-084248A (JP-S59-084248A), JP1984-084249A (JP-S59-084249A), JP1984-146063A (JP-S59-146063A), and JP1984-146061A (JP-S59-146061A), cyanine dyes described in JP1984-216146A (JP-S59-216146A), pentamethinethiopyrylium salts described in U.S. Pat. No. 4,283,475A, and pyrylium compounds described in JP1993-013514B (JP-H5-013514B) and JP1993-019702B (JP-H5-019702B).

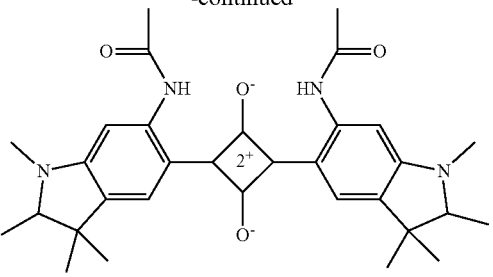

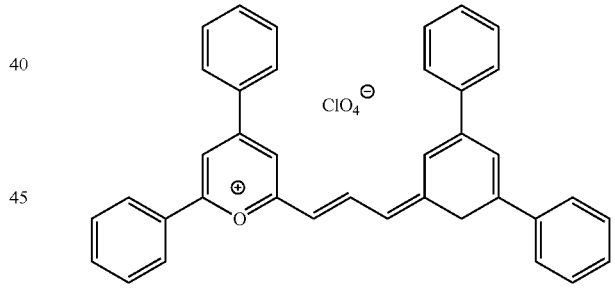

[Phthalocyanine Compound and Naphthalocyanine Compound]

Examples of the phthalocyanine compound include a compound described in paragraph "0093" of JP2012-077153A, oxytitaniumphthalocyanine described in JP2006-343631A, a compound described in paragraphs "0013" to "0029" of JP2013-195480A, vanadium phthalocyanine described in JP6081771B, the contents of which are incorporated herein by reference. As the phthalocyanine compound, for example, a compound having the following structure can also be used. Examples of the naphthalocyanine compound include a compound described in paragraph "0093" of JP2012-077153A, the content of which is incorporated herein by reference.

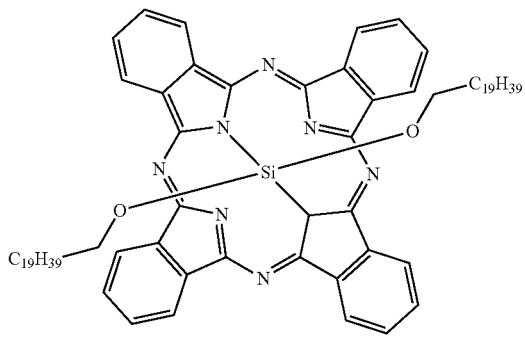

In the present disclosure, as the phthalocyanine compound, a commercially available product can be used. Examples of the commercially available product include SDO-C33 (manufactured by Arimoto Chemical Co., Ltd.); EXCOLOR IR-14, EXCOLOR IR-10A, EXCOLOR TX-EX-801B, and EXCOLOR TX-EX-805K (manufactured by Nippon Shokubai Co., Ltd.); Shigenox NIA-8041, Shigenox NIA-8042, Shigenox NIA-814, Shigenox NIA-820, and Shigenox NIA-839 (manufactured by Hakko Chemical Co., Ltd.); Epolite V-63, Epolight 3801, and Epolight 3036 (manufactured by Epolin Inc.); PRO-JET 825LDI (manufactured by Fujifilm Corporation); NK-3027 and NK-5060 (manufactured by Hayashibara Co., Ltd.); and YKR-3070 (manufactured by Mitsui Chemicals, Inc.).

[Diiminium Compound]

As the diiminium compound, a compound represented by the following Formula (Im) is preferable.

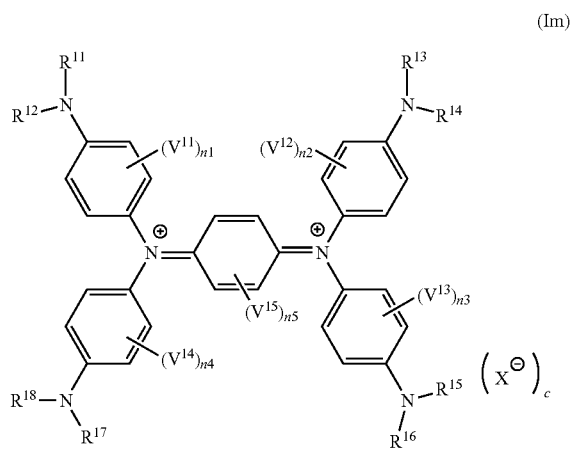

(Im)

In Formula (Im), $R^{11}$ to $R^{18}$ each independently represent an alkyl group or an aryl group, $V^{11}$ to $V^{15}$ each independently represent an alkyl group, an aryl group, a halogen atom, an alkoxy group, or a cyano group, X represents a counter anion, c represents the number of X's for balancing charge, and n1 to n5 each independently 0 to 4.

$R^{11}$ to $R^{18}$ each independently represent an alkyl group or an aryl group. The number of carbon atoms in the alkyl group is preferably 1 to 20, more preferably 1 to 12, and still more preferably 1 to 8. The alkyl group may be linear, branched, or cyclic and is preferably linear or branched. The number of carbon atoms in the aryl group is preferably 6 to 25, more preferably 6 to 15, and still more preferably 6 to 12. The alkyl group and the aryl group may have a substituent or may be unsubstituted. Examples of the substituent include groups described below regarding a substituent T.

$V^{11}$ to $V^{15}$ each independently represent an alkyl group, an aryl group, a halogen atom, an alkoxy group, or a cyano group. Examples of the halogen atom include a fluorine atom, a chlorine atom, a bromine atom, and an iodine atom. The number of carbon atoms in the alkyl group is preferably 1 to 20, more preferably 1 to 12, and still more preferably 1 to 8. The alkyl group may be linear, branched, or cyclic and is preferably linear or branched and more preferably linear. The number of carbon atoms in the aryl group is preferably 6 to 25, more preferably 6 to 15, and still more preferably 6 to 12. The number of carbon atoms in the alkoxy group is preferably 1 to 20, more preferably 1 to 12, and still more preferably 1 to 8. The alkoxy group may be linear, branched, or cyclic and is preferably linear or branched and more preferably linear.

n1 to n5 each independently 0 to 4. n1 to n4 represents preferably 0 to 2 and more preferably 0 or 1. n5 represents preferably 0 to 3 and more preferably 0 to 2.

X represents a counter anion. Examples of the counter anion include a halide ion ($Cl^-$, $Br^-$, or $F^-$), a p-toluenesulfonate ion, an ethyl sulfate ion, $SbF_6^-$, $PF_6^-$, $BF_4^-$ $ClO_4^-$, a tris(halogenoalkylsulfonyl)methide anion (for example, $(CF_3SO_2)_3C^-$), a di(halogenoalkylsulfonyl)imide anion (for example, $(CF_3SO_2)_2N^-$), and a tetracyanoborate anion.

c represents the number of X's for balancing charge, for example, preferably 2.

(Substituent T)

The substituent T includes an alkyl group (preferably an alkyl group having 1 to 30 carbon atoms), an alkenyl group (preferably an alkenyl group having 2 to 30 carbon atoms), an alkynyl group (preferably an alkynyl group having 2 to 30 carbon atoms), an aryl group (preferably an aryl group having 6 to 30 carbon atoms), an amino group (preferably an amino group having 0 to 30 carbon atoms), an alkoxy group (preferably an alkoxy group having 1 to 30 carbon atoms), an aryloxy group (preferably an aryloxy group having 6 to 30 carbon atoms), a heteroaryloxy group, an acyl group (preferably having an acyl group 1 to 30 carbon atoms), an alkoxycarbonyl group (preferably an alkoxycarbonyl group having 2 to 30 carbon atoms), an aryloxycarbonyl group (preferably an aryloxycarbonyl group having 7 to 30 carbon atoms), an acyloxy group (preferably an acyloxy group having 2 to 30 carbon atoms), an acylamino group (preferably an acylamino group having 2 to 30 carbon atoms), an alkoxycarbonylamino group (preferably an alkoxycarbonylamino group having 2 to 30 carbon atoms), an aryloxycarbonylamino group (preferably an aryloxycarbonylamino group having 7 to 30 carbon atoms), a sulfamoyl group (preferably a sulfamoyl group having 0 to 30 carbon atoms), a carbamoyl group (preferably a carbamoyl group having 1 to 30 carbon atoms), an alkylthio group (preferably an alkylthio group having 1 to 30 carbon atoms), an arylthio group (preferably an arylthio group having 6 to 30 carbon atoms), a heteroarylthio group (preferably having 1 to 30 carbon atoms), an alkylsulfonyl group (preferably having 1 to 30 carbon atoms), an arylsulfonyl group (preferably having 6 to 30 carbon atoms), a heteroarylsulfonyl group (preferably having 1 to 30 carbon atoms), an alkylsulfinyl group (preferably having 1 to 30 carbon atoms), an arylsulfinyl group (preferably having 6 to 30 carbon atoms), a heteroarylsulfinyl group (preferably having 1 to 30 carbon atoms), a ureido group (preferably having 1 to 30 carbon atoms), a hydroxy group, a carboxy group, a sulfo group, a phosphate group, a carboxylic acid amide group (preferably a group represented by —$NHCOR^{41}$; $R^{41}$ represents a hydrocarbon group or a heterocyclic group, and the hydrocarbon group and the heterocyclic group may further have a substituent; as the substituent, a halogen atom is preferable, and a fluorine atom is more preferable), a sulfonic acid amide group (preferably a group represented by —NHSO$_2$R$^{42}$; R$^{42}$ represents a hydrocarbon group or a heterocyclic group, and the hydrocarbon group and the heterocyclic group may further have a substituent; as the substituent, a halogen atom is preferable, and a fluorine atom is more preferable), an imide acid group (preferably a group represented by —SO$_2$NHSO$_2$R$^{43}$, —CONHSO$_2$R$^{44}$, —CONHCOR$^{45}$, or —SO$_2$NHCOR$^{46}$; R$^{43}$ to R$^{46}$ each independently represent a hydrocarbon group or a heterocyclic group; the hydrocarbon group and the heterocyclic group may further have a substituent), a mercapto group, a halogen atom, a cyano group, an alkylsulfino group, an arylsulfino group, a hydrazino group, an imino group, and a heteroaryl group (preferably having 1 to 30 carbon atoms).

In a case where the above-described groups can be further substituted, the groups may further have a substituent. Examples of the substituent include the groups described regarding the substituent T.

Specific examples of the diiminium compound include the following compounds. In the table, λmax represents a maximum absorption wavelength of the same compound. In addition, examples of a commercially available product of the diiminium compound include IRG-068 (manufactured by Nippon Kayaku Co., Ltd.).

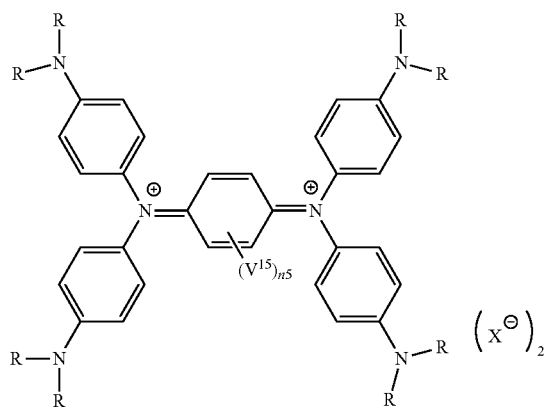

|  | R | X | λ max (nm) |
|---|---|---|---|
| im-1 | n-C$_3$H$_7$ | SbF$_8^-$ | 1095 |
| im-2 | n-C$_4$H$_9$ | SbF$_8^-$ | 1100 |
| im-3 | n-C$_5$H$_{11}$ | SbF$_6^-$ | 1103 |
| im-4 | n-C$_6$H$_{13}$ | SbF$_6^-$ | 1102 |
| im-5 | n-C$_8$H$_{17}$ | SbF$_6^-$ | 1104 |
| im-6 | i-C$_4$H$_9$ | SbF$_6^-$ | 1108 |
| im-7 | i-C$_5$H$_{11}$ | SbF$_6^-$ | 1101 |
| im-8 | i-C$_6$H$_{13}$ | SbF$_6^-$ | 1098 |
| im-9 | n-C$_3$H$_6$CN | SbF$_6^-$ | 1061 |
| im-10 | n-C$_4$H$_9$ | ClO$_4^-$ | 1095 |
| im-11 | n-C$_4$H$_9$ | PF$_6^-$ | 1100 |
| im-12 | n-C$_4$H$_9$ | (CF$_3$SO$_2$)$_2$N$^-$ | 1102 |
| im-13 | i-C$_4$H$_9$ | (CF$_3$SO$_2$)$_2$N$^-$ | 1106 |

[Flat Metal Particles]

As a material of flat metal particles used as the other infrared absorber, silver, gold, aluminum, copper, rhodium, nickel, or platinum is preferable, and silver is more preferable. The flat metal particles are not particularly limited as long as they are particles having two principal planes and can be appropriately selected depending on the purposes. Examples of the shape of the flat metal particles include a hexagonal shape, a circular shape, and a triangular shape. In particular, from the viewpoint of increasing visible transmittance, a hexagonal shape or more polygonal shape or a circular shape is more preferable, and a hexagonal shape or a circular shape is still more preferable. The thickness of the flat metal particles is preferably 20 nm or less and more preferably 14 nm or less. An aspect ratio of the flat metal particles is not particularly limited and can be appropriately selected depending on the purposes. From the viewpoint of increasing a reflectivity of light in an infrared range (for example, in a wavelength range of longer than 1,000 nm and 1,200 nm or shorter), the aspect ratio is preferably 6 to 40 and more preferably 8 to 30. The above-described aspect ratio refers to a value obtained by dividing the average primary particle size (average equivalent circle diameter) of the flat metal particles by the average particle thickness of the flat metal particles. The average particle thickness corresponds to the distance between the principal planes of the flat metal particles and can be measured using an atomic force microscope (AFM). The details of the flat metal particles can be found in paragraphs "0017" to "0027" of JP2013-195563A, the content of which is incorporated herein by reference.

[Quantum Dots]

Examples of a material of the quantum dot used as the other infrared absorber include FeSi, Ge, InN, InAs, PbTe, PbSe, and InSb. The shape of the quantum dot is not particularly limited, and examples thereof include a spherical shape, a flaky shape, a plate shape, an oval spherical shape, and an unstructured shape.

[Rare Earth-Containing Ceramic]

Examples of the rare earth-containing ceramic used as the other infrared absorber include a ceramic include a rare earth atom such as Yb, Ho, or Tm. Specific examples include Y$_2$O$_3$ including Yb and Ho and Y$_2$O$_3$ including Yb and Tm.

[Content]

In the composition according to the present disclosure, the content of the other infrared absorber is preferably 0.5 to 30 mass % with respect to the total solid content of the composition. The upper limit of the content is more preferably 20 mass % or lower and still more preferably 15 mass % or lower. The lower limit of the content is more preferably 1 mass % or higher and still more preferably 2 mass % or higher.

<Compound Having Maximum Absorption Wavelength in Wavelength Range of 400 nm to 700 nm>

It is preferable that the curable composition according to the embodiment of the present disclosure further includes a compound (hereinafter, also referred to as "visible light absorbing compound") having a maximum absorption wavelength in a wavelength range of 400 nm to 700 nm.

In addition, it is preferable that the curable composition according to the embodiment of the present disclosure further includes the visible light absorbing compound, in which in a case where a wavelength that is shorter than the wavelength Tb by 150 nm is represented by Ta', a ratio A'/C of a minimum value A' of an absorbance in a wavelength range of 400 nm to the wavelength Ta' to the maximum value C is 4.5 or higher.

A'/C is preferably 10 or higher, more preferably 15 or higher, and still more preferably 20 or higher.

The minimum value A' is preferably 0.8 or higher, more preferably 1.0 or higher, and still more preferably 1.3 or higher.

[Visible Light Absorbing Compound]

It is preferable that the visible light absorbing compound is a compound that absorbs light in a wavelength range of violet to red.

It is preferable that the visible light absorbing compound is a colorant that blocks light in a wavelength range of 450 nm to 650 nm (preferably in a wavelength range of 400 nm to 700 nm).

It is preferable that the visible light absorbing compound has a maximum absorption wavelength in a wavelength range of 400 nm to 700 nm.

It is preferable that the visible light absorbing compound has an absorption maximum in a wavelength range of 400 nm to 700 nm in a wavelength range of 350 nm to 1,300 nm.

It is preferable that the visible light absorbing compound is a compound having high transmittance to light in a wavelength range of 1,000 nm to 1,300 nm.

In the present disclosure, it is preferable that the curable composition includes two or more visible light absorbing compounds.

In the present disclosure, it is preferable that the visible light absorbing compound satisfies at least one of the following requirement (1) or (2).

(1): An aspect in which the visible light absorbing compound includes two or more chromatic colorants. It is more preferable that a combination of the two or more chromatic colorants forms black.

(2) An aspect in which the visible light absorbing compound includes an organic black colorant. In the aspect (2), it is preferable that the visible light absorbing compound further includes a chromatic colorant.

In the present disclosure, "chromatic colorant" denotes a colorant other than a white colorant and a black colorant. It is preferable that the chromatic colorant is a colorant having an absorption maximum in a wavelength range of 400 nm to 700 nm in a wavelength range of 350 nm to 1,300 nm.

In addition, in the present disclosure, the organic black colorant as the visible light absorbing compound denotes a material that absorbs visible light and allows transmission of at least a part of infrared light. Accordingly, in the present disclosure, the organic black colorant as the visible light absorbing compound does not denote a black colorant that absorbs both visible light and infrared light, for example, carbon black or titanium black. It is preferable that the organic black colorant is a colorant having a maximum absorption wavelength in a wavelength range of 400 nm to 700 nm. It is preferable that the organic black colorant is a colorant having an absorption maximum in a wavelength range of 400 nm to 700 nm in a wavelength range of 350 nm to 1,300 nm.

It is preferable that, in the visible light absorbing compound, for example, a ratio A1/B1 of a minimum value A1 of an absorbance in a wavelength range of 450 nm to 650 nm to a maximum value B1 of an absorbance in a wavelength range of 1,000 nm to 1,500 nm is 4.5 or higher.

The above-described spectral characteristics (A1/B1) of the visible light absorbing compound may be satisfied using one visible light absorbing compound or may be satisfied using a combination of a plurality of visible light absorbing compounds. For example, in the aspect (1), it is preferable that the spectral characteristics are satisfied using a combination of a plurality of chromatic colorants. In addition, in the aspect (2), the spectral characteristics may be satisfied using an organic black colorant. In addition, the spectral characteristics may be satisfied using a combination of an organic black colorant and a chromatic colorant.

—Chromatic Colorant—

In the present disclosure, it is preferable that the chromatic colorant is at least one colorant selected from the group consisting of a red colorant, a blue colorant, a green colorant, a yellow colorant, a violet colorant, and a brown colorant.

In the present disclosure, the chromatic colorant may be a pigment or a dye. It is preferable that the chromatic colorant is a pigment.

It is preferable that an average particle size (r) of the pigment satisfies preferably 20 nm≤r≤300 nm, more preferably 25 nm≤r≤250 nm, and still more preferably 30 nm≤r≤200 nm. "Average particle size" described herein denotes the average particle size of secondary particles which are aggregates of primary particles of the pigment, which is a number average particle size.

In addition, regarding a particle size distribution of the secondary particles of the pigment (hereinafter, simply referred to as "particle size distribution") which can be used, it is preferable that secondary particles having a particle size of (average particle size±100) nm account for 70 mass % or higher, preferably, 80 mass % or higher in the pigment. The average particle size and particle size distribution of the secondary particles can be measured using a dynamic light scattering method.

The pigment having an average particle size and a particle size distribution in the above-described ranges can be prepared by mixing and dispersing a pigment mixed solution while pulverizing the pigment mixed solution using a pulverizer such as a beads mill or a roll mill, the pigment mixed solution being obtained by mixing a commercially available pigment, another pigment (typically having an average particle size of secondary particles of more than 300 nm) which is optionally used, and a resin and an organic solvent which are preferably used with each other. The pigment obtained as described above is typically in the form of a pigment dispersion liquid.

The pigment is preferably an organic pigment, and examples thereof are as follows. However, the present disclosure is not limited to the examples:

Color Index (C.I.) Pigment Yellow 1, 2, 3, 4, 5, 6, 10, 11, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, 214, and the like (all of which are yellow pigments);

C.I. Pigment Orange 2, 5, 13, 16, 17:1, 31, 34, 36, 38, 43, 46, 48, 49, 51, 52, 55, 59, 60, 61, 62, 64, 71, 73, and the like (all of which are orange pigments);

C.I. Pigment Red 1, 2, 3, 4, 5, 6, 7, 9, 10, 14, 17, 22, 23, 31, 38, 41, 48:1, 48:2, 48:3, 48:4, 49, 49:1, 49:2, 52:1, 52:2, 53:1, 57:1, 60:1, 63:1, 66, 67, 81:1, 81:2, 81:3, 83, 88, 90, 105, 112, 119, 122, 123, 144, 146, 149, 150, 155, 166, 168, 169, 170, 171, 172, 175, 176, 177, 178, 179, 184, 185, 187, 188, 190, 200, 202, 206, 207, 208, 209, 210, 216, 220, 224, 226, 242, 246, 254, 255, 264, 270, 272, 279, 294, and the like (xanthene, Organo Ultramarine, Bluish Red) (all of which are red pigments);

C.I. Pigment Green 7, 10, 36, 37, 58, 59, and the like (all of which are green pigments);

C.I. Pigment Violet 1, 19, 23, 27, 32, 37, 42, and the like (all of which are violet pigments); and C.I. Pigment Blue 1, 2, 15, 15:1, 15:2, 15:3, 15:4, 15:6, 16, 22, 29, 60, 64, 66, 79, 80, 87 (monoazo), 88 (methine/polymethine), and the like (all of which are blue pigments).

Among these organic pigments, one kind may be used alone, or two or more kinds may be used in combination.

As the dye, well-known dyes can be used without any particular limitation. In terms of a chemical structure, a dye such as a pyrazole azo dye, an anilino azo dye, a triarylmethane dye, an anthraquinone dye, an anthrapyridone dye, a benzylidene dye, an oxonol dye, a pyrazolotriazole azo dye, a pyridone azo dye, a cyanine dye, a phenothiazine dye, a pyrrolopyrazole azomethine dye, a xanthene dye, a phthalocyanine dye, a benzopyran dye, an indigo dye, or a pyrromethene dye can be used. In addition, a polymer of the above-described dyes may be used. In addition, dyes described in JP2015-028144A and JP2015-034966A can also be used.

In a case where a combination of two or more chromatic colorants forms black, examples of the combination of chromatic colorants are as follows.

15:6 or C.I. Pigment Blue 16 as a blue pigment, and C.I. Pigment Red 254 or 224 as a red pigment.

Specific examples of the aspect (3) include C.I. Pigment Yellow 139 or 185 as a yellow pigment, C.I. Pigment Violet 23 as a violet pigment, and C.I. Pigment Red 254 or 224 as a red pigment.

Specific examples of the aspect (4) include C.I. Pigment Yellow 139 or 185 as a yellow pigment, and C.I. Pigment Violet 23 as a violet pigment.

Specific examples of the aspect (5) include C.I. Pigment Green 7 or 36 as a green pigment, C.I. Pigment Blue 15:6 as a blue pigment, C.I. Pigment Violet 23 as a violet pigment, and C.I. Pigment Red 254 or 224 as a red pigment.

Specific examples of the aspect (6) include C.I. Pigment Violet 23 as a violet pigment, and C.I. Pigment Orange 71 as an orange pigment.

Specific examples of the aspect (7) include C.I. Pigment Green 7 or 36 as a green pigment, C.I. Pigment Violet 23 as a violet pigment, and C.I. Pigment Red 254 or 224 as a red pigment.

Specific examples of the aspect (8) include C.I. Pigment Green 7 or 36 as a green pigment, and C.I. Pigment Red 254 or 224 as a red pigment.

For example, it is preferable that ratios (mass ratios) between the respective colorants are the following ratios.

| No. | Yellow Colorant | Green Colorant | Blue Colorant | Violet Colorant | Red Colorant | Orange Colorant |
|---|---|---|---|---|---|---|
| 1 | 0.1 to 0.4 | | 0.1 to 0.6 | 0.01 to 0.3 | 0.1 to 0.6 | |
| 2 | 0.1 to 0.4 | | 0.1 to 0.6 | | 0.2 to 0.7 | |
| 3 | 0.1 to 0.6 | | | 0.1 to 0.6 | 0.1 to 0.6 | |
| 4 | 0.2 to 0.8 | | | 0.2 to 0.8 | | |
| 5 | | 0.1 to 0.4 | 0.1 to 0.4 | 0.1 to 0.4 | 0.1 to 0.4 | |
| 6 | | | | 0.2 to 0.6 | | 0.4 to 0.8 |
| 7 | | 0.1 to 0.5 | | 0.2 to 0.7 | 0.1 to 0.4 | |
| 8 | | 0.5 to 0.8 | | | 0.2 to 0.5 | |

(1) An aspect in which the visible light absorbing compound includes a yellow colorant, a blue colorant, a violet colorant, and a red colorant.

(2) An aspect in which the visible light absorbing compound includes a yellow colorant, a blue colorant, and a red colorant.

(3) An aspect in which the visible light absorbing compound includes a yellow colorant, a violet colorant, and a red colorant.

(4) An aspect in which the visible light absorbing compound includes a yellow colorant and a violet colorant.

(5) An aspect in which the visible light absorbing compound includes a green colorant, a blue colorant, a violet colorant, and a red colorant.

(6) An aspect in which the visible light absorbing compound includes a violet colorant and an orange colorant.

(7) An aspect in which the visible light absorbing compound includes a green colorant, a violet colorant, and a red colorant.

(8) An aspect in which the visible light absorbing compound includes a green colorant and a red colorant.

Specific examples of the aspect (1) include C.I. Pigment Yellow 139 or 185 as a yellow pigment, C.I. Pigment Blue 15:6 or C.I. Pigment Blue 16 as a blue pigment, C.I. Pigment Violet 23 as a violet pigment, and C.I. Pigment Red 254 or 224 as a red pigment.

Specific examples of the aspect (2) include C.I. Pigment Yellow 139 or 185 as a yellow pigment, C.I. Pigment Blue In No. 1, the yellow colorant is more preferably 0.1 to 0.3, the blue colorant is more preferably 0.1 to 0.5, the violet colorant is more preferably 0.01 to 0.2, and the red colorant is more preferably 0.1 to 0.5. In No. 2, the yellow colorant is more preferably 0.1 to 0.3, the blue colorant is more preferably 0.1 to 0.5, and the red colorant is more preferably 0.2 to 0.5.

Organic Black Colorant—

Examples of the organic black colorant include a bisbenzofuranone compound, an azomethine compound, a perylene compound, and an azo compound. Among these, a bisbenzofuranone compound or a perylene compound is preferable. Examples of the bisbenzofuranone compound include compounds described in JP2010-534726A, JP2012-515233A, JP2012-515234A, WO2014/208348A, and JP2015-525260A. For example, "Irgaphor Black" (manufactured by BASF SE) is available. Examples of the perylene compound include C.I. Pigment Black 31 and 32. Examples of the azomethine compound include compounds described in JP1989-170601A (JP-H1-170601A) and JP1990-034664A (JP-H2-034664A). For example, "CHROMOFINE BLACK A1103" (manufactured by Dainichiseika Color & Chemicals Mfg. Co., Ltd.) is available.

In the present disclosure, it is preferable that the bisbenzofuranone compound is one of the following compounds represented by the following formulae or a mixture thereof.

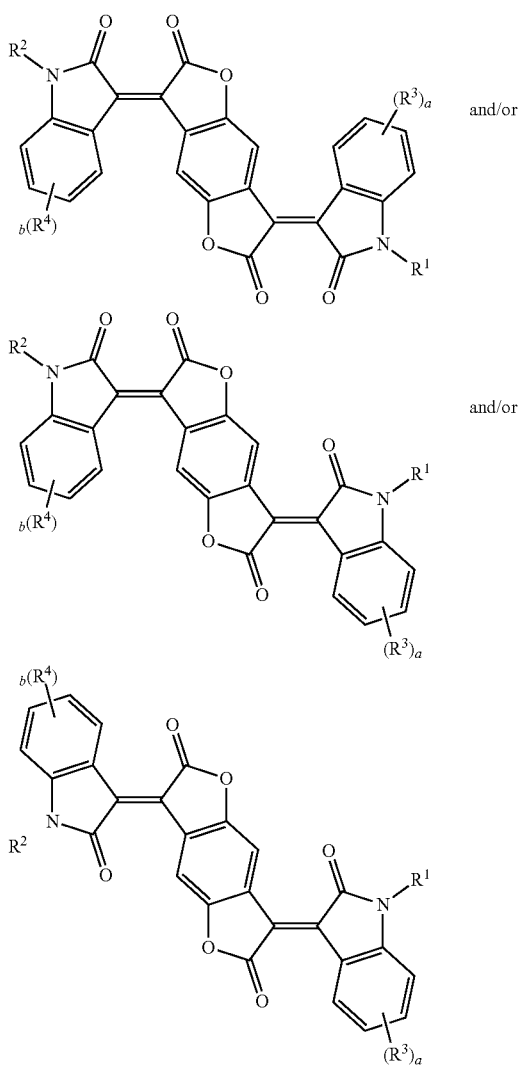

In the formulae, $R^1$ and $R^2$ each independently represent a hydrogen atom or a substituent, $R^3$ and $R^4$ each independently represent a substituent, a and b each independently represent an integer of 0 to 4, in a case where a is 2 or more, a plurality of $R^3$'s may be the same as or different from each other, a plurality of $R^3$'s may be bonded to each other to form a ring, in a case where b is 2 or more, a plurality of $R^4$'s may be the same as or different from each other, and a plurality of $R^4$'s may be bonded to each other to form a ring.

The substituent represented by $R^1$ to $R^4$ is a halogen atom, a cyano group, a nitro group, an alkyl group, an alkenyl group, an alkynyl group, an aralkyl group, an aryl group, a heteroaryl group, —$OR^{301}$, —$COR^{302}$, —$COOR^{303}$, —$OCOR^{304}$, $NHCOR^{305}R^{306}$, —$NHCOR^{307}$, —$CONR^{308}R^{309}$, —$NHCONR^{310}R^{311}$, —$NHCOOR^{312}$, —$SR^{313}$, —$SO_2R^{314}$, —$SO_2OR^{315}$, —$NHSO_2R^{316}$, or —$SO_2NR^{317}R^{318}$. $R^{301}$ to $R^{318}$ each independently represent a hydrogen atom, an alkyl group, an alkenyl group, an alkynyl group, an aryl group, or a heteroaryl group.

The details of the bisbenzofuranone compound can be found in paragraphs "0014" to "0037" of JP2010-534726A, the content of which is incorporated herein by reference.

In the present disclosure, in a case where an organic black colorant is used as the visible light absorbing compound, it is preferable that the organic black colorant is used in combination with a chromatic colorant. By using the organic black colorant in combination with a chromatic colorant, excellent spectral characteristics are likely to be obtained. Examples of the chromatic colorant which can be used in combination with the organic black colorant include a red colorant, a blue colorant, and a violet colorant. Among these, a red colorant or a blue colorant is preferable. Among these colorants, one kind may be used alone, or two or more kinds may be used in combination.

In addition, regarding a mixing ratio between the chromatic colorant and the organic black colorant, the amount of the chromatic colorant is preferably 10 to 200 parts by mass and more preferably 15 to 150 parts by mass with respect to 100 parts by mass of the organic black colorant.

In the present disclosure, the content of the pigment in the visible light absorbing compound is preferably 95 mass % or higher, more preferably 97 mass % or higher, and still more preferably 99 mass % or higher with respect to the total mass of the visible light absorbing compound.

In the curable composition according to the present disclosure, the content of the visible light absorbing compound is preferably 10 mass % to 60 mass % with respect to the total solid content of the composition. The upper limit is preferably 50 mass % or lower and more preferably 45 mass % or lower. The lower limit is preferably 20 mass % or higher and more preferably 25 mass % or higher.

<Curable Compound>

The curable composition according to the embodiment of the present disclosure includes a curable compound.

Examples of the curable compound include a polymerizable compound, a resin, and a natural polymer such as gelatin or cellulose.

As the gelatin, any one of an acid-treated gelatin or an alkali-treated gelatin (for example, a lime-treated gelatin) can be preferably used in terms of a synthesis method thereof. The molecular weight of the gelatin is preferably 10,000 to 1,000,000. In addition, a modified gelatin which is modified using an amino group or a carboxy group of a gelatin can also be used (for example, phthalated gelatin). As the gelatin, for example, inert gelatin (for example, NITTA GELATIN 750) or phthalated gelatin (for example, NITTA GELATIN 801) can be used. The resin may be a non-polymerizable resin (resin not having a polymerizable group) or a polymerizable resin (resin having a polymerizable group). Examples of the polymerizable group include a group having an ethylenically unsaturated bond, an epoxy group, a methylol group, and an alkoxymethyl group. Examples of the group having an ethylenically unsaturated bond include a vinyl group, a (meth)allyl group, and a (meth)acryloyl group. The polymerizable resin (resin having a polymerizable group) may be a polymerizable compound.

In the present disclosure, it is preferable that a compound including at least a resin is used as the curable compound, it is more preferable that a resin and a polymerizable compound as a monomer are used as the curable compound, and it is still more preferable that a resin and a polymerizable compound as a monomer which has a group having an ethylenically unsaturated bond are used as the curable compound.

In the composition according to the embodiment of the present disclosure, the content of the curable compound is preferably 0.1 to 80 mass % with respect to the total solid content of the composition according to the embodiment of the present disclosure. The lower limit is preferably 0.5 mass % or higher, more preferably 1 mass % or higher, and still more preferably 5 mass % or higher. The upper limit is preferably 70 mass % or lower, more preferably 60 mass % or lower, still more preferably 50 mass % or lower, still more preferably 40 mass % or lower, and still more preferably 30 mass % or lower.

As the curable compound in the curable composition according to the present disclosure, one kind may be used alone, or two or more kinds may be used. In a case where two or more curable compounds are used in combination, it is preferable that the total content of the two or more curable compounds is in the above-described range.

[Polymerizable Compound]

Examples of the polymerizable compound include a compound which has a group having an ethylenically unsaturated bond, a compound having an epoxy group, a compound having a methylol group, and a compound having an alkoxymethyl group.

The polymerizable compound may be a monomer or a resin.

As the monomer, a monomer which has a group having an ethylenically unsaturated bond is preferable.

The polymerizable compound as a monomer which has a group having an ethylenically unsaturated bond can be preferably used as a radically polymerizable compound.

In addition, the compound having an epoxy group, the compound having a methylol group, and the compound having an alkoxymethyl group can be preferably used as a cationically polymerizable compound.

The molecular weight of the polymerizable compound as the monomer is preferably lower than 2,000, more preferably 100 or higher and lower than 2,000, and still more preferably 200 or higher and lower than 2,000. The upper limit is, for example, preferably 1,500 or lower.

The weight-average molecular weight (Mw) of a polymerizable compound as a resin is preferably 2,000 to 2,000,000. The upper limit is preferably 1,000,000 or lower and more preferably 500,000 or lower. The lower limit is preferably 3,000 or higher and more preferably 5,000 or higher.

—Polymerizable Compound as Resin—

Examples of the polymerizable compound as a resin include an epoxy resin and a resin which includes a constitutional unit having a polymerizable group. Examples of the constitutional unit having a polymerizable group include the following Formulae (A2-1) to (A2-4).

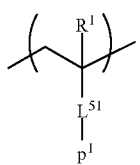
(A2-1)

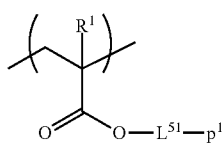
(A2-2)

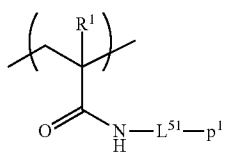
(A2-3)

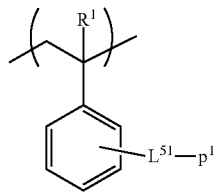
(A2-4)

$R^1$ represents a hydrogen atom or an alkyl group. The number of carbon atoms in the alkyl group is preferably 1 to 5, more preferably 1 to 3, and still more preferably 1. It is preferable that $R^1$ represents a hydrogen atom or a methyl group.

$L^{51}$ represents a single bond or a divalent linking group. Examples of the divalent linking group include an alkylene group, an arylene group, —O—, —S—, —C(=O)—, —C(=O)O—, —OC(=O)—, —SO$_2$—, —NR$^{10}$— ($R^{10}$ represents a hydrogen atom or an alkyl group and preferably a hydrogen atom), and a group consisting of a combination thereof. The number of carbon atoms in the alkylene group is preferably 1 to 30, more preferably 1 to 15, and still more preferably 1 to 10. The alkylene group may have a substituent but is preferably unsubstituted. The alkylene group may be linear, branched, or cyclic. In addition, the cyclic alkylene group may be monocyclic or polycyclic. The number of carbon atoms in the arylene group is preferably 6 to 18, more preferably 6 to 14, and still more preferably 6 to 10.

$P^1$ represents a polymerizable group. Examples of the polymerizable group include a group having an ethylenically unsaturated bond, an epoxy group, a methylol group, and an alkoxymethyl group.

—Compound which has Group Having Ethylenically Unsaturated Bond—

The compound which has a group having an ethylenically unsaturated bond is preferably a (meth)acrylate compound having 3 to 15 functional groups and more preferably a (meth)acrylate compound having 3 to 6 functional groups.

Examples of the compound which includes a group having an ethylenically unsaturated bond can be found in paragraphs "0033" and "0034" of JP2013-253224A, the content of which is incorporated herein by reference.

As the compound which has a group having an ethylenically unsaturated bond, ethyleneoxy-modified pentaerythritol tetraacrylate (as a commercially available product, NK ESTER ATM-35E manufactured by Shin-Nakamura Chemical Co., Ltd.), dipentaerythritol triacrylate (as a commercially available product, KAYARAD D-330 manufactured by Nippon Kayaku Co., Ltd.), dipentaerythritol tetraacrylate (as a commercially available product, KAYARAD D-320 manufactured by Nippon Kayaku Co., Ltd.), dipentaerythritol penta(meth)acrylate (as a commercially available product, KAYARAD D-310 manufactured by Nippon Kayaku Co., Ltd.), dipentaerythritol hexa(meth)acrylate (as a commercially available product, KAYARAD DPHA manufactured by Nippon Kayaku Co., Ltd., A-DPH-12E, manufactured by Shin-Nakamura Chemical Co., Ltd.), or a structure in which the (meth)acryloyl group is bonded through an ethylene glycol residue and/or a propylene glycol residue is preferable. In addition, oligomers of the above-described examples can be used. For example, the details of the polymerizable compound can be found in paragraphs "0034" to "0038" of JP2013-253224A, the content of which is incorporated herein by reference. Examples of the compound having an ethylenically unsaturated bond include a polymerizable monomer in paragraph "0477" of JP2012-208494A (corresponding to paragraph "0585" of US2012/0235099A), the contents of which are incorporated herein by reference. In addition, diglycerin ethylene oxide (EO)-modified (meth)acrylate (as a commercially available product, M-460 manufactured by Toagosei Co., Ltd.), pentaerythritol tetraacrylate (A-TMMT manufactured by Shin-Nakamura Chemical Co., Ltd.), or 1,6-hexanediol diacrylate (KAYARAD HDDA manufactured by Nippon Kayaku Co., Ltd.) is also preferable. Oligomers of the above-described examples can be used.

For example, RP-1040 (manufactured by Nippon Kayaku Co., Ltd.) is used. In addition, ARONIX M-350 or TO-2349 (manufactured by Toagosei Co., Ltd.) can also be used.

The compound which includes a group having an ethylenically unsaturated bond may further have an acid group such as a carboxy group, a sulfo group, or a phosphate group. Examples of a commercially available product include ARONIX series (for example, M-305, M-510, or M-520, manufactured by Toagosei Co., Ltd.).

In addition, a compound having a caprolactone structure is also preferable as the compound which includes a group having an ethylenically unsaturated bond. Examples of the compound having a caprolactone structure can be found in paragraphs "0042" to "0045" of JP2013-253224A, the content of which is incorporated herein by reference.

As the compound having a caprolactone structure, for example, KAYARAD DPCA series (manufactured by Nippon Kayaku Co., Ltd.) is commercially available, and examples thereof include DPCA-20, DPCA-30, DPCA-60, and DPCA-120.

As the compound which has a group having an ethylenically unsaturated bond, a compound which has a group having an ethylenically unsaturated bond and an alkyleneoxy group can also be used. As the compound which has a group having an ethylenically unsaturated bond and an alkyleneoxy group, a compound which has a group having an ethylenically unsaturated bond, an ethyleneoxy group, and/or a propyleneoxy group is preferable, a compound which has a group having an ethylenically unsaturated bond and an ethyleneoxy group is more preferable, and a trifunctional to hexafunctional (meth)acrylate compound having 4 to 20 ethyleneoxy groups is still more preferable. Examples of a commercially available product of the compound which has a group having an ethylenically unsaturated bond and an alkyleneoxy group include SR-494 (manufactured by Sartomer) which is a tetrafunctional (meth)acrylate having four ethyleneoxy groups, and KAYARAD TPA-330 which is a trifunctional (meth)acrylate having three isobutyleneoxy groups.

As the compound which has a group having an ethylenically unsaturated bond, a urethane acrylate described in JP1973-041708B (JP-S48-041708B), JP1976-037193A (JP-S51-037193A), JP1990-032293B (JP-H2-032293B), or JP1990-016765B (JP-H2-016765B), or a urethane compound having an ethylene oxide skeleton described in JP1983-049860B (JP-S58-049860B), JP1981-017654B (JP-S56-017654B), JP1987-039417B (JP-S62-039417B), or JP1987-039418B (JP-S62-039418B) is also preferable. In addition, an addition-polymerizable compound having an amino structure or a sulfide structure in the molecules described in JP1988-277653A (JP-S63-277653A), JP1988-260909A (JP-S63-260909A), or JP1989-105238A (JP-H1-105238A) can be used. Examples of a commercially available product of the polymerizable compound include UA-7200 (manufactured by Shin-Nakamura Chemical Co., Ltd.), DPHA-40H (manufactured by Nippon Kayaku Co., Ltd.), and UA-306H, UA-306T, UA-306I, AH-600, T-600 and AI-600 (manufactured by Kyoeisha Chemical Co., Ltd.).

In addition, as the compound which has a group having an ethylenically unsaturated bond, a compound described in JP2017-048367A, JP6057891B, or JP6031807B can also be used.

In addition, as the compound that includes the group having an ethylenically unsaturated bond, for example, 8UH-1006 or 8UH-1012 (manufactured by Taisei Fine Chemical Co., Ltd.) or LIGHT ACRYLATE POB-A0 (manufactured by Kyoeisha Chemical Co., Ltd.) is also preferably used.

In a case where the composition according to the embodiment of the present disclosure includes the compound which includes a group having an ethylenically unsaturated bond, the content of the compound which includes a group having an ethylenically unsaturated bond is preferably 0.1 mass % or higher, more preferably 0.5 mass % or higher, still more preferably 1 mass % or higher, and still more preferably 5 mass % or higher with respect to the total solid content of the composition. The upper limit is preferably 80 mass % or lower, more preferably 70 mass % or lower, still more preferably 60 mass % or lower, still more preferably 50 mass % or lower, still more preferably 40 mass % or lower, and still more preferably 30 mass % or lower.

—Compound Having Epoxy Group—

Examples of the compound having an epoxy group (hereinafter, also referred to as "epoxy compound") include a monofunctional or polyfunctional glycidyl ether compound, and a polyfunctional aliphatic glycidyl ether compound. In addition, as the epoxy compound, a compound having an alicyclic epoxy group can also be used.

Examples of the epoxy compound include a compound having one or more epoxy groups in one molecule.

It is preferable that the epoxy compound is a compound having 1 to 100 epoxy groups in one molecule. The upper limit of the number of epoxy groups is, for example, 10 or less or 5 or less. The lower limit of the number of epoxy groups is preferably 2 or more.

The epoxy compound may be a low molecular weight compound (for example, molecular weight: lower than 1,000) or a high molecular weight compound (macromolecule; for example, molecular weight: 1,000 or higher, and in the case of a polymer, weight-average molecular weight: 1,000 or higher). The weight-average molecular weight of the epoxy compound is preferably 2,000 to 100,000. The upper limit of the weight-average molecular weight is preferably 10,000 or lower, more preferably 5,000 or lower, and still more preferably 3,000 or lower.

Examples of a commercially available product of the epoxy compound include EHPE 3150 (manufactured by Daicel Corporation), EPICLON N-695 (manufactured by DIC Corporation), ADEKA GLYCILOL ED-505 (manufactured by Adeka Corporation, an epoxy group-containing monomer), and MARPROOF G-0150M, G-0105SA, G-0130SP, G-0250SP, G-1005S, G-1005SA, G-1010S, G-2050M, G-01100, or G-01758 (manufactured by NOF Corporation, an epoxy group-containing polymer). In addition, as the epoxy compound, compounds described in paragraphs "0034" to "0036" of JP2013-011869A, paragraphs "0147" to "0156" of JP2014-043556A, and paragraphs "0085" to "0092" of JP2014-089408A can also be used. In this specification, the contents are incorporated herein by reference.

In a case where the composition according to the embodiment of the present disclosure includes the epoxy compound, the content of the epoxy compound is preferably 0.1 mass % or higher, more preferably 0.5 mass % or higher, still more preferably 1 mass % or higher, and still more preferably 5 mass % or higher with respect to the total solid content of the composition. The upper limit is preferably 80 mass % or lower, more preferably 70 mass % or lower, still more preferably 60 mass % or lower, still more preferably 50 mass % or lower, still more preferably 40 mass % or lower, and still more preferably 30 mass % or lower. —Compound Having Methylol Group and Compound Having Alkoxymethyl Group—

Examples of the compound having a methylol group (hereinafter, also referred to as "methylol compound") include a compound in which a methylol group is bonded to a nitrogen atom or a carbon atom which forms an aromatic ring. In addition, examples of the compound having an alkoxymethyl group (hereinafter, also referred to as "alkoxymethyl compound") include a compound in which an alkoxymethyl group is bonded to a nitrogen atom or a carbon atom which forms an aromatic ring. As the compound in which an alkoxymethyl group or a methylol group is bonded to a nitrogen atom, for example, alkoxy methylated melamine, methylolated melamine, alkoxy methylated benzoguanamine, methylolated benzoguanamine, alkoxy methylated glycoluril, methylolated glycoluril, alkoxy methylated urea, or methylolated urea is preferable. In addition, the details can be found in paragraphs "0134" to "0147" of JP2004-295116A or paragraphs "0095" to "0126" of JP2014-089408A, the contents of which are incorporated herein by reference.

In a case where the composition according to the embodiment of the present disclosure includes the methylol compound, the content of the methylol compound is preferably 0.1 mass % or higher, more preferably 0.5 mass % or higher, still more preferably 1 mass % or higher, and still more preferably 5 mass % or higher with respect to the total solid content of the composition. The upper limit is preferably 80 mass % or lower, more preferably 70 mass % or lower, still more preferably 60 mass % or lower, still more preferably 50 mass % or lower, still more preferably 40 mass % or lower, and still more preferably 30 mass % or lower.

In a case where the composition according to the embodiment of the present disclosure includes the alkoxymethyl compound, the content of the alkoxymethyl compound is preferably 0.1 mass % or higher, more preferably 0.5 mass % or higher, still more preferably 1 mass % or higher, and still more preferably 5 mass % or higher with respect to the total solid content of the composition. The upper limit is preferably 80 mass % or lower, more preferably 70 mass % or lower, still more preferably 60 mass % or lower, still more preferably 50 mass % or lower, still more preferably 40 mass % or lower, and still more preferably 30 mass % or lower.

[Resin]

The composition according to the embodiment of the present disclosure may include a resin as the curable compound. It is preferable that the curable compound includes at least a resin. The resin can also be used as a dispersant. The resin which is used to disperse the pigments and the like will also be referred to as a dispersant. However, the above-described uses of the resin are merely exemplary, and the resin can be used for purposes other than the uses. The resin having a polymerizable group also corresponds to the polymerizable compound.

The weight-average molecular weight (Mw) of the resin is preferably 2,000 to 2,000,000. The upper limit is preferably 1,000,000 or lower and more preferably 500,000 or lower. The lower limit is preferably 3,000 or higher and more preferably 5,000 or higher.

Examples of the resin include a (meth)acrylic resin, an epoxy resin, an enethiol resin, a polycarbonate resin, a polyether resin, a polyarylate resin, a polysulfone resin, a polyethersulfone resin, a polyphenylene resin, a polyarylene ether phosphine oxide resin, a polyimide resin, a polyamide imide resin, a polyolefin resin, a cyclic olefin resin, a polyester resin, and a styrene resin.

—Epoxy Resin—

Examples of the epoxy resin include the compounds as resins among the compounds described above as the examples of the epoxy compound regarding the polymerizable compound.

Cyclic Olefin Resin—

Examples of a commercially available product of the cyclic olefin resin include ARTON D4540 and F4520 (both of which are manufactured by JSR Corporation). In addition, a resin described in Examples of WO2016/088645A, a resin described in JP2017-057265A, a resin described in JP2017-032685A, a resin described in JP2017-075248A, or a resin described in JP2017-066240A can also be used, the contents of which are incorporated herein by reference.

—Resin Having Fluorene Skeleton—

In addition, a resin having a fluorene skeleton can also be preferably used. Examples of the resin having a fluorene skeleton include a resin having the following structure. In the following structural formula, A represents a residue of a carboxylic dianhydride selected from pyromellitic dianhydride, benzophenone tetracarboxylic dianhydride, biphenyl tetracarboxylic dianhydride, or diphenyl ether tetracarboxylic dianhydride, and M represents a phenyl group or a benzyl group. The details of the resin having a fluorene skeleton can be found in US2017/0102610A, the content of which is incorporated herein by reference.

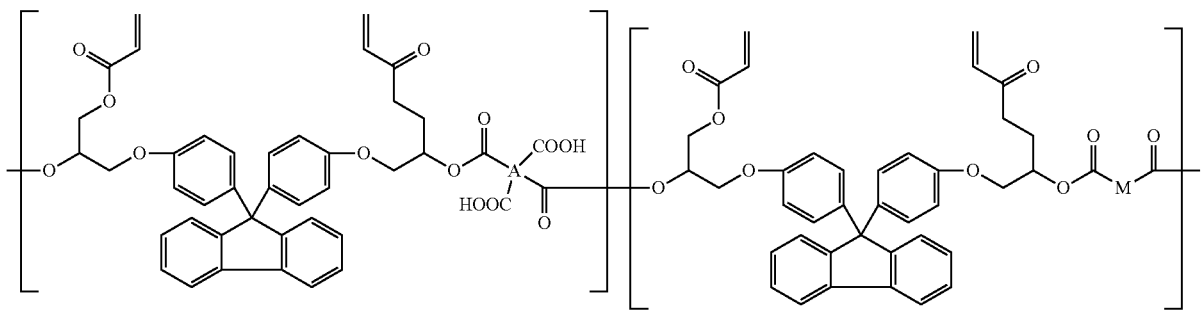

—Resin Having Acid Group—

The resin used in the present disclosure may have an acid group. Examples of the acid group include a carboxy group, a phosphate group, a sulfo group, and a phenolic hydroxy group. Among these, a carboxy group is preferable. Among these acid groups, one kind may be used alone, or two or more kinds may be used in combination. The resin having an acid group can also be used as an alkali-soluble resin.

As the resin having an acid group, a polymer having a carboxy group at a side chain is preferable. Specific examples of the resin include an alkali-soluble phenol resin such as a methacrylic acid copolymer, an acrylic acid copolymer, an itaconic acid copolymer, a crotonic acid copolymer, a maleic acid copolymer, a partially esterified maleic acid copolymer, or a novolac resin, an acidic cellulose derivative having a carboxy group at a side chain thereof, and a resin obtained by adding an acid anhydride to a polymer having a hydroxy group. In particular, a copolymer of (meth)acrylic acid and another monomer which is copolymerizable with the (meth)acrylic acid is preferable as the alkali-soluble resin. Examples of the other monomer which is copolymerizable with the (meth)acrylic acid include an alkyl (meth)acrylate, an aryl (meth)acrylate, and a vinyl compound. Examples of the alkyl (meth)acrylate and the aryl (meth)acrylate include methyl (meth)acrylate, ethyl (meth)acrylate, propyl (meth)acrylate, butyl (meth)acrylate, isobutyl (meth)acrylate, pentyl (meth)acrylate, hexyl (meth)acrylate, octyl (meth)acrylate, phenyl (meth)acrylate, benzyl (meth)acrylate, tolyl (meth)acrylate, naphthyl (meth)acrylate, and cyclohexyl (meth)acrylate. Examples of the vinyl compound include styrene, α-methylstyrene, vinyl toluene, glycidyl methacrylate, acrylonitrile, vinyl acetate, N-vinylpyrrolidone, tetrahydrofurfuryl methacrylate, a polystyrene macromonomer, and a polymethyl methacrylate macromonomer. Examples of other monomers include an N-position-substituted maleimide monomer described in JP1998-300922A (JP-H10-300922A) such as N-phenylmaleimide or N-cyclohexylmaleimide. Among the other monomers which are copolymerizable with the (meth)acrylic acid, one kind may be used alone, or two or more kinds may be used in combination.

The resin having an acid group may further include a constitutional unit having a polymerizable group. In a case where the resin having an acid group further includes the constitutional unit having a polymerizable group, the content of the constitutional unit having a polymerizable group is preferably 10% to 90 mol %, more preferably 20% to 90 mol %, and still more preferably 20% to 85 mol % with respect to all the constitutional units. In addition, the content of the constitutional unit having an acid group is preferably 1% to 50 mol %, more preferably 5% to 40 mol %, and still more preferably 5% to 30 mol % with respect to all the constitutional units.

As the resin having an acid group, a copolymer including benzyl (meth)acrylate and (meth)acrylic acid; a copolymer including benzyl (meth)acrylate, (meth)acrylic acid, and 2-hydroxyethyl (meth)acrylate; or a multi-component copolymer including benzyl (meth)acrylate, (meth)acrylic acid, and another monomer can be preferably used. In addition, copolymers described in JP1995-140654A (JP-H7-140654A) obtained by copolymerization of 2-hydroxyethyl (meth)acrylate can be preferably used, and examples thereof include: a copolymer including 2-hydroxypropyl (meth)acrylate, a polystyrene macromonomer, benzyl methacrylate, and methacrylic acid; a copolymer including 2-hydroxy-3-phenoxypropyl acrylate, a polymethyl methacrylate macromonomer, benzyl methacrylate, and methacrylic acid; a copolymer including 2-hydroxyethyl methacrylate, a polystyrene macromonomer, methyl methacrylate, and methacrylic acid; or a copolymer including 2-hydroxyethyl methacrylate, a polystyrene macromonomer, benzyl methacrylate, and methacrylic acid.

As the resin having an acid group, a polymer obtained by polymerization of monomer components including a compound represented by the following Formula (ED1) and/or a compound represented by the following Formula (ED2) (hereinafter, these compounds will also be referred to as "ether dimer") is also preferable.

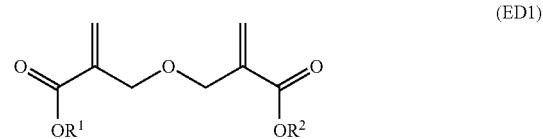

(ED1)

In Formula (ED1), $R^1$ and $R^2$ each independently represent a hydrogen atom or a hydrocarbon group having 1 to 25 carbon atoms which may have a substituent.

(ED2)

In Formula (ED2), R represents a hydrogen atom or an organic group having 1 to 30 carbon atoms. Specific examples of the compound represented by Formula (ED2) can be found in the description of JP2010-168539A.

Specific examples of the ether dimer can be found in paragraph "0317" of JP2013-029760A, the content of which is incorporated herein by reference. Among these ether dimers, one kind may be used alone, or two or more kinds may be used in combination.

The resin having an acid group may include a constitutional unit which is derived from a compound represented by the following Formula (X).

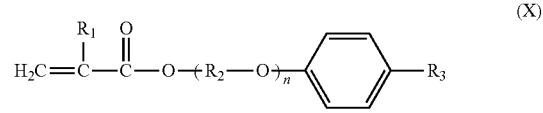

(X)

In Formula (X), $R_1$ represents a hydrogen atom or a methyl group, $R_2$ represents an alkylene group having 2 to 10 carbon atoms, and $R_3$ represents a hydrogen atom or an alkyl group having 1 to 20 carbon atoms which may have a benzene ring. n represents an integer of 1 to 15.

The details of the resin having an acid group can be found in paragraphs "0558" to "0571" of JP2012-208494A (corresponding to paragraphs "0685" to "0700" of US2012/0235099A) and paragraphs "0076" to "0099" of JP2012-198408A, the contents of which are incorporated herein by reference. In addition, as the resin having an acid group, a commercially available product may also be used. Examples of the commercially available product include CYCLOMER ACA21013 (manufactured by Daicel Corporation) and ACRYBASE FF-426 (manufactured by Fujikura Kasei Co., Ltd.).

The acid value of the resin having an acid group is preferably 30 to 200 mgKOH/g. The lower limit is preferably 50 mgKOH/g or higher and more preferably 70 mgKOH/g or higher. The upper limit is preferably 150 mgKOH/g or lower and more preferably 120 mgKOH/g or lower.

Examples of the resin having an acid group include resins having the following structures. In the following structural formulae, Me represents a methyl group.

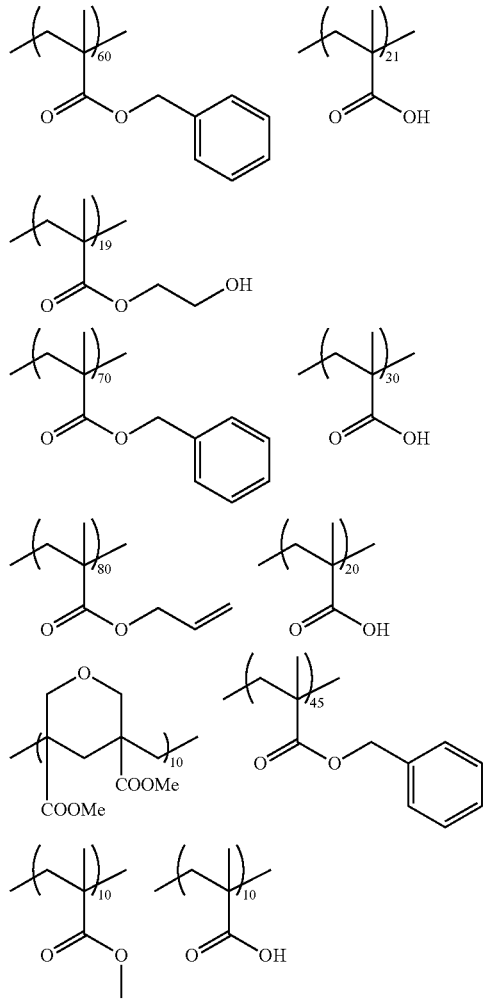

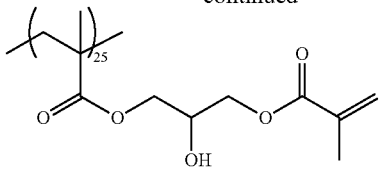

—Resin as Dispersant—

The composition according to the embodiment of the present disclosure may include a resin as a dispersant. Examples of the dispersant include an acidic dispersant (acidic resin) and a basic dispersant (basic resin). Here, the acidic dispersant (acidic resin) refers to a resin in which the content of an acid group is more than the content of a basic group. In a case where the sum of the amount of an acid group and the amount of a basic group in the acidic dispersant (acidic resin) is represented by 100 mol %, the amount of the acid group in the acidic resin is preferably 70 mol % or higher and more preferably substantially 100 mol %. The acid group in the acidic dispersant (acidic resin) is preferably a carboxy group. An acid value of the acidic dispersant (acidic resin) is preferably 40 to 105 mgKOH/g, more preferably 50 to 105 mgKOH/g, and still more preferably 60 to 105 mgKOH/g. In addition, the basic dispersant (basic resin) refers to a resin in which the amount of a basic group is more than the amount of an acid group. In a case where the sum of the amount of an acid group and the amount of a basic group in the basic dispersant (basic resin) is represented by 100 mol %, the amount of the basic group in the basic resin is preferably higher than 50 mol %. The basic group in the basic dispersant is preferably an amino group.

It is preferable that the resin used as the dispersant further includes a constitutional unit having an acid group. By the resin, which is used as the dispersant, including the constitutional unit having an acid group, in a case where a pattern is formed using a photolithography method, the amount of residues formed in an underlayer of a pixel can be reduced.

It is preferable that the resin used as the dispersant is a graft copolymer. Since the graft copolymer has affinity to the solvent due to the graft chain, the pigment dispersibility and the dispersion stability over time are excellent. The details of the graft copolymer can be found in the description of paragraphs "0025" to "0094" of JP2012-255128A, the content of which is incorporated herein by reference. In addition, specific examples of the graft copolymer include the following resins. The following resin may also be a resin having an acid group (alkali-soluble resin). In addition, other examples of the graft copolymer include resins described in paragraphs "0072" to "0094" of JP2012-255128A, the content of which is incorporated herein by reference.

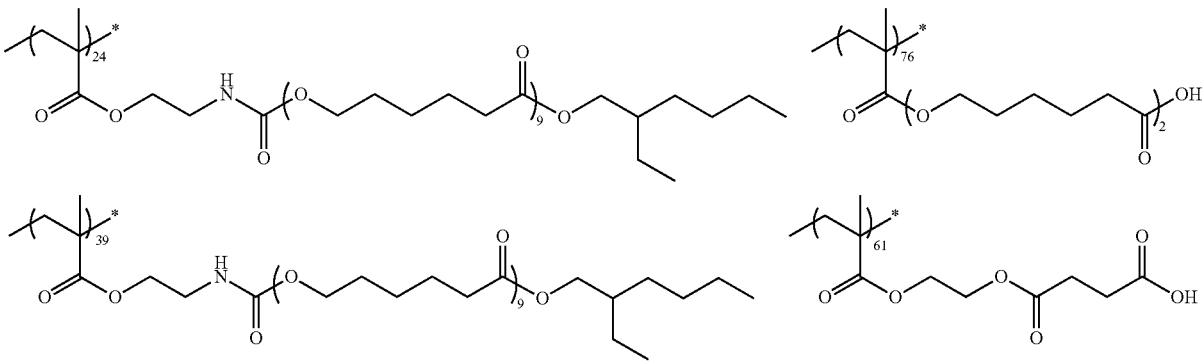

-continued

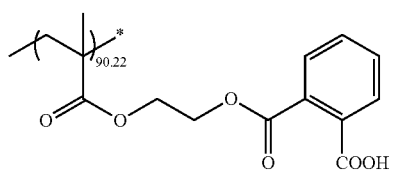 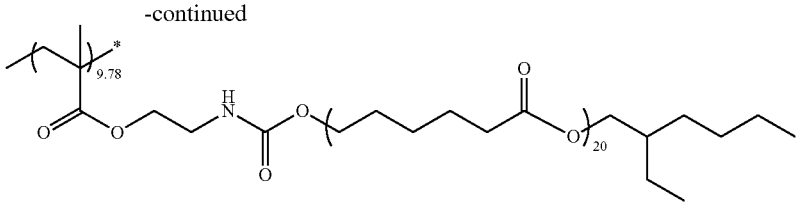

In addition, in the present disclosure, as the resin (dispersant), an oligoimine dispersant having a nitrogen atom at at least either a main chain or a side chain is also preferably used. As the oligoimine dispersant, a resin, which includes a structural unit having a partial structure X with a functional group (pKa: 14 or lower) and a side chain including a side chain Y having 40 to 10,000 atoms and has a basic nitrogen atom at at least either a main chain or a side chain, is preferable. The basic nitrogen atom is not particularly limited as long as it is a nitrogen atom exhibiting basicity. The oligoimine dispersant can be found in the description of paragraphs "0102" to "0166" of JP2012-255128A, the content of which is incorporated herein by reference. As the oligoimine dispersant, a resin having the following structure or a resin described in paragraphs "0168" to "0174" of JP2012-255128A can be used.

and still more preferably 10 mass % or higher. The upper limit is more preferably 40 mass % or lower, and still more preferably 30 mass % or lower. The composition according to the embodiment of the present disclosure may include one resin or two or more resins. In a case where the composition includes two or more resins, it is preferable that the total content of the two or more resins is in the above-described range.

In a case where the composition according to the embodiment of the present disclosure includes the polymerizable compound (preferably the monomer type polymerizable compound that has a group having an ethylenically unsaturated bond) and the resin, a mass ratio (polymerizable compound/resin) of the polymerizable compound to the resin is preferably 0.4 to 1.4. The lower limit of the mass ratio is preferably 0.5 or higher and more preferably 0.6 or

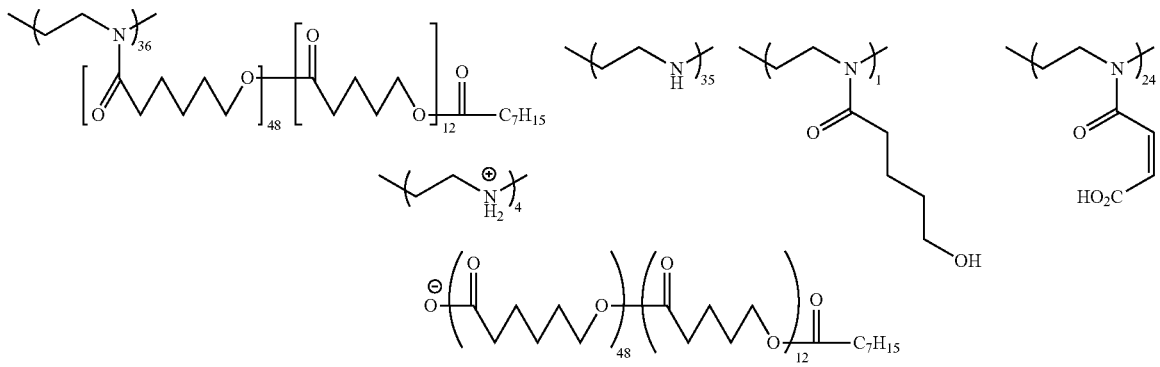

The dispersant is available as a commercially available product, and specific examples thereof include BYK 2000 (manufactured by BYK Chemie). In addition, a pigment dispersant described in paragraphs "0041" to "0130" of JP2014-130338A can also be used, the content of which is incorporated herein by reference. In addition, the resin having an acid group or the like can also be used as a dispersant.

In a case where the composition according to the embodiment of the present disclosure includes a resin, the content of the resin is preferably 0.1 to 50 mass % with respect to the total solid content of the composition according to the embodiment of the present disclosure. The lower limit is preferably 1 mass % or higher, more preferably 3 mass % or higher, still more preferably 5 mass % or higher, and still more preferably 10 mass % or higher. The upper limit is more preferably 40 mass % or lower, and still more preferably 30 mass % or lower. In addition, the content of the resin having an acid group is preferably 0.1 to 50 mass % with respect to the total solid content of the composition according to the embodiment of the present disclosure. The lower limit is preferably 1 mass % or higher, more preferably 3 mass % or higher, still more preferably 5 mass % or higher, higher. The upper limit of the mass ratio is preferably 1.3 or lower and more preferably 1.2 or lower. In a case where the mass ratio is in the above-described range, a pattern having more excellent rectangularity can be formed.

In addition, a mass ratio (polymerizable compound/resin having an acid group) of the polymerizable compound (preferably the polymerizable compound as a monomer that has a group having an ethylenically unsaturated bond) to the resin having an acid group is preferably 0.4 to 1.4. The lower limit of the mass ratio is preferably 0.5 or higher and more preferably 0.6 or higher. The upper limit of the mass ratio is preferably 1.3 or lower and more preferably 1.2 or lower. In a case where the mass ratio is in the above-described range, a pattern having more excellent rectangularity can be formed.

<Polymerization Initiator>

It is preferable that the composition according to the embodiment of the present disclosure further includes a polymerization initiator.

The polymerization initiator may be a photopolymerization initiator or a thermal polymerization initiator and is preferably a photopolymerization initiator from the viewpoint of easily performing patterning caused by exposure.

Examples of the polymerization initiator include a radical polymerization initiator and a cationic polymerization initiator. It is preferable that the polymerization initiator is selected and used according to the kind of the polymerizable compound. In a case where a radically polymerizable compound such as the compound which has a group having an ethylenically unsaturated bond is used as the polymerizable compound, it is preferable that a radical polymerization initiator is used as the polymerization initiator. In a case where the cationically polymerizable compound is used as the polymerizable compound, it is preferable that the cationic polymerization initiator is used as the polymerization initiator. The polymerization initiator is not particularly limited and can be appropriately selected from well-known polymerization initiators. For example, a photopolymerization initiator having photosensitivity to light in a range from the ultraviolet range to the visible range is preferable.

The content of the polymerization initiator is preferably 0.1 to 50 mass %, more preferably 0.5 to 30 mass %, and still more preferably 1 to 20 mass % with respect to the total solid content of the composition. In a case where the content of the polymerization initiator is in the above-described range, higher sensitivity and pattern formability can be obtained. The composition according to the present disclosure may include one polymerization initiator or two or more polymerization initiators. In a case where the composition includes two or more polymerization initiators, it is preferable that the total content of the polymerization initiators is in the above-described range.

[Photoradical Polymerization Initiator]

Examples of the photoradical polymerization initiator include a halogenated hydrocarbon derivative (for example, a compound having a triazine skeleton or a compound having an oxadiazole skeleton), an acylphosphine compound, a hexaarylbiimidazole, an oxime compound, an organic peroxide, a thio compound, a ketone compound, an aromatic onium salt, an α-hydroxyketone compound, and an α-aminoketone compound. In addition, from the viewpoint of exposure sensitivity, as the photopolymerization initiator, a trihalomethyltriazine compound, a benzyldimethylketal compound, an α-hydroxyketone compound, an α-aminoketone compound, an acylphosphine compound, a phosphine oxide compound, a metallocene compound, an oxime compound, a triarylimidazole dimer, an onium compound, a benzothiazole compound, a benzophenone compound, an acetophenone compound, a cyclopentadiene-benzene-iron complex, a halomethyl oxadiazole compound, or a 3-aryl-substituted coumarin compound is preferable, a compound selected from an oxime compound, an α-hydroxyketone compound, an α-aminoketone compound, or an acylphosphine compound is more preferable, and an oxime compound is still more preferable. The details of the photoradical polymerization initiator can be found in paragraphs "0065" to "0111" of JP2014-130173A, the content of which is incorporated herein by reference.

Examples of a commercially available product of the α-hydroxyketone compound include IRGACURE-184, DAROCUR-1173, IRGACURE-500, IRGACURE-2959, and IRGACURE-127 (all of which are manufactured by BASF SE). Examples of a commercially available product of the α-aminoketone compound include IRGACURE-907, IRGACURE-369, IRGACURE-379, and IRGACURE-379EG (all of which are manufactured by BASF SE). Examples of a commercially available product of the acylphosphine compound include IRGACURE-819, and DAROCUR-TPO (all of which are manufactured by BASF SE).

Examples of the oxime compound include a compound described in JP2001-233842A, a compound described in JP2000-080068A, a compound described in JP2006-342166A, a compound described in J. C. S. Perkin II (1979, pp. 1653 to 1660), a compound described in J. C. S. Perkin II (1979, pp. 156 to 162), a compound described in Journal of Photopolymer Science and Technology (1995, pp. 202 to 232), a compound described in JP2000-066385A, a compound described in JP2000-080068A, a compound described in JP2004-534797A, a compound described in JP2006-342166A, a compound described in JP2017-019766A, a compound described in JP6065596B, a compound described in WO2015/152153A, and a compound described in WO2017/051680A. Specific examples of the oxime compound include 3-benzoyloxyiminobutane-2-one, 3-acetoxyiminobutane-2-one, 3-propionyloxyiminobutane-2-one, 2-acetoxyiminopentane-3-one, 2-acetoxyimino-1-phenylpropane-1-one, 2-benzoyloxyimino-1-phenylpropane-1-one, 3-(4-toluene sulfonyloxy)iminobutane-2-one, and 2-ethoxycarbonyloxyimino-1-phenylpropane-1-one. Examples of a commercially available product of the oxime compound include IRGACURE-OXE01, IRGACURE-OXE02, IRGACURE-OXE03, or IRGACURE-OXE04 (all of which are manufactured by BASF SE), TR-PBG-304 (manufactured by Changzhou Tronly New Electronic Materials Co., Ltd.), and ADEKA OPTOMER N-1919 (manufactured by Adeka Corporation, a photopolymerization initiator 2 described in JP2012-014052A). In addition, as the oxime compound, a compound having no colorability or a compound having high transparency that is not likely to be discolored can also be preferably used. Examples of a commercially available product of the oxime compound include ADEKA ARKLS NCI-730, NCI-831, and NCI-930 (all of which are manufactured by Adeka Corporation).

In the present disclosure, an oxime compound having a fluorene ring can also be used as the photopolymerization initiator. Specific examples of the oxime compound having a fluorene ring include a compound described in JP2014-137466A. The content of this specification is incorporated herein by reference.

In the present disclosure, an oxime compound having a fluorine atom can also be used as the photoradical polymerization initiator. Specific examples of the oxime compound having a fluorine atom include a compound described in JP2010-262028A, Compound 24 and 36 to 40 described in JP2014-500852A, and Compound (C-3) described in JP2013-164471A. The content of this specification is incorporated herein by reference.

In the present disclosure, as the photoradical polymerization initiator, an oxime compound having a nitro group can be used. It is preferable that the oxime compound having a nitro group is a dimer. Specific examples of the oxime compound having a nitro group include compounds described in paragraphs "0031" to "0047" of JP2013-114249A and paragraphs "0008" to "0012" and "0070" to "0079" of JP2014-137466A, compounds described in paragraphs "0007" to 0025" of JP4223071B, and ADEKA ARKLS NCI-831 (manufactured by Adeka Corporation).

In the present disclosure, as the photoradical polymerization initiator, an oxime compound having a benzofuran skeleton can also be used. Specific examples include OE-01 to OE-75 described in WO2015/036910A.

Specific examples of the oxime compound which are preferably used in the present disclosure are shown below, but the present disclosure is not limited thereto.

(C-1)
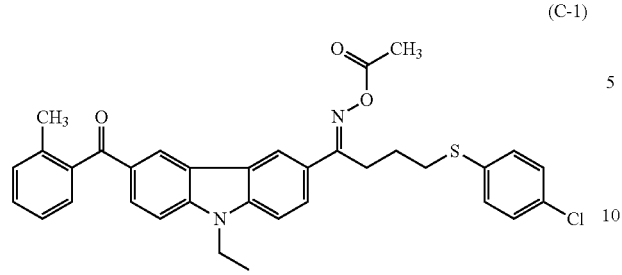
(C-2)
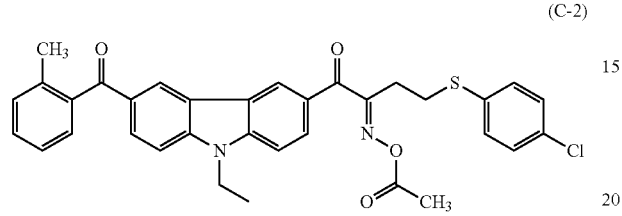
(C-3)
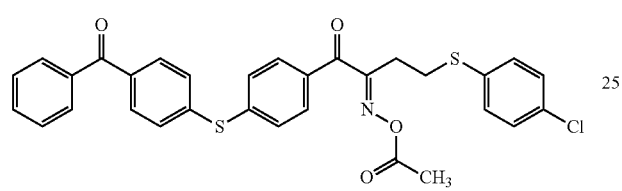
(C-4)
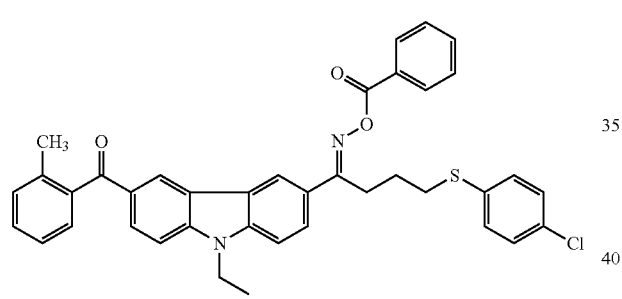
(C-5)
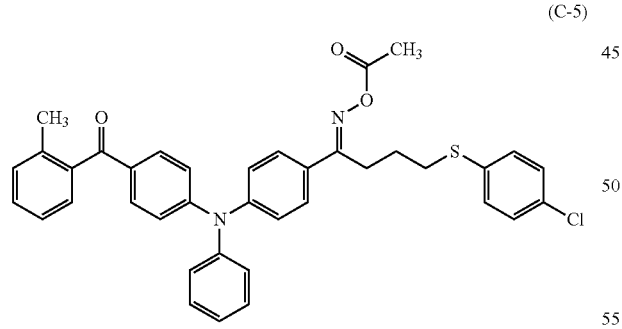
(C-6)
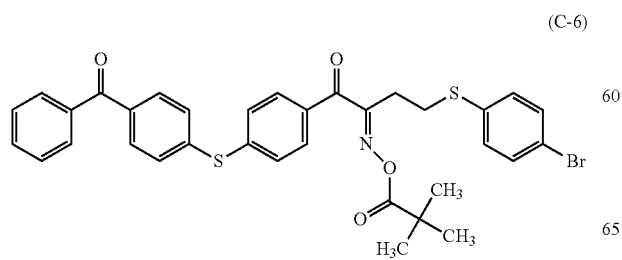
(C-7)
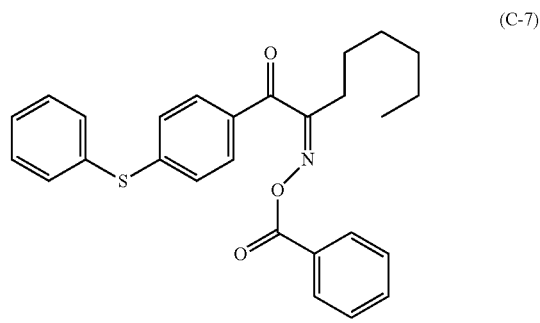
(C-8)
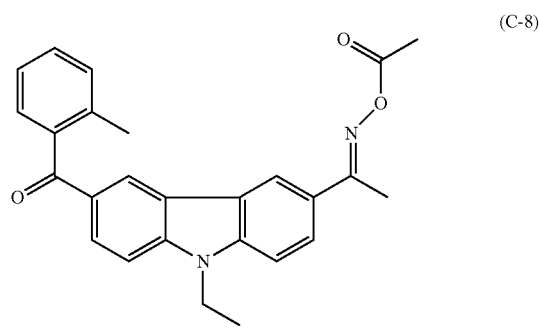
(C-9)
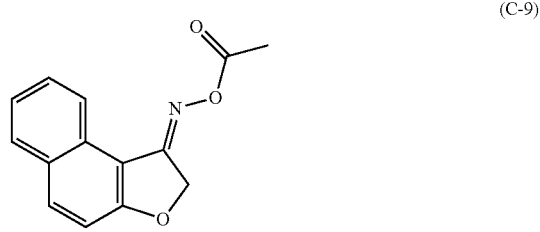
(C-10)
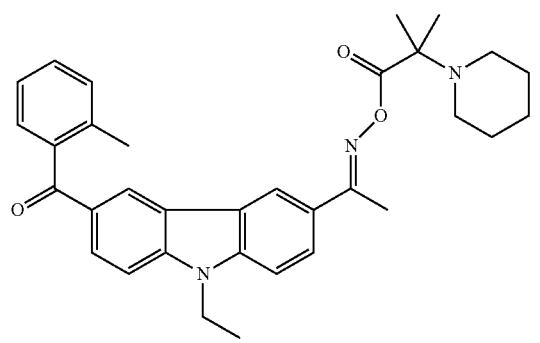
(C-11)
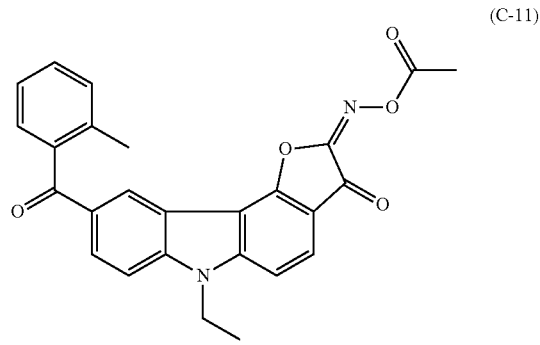

-continued

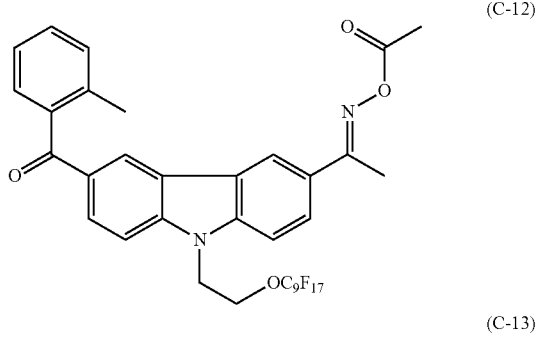
(C-12)

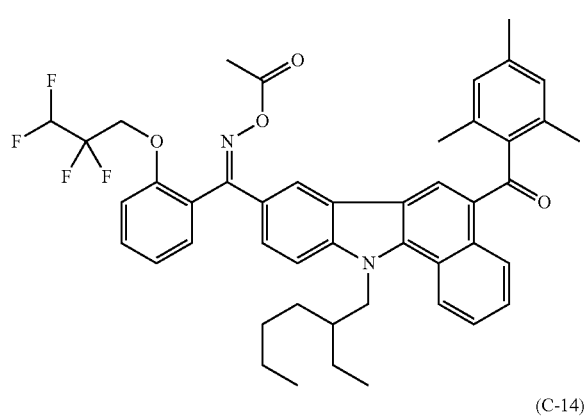
(C-13)

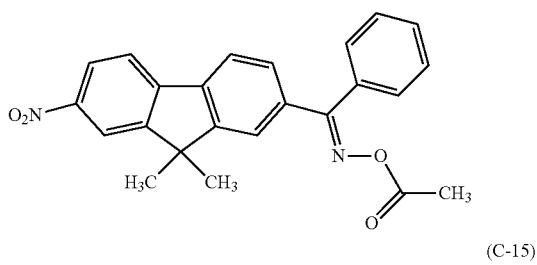
(C-14)

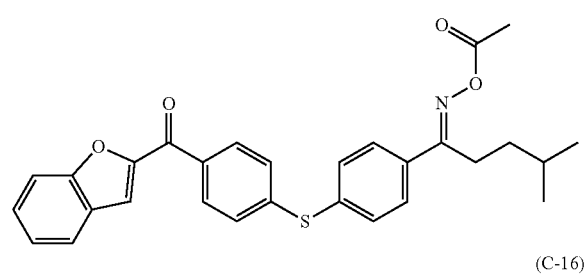
(C-15)

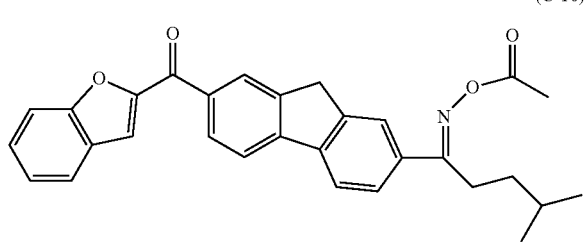
(C-16)

The oxime compound is preferably a compound having a maximum absorption wavelength in a wavelength range of 350 nm to 500 nm and more preferably a compound having a maximum absorption wavelength in a wavelength range of 360 nm to 480 nm. In addition, the molar absorption coefficient of the oxime compound at a wavelength of 365 nm or 405 nm is preferably high, more preferably 1,000 to 300,000, still more preferably 2,000 to 300,000, and still more preferably 5,000 to 200,000 from the viewpoint of sensitivity. The molar absorption coefficient of the compound can be measured using a well-known method. For example, it is preferable that the molar absorption coefficient can be measured using a spectrophotometer (Cary-5 spectrophotometer, manufactured by Varian Medical Systems, Inc.) and ethyl acetate as a solvent at a concentration of 0.01 g/L.

In the present disclosure, as the photoradical polymerization initiator, a photoradical polymerization initiator having two functional groups or three or more functional groups may be used. Specific examples of the photoradical polymerization initiator include a dimer of an oxime compound described in JP2010-527339A, JP2011-524436A, WO2015/004565A, paragraphs "0407" to "0412" of JP2016-532675A, or paragraphs "0039" to "0055" of WO2017/033680A, a compound (E) and a compound (G) described in JP2013-522445A, and Cmpd 1 to 7 described in WO2016/034963A.

It is preferable that the photoradical polymerization initiator includes an oxime compound and an α-aminoketone compound. By using the oxime compound and the α-aminoketone compound in combination, the developability is improved, and a pattern having excellent rectangularity can be easily formed. In a case where the oxime compound and the α-aminoketone compound are used in combination, the content of the α-aminoketone compound is preferably 50 parts by mass to 600 parts by mass and more preferably 150 parts by mass to 400 parts by mass with respect to 100 parts by mass of the oxime compound.

The content of the photoradical polymerization initiator is preferably 0.1 to 50 mass %, more preferably 0.5 to 30 mass %, and still more preferably 1 to 20 mass % with respect to the total solid content of the composition according to the embodiment of the present disclosure. In a case where the content of the photoradical polymerization initiator is in the above-described range, higher sensitivity and pattern formability can be obtained. The composition according to the present disclosure may include one photoradical polymerization initiator or two or more photoradical polymerization initiators. In a case where the composition includes two or more photoradical polymerization initiators, it is preferable that the total content of the photoradical polymerization initiators is in the above-described range.

[Photocationic Polymerization Initiator]

Examples of the photocationic polymerization initiator include a photoacid generator. Examples of the photoacid generator include compounds which are decomposed by light irradiation to generate an acid including: an onium salt compound such as a diazonium salt, a phosphonium salt, a sulfonium salt, or an iodonium salt; and a sulfonate compound such as imidosulfonate, oximesulfonate, diazodisulfone, disulfone, or o-nitrobenzyl sulfonate. The details of the photocationic polymerization initiator can be found in paragraphs "0139" to "0214" of JP2009-258603A, the content of which is incorporated herein by reference.

The content of the photocationic polymerization initiator is preferably 0.1 to 50 mass %, more preferably 0.5 to 30 mass %, and still more preferably 1 to 20 mass % with respect to the total solid content of the composition according to the embodiment of the present disclosure. In a case where the content of the photocationic polymerization initiator is in the above-described range, higher sensitivity and pattern formability can be obtained. The composition according to the present disclosure may include one photocationic polymerization initiator or two or more photocationic polymerization initiators. In a case where the composition includes two or more photocationic polymerization initiators, it is preferable that the total content of the two or more photocationic polymerization initiators is in the above-described range.

<Polyfunctional Thiol>

The composition according to the embodiment of the present disclosure may include a polyfunctional thiol. The polyfunctional thiol is a compound having two or more thiol (SH) groups. By using the above-described photoradical polymerization initiator in combination, the polyfunctional thiol functions as a chain transfer agent in the process of radical polymerization after light irradiation such that a thiyl radical that is not likely to undergo polymerization inhibition due to oxygen is generated. Therefore, the sensitivity of the composition can be improved. In particular, it is preferable that the SH group is a polyfunctional aliphatic thiol that is bonded to an aliphatic group such as a methylene or ethylene group.

Examples of the polyfunctional thiol include hexanedithiol, decanedithiol, 1,4-butanediol bisthio propionate, 1,4-butanediolbisthioglycolate, ethylene glycol bisthioglycolate, ethylene glycol bisthiopropionate, trimethylolpropane tristhioglycolate, trimethylolpropane tristhiopropionate, trimethylolethane tris(3-mercaptobutyrate), trimethylolpropane tris(3-mercaptobutyrate), trimethylolpropane tris(3-mercaptopropionate), pentaerythritol tetrakisthioglycolate, pentaerythritol tetrakisthiopropionate, pentaerythritol tetrakis (3-mercaptopropionate), dipentaerythritol hexakis(3-mercaptopropionate), trimercaptopropionic acid tris(2-hydroxyethyl)isocyanurate, 1,4-dimethylmercaptobenzene, 2,4,6-trimercapto-s-triazine, and 2-(N,N-dibutylamino)-4,6-dimercapto-s-triazine. In addition, for example, a compound having the following structure can also be used.

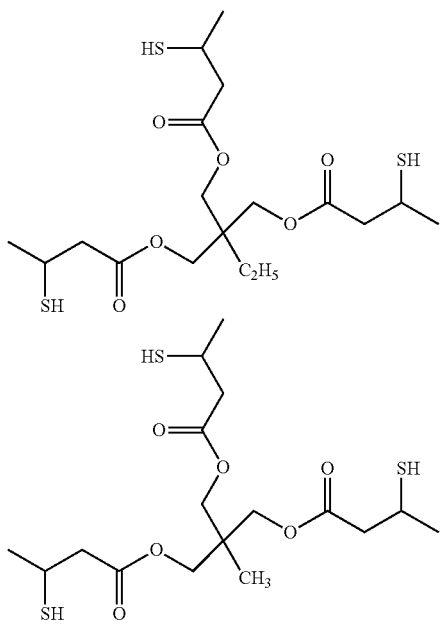

The content of the polyfunctional thiol is preferably 0.1 mass % to 20 mass %, more preferably 0.1 mass % to 15 mass %, and still more preferably 0.1 mass % to 10 mass % with respect to the total solid content of the composition according to the embodiment of the present disclosure. The composition according to the embodiment of the present disclosure may include one polyfunctional thiol or two or more polyfunctional thiols. In a case where the composition includes two or more polyfunctional thiols, it is preferable that the total content of the two or more polyfunctional thiols is in the above-described range.

<Epoxy Resin Curing Agent>

In a case where the composition according to the embodiment of the present disclosure includes an epoxy resin, it is preferable that the composition further includes an epoxy resin curing agent. Examples of the epoxy resin curing agent include an amine compound, an acid anhydride compound, an amide compound, a phenol compound, and a polycarboxylic acid. From the viewpoints of heat resistance and transparency of a cured product, as the epoxy resin curing agent, a polycarboxylic acid is preferable, and a compound having two or more carboxylic anhydride groups in a molecule is most preferable. Specific examples of the epoxy resin curing agent include butanedioic acid. The details of the epoxy resin curing agent can be found in paragraphs "0072" to "0078", the content of which is incorporated herein by reference.

The content of the epoxy resin curing agent is preferably 0.01 parts by mass to 20 parts by mass, more preferably 0.01 parts by mass to 10 parts by mass, and still more preferably 0.1 parts by mass to 6.0 parts by mass with respect to 100 parts by mass of the epoxy resin.

<Pigment Derivative>

The composition according to the embodiment of the present disclosure may further include a pigment derivative. Examples of the pigment derivative include a compound having a structure in which a portion of a pigment is substituted with an acid group, a basic group, a group having a salt structure, or a phthalimidomethyl group. Examples of the pigment include the infrared absorber, the other infrared absorber, and a pigment among the visible light absorbing compound.

As the pigment derivative, a compound represented by Formula (B1) is preferable.

In Formula (B1), P represents a colorant structure, L represents a single bond or a linking group, X represents an acid group, a basic group, a group having a salt structure, or a phthalimidomethyl group, m represents an integer of 1 or more, n represents an integer of 1 or more, in a case where m represents 2 or more, a plurality of L's and a plurality of X's may be different from each other, and in a case where n represents 2 or more, a plurality of X's may be different from each other.

The colorant structure represented by P is preferably at least one selected from a pyrrolopyrrole colorant structure, a diketo pyrrolopyrrole colorant structure, a quinacridone colorant structure, an anthraquinone colorant structure, a dianthraquinone colorant structure, a benzoisoindole colorant structure, a thiazine indigo colorant structure, an azo colorant structure, a quinophthalone colorant structure, a phthalocyanine colorant structure, a naphthalocyanine colorant structure, a dioxazine colorant structure, a perylene colorant structure, a perinone colorant structure, a benzimidazolone colorant structure, a benzothiazole colorant structure, a benzimidazole colorant structure, or a benzoxazole colorant structure, more preferably at least one selected from a pyrrolopyrrole colorant structure, a diketo pyrrolopyrrole colorant structure, a quinacridone colorant structure, or a benzimidazolone colorant structure, and still more preferably a pyrrolopyrrole colorant structure.

Examples of the linking group represented by L include a hydrocarbon group, a heterocyclic group, —NR—, —SO$_2$—, —S—, —O—, —CO—, and a group consisting of a combination thereof. R represents a hydrogen atom, an alkyl group, or an aryl group.

Examples of the acid group represented by X include a carboxy group, a sulfo group, a carboxylic acid amide group, a sulfonic acid amide group, and an imide acid group. As the carboxylic acid amide group, a group represented by —NHCOR$^{X1}$ is preferable. As the sulfonic acid amide group, a group represented by —NHSO$_2$R$^{X2}$ is preferable. As the imide acid group, a group represented by —SO$_2$NHSO$_2$R$^{X3}$, —CONHSO$_2$R$^{X4}$, —CONHCOR$^{X5}$, or —SO$_2$NHCOR$^{X6}$ is preferable. R$^{X1}$ to R$^{X6}$ each independently represent a hydrocarbon group or a heterocyclic group. The hydrocarbon group and the heterocyclic group represented by R$^{X1}$ to R$^{X6}$ may further have a substituent. Examples of the substituent which may be further included include the above-described substituent T. Among these, a halogen atom is preferable and a fluorine atom is more preferable. Examples of the basic group represented by X include an amino group. Examples of the salt structure represented by X include a salt of the acid group or the basic group described above.

Examples of the pigment derivative include compounds having the following structures. In addition, a visible light absorbing pigment derivative or an infrared derivative described below in Examples may be used. In addition, for example, compounds described in JP1981-118462A (JP-S56-118462A), JP1988-264674A (JP-S63-264674A), JP1989-217077A (JP-H1-217077A), JP1991-009961A (JP-H3-009961A), JP1991-026767A (JP-H3-026767A), JP1991-153780A (JP-H3-153780A), JP1991-045662A (JP-H3-045662A), JP1992-285669A (JP-H4-285669A), JP1994-145546A (JP-H6-145546A), JP1994-212088A (JP-H6-212088A), JP1994-240158A (JP-H6-240158A), JP1998-030063A (JP-H10-030063A), JP1998-195326A (JP-H10-195326A), paragraphs "0086" to "0098" of WO2011/024896A, paragraphs "0063" to "0094" of WO2012/102399A, paragraph "0082" of WO2017/038252A, and JP5299151B can be used, the contents of which are incorporated herein by reference.

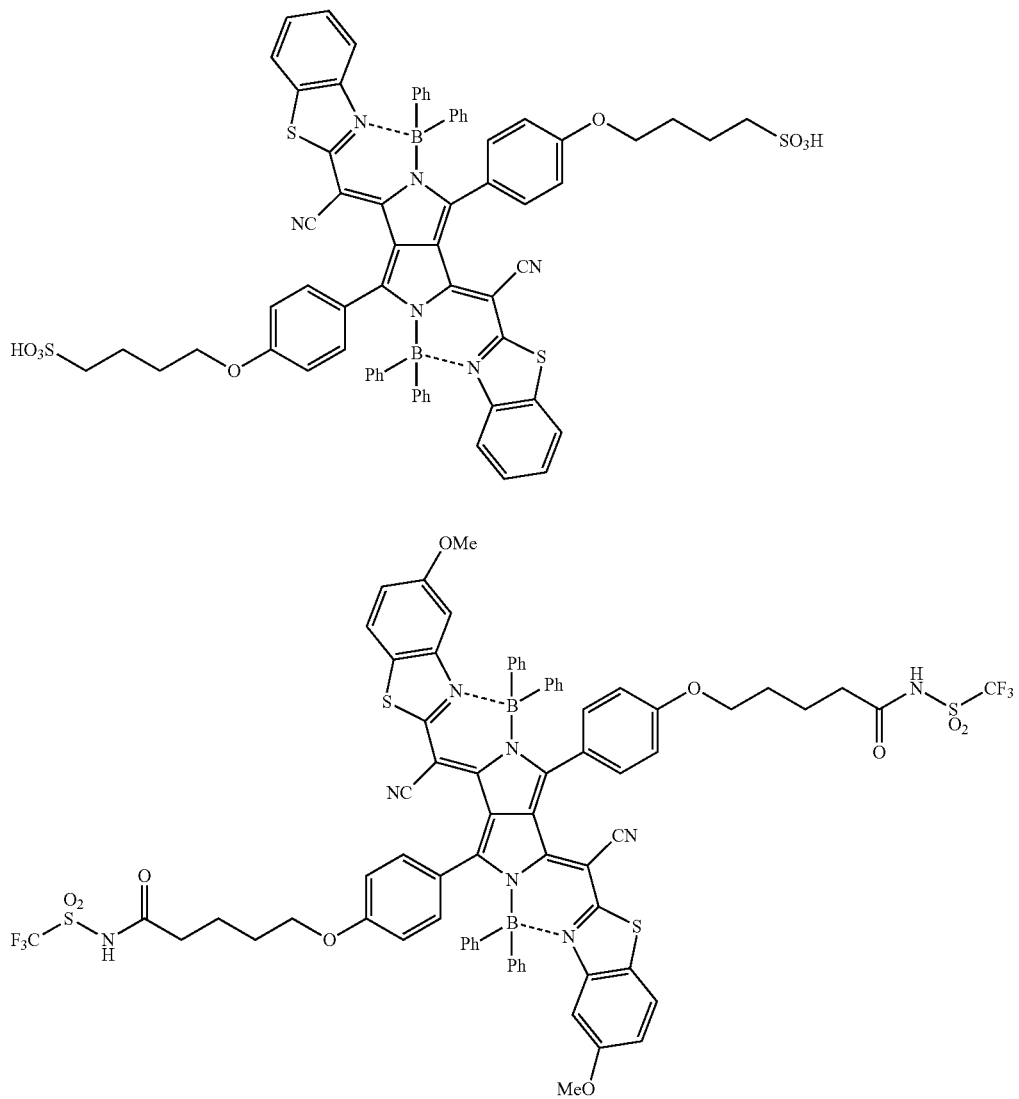

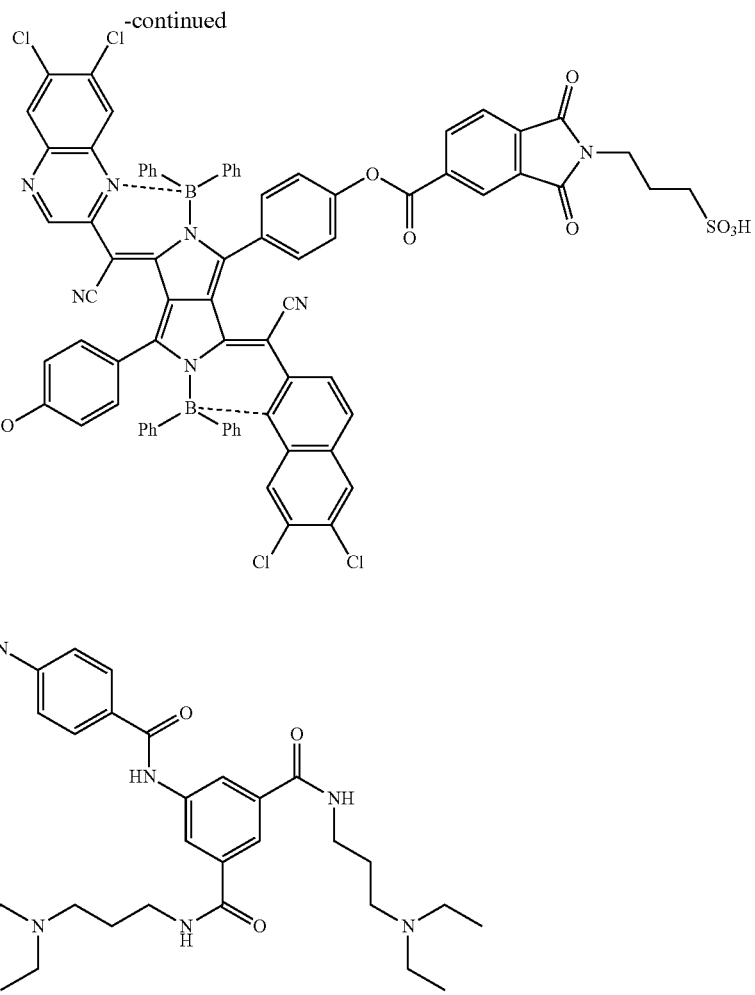

In a case where the composition according to the embodiment of the present disclosure includes the pigment derivative, the content of the pigment derivative is preferably 1 to 50 parts by mass with respect to 100 parts by mass of the pigment. The lower limit value is preferably 3 parts by mass or more and more preferably 5 parts by mass or more. The upper limit value is preferably 40 parts by mass or less and more preferably 30 parts by mass or less. In a case where the content of the pigment derivative is in the above-described range, the pigment dispersibility can be improved, and aggregation of the pigment can be efficiently suppressed. As the pigment derivative, one kind may be used alone, or two or more kinds may be used in combination. In a case where two or more ultraviolet absorbers are used in combination, it is preferable that the total content of the two or more ultraviolet absorbers is in the above-described range.

<Solvent>

The composition according to the embodiment of the present disclosure may include a solvent. Examples of the solvent include an organic solvent. Basically, the solvent is not particularly limited as long as it satisfies the solubility of the respective components and the application properties of the composition. Examples of the organic solvent include esters, ethers, ketones, and aromatic hydrocarbons.

The details of the organic solvent can be found in paragraph "0223" of WO2015/166779A, the content of which is incorporated herein by reference. In addition, an ester solvent in which a cyclic alkyl group is substituted or a ketone solvent in which a cyclic alkyl group is substituted can also be preferably used.

Specific examples of the organic solvent include dichloromethane, methyl 3-ethoxypropionate, ethyl 3-ethoxypropionate, ethyl cellosolve acetate, ethyl lactate, diethylene glycol dimethyl ether, butyl acetate, methyl 3-methoxypropionate, 2-heptanone, cyclohexanone, cyclohexyl acetate, cyclopentanone, ethyl carbitol acetate, butyl carbitol acetate, propylene glycol monomethyl ether, and propylene glycol monomethyl ether acetate.

In the present disclosure, as the organic solvent, one kind may be used alone, or two or more kinds may be used in combination. In addition, 3-methoxy-N,N-dimethylpropanamide or 3-butoxy-N,N-dimethylpropanamide is also preferable from the viewpoint of improving solubility.

In this case, it may be preferable that the content of the aromatic hydrocarbon (for example, benzene, toluene, xylene, or ethylbenzene) as the solvent is low (for example, 50 mass parts per million (ppm) or lower, 10 mass ppm or lower, or 1 mass ppm or lower with respect to the total mass of the organic solvent) in consideration of environmental aspects and the like.

In the present disclosure, a solvent having a low metal content is preferably used. For example, the metal content in the solvent is preferably 10 mass parts per billion (ppb) or lower. Optionally, a solvent having a metal content at a mass parts per trillion (ppt) level may be used. For example, such a high-purity solvent is available from Toyo Gosei Co., Ltd. (The Chemical Daily, Nov. 13, 2015).

Examples of a method of removing impurities such as metal from the solvent include distillation (for example, molecular distillation or thin-film distillation) and filtering using a filter. The pore size of a filter used for the filtering is preferably 10 µm or less, more preferably 5 µm or less, and still more preferably 3 µm or less. As a material of the filter, polytetrafluoroethylene, polyethylene, or nylon is preferable.

The solvent may include an isomer (a compound having the same number of atoms and a different structure). In addition, the organic solvent may include only one isomer or a plurality of isomers.

In the present disclosure, as the organic solvent, an organic solvent containing 0.8 mmol/L or lower of a peroxide is preferable, and an organic solvent containing substantially no peroxide is more preferable.

The content of the solvent is preferably 10 to 99 mass % with respect to the total mass of the composition according to the embodiment of the present disclosure. The upper limit is preferably 95 mass % or lower, and more preferably 90 mass % or lower. The lower limit is preferably 30 mass % or higher, more preferably 40 mass % or higher, still more preferably 50 mass % or higher, still more preferably 60 mass % or higher, and still more preferably 70 mass % or higher.

<Polymerization Inhibitor>

The composition according to the embodiment of the present disclosure may include a polymerization inhibitor. Examples of the polymerization inhibitor include hydroquinone, p-methoxyphenol, di-tert-butyl-p-cresol, pyrogallol, t-butylcatechol, benzoquinone, 4,4'-thiobis(3-methyl-6-tert-butylphenol), 2,2'-methylenebis(4-methyl-6-t-butylphenol), and N-nitrosophenylhydroxyamine salt (for example, an ammonium salt or a cerium (III) salt). Among these, p-methoxyphenol is preferable. The content of the polymerization inhibitor is preferably 0.001 to 5 mass % with respect to the total solid content of the composition according to the embodiment of the present disclosure.

<Silane Coupling Agent>

The composition according to the embodiment of the present disclosure may include a silane coupling agent. In the present disclosure, the silane coupling agent refers to a silane compound having a functional group other than a hydrolyzable group. In addition, the hydrolyzable group refers to a substituent directly linked to a silicon atom and capable of forming a siloxane bond due to at least one of a hydrolysis reaction or a condensation reaction. Examples of the hydrolyzable group include a halogen atom, an alkoxy group, and an acyloxy group. Among these, an alkoxy group is preferable. That is, it is preferable that the silane coupling agent is a compound having an alkoxysilyl group. Examples of the functional group other than a hydrolyzable group include a vinyl group, a (meth)acryloyl group, a mercapto group, an epoxy group, an oxetanyl group, an amino group, an ureido group, a sulfide group, an isocyanate group, and a phenyl group. Among these, a (meth)acryloyl group or an epoxy group is preferable. Examples of the silane coupling agent include a compound described in paragraphs "0018" to "0036" of JP2009-288703A and a compound described in paragraphs "0056" to "0066" of JP2009-242604A, the contents of which are incorporated herein by reference.

The content of the silane coupling agent is preferably 0.01 to 15.0 mass % and more preferably 0.05 to 10.0 mass % with respect to the total solid content of the composition according to the embodiment of the present disclosure. As the silane coupling agent, one kind may be used alone, or two or more kinds may be used. In a case where two or more silane coupling agents are used in combination, it is preferable that the total content of the two or more silane coupling agents is in the above-described range.

<Surfactant>

The composition according to the embodiment of the present disclosure may include a surfactant. As the surfactants, various surfactants such as a fluorine surfactant, a nonionic surfactant, a cationic surfactant, an anionic surfactant, or a silicone surfactant can be used. The details of the surfactant can be found in paragraphs "0238" to "0245" of WO2015/166779A, the content of which is incorporated herein by reference.

In the present disclosure, it is preferable that the surfactant is a fluorine surfactant. By the composition according to the present disclosure including a fluorine surfactant, liquid characteristics (in particular, fluidity) are further improved, and liquid saving properties can be further improved. In addition, a film having reduced thickness unevenness can be formed.

The fluorine content in the fluorine surfactant is preferably 3 to 40 mass %, more preferably 5 to 30 mass %, and still more preferably 7 to 25 mass %. The fluorine surfactant in which the fluorine content is in the above-described range is effective from the viewpoints of the uniformity in the thickness of the coating film and liquid saving properties, and the solubility thereof in the composition is also excellent.

Specific examples of the fluorine surfactant include a surfactant described in paragraphs "0060" to "0064" of JP2014-041318A (paragraphs "0060" to "0064" of corresponding WO2014/017669A) and a surfactant described in paragraphs "0117" to "0132" of JP2011-132503A, the contents of which are incorporated herein by reference. Examples of a commercially available product of the fluorine surfactant include: MEGAFACE F171, F172, F173, F176, F177, F141, F142, F143, F144, R30, F437, F475, F479, F482, F554, F780, EXP, and MFS-330 (all of which are manufactured by DIC Corporation); FLUORAD FC430, FC431, and FC171 (all of which are manufactured by Sumitomo 3M Ltd.); SURFLON S-382, SC-101, SC-103, SC-104, SC-105, SC-1068, SC-381, SC-383, S-393, and KH-40 (all of which are manufactured by Asahi Glass Co., Ltd.); and POLYFOX PF636, PF656, PF6320, PF6520, and PF7002 (all of which are manufactured by OMNOVA Solutions Inc.).

In addition, as the fluorine surfactant, an acrylic compound in which, in a case where heat is applied to a molecular structure which has a functional group having a fluorine atom, the functional group having a fluorine atom is cut and a fluorine atom is volatilized can also be preferably used. Examples of the fluorine surfactant include MEGAFACE DS series (manufactured by DIC Corporation, The Chemical Daily, Feb. 22, 2016, Nikkei Business Daily, Feb. 23, 2016), for example, MEGAFACE DS-21.

In addition, as the fluorine surfactant, a polymer of a fluorine-containing vinyl ether compound having a fluorinated alkyl group or a fluorinated alkylene ether group and a hydrophilic vinyl ether compound is also preferable. The details of this fluorine surfactant can be found in JP2016-216602A, the content of which is incorporated herein by reference.

As the fluorine surfactant, a block polymer can also be used. Examples of the block polymer include a compound described in JP2011-089090A. As the fluorine surfactant, a fluorine-containing polymer compound can be preferably used, the fluorine-containing polymer compound including: a constitutional unit derived from a (meth)acrylate compound having a fluorine atom; and a constitutional unit derived from a (meth)acrylate compound having 2 or more (preferably 5 or more) alkyleneoxy groups (preferably an ethyleneoxy group and a propyleneoxy group). For example, the following compound can also be used as the fluorine surfactant used in the present disclosure.

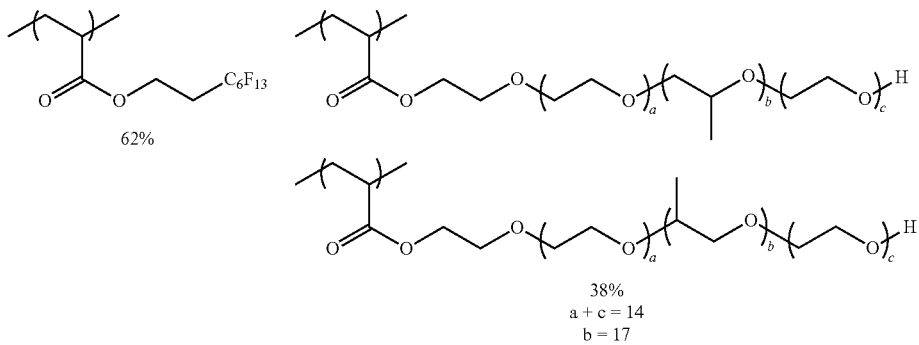

The weight-average molecular weight of the compound is preferably 3,000 to 50,000 and, for example, 14,000. In the compound, "%" representing the proportion of a constitutional unit is mol %.

In addition, as the fluorine surfactant, a fluorine-containing polymer having an ethylenically unsaturated group at a side chain can also be used. Specific examples include a compound described in paragraphs "0050" to "0090" and paragraphs "0289" to "0295" of JP2010-164965A, for example, MEGAFACE RS-101, RS-102, RS-718K, and RS-72-K manufactured by DIC Corporation. As the fluorine surfactant, a compound described in paragraphs "0015" to "0158" of JP2015-117327A can also be used.

Examples of the nonionic surfactant include glycerol, trimethylolpropane, trimethylolethane, an ethoxylate and a propoxylate thereof (for example, glycerol propoxylate or glycerol ethoxylate), polyoxyethylene lauryl ether, polyoxyethylene stearyl ether, polyoxyethylene oleyl ether, polyoxyethylene octylphenyl ether, polyoxyethylene nonylphenyl ether, polyethylene glycol dilaurate, polyethylene glycol distearate, sorbitan fatty acid esters, PLURONIC L10, L31, L61, L62, 10R5, 17R2, and 25R2 (manufactured by BASF SE), TETRONIC 304, 701, 704, 901, 904, and 150R1 (manufactured by BASF SE), SOLSPERSE 20000 (manufactured by Lubrication Technology Inc.), NCW-101, NCW-1001, and NCW-1002 (all of which are manufactured by Wako Pure Chemical Industries, Ltd.), PIONIN D-6112, D-6112-W, and D-6315 (all of which are manufactured by Takemoto Oil & Fat Co., Ltd.), and OLFINE E1010, SURFYNOL 104, 400, and 440 (all of which are manufactured by Nissin Chemical Co., Ltd.).

The content of the surfactant is preferably 0.001 mass % to 5.0 mass % and more preferably 0.005 to 3.0 mass % with respect to the total solid content of the composition according to the embodiment of the present disclosure. As the surfactant, one kind may be used alone, or two or more kinds may be used. In a case where two or more surfactants are used in combination, it is preferable that the total content of the two or more surfactants is in the above-described range.

<Ultraviolet Absorber>

The composition according to the embodiment of the present disclosure may include an ultraviolet absorber. As the ultraviolet absorber, for example, a conjugated diene compound, an aminobutadiene compound, a methyldibenzoyl compound, a coumarin compound, a salicylate compound, a benzophenone compound, a benzotriazole compound, an acrylonitrile compound, an azomethine compound, an indole compound, or a triazine compound can be used. The details of the ultraviolet absorber can be found in paragraphs "0052" to "0072" of JP2012-208374A, paragraphs "0317" to "0334" of JP2013-068814A, and paragraphs "0061" to "0080" of JP2016-162946A, the contents of which are incorporated herein by reference. Examples of a commercially available product of the conjugated diene compound include UV-503 (manufactured by Daito Chemical Co., Ltd.). Specific examples of the indole compound include compounds having the following structures. In addition, as the benzotriazole compound, MYUA series (manufactured by Miyoshi Oil & Fat Co., Ltd.; The Chemical Daily, Feb. 1, 2016) may be used.

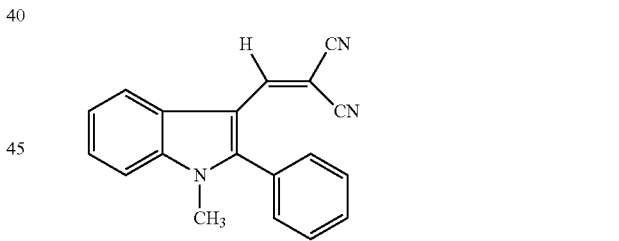

In the present disclosure, as the ultraviolet absorber, compounds represented by Formulae (UV-1) to (UV-3) can also be preferably used.

(UV-1)

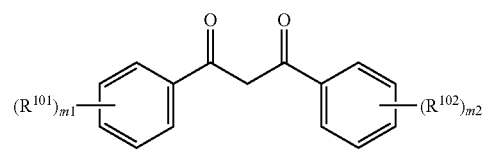

(UV-2)

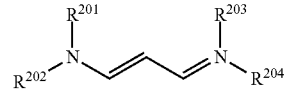

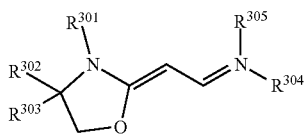

In Formula (UV-1), $R^{101}$ and $R^{102}$ each independently represent a substituent, and m1 and m2 each independently represent 0 to 4. In Formula (UV-2), $R^{201}$ and $R^{202}$ each independently represent a hydrogen atom or an alkyl group, and $R^{203}$ and $R^{204}$ each independently represent a substituent. In Formula (UV-3), $R^{301}$ to $R^{303}$ each independently represent a hydrogen atom or an alkyl group, and $R^{304}$ and $R^{305}$ each independently represent a substituent.

Specific examples of the compounds represented by Formulae (UV-1) to (UV-3) include the following compounds.

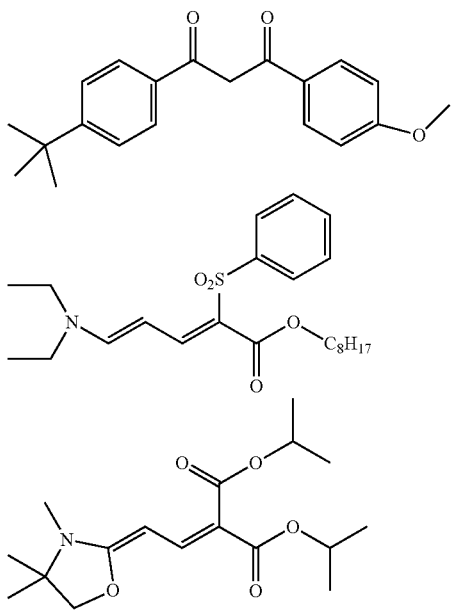

The content of the ultraviolet absorber is preferably 0.01 mass % to 10 mass % and more preferably 0.01 mass % to 5 mass % with respect to the total solid content of the composition according to the embodiment of the present disclosure. In the present disclosure, as the ultraviolet absorber, one kind may be used alone, or two or more kinds may be used. In a case where two or more ultraviolet absorbers are used in combination, it is preferable that the total content of the two or more ultraviolet absorbers is in the above-described range.

<Antioxidant>

The composition according to the embodiment of the present disclosure may include an antioxidant. Examples of the antioxidant include a phenol compound, a phosphite compound, and a thioether compound. As the phenol compound, any phenol compound which is known as a phenol antioxidant can be used. Preferable examples of the phenol compound include a hindered phenol compound. A compound having a substituent at a position (ortho position) adjacent to a phenolic hydroxy group is preferable. As the substituent, a substituted or unsubstituted alkyl group having 1 to 22 carbon atoms is preferable. In addition, as the antioxidant, a compound having a phenol group and a phosphite group in the same molecule is also preferable. In addition, as the antioxidant, a phosphorus antioxidant can also be preferably used. Examples of the phosphorus antioxidant include tris[2-[[2,4,8,10-tetrakis(1,1-dimethylethyl) dibenzo[d,f][1,3,2]dioxaphosphepin-6-yl]oxy]ethyl]amine, tris[2-[(4,6,9,11-tetra-tert-butyldibenzo[d,f][1,3,2]dioxaphosphepin-2-yl)oxy]ethyl]amine, and ethyl bis(2,4-di-tert-butyl-6-methylphenyl)phosphite. Examples of the commercially available product of the antioxidant include ADEKA STAB AO-20, ADEKA STAB AO-30, ADEKA STAB AO-40, ADEKA STAB AO-50, ADEKA STAB AO-50F, ADEKA STAB AO-60, ADEKA STAB AO-60G, ADEKA STAB AO-80, and ADEKA STAB AO-330 (all of which are manufactured by Adeka Corporation). In addition, as the antioxidant, a polyfunctional hindered amine antioxidant described in WO17/006600A can also be used.

The content of the antioxidant is preferably 0.01 to 20 mass % and more preferably 0.3 to 15 mass % with respect to the mass of the total solid content of the composition according to the embodiment of the present disclosure. As the antioxidant, one kind may be used alone, or two or more kinds may be used in combination. In a case where two or more antioxidants are used in combination, it is preferable that the total content of the two or more antioxidants is in the above-described range.

<Other Components>

Optionally, the composition according to the embodiment of the present disclosure may further include a sensitizer, a curing accelerator, a filler, a thermal curing accelerator, a plasticizer, and other auxiliary agents (for example, conductive particles, a filler, an antifoaming agent, a flame retardant, a leveling agent, a peeling accelerator, an aromatic chemical, a surface tension adjuster, or a chain transfer agent). By the composition appropriately including the components, properties such as film properties can be adjusted. The details of the components can be found in, for example, paragraph "0183" of JP2012-003225A (corresponding to paragraph "0237" of US2013/0034812A) and paragraphs "0101" to "0104" and "0107" to "0109" of JP2008-250074A, the contents of which are incorporated herein by reference.

In addition, the composition according to the embodiment of the present disclosure may optionally include a potential antioxidant. The potential antioxidant is a compound in which a portion that functions as the antioxidant is protected by a protective group and this protective group is desorbed by heating the compound at 100° C. to 250° C. or by heating the compound at 80° C. to 200° C. in the presence of an acid/a base catalyst. Examples of the potential antioxidant include a compound described in WO2014/021023A, WO2017/030005A, and JP2017-008219A. Examples of a commercially available product of the potential antioxidant include ADEKA ARKLS GPA-5001 (manufactured by Adeka Corporation).

A storage container of the composition according to the embodiment of the present disclosure is not particularly limited, and a well-known storage container can be used. In addition, as the storage container, in order to suppress infiltration of impurities into the raw materials or the composition, a multilayer bottle in which a container inner wall having a six-layer structure is formed of six kinds of resins or a bottle in which a container inner wall having a seven-layer structure is formed of six kinds of resins is preferably used. Examples of the container include a container described in JP2015-123351A.

The use of the composition according to the embodiment of the present disclosure is not particularly limited. The composition according to the embodiment of the present invention can be preferably used to form an infrared transmitting filter or the like.

<Method of Preparing Composition>

The composition according to the embodiment of the present disclosure can be prepared by mixing the above-described components with each other. During the preparation of the composition, all the components may be dissolved or dispersed in a solvent at the same time to prepare the composition. Optionally, two or more solutions or dispersion liquids to which the respective components are appropriately added may be prepared in advance, and the solutions or dispersion liquids may be mixed with each other during use (during application) to prepare the composition.

In addition, in a case where the composition according to the embodiment of the present disclosure includes particles of a pigment or the like, it is preferable that a process of dispersing the particles is provided. Examples of a mechanical force used for dispersing the particles in the process of dispersing the particles include compression, squeezing, impact, shearing, and cavitation. Specific examples of the process include a beads mill, a sand mill, a roll mill, a ball mill, a paint shaker, a Microfluidizer, a high-speed impeller, a sand grinder, a flow jet mixer, high-pressure wet atomization, and ultrasonic dispersion. During the pulverization of the particles using a sand mill (beads mill), it is preferable that the process is performed under conditions for increasing the pulverization efficiency, for example, by using beads having a small size and increasing the filling rate of the beads. In addition, it is preferable that coarse particles are removed by filtering, centrifugal separation, and the like after pulverization. In addition, as the process and the disperser for dispersing the particles, a process and a disperser described in "Complete Works of Dispersion Technology, Johokiko Co., Ltd., Jul. 15, 2005", "Dispersion Technique focusing on Suspension (Solid/Liquid Dispersion) and Practical Industrial Application, Comprehensive Reference List, Publishing Department of Management Development Center, Oct. 10, 1978", and paragraph "0022" JP2015-157893A can be suitably used. In addition, in the process of dispersing the particles, particles may be refined in a salt milling step. A material, a device, process conditions, and the like used in the salt milling step can be found in, for example, JP2015-194521A and JP2012-046629A.

During the preparation of the composition, it is preferable that the composition is filtered through a filter, for example, in order to remove foreign matter or to reduce defects. As the filter, any filter which is used in the related art for filtering or the like can be used without any particular limitation. Examples of a material of the filter include: a fluororesin such as polytetrafluoroethylene (PTFE); a polyamide resin such as nylon (for example, nylon-6 or nylon-6,6); and a polyolefin resin (including a polyolefin resin having a high density and an ultrahigh molecular weight) such as polyethylene or polypropylene (PP). Among these materials, polypropylene (including high-density polypropylene) or nylon is preferable.

The pore size of the filter is suitably 0.01 μm to 7.0 μm and is preferably 0.01 μm to 3.0 μm and more preferably 0.05 μm to 0.5 μm. In a case where the pore size of the filter is in the above-described range, fine foreign matter can be reliably removed. In addition, it is preferable that a fibrous filter material is used. Examples of the fibrous filter material include polypropylene fiber, nylon fiber, and glass fiber. Specific examples include a filter cartridge of SBP type series (for example, SBP008), TPR type series (for example, TPR002 or TPR005), and SHPX type series (for example, SHPX003) all of which are manufactured by Roki Techno Co., Ltd.

In a case where a filter is used, a combination of different filters (for example, a first filter and a second filter) may be used. At this time, the filtering using each of the filters may be performed once, or twice or more.

In addition, a combination of filters having different pore sizes in the above-described range may be used. Here, the pore size of the filter can refer to a nominal value of a manufacturer of the filter. A commercially available filter can be selected from various filters manufactured by Pall Corporation (for example, DFA4201NIEY), Toyo Roshi Kaisha, Ltd., Entegris Japan Co., Ltd. (former Mykrolis Corporation), or Kits Microfilter Corporation.

The second filter may be formed of the same material as that of the first filter.

In addition, the filtering using the first filter may be performed only on the dispersion liquid, and the filtering using the second filter may be performed on a mixture of the dispersion liquid and other components.

The total solid content (solid content concentration) of the composition according to the embodiment of the present disclosure changes depending on an application method and, for example, is preferably 1% to 50 mass %. The lower limit is more preferably 10 mass % or higher. The upper limit is more preferably 30 mass % or lower.

<Use>

A film formed of the composition according to the embodiment of the present disclosure can be preferably used as an infrared transmitting filter. For example, by incorporating the film formed of the composition according to the embodiment of the present disclosure into a solid-state imaging element or a sensor, the generation of noise from visible light can be suppressed.

(Pattern Forming Method)

Next, a pattern forming method using the composition according to the embodiment of the present disclosure will be described. It is preferable that a pattern forming method according to the embodiment of the present disclosure includes a step of forming a pattern on a curable composition layer including the composition according to the present disclosure using a photolithography method or a dry etching method.

In addition, the pattern forming method may further include a step of preparing a pattern-forming laminate before the step of forming the pattern.

In the step of preparing the pattern-forming laminate, a step of forming the curable composition layer on a support using the curable composition according to the embodiment of the present disclosure may be further provided, or a commercially available pattern-forming laminate in which a curable composition layer is formed on a support may be used.

It is preferable that the pattern forming method using the photolithography method includes: a step of exposing a curable composition layer including the composition according to the embodiment of the present disclosure in a pattern shape; and a step of forming a pattern by removing a non-exposed portion by development.

In addition, the pattern forming method may further include a step of preparing a pattern-forming laminate before the step of forming the pattern.

In the step of preparing the pattern-forming laminate, a step of forming the curable composition layer on a support using the curable composition according to the embodiment of the present disclosure may be further provided, or a commercially available pattern-forming laminate in which a curable composition layer is formed on a support may be used.

In addition, the pattern forming method using a dry etching method can be performed using a method including: curing a curable composition layer including the curable composition according to the embodiment of the present disclosure to form a cured composition layer; forming a patterned resist layer on the cured composition layer; and dry-etching the cured composition layer with etching gas by using the patterned resist layer as a mask.

In addition, the pattern forming method may further include a step of preparing a pattern-forming laminate before the step of forming the pattern.

In the step of preparing the pattern-forming laminate, a step of forming the curable composition layer on a support using the curable composition according to the embodiment of the present disclosure may be further provided, or a commercially available pattern-forming laminate in which a curable composition layer is formed on a support may be used.

Hereinafter, the respective steps will be described.

<Step of Forming Curable Composition Layer>

In the step of forming a curable composition layer, a curable composition layer is formed on a support using the composition according to the embodiment of the present disclosure.

Examples of the support include a substrate formed of a material such as silicon, non-alkali glass, soda glass, PYREX (registered trade name) glass, or quartz glass.

In addition, for example, an InGaAs substrate is preferably used as the support. The InGaAs substrate has excellent sensitivity to light having a wavelength of longer than 1000 nm. Therefore, by laminating the film according to the embodiment of the present disclosure on the InGaAs substrate, an infrared sensor having excellent sensitivity can be easily obtained.

In addition, a charge coupled device (CCD), a complementary metal-oxide semiconductor (CMOS), a transparent conductive film, or the like may be formed on the support.

In addition, a black matrix that separates pixels from each other may be formed on the support.

In addition, optionally, an undercoat layer may be provided on the support to improve adhesiveness with a layer above the support, to prevent diffusion of materials, or to make a surface of the substrate flat.

As a method of applying the composition to the support, a well-known method can be used. Examples of the well-known method include: a drop casting method; a slit coating method; a spray coating method; a roll coating method; a spin coating method; a cast coating method; a slit and spin method; a pre-wetting method (for example, a method described in JP2009-145395A); various printing methods including jet printing such as an ink jet method (for example, an on-demand method, a piezoelectric method, or a thermal method) or a nozzle jet method, flexographic printing, screen printing, gravure printing, reverse offset printing, and metal mask printing; a transfer method using a mold or the like; and a nanoimprint method.

The application method using an ink jet method is not particularly limited, and examples thereof include a method (in particular, pp. 115 to 133) described in "Extension of Use of Ink Jet—Infinite Possibilities in Patent-" (February, 2005, S.B. Research Co., Ltd.) and methods described in JP2003-262716A, JP2003-185831A, JP2003-261827A, JP2012-126830A, and JP2006-169325A. In addition, the details of the method of applying the resin composition can be found in WO2017/030174A and WO2017/018419A, the contents of which are incorporated herein by reference.

The curable composition layer formed on the support may be dried (pre-baked). In a case where a pattern is formed through a low-temperature process, pre-baking is not necessarily performed. In a case where pre-baking is performed, the pre-baking temperature is preferably 150° C. or lower, more preferably 120° C. or lower, and still more preferably 110° C. or lower. The lower limit is, for example, 50° C. or higher or 80° C. or higher. The pre-baking time is preferably 10 seconds to 3000 seconds, more preferably 40 seconds to 2500 seconds, and still more preferably 80 seconds to 2200 seconds. Drying can be performed using a hot plate, an oven, or the like.

<Case where Pattern is Formed Using Photolithography Method>

[Exposure Step]

In the exposure step, the curable composition layer is exposed in a pattern shape (exposure step). For example, the curable composition layer can be exposed in a pattern shape using an exposure device such as a stepper through a mask having a predetermined mask pattern. As a result, an exposed portion can be cured. As radiation (light) used during the exposure, ultraviolet rays such as g-rays or i-rays are preferable, and i-rays are more preferable. The irradiation dose (exposure dose) is, for example, preferably 0.03 $J/cm^2$ to 2.5 $J/cm^2$, more preferably 0.05 $J/cm^2$ to 1.0 $J/cm^2$, and most preferably 0.08 $J/cm^2$ to 0.5 $J/cm^2$. The oxygen concentration during exposure can be appropriately selected. The exposure may be performed not only in air but also in a low-oxygen atmosphere having an oxygen concentration of 19 vol % or lower (for example, 15 vol %, 5 vol %, or substantially 0 vol %) or in a high-oxygen atmosphere having an oxygen concentration of higher than 21 vol % (for example, 22 vol %, 30 vol %, or 50 vol %). In addition, the exposure illuminance can be appropriately set and typically can be selected in a range of 1,000 $W/m^2$ to 100,000 $W/m^2$ (for example, 5,000 $W/m^2$, 15,000 $W/m^2$, or 35,000 $W/m^2$). Conditions of the oxygen concentration and conditions of the exposure illuminance may be appropriately combined. For example, conditions are oxygen concentration: 10 vol % and illuminance: 10,000 $W/m^2$, or oxygen concentration: 35 vol % and illuminance: 20,000 $W/m^2$.

[Development Step]

In the development step, a pattern is formed by removing a non-exposed portion from the exposed curable composition layer by development. The non-exposed portion of the composition layer can be removed by development using a developer. As a result, a non-exposed portion of the composition layer in the exposure step is eluted into the developer, and only the photocured portion remains on the support. As the developer, an alkali developer which does not cause damages to a solid-state imaging element as an underlayer, a circuit or the like is desired. For example, the temperature of the developer is preferably 20° C. to 30° C. The development time is preferably 20 to 180 seconds. In addition, in order to further improve residue removing properties, a step of shaking the developer off per 60 seconds and supplying a new developer may be repeated multiple times.

Examples of the alkaline agent used as the developer include: an organic alkaline compound such as ethylamine, diethylamine, dimethylethanolamine, diglycolamine, diethanolamine, hydroxyamine, ethylenediamine, tetramethylammonium hydroxide, tetraethylammonium hydroxide, tetrapropylammonium hydroxide, tetrabutylammonium hydroxide, ethyltrimethylammonium hydroxide, benzyltrimethylammonium hydroxide, dimethyl bis(2-hydroxyethyl)ammonium hydroxide, choline, pyrrole, piperidine, or 1,8-diazabicyclo[5.4.0]-7-undecene; and an inorganic alkaline compound such as ammonia water, sodium hydroxide, potassium hydroxide, sodium carbonate, sodium bicarbonate, sodium silicate, or sodium metasilicate. From the viewpoints of environment and safety, it is preferable that the alkaline agent is a compound having a high molecular weight. As the developer, an alkaline aqueous solution in which the above alkaline agent is diluted with pure water is preferably used. A concentration of the alkaline agent in the alkaline aqueous solution is preferably 0.001 to 10 mass % and more preferably 0.01 to 1 mass %. In addition, a surfactant may be used as the developer. Examples of the surfactant include the above-described surfactants. Among these, a nonionic surfactant is preferable. From the viewpoint of easiness of transport, storage, and the like, the developer may be obtained by temporarily manufacturing a concentrated solution and diluting the concentrated solution to a necessary concentration during use. The dilution factor is not particularly limited and, for example, can be set to be in a range of 1.5 to 100 times. In a case where a developer including the alkaline aqueous solution is used, it is preferable that the layer is rinsed with pure water after development.

[Curing Step]

In the present disclosure, after the development step and the drying, a heat treatment (post-baking) or a curing step of curing the film by post-exposure may be performed.

Post-baking is a heat treatment which is performed after development to complete curing. For example, the heating temperature during post-baking is preferably 100° C. to 240° C. and more preferably 200° C. to 240° C. In addition, in a case where an organic electroluminescence (organic EL) element is used as a light-emitting light source, or in a case where a photoelectric conversion film of an image sensor is formed of an organic material, the heating temperature is preferably 150° C. or lower, more preferably 120° C. or lower, still more preferably 100° C. or lower, and even still more preferably 90° C. or lower. The lower limit is, for example, 50° C. or higher. The film after the development is post-baked continuously or batchwise using a heating unit such as a hot plate, a convection oven (hot air circulation dryer), or a high-frequency heater under the above-described conditions.

For post-exposure, for example, g-rays, h-rays, i-rays, excimer laser such as KrF or ArF, electron beams, or X-rays can be used. It is preferable that post-baking is performed using an existing high-pressure mercury lamp at a low temperature of about 20° C. to 50° C. The irradiation time is 10 seconds to 180 seconds and preferably 30 seconds to 60 seconds. In a case where post-exposure and post-baking are performed in combination, it is preferable that post-exposure is performed before post-baking.

<Case where Pattern is Formed Using Dry Etching Method>

The formation of a pattern using a dry etching method can be performed using a method including: curing the composition layer on the support to form a cured composition layer; forming a patterned resist layer on the cured composition layer; and dry-etching the cured composition layer with etching gas by using the patterned resist layer as a mask. In particular, in a desirable aspect, as a process of forming the resist layer, baking after exposure or baking after development (post-baking) is performed. The details of the pattern formation using the dry etching method can be found in paragraphs "0010" to "0067" of JP2013-064993A, the content of which is incorporated herein by reference.

By performing the respective steps as described above, a pattern (pixel) of the film having the specific spectral characteristics according to the embodiment of the present disclosure can be formed.

(Cured Film)

Next, a cured film according to the embodiment of the present disclosure will be described.

The cured film according to the embodiment of the present disclosure is a cured film which is formed by curing the composition according to the embodiment of the present disclosure. The cured film according to the embodiment of the present disclosure can be preferably used as an infrared transmitting filter. For example, by incorporating the cured film according to the embodiment of the present disclosure into an infrared sensor, moisture can be detected with high sensitivity.

It is preferable that the cured film according to the embodiment of the present disclosure has the following spectral characteristics (1). According to this aspect, a film capable of blocking light in a wavelength range of 400 nm to 1,000 nm and allowing transmission of infrared light (preferably infrared light in a wavelength range of longer than 1,000 nm and more preferably infrared light in a wavelength range of 100 nm to 1,300 nm) in a state where noise generated from visible light is small can be formed. Regarding the spectral characteristics shown in (1), preferable ranges of A/C, the minimum value A, and the maximum value C are the same as the preferable ranges of A/C, the minimum value A, and the maximum value C in the curable composition according to the embodiment of the present disclosure.

(1) A wavelength Tb having a transmittance of 50% is present in a wavelength range of 1,000 nm to 1,300 nm, and in a case where a wavelength that is shorter than the wavelength Tb by 200 nm is represented by Ta and a wavelength that is longer than the wavelength Tb by 200 nm is represented by Tc, a ratio A/C of a minimum value A of an absorbance in a wavelength range of the wavelength Ta±50 nm to a maximum value C of an absorbance in a wavelength range of the wavelength Tc±50 nm is 4.5 or higher.

The thickness of the cured film according to the embodiment of the present disclosure is not particularly limited and is preferably 0.1 μm to 50 μm, more preferably 0.1 μm to 20 μm, and still more preferably 0.5 μm to 10 μm.

(Infrared Transmitting Filter)

An infrared transmitting filter according to the embodiment of the present disclosure includes the cured film according to the embodiment of the present disclosure.

It is preferable that the infrared transmitting filter according to the embodiment of the present disclosure is laminated on a support for use. Examples of the support include the above-described examples.

The infrared transmitting filter according to the embodiment of the present disclosure can be used in combination with a color filter that includes a chromatic colorant. The color filter can be manufactured using a coloring composition including a chromatic colorant. Examples of the chromatic colorant include the chromatic colorants described regarding the composition according to the embodiment of the present disclosure. The coloring composition may further include, for example, a resin, a polymerizable compound, a photopolymerization initiator, a surfactant, a solvent, a polymerization inhibitor, and an ultraviolet absorber. In more detail, for example, the materials described above regarding the composition according to the embodiment of the present disclosure can be used.

In the infrared transmitting filter according to the embodiment of the present disclosure, the film according to the embodiment of the present disclosure can also be used in combination with another infrared transmitting filter having spectral characteristics different from those of the film according to the embodiment of the present disclosure.

Examples of the other infrared transmitting filter include a filter satisfying the following spectral characteristics (1). Regarding the spectral characteristics shown in (1), preferable ranges of A/C, the minimum value A, and the maximum value C are the same as the preferable ranges of A/C, the minimum value A, and the maximum value C in the curable composition according to the embodiment of the present disclosure.

(1) A wavelength Tb having a transmittance of 50% is present in a wavelength range of 1,000 nm to 1,300 nm, and in a case where a wavelength that is shorter than the wavelength Tb by 200 nm is represented by Ta and a wavelength that is longer than the wavelength Tb by 200 nm is represented by Tc, a ratio A/C of a minimum value A of an absorbance in a wavelength range of the wavelength Ta±50 nm to a maximum value C of an absorbance in a wavelength range of the wavelength Tc±50 nm is 4.5 or higher.

(Laminate)

A laminate according to the embodiment of the present disclosure includes the cured film according to the embodiment of the present disclosure or the infrared transmitting filter according to the embodiment of the present disclosure and a dielectric multi-layer film.

The dielectric multi-layer film is a film in which dielectrics having different refractive indices are laminated, and is an optical thin film formed on a surface or the like of a lens for the purpose of antireflection or total reflection at a specific wavelength.

It is preferable that the dielectric multi-layer film includes at least a Bragg reflection layer.

The Bragg reflection layer is a layer having a modulation of refractive index in a thickness direction of the layer. In a case where light including a component perpendicular to the modulation of refractive index is incident into the Bragg reflection layer, transmitted light and reflected light are generated at each refractive index interface, and these light components interfere with each other. As a result, a part of the incidence light is reflected. In general, the Bragg reflection layer has a periodic multilayer structure, in which the reflectivity can be controlled by increasing or decreasing the number of layers. In addition, regarding selective reflection in the Bragg reflection layer, in general a reflection wavelength can be selected by controlling the thickness of each of the layers in the multilayer structure.

For example, the Bragg reflection layer can be prepared by alternately laminating several tens of thin films of silicon oxide and niobium pentoxide. In addition, the Bragg reflection layer can also be prepared by laminating multiple layers of polymer films. As a commercially available product, a multilayer reflection film "ESR" (manufactured by 3M) can be used.

In the dielectric multi-layer film, for example, it is preferable that a transmittance of light in a wavelength range of the wavelength Tb nm to the wavelength Tb+200 nm is 80% or higher and a transmittance of light in a wavelength range of 400 nm to the wavelength Tb nm is 10% or lower, and it is preferable that a transmittance of light in a wavelength range of the wavelength Tb nm to the wavelength Tb+200 nm is 90% or higher and a transmittance of light in a wavelength range of 400 nm to the wavelength Tb nm is 5% or lower.

In the laminate according to the embodiment of the present disclosure, it is presumed that, by including the dielectric multi-layer film, the generation of noise from visible light can be further suppressed.

(Solid-State Imaging Element)

A solid-state imaging element according to the embodiment of the present disclosure includes the cured film according to the embodiment of the present disclosure, the infrared transmitting filter according to the embodiment of the present disclosure, or the laminate according to the embodiment of the present disclosure. The solid-state imaging element according to the embodiment of the present disclosure is configured to include the cured film according to the embodiment of the present disclosure, the infrared transmitting filter according to the embodiment of the present disclosure, or the laminate according to the embodiment of the present disclosure. The configuration of the solid-state imaging element is not particularly limited as long as the solid image pickup element functions. For example, the following configuration can be adopted.

The solid-state imaging element includes a plurality of photodiodes and transfer electrodes on the support, the photodiodes constituting a light receiving area of the solid-state imaging element (for example, a CCD image sensor or a CMOS image sensor), and the transfer electrode being formed of polysilicon or the like. In the solid-state imaging element, a light blocking film formed of tungsten or the like which has openings through only light receiving sections of the photodiodes is provided on the photodiodes and the transfer electrodes, a device protective film formed of silicon nitride or the like is formed on the light blocking film so as to cover the entire surface of the light blocking film and the light receiving sections of the photodiodes, and the cured film according to the embodiment of the present disclosure, the infrared transmitting filter according to the embodiment of the present disclosure, or the laminate according to the embodiment of the present disclosure is formed on the device protective film. Further, a configuration in which a light collecting unit (for example, a microlens; hereinafter, the same shall be applied) is provided above the device protective film and below the cured film according to the embodiment of the present disclosure, the infrared transmitting filter according to the embodiment of the present disclosure, or the laminate according to the embodiment of the present disclosure (on a side thereof close the support), or a configuration in which a light collecting unit is provided on the cured film according to the embodiment of the present disclosure, the infrared transmitting filter according to the embodiment of the present disclosure, or the laminate according to the embodiment of the present disclosure may be adopted.

(Sensor)

A sensor (an optical sensor, preferably an infrared sensor) according to the embodiment of the present disclosure includes the cured film according to the embodiment of the present disclosure, the infrared transmitting filter according to the embodiment of the present disclosure, or the laminate according to the embodiment of the present disclosure. The configuration of the infrared sensor is not particularly limited as long as it functions as an infrared sensor. Hereinafter, an embodiment of the infrared sensor according to the present disclosure will be described using the drawings.

In FIG. 1, reference numeral 110 represents a solid-state imaging element. In an imaging region provided on a solid-state imaging element 110, infrared cut filters 111 and infrared transmitting filters 114 are provided. In addition, color filters 112 are laminated on the infrared cut filters 111. Microlenses 115 are disposed on an incidence ray hv side of the color filters 112 and the infrared transmitting filters 114. A planarizing layer 116 is formed so as to cover the microlenses 115.

The near infrared cut filters 111 are filters that allow transmission of light in a visible range (for example, light in a wavelength range of 400 to 700 nm) and block light in an infrared range. The color filters 112 are not particularly limited as long as pixels which allow transmission of light having a specific wavelength in a visible range and absorb the light are formed therein, and well-known color filters of the related art for forming a pixel can be used. For example, pixels of red (R), green (G), and blue (B) are formed in the color filters. For example, the details of the color filters can be found in paragraphs "0214" to "0263" of JP2014-043556A, the content of which is incorporated herein by reference. The infrared transmitting filters 114 have visible light blocking properties, allow transmission of infrared light having a specific wavelength, and are formed of the film or the laminate according to the embodiment of the present disclosure having the above-described spectral characteristics.

In the infrared sensor shown in FIG. 1, an infrared cut filter (other infrared cut filter) other than the infrared cut filter 111 may be further disposed on the planarizing layer 116. As the other infrared cut filter, for example, a layer containing copper and/or a dielectric multi-layer film may be provided. The details of the groups are as described above. In addition, as the other infrared cut filter, a dual band pass filter may be used.

In addition, in the embodiment shown in FIG. 1, the color filters 112 are provided on the incidence ray hv side compared to the infrared cut filter 111. The lamination order of the infrared cut filter 111 and the color filters 112 may be reversed, and the infrared cut filter 111 may be provided on the incidence ray hv side compared to the color filters 112.

In addition, in the embodiment shown in FIG. 1, the infrared cut filters 111 and the color filters 112 are laminated adjacent to each other. However, the infrared cut filters 111 and the color filters 112 are not necessarily provided adjacent to each other, and another layer may be provided therebetween.

In addition, in the embodiment shown in FIG. 1, another infrared transmitting filter having spectral characteristics different from those of the infrared transmitting filter 114 may be further provided.

Figure 2:
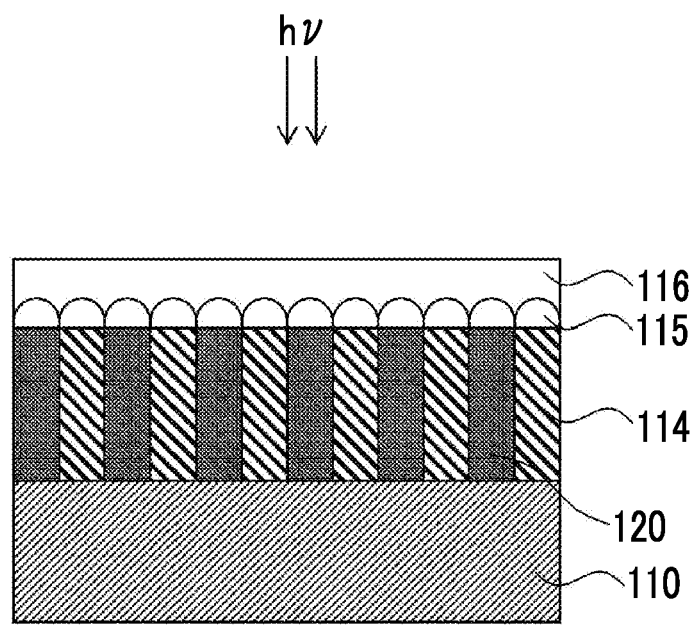
FIG. 2 is a schematic cross-sectional view showing a configuration of another embodiment of the infrared sensor according to the present disclosure.

An infrared sensor shown in FIG. 2 is another embodiment of the infrared sensor according to the embodiment of the present disclosure, and this infrared sensor includes: the infrared transmitting filters 114 and second infrared transmitting filters 120 different from the infrared transmitting filters 114 in an imaging region of the solid-state imaging element 110. Microlenses 115 are disposed on an incidence ray hv side of the infrared transmitting filters 114 and the second infrared transmitting filters 120. A planarizing layer 116 is formed so as to cover the microlenses 115.

In the infrared sensor shown in FIG. 2, two or more kinds of infrared transmitting filters having different spectral characteristics may be further provided as the second infrared transmitting filters 120.

(Image Display Device)

The film or the laminate according to the embodiment of the present disclosure can also be used in an image display device such as a liquid crystal display device or an organic electroluminescence (organic EL) display device. The definition of a display device and the details of each display device can be found in, for example, "Electronic Display Device (by Akio Sasaki, Kogyo Chosakai Publishing Co., Ltd., 1990)" or "Display Device (Sumiaki Ibuki, Sangyo Tosho Co., Ltd., 1989). In addition, the details of a liquid crystal display device can be found in, for example, "Next-Generation Liquid Crystal Display Techniques (Edited by Tatsuo Uchida, Kogyo Chosakai Publishing Co., Ltd., 1994) ". The type of the liquid crystal display device to which the embodiment of the present disclosure is applicable is not particularly limited. For example, the present invention is applicable to various liquid crystal display devices described in "Next-Generation Liquid Crystal Display Techniques".

The image display device may include a white organic EL element as a display element. It is preferable that the white organic EL element has a tandem structure. The tandem structure of the organic EL element is described in, for example, JP2003-045676A, or pp. 326 to 328 of "Forefront of Organic EL Technology Development—Know-How Collection of High Brightness, High Precision, and Long Life" (Edited by Akiyoshi MIKAMI, Technical Information Institute, 2008). It is preferable that a spectrum of white light emitted from the organic EL element has high maximum emission peaks in a blue range (430 nm to 485 nm), a green range (530 nm to 580 nm), and a yellow range (580 nm to 620 nm). It is more preferable that the spectrum has a maximum emission peak in a red range (650 nm to 700 nm) in addition to the above-described emission peaks.

EXAMPLES

Hereinafter, the present disclosure will be described in more detail using examples. However, the present invention is not limited to the following examples as long as it does not depart from the scope of the present invention. Unless specified otherwise, "part(s)" and "%" represent "part(s) by mass" and "mass %".

Examples 1 to 79 and Comparative Examples 1 to 6

<Preparation of Visible Light Absorbing Dispersion Liquid and Infrared Absorbing Dispersion Liquid>

In each of Examples or Comparative Examples, visible light absorbing dispersion liquids and/or infrared absorbing dispersion liquids having compositions shown in Tables 1 to 29 were prepared.

For example, in Example 1, five dispersion liquids in total including visible light absorbing dispersion liquids R1, Y1, and B1 and infrared absorbing dispersion liquids IR1 and IR2 were prepared.

Specifically, a mixed solution having a composition shown below was mixed and dispersed for 3 hours using a beads mill (a high-pressure disperser with a pressure reducing mechanism, NANO-3000-10 (manufactured by Nippon BEE Chemical Co., Ltd.)) in which zirconia beads having a diameter of 0.3 mm were used. As a result, each of the visible light absorbing dispersion liquids and/or the infrared absorbing dispersion liquids according to Examples or Comparative Examples was prepared.

In Tables 1 to 29, the kinds and contents of the visible light absorbing compounds used are shown in the column "Visible Light Absorbing Pigment", the kinds and contents of pigment derivatives used are shown in the column "Visible Light Absorbing Derivative", the kinds and contents of dispersants used are shown in the column "Dispersant", and the kinds and contents of solvents used are shown in the column "Solvent".

In Tables 1 to 29, the kinds and contents of the other infrared absorbers used are shown in the column "Infrared Pigment", and the kinds and contents of pigment derivatives used are shown in the column "Infrared Absorbing Derivative".

The content of each of the components in the visible light absorbing dispersion liquids and the infrared absorbing dispersion liquids shown in each of the tables is the content thereof in the curable composition in a case where the curable composition was finally prepared.

In addition, in Tables 1 to 29, the expression "-" represents that the corresponding compound was not used.

<Preparation of Curable Composition>

In each of Examples or Comparative Examples, components shown in Tables 1 to 29 were mixed with each other to obtain a composition (part(s) by mass) shown in each of the tables. As a result, a curable composition was prepared.

Specifically, the curable composition was prepared by mixing the prepared visible light absorbing dispersion liquid or infrared absorbing dispersion liquid, a visible light absorbing dye, an infrared dye (infrared absorber), a resin, a polymerizable monomer (curable compound), a polymerization initiator, an additive, a polymerization inhibitor, a surfactant, and a solvent.

TABLE 1

| | Name of Level | | Example 1 | | | Example 2 | | | Example 3 | | |
|---|---|---|---|---|---|---|---|---|---|---|---|
| Visible Light Absorbing Dispersion Liquid | Name of Dispersion Liquid | | R1 | Y1 | B1 | R2 | Y1 | B1 | R1 | Y2 | B1 |
| | Visible Light Absorbing Pigment | Kind | VP-1 | VP-3 | VP-5 | VP-2 | VP-3 | VP-5 | VP-1 | VP-4 | VP-5 |
| | | Part(s) by Weight | 2 | 2 | 2 | 2 | 2 | 2 | 2 | 2 | 2 |
| | Visible Light Absorbing Derivative | Kind | VS-1 | VS-2 | VS-3 | VS-1 | VS-2 | VS-3 | VS-1 | VS-2 | VS-3 |
| | | Part(s) by Weight | 0.2 | 0.2 | 0.2 | 0.2 | 0.2 | 0.2 | 0.2 | 0.2 | 0.2 |
| | Dispersant | Kind | D-1 | D-1 | D-1 | D-1 | D-1 | D-1 | D-1 | D-1 | D-1 |
| | | Part(s) by Weight | 0.6 | 0.6 | 0.6 | 0.6 | 0.6 | 0.6 | 0.6 | 0.6 | 0.6 |
| | Solvent | Kind | S-1 | S-1 | S-1 | S-1 | S-1 | S-1 | S-1 | S-1 | S-1 |
| | | Part(s) by Weight | 9.2 | 9.2 | 9.2 | 9.2 | 9.2 | 9.2 | 9.2 | 9.2 | 9.2 |
| Visible Light Absorbing Dye | | Kind | — | — | — | — | — | — | — | — | — |
| | | Part(s) by Weight | 0 | 0 | 0 | 0 | 0 | 0 | 0 | 0 | 0 |
| Infrared Absorbing Dispersion Liquid | Name of Dispersion Liquid | | IR1 | IR2 | — | IR1 | IR2 | — | IR1 | IR2 | — |
| | Infrared Pigment | Kind | IP-1 | IP-2 | — | IP-1 | IP-2 | — | IP-1 | IP-2 | — |
| | | Maximum Absorption Wavelength | — | — | — | — | — | — | — | — | — |
| | | Part(s) by Weight | 2 | 2 | 0 | 2 | 2 | 0 | 2 | 2 | 0 |
| | Infrared Derivative | Kind | IS-1 | IS-2 | — | IS-1 | IS-2 | — | IS-1 | IS-2 | — |
| | | Part(s) by Weight | 0.4 | 0.4 | 0 | 0.4 | 0.4 | 0 | 0.4 | 0.4 | 0 |
| | Dispersant | Kind | D-1 | D-1 | — | D-1 | D-1 | — | D-1 | D-1 | — |
| | | Part(s) by Weight | 1.6 | 1.6 | 0 | 1.6 | 1.6 | 0 | 1.6 | 1.6 | 0 |
| | Solvent | Kind | S-1 | S-1 | — | S-1 | S-1 | — | S-1 | S-1 | — |
| | | Part(s) by Weight | 8 | 8 | 0 | 8 | 8 | 0 | 8 | 8 | 0 |
| Infrared Dye | | Kind | ID-2 | — | — | ID-2 | — | — | ID-2 | — | — |
| | | Maximum Absorption Wavelength | 1007 | — | — | 1007 | — | — | 1007 | — | — |
| | | Part(s) by Weight | 1.5 | 0 | 0 | 1.5 | 0 | 0 | 1.5 | 0 | 0 |
| Resin | | Kind | B-2 | — | — | B-2 | — | — | B-2 | — | — |
| | | Part(s) by Weight | 0.32 | 0 | 0 | 0.32 | 0 | 0 | 0.32 | 0 | 0 |
| Polymerizable Monomer | | Kind | M-1 | M-2 | — | M-1 | M-2 | — | M-1 | M-2 | — |
| | | Part(s) by Weight | 0.48 | 0.48 | 0 | 0.48 | 0.48 | 0 | 0.48 | 0.48 | 0 |
| Polymerization Initiator | | Kind | I-1 | — | — | I-1 | — | — | I-1 | — | — |
| | | Part(s) by Weight | 0.8 | 0 | 0 | 0.8 | 0 | 0 | 0.8 | 0 | 0 |
| Additive | | Kind | — | — | — | — | — | — | — | — | — |
| | | Part(s) by Weight | 0 | 0 | 0 | 0 | 0 | 0 | 0 | 0 | 0 |
| Polymerization Inhibitor | | Kind | In-1 | — | — | In-1 | — | — | In-1 | — | — |
| | | Part(s) by Weight | 0.003 | 0 | 0 | 0.003 | 0 | 0 | 0.003 | 0 | 0 |
| Surfactant | | Kind | Su-1 | — | — | Su-1 | — | — | Su-1 | — | — |
| | | Part(s) by Weight | 0.025 | 0 | 0 | 0.025 | 0 | 0 | 0.025 | 0 | 0 |
| Solvent | | Kind | S-1 | — | — | S-1 | — | — | S-1 | — | — |
| | | Part(s) by Weight | 36.4 | 0 | 0 | 36.4 | 0 | 0 | 36.4 | 0 | 0 |
| Total | | | 100.0 | | | 100.0 | | | 100.0 | | |
| Dielectric | | | None | | | None | | | None | | |
| Desired Thickness | | | 2 | | | 2 | | | 2 | | |
| Half-Value Wavelength | | | 1100 | | | 1100 | | | 1100 | | |
| Absorbance Ratio | | | 43.2 | | | 43.2 | | | 43.2 | | |
| Blocking Degree | | | 24.8 | | | 17.1 | | | 25.4 | | |
| Effect | External Light | | 4 | | | 3 | | | 4 | | |
| | High Humidity Sensitivity | | A | | | A | | | A | | |
| | Angle Dependence | | 4 | | | 4 | | | 4 | | |
| | Reduction in Height | | A | | | A | | | A | | |
| | Light Fastness | | 4 | | | 4 | | | 4 | | |

TABLE 2

| Name of Level | | | Example 4 | | | Example 5 | | | Example 6 | | |
|---|---|---|---|---|---|---|---|---|---|---|---|
| Visible Light Absorbing Dispersion Liquid | Name of Dispersion Liquid | | R1 | Y1 | B2 | RY1 | | B1 | RY2 | | B1 |
| | Visible Light Absorbing Pigment | Kind | VP-1 | VP-3 | VP-6 | VP-1 | VP-3 | VP-5 | VP-1 | VP-3 | VP-5 |
| | | Part(s) by Weight | 2 | 2 | 2 | 2 | 2 | 2 | 2 | 2 | 2 |
| | Visible Light Absorbing Derivative | Kind | VS-1 | VS-2 | VS-3 | VS-1 | VS-2 | VS-3 | VS-1 | VS-2 | VS-3 |
| | | Part(s) by Weight | 0.2 | 0.2 | 0.2 | 0.2 | 0.2 | 0.2 | 0.2 | 0.2 | 0.2 |
| | Dispersant | Kind | D-1 | D-1 | D-1 | D-1 | | D-1 | D-1 | | D-1 |
| | | Part(s) by Weight | 0.6 | 0.6 | 0.6 | 1.2 | | 0.6 | 1.2 | | 0.6 |
| | Solvent | Kind | S-1 | S-1 | S-1 | S-1 | | S-1 | S-1 | S-2 | S-1 |
| | | Part(s) by Weight | 9.2 | 9.2 | 9.2 | 18.4 | | 9.2 | 8.6 | 9.8 | 9.2 |
| Visible Light Absorbing Dye | Kind | | — | — | — | — | — | — | — | — | — |
| | Part(s) by Weight | | 0 | 0 | 0 | 0 | 0 | 0 | 0 | 0 | 0 |
| Infrared Absorbing Dispersion Liquid | Name of Dispersion Liquid | | IR1 | IR2 | — | IR1 | IR2 | — | IR1 | IR2 | — |
| | Infrared Pigment | Kind | IP-1 | IP-2 | — | IP-1 | IP-2 | — | IP-1 | IP-2 | — |
| | | Maximum Absorption Wavelength | — | — | — | — | — | — | — | — | — |
| | | Part(s) by Weight | 2 | 2 | 0 | 2 | 2 | 0 | 2 | 2 | 0 |
| | Infrared Derivative | Kind | IS-1 | IS-2 | — | IS-1 | IS-2 | — | IS-1 | IS-2 | — |
| | | Part(s) by Weight | 0.4 | 0.4 | 0 | 0.4 | 0.4 | 0 | 0.4 | 0.4 | 0 |
| | Dispersant | Kind | D-1 | D-1 | — | D-1 | D-1 | — | D-1 | D-1 | — |
| | | Part(s) by Weight | 1.6 | 1.6 | 0 | 1.6 | 1.6 | 0 | 1.6 | 1.6 | 0 |
| | Solvent | Kind | S-1 | S-1 | — | S-1 | S-1 | — | S-1 | S-1 | — |
| | | Part(s) by Weight | 8 | 8 | 0 | 8 | 8 | 0 | 8 | 8 | 0 |
| Infrared Dye | Kind | | ID-2 | — | — | ID-2 | — | — | ID-2 | — | — |
| | Maximum Absorption Wavelength | | 1007 | — | — | 1007 | — | — | 1007 | — | — |
| | Part(s) by Weight | | 1.5 | 0 | 0 | 1.5 | 0 | 0 | 1.5 | 0 | 0 |
| Resin | Kind | | B-2 | — | — | B-2 | — | — | B-2 | — | — |
| | Part(s) by Weight | | 0.32 | 0 | 0 | 0.32 | 0 | 0 | 0.32 | 0 | 0 |
| Polymerizable Monomer | Kind | | M-1 | M-2 | — | M-1 | M-2 | — | M-1 | M-2 | — |
| | Part(s) by Weight | | 0.48 | 0.48 | 0 | 0.48 | 0.48 | 0 | 0.48 | 0.48 | 0 |
| Polymerization Initiator | Kind | | I-1 | — | — | I-1 | — | — | I-1 | — | — |
| | Part(s) by Weight | | 0.8 | 0 | 0 | 0.8 | 0 | 0 | 0.8 | 0 | 0 |
| Additive | Kind | | — | — | — | — | — | — | — | — | — |
| | Part(s) by Weight | | 0 | 0 | 0 | 0 | 0 | 0 | 0 | 0 | 0 |
| Polymerization Inhibitor | Kind | | In-1 | — | — | In-1 | — | — | In-1 | — | — |
| | Part(s) by Weight | | 0.003 | 0 | 0 | 0.003 | 0 | 0 | 0.003 | 0 | 0 |
| Surfactant | Kind | | Su-1 | — | — | Su-1 | — | — | Su-1 | — | — |
| | Part(s) by Weight | | 0.025 | 0 | 0 | 0.025 | 0 | 0 | 0.025 | 0 | 0 |
| Solvent | Kind | | S-1 | — | — | S-1 | — | — | S-1 | — | — |
| | Part(s) by Weight | | 36.4 | 0 | 0 | 36.4 | 0 | 0 | 36.4 | 0 | 0 |
| Total | | | 100.0 | | | 100.0 | | | 100.0 | | |
| Dielectric | | | None | | | None | | | None | | |
| Desired Thickness | | | 2 | | | 2 | | | 2 | | |
| Half-Value Wavelength | | | 1100 | | | 1100 | | | 1100 | | |
| Absorbance Ratio | | | 43.2 | | | 43.2 | | | 43.2 | | |
| Blocking Degree | | | 26.2 | | | 24.8 | | | 24.8 | | |
| Effect | External Light | | 4 | | | 4 | | | 4 | | |
| | High Humidity Sensitivity | | A | | | A | | | A | | |
| | Angle Dependence | | 4 | | | 4 | | | 4 | | |
| | Reduction in Height | | A | | | A | | | A | | |
| | Light Fastness | | 4 | | | 4 | | | 4 | | |

TABLE 3

| Name of Level | | | Example 7 | | | Example 8 | | | |
|---|---|---|---|---|---|---|---|---|---|
| Visible Light Absorbing Dispersion Liquid | Name of Dispersion Liquid | | RYB1 | | | R1 | Y1 | B1 | V1 |
| | Visible Light Absorbing Pigment | Kind | VP-1 | VP-3 | VP-5 | VP-1 | VP-3 | VP-5 | VP-7 |
| | | Part(s) by Weight | 2 | 2 | 2 | 1 | 2 | 2 | 1 |
| | Visible Light Absorbing Derivative | Kind | VS-1 | VS-2 | VS-3 | VS-1 | VS-2 | VS-3 | VS-3 |
| | | Part(s) by Weight | 0.2 | 0.2 | 0.2 | 0.1 | 0.2 | 0.2 | 0.1 |
| | Dispersant | Kind | D-1 | | | D-1 | D-1 | D-1 | D-1 |
| | | Part(s) by Weight | 1.8 | | | 0.3 | 0.6 | 0.6 | 0.3 |
| | Solvent | Kind | S-1 | | | S-1 | S-1 | S-1 | S-1 |
| | | Part(s) by Weight | 27.6 | | | 4.6 | 9.2 | 9.2 | 4.6 |
| Visible Light Absorbing Dye | Kind | | — | — | — | — | — | — | — |
| | Part(s) by Weight | | 0 | 0 | 0 | 0 | 0 | 0 | 0 |

TABLE 3-continued

| | Name of Level | | Example 7 | | | Example 8 | | | |
|---|---|---|---|---|---|---|---|---|---|
| Infrared Absorbing Dispersion Liquid | Name of Dispersion Liquid | | IR1 | IR2 | — | IR1 | IR2 | — | — |
| | Infrared Pigment | Kind | IP-1 | IP-2 | — | IP-1 | IP-2 | — | — |
| | | Maximum Absorption Wavelength | — | — | — | — | — | — | — |
| | | Part(s) by Weight | 2 | 2 | 0 | 2 | 2 | 0 | 0 |
| | Infrared Derivative | Kind | IS-1 | IS-2 | — | IS-1 | IS-2 | — | — |
| | | Part(s) by Weight | 0.4 | 0.4 | 0 | 0.4 | 0.4 | 0 | 0 |
| | Dispersant | Kind | D-1 | D-1 | — | D-1 | D-1 | — | — |
| | | Part(s) by Weight | 1.6 | 1.6 | 0 | 1.6 | 1.6 | 0 | 0 |
| | Solvent | Kind | S-1 | S-1 | — | S-1 | S-1 | — | — |
| | | Part(s) by Weight | 8 | 8 | 0 | 8 | 8 | 0 | 0 |
| Infrared Dye | Kind | | ID-2 | — | — | ID-2 | — | — | — |
| | Maximum Absorption Wavelength | | 1007 | — | — | 1007 | — | — | — |
| | Part(s) by Weight | | 1.5 | 0 | 0 | 1.5 | 0 | 0 | 0 |
| Resin | Kind | | B-2 | — | — | B-2 | — | — | — |
| | Part(s) by Weight | | 0.32 | 0 | 0 | 0.32 | 0 | 0 | 0 |
| Polymerizable Monomer | Kind | | M-1 | M-2 | — | M-1 | M-2 | — | — |
| | Part(s) by Weight | | 0.48 | 0.48 | 0 | 0.48 | 0.48 | 0 | 0 |
| Polymerization Initiator | Kind | | I-1 | — | — | I-1 | — | — | — |
| | Part(s) by Weight | | 0.8 | 0 | 0 | 0.8 | 0 | 0 | 0 |
| Additive | Kind | | — | — | — | — | — | — | — |
| | Part(s) by Weight | | 0 | 0 | 0 | 0 | 0 | 0 | 0 |
| Polymerization Inhibitor | Kind | | In-1 | — | — | In-1 | — | — | — |
| | Part(s) by Weight | | 0.003 | 0 | 0 | 0.003 | 0 | 0 | 0 |
| Surfactant | Kind | | Su-1 | — | — | Su-1 | — | — | — |
| | Part(s) by Weight | | 0.025 | 0 | 0 | 0.025 | 0 | 0 | 0 |
| Solvent | Kind | | S-1 | — | — | S-1 | — | — | — |
| | Part(s) by Weight | | 36.4 | 0 | 0 | 36.4 | 0 | 0 | 0 |
| Total | | | | 100.0 | | | 100.0 | | |
| Dielectric | | | | None | | | None | | |
| Desired Thickness | | | | 2 | | | 2 | | |
| Half-Value Wavelength | | | | 1100 | | | 1100 | | |
| Absorbance Ratio | | | | 43.2 | | | 43.2 | | |
| Blocking Degree | | | | 24.8 | | | 25.8 | | |
| Effect | External Light | | | 4 | | | 4 | | |
| | High Humidity Sensitivity | | | A | | | A | | |
| | Angle Dependence | | | 4 | | | 4 | | |
| | Reduction in Height | | | A | | | A | | |
| | Light Fastness | | | 4 | | | 4 | | |

TABLE 4

| | Name of Level | | Example 9 | | | | Example 10 | | Example 11 | |
|---|---|---|---|---|---|---|---|---|---|---|
| Visible Light Absorbing Dispersion Liquid | Name of Dispersion Liquid | | RYBV1 | | | | Bk-1 | — | Bk-2 | V1 |
| | Visible Light Absorbing Pigment | Kind | VP-1 | VP-3 | VP-5 | VP-7 | VP-8 | — | VP-9 | VP-3 |
| | | Part(s) by Weight | 1 | 2 | 2 | 1 | 6 | 0 | 5 | 1 |
| | Visible Light Absorbing Derivative | Kind | VS-1 | VS-2 | VS-3 | VS-3 | VS-2 | — | VS-2 | VS-2 |
| | | Part(s) by Weight | 0.1 | 0.2 | 0.2 | 0.1 | 0.6 | 0 | 0.5 | 0.1 |
| | Dispersant | Kind | | D-1 | | | D-1 | — | D-1 | D-1 |
| | | Part(s) by Weight | | 1.8 | | | 1.8 | 0 | 1.5 | 0.3 |
| | Solvent | Kind | | S-1 | | | S-1 | — | S-1 | S-1 |
| | | Part(s) by Weight | | 27.6 | | | 27.6 | 0 | 23 | 4.6 |
| Visible Light Absorbing Dye | Kind | | — | — | — | — | — | — | — | — |
| | Part(s) by Weight | | 0 | 0 | 0 | 0 | 0 | 0 | 0 | 0 |
| Infrared Absorbing Dispersion Liquid | Name of Dispersion Liquid | | IR1 | IR2 | — | — | IR1 | IR2 | IR1 | IR2 |
| | Infrared Pigment | Kind | IP-1 | IP-2 | — | — | IP-1 | IP-2 | IP-1 | IP-2 |
| | | Maximum Absorption Wavelength | — | — | — | — | — | — | — | — |
| | | Part(s) by Weight | 2 | 2 | 0 | 0 | 2 | 2 | 2 | 2 |
| | Infrared Derivative | Kind | IS-1 | IS-2 | — | — | IS-1 | IS-2 | IS-1 | IS-2 |
| | | Part(s) by Weight | 0.4 | 0.4 | 0 | 0 | 0.4 | 0.4 | 0.4 | 0.4 |
| | Dispersant | Kind | D-1 | D-1 | — | — | D-1 | D-1 | D-1 | D-1 |
| | | Part(s) by Weight | 1.6 | 1.6 | 0 | 0 | 1.6 | 1.6 | 1.6 | 1.6 |
| | Solvent | Kind | S-1 | S-1 | — | — | S-1 | S-1 | S-1 | S-1 |
| | | Part(s) by Weight | 8 | 8 | 0 | 0 | 8 | 8 | 8 | 8 |

TABLE 4-continued

| Name of Level | | | Example 9 | | | | Example 10 | | Example 11 | |
|---|---|---|---|---|---|---|---|---|---|---|
| Infrared Dye | | Kind | ID-2 | — | — | — | ID-2 | — | ID-2 | — |
| | | Maximum Absorption Wavelength | 1007 | — | — | — | 1007 | — | 1007 | — |
| | | Part(s) by Weight | 1.5 | 0 | 0 | 0 | 1.5 | 0 | 1.5 | 0 |
| Resin | | Kind | B-2 | — | — | — | B-2 | — | B-2 | — |
| | | Part(s) by Weight | 0.32 | 0 | 0 | 0 | 0.32 | 0 | 0.32 | 0 |
| Polymerizable Monomer | | Kind | M-1 | M-2 | — | — | M-1 | M-2 | M-1 | M-2 |
| | | Part(s) by Weight | 0.48 | 0.48 | 0 | 0 | 0.48 | 0.48 | 0.48 | 0.48 |
| Polymerization Initiator | | Kind | I-1 | — | — | — | I-1 | — | I-1 | — |
| | | Part(s) by Weight | 0.8 | 0 | 0 | 0 | 0.8 | 0 | 0.8 | 0 |
| Additive | | Kind | — | — | — | — | — | — | — | — |
| | | Part(s) by Weight | 0 | 0 | 0 | 0 | 0 | 0 | 0 | 0 |
| Polymerization Inhibitor | | Kind | In-1 | — | — | — | In-1 | — | In-1 | — |
| | | Part(s) by Weight | 0.003 | 0 | 0 | 0 | 0.003 | 0 | 0.003 | 0 |
| Surfactant | | Kind | Su-1 | — | — | — | Su-1 | — | Su-1 | — |
| | | Part(s) by Weight | 0.025 | 0 | 0 | 0 | 0.025 | 0 | 0.025 | 0 |
| Solvent | | Kind | S-1 | — | — | — | S-1 | — | S-1 | — |
| | | Part(s) by Weight | 36.4 | 0 | 0 | 0 | 36.4 | 0 | 36.4 | 0 |
| Total | | | | | | 100.0 | | 100.0 | | 100.0 | |
| Dielectric | | | | | | None | | None | | None | |
| Desired Thickness | | | | | | 2 | | 2 | | 2 | |
| Half-Value Wavelength | | | | | | 1100 | | 1100 | | 1100 | |
| Absorbance Ratio | | | | | | 43.2 | | 43.2 | | 43.2 | |
| Blocking Degree | | | | | | 25.8 | | 21.6 | | 40 | |
| Effect | External Light | | | | | 4 | | 4 | | 5 | |
| | High Humidity Sensitivity | | | | | A | | A | | A | |
| | Angle Dependence | | | | | 4 | | 4 | | 4 | |
| | Reduction in Height | | | | | A | | A | | A | |
| | Light Fastness | | | | | 4 | | 4 | | 4 | |

TABLE 5

| Name of Level | | | Example 12 | | | Example 13 | | | Example 14 | |
|---|---|---|---|---|---|---|---|---|---|---|
| Visible Light Absorbing Dispersion Liquid | Name of Dispersion Liquid | | RYB1 | | | RYB1 | | | — | — |
| | Visible Light Absorbing Pigment | Kind | VP-1 | VP-3 | VP-5 | VP-1 | VP-3 | VP-5 | — | — |
| | | Part(s) by Weight | 2 | 2 | 2 | 2 | 2 | 2 | 0 | 0 |
| | Visible Light Absorbing Derivative | Kind | VS-1 | — | — | — | — | — | — | — |
| | | Part(s) by Weight | 0.6 | 0 | 0 | 0 | 0 | 0 | 0 | 0 |
| | Dispersant | Kind | D-1 | | | D-1 | | | — | — |
| | | Part(s) by Weight | 1.8 | | | 1.8 | | | 0 | 0 |
| | Solvent | Kind | S-1 | | | S-1 | | | — | — |
| | | Part(s) by Weight | 27.6 | | | 28.2 | | | 0 | 0 |
| Visible Light Absorbing Dye | | Kind | — | — | — | — | — | — | VD-1 | — |
| | | Part(s) by Weight | 0 | 0 | 0 | 0 | 0 | 0 | 6 | 0 |
| Infrared Absorbing Dispersion Liquid | Name of Dispersion Liquid | | IR1 | IR2 | — | IR1 | IR2 | — | IR1 | IR2 |
| | Infrared Pigment | Kind | IP-1 | IP-2 | — | IP-1 | IP-2 | — | IP-1 | IP-2 |
| | | Maximum Absorption Wavelength | — | — | — | — | — | — | — | — |
| | | Part(s) by Weight | 2 | 2 | 0 | 2 | 2 | 0 | 2 | 2 |
| | Infrared Derivative | Kind | IS-1 | IS-2 | — | IS-1 | IS-2 | — | IS-1 | IS-2 |
| | | Part(s) by Weight | 0.4 | 0.4 | 0 | 0.4 | 0.4 | 0 | 0.4 | 0.4 |
| | Dispersant | Kind | D-1 | D-1 | — | D-1 | D-1 | — | D-1 | D-1 |
| | | Part(s) by Weight | 1.6 | 1.6 | 0 | 1.6 | 1.6 | 0 | 1.6 | 1.6 |
| | Solvent | Kind | S-1 | S-1 | — | S-1 | S-1 | — | S-1 | S-1 |
| | | Part(s) by Weight | 8 | 8 | 0 | 8 | 8 | 0 | 8 | 8 |
| Infrared Dye | | Kind | ID-2 | — | — | ID-2 | — | — | ID-2 | — |
| | | Maximum Absorption Wavelength | 1007 | — | — | 1007 | — | — | 1007 | — |
| | | Part(s) by Weight | 1.5 | 0 | 0 | 1.5 | 0 | 0 | 1.5 | 0 |
| Resin | | Kind | B-2 | — | — | B-2 | — | — | B-2 | — |
| | | Part(s) by Weight | 0.32 | 0 | 0 | 0.47 | 0 | 0 | 0.92 | 0 |
| Polymerizable Monomer | | Kind | M-1 | M-2 | — | M-1 | M-2 | — | M-1 | M-2 |
| | | Part(s) by Weight | 0.48 | 0.48 | 0 | 0.70 | 0.70 | 0 | 1.38 | 1.38 |
| Polymerization Initiator | | Kind | I-1 | — | — | I-1 | — | — | I-1 | — |
| | | Part(s) by Weight | 0.8 | 0 | 0 | 0.8 | 0 | 0 | 0.8 | 0 |
| Additive | | Kind | — | — | — | — | — | — | — | — |
| | | Part(s) by Weight | 0 | 0 | 0 | 0 | 0 | 0 | 0 | 0 |

TABLE 5-continued

| Name of Level | | Example 12 | | | Example 13 | | | Example 14 | |
| --- | --- | --- | --- | --- | --- | --- | --- | --- | --- |
| Polymerization Inhibitor | Kind | In-1 | — | — | In-1 | — | — | In-1 | — |
| | Part(s) by Weight | 0.003 | 0 | 0 | 0.003 | 0 | 0 | 0.003 | 0 |
| Surfactant | Kind | Su-1 | — | — | Su-1 | — | — | Su-1 | — |
| | Part(s) by Weight | 0.025 | 0 | 0 | 0.025 | 0 | 0 | 0.025 | 0 |
| Solvent | Kind | S-1 | — | — | S-1 | — | — | S-1 | — |
| | Part(s) by Weight | 36.4 | 0 | 0 | 35.8 | 0 | 0 | 64 | 0 |
| Total | | 100.0 | | | 100.0 | | | 100.0 | |
| Dielectric | | None | | | None | | | None | |
| Desired Thickness | | 2 | | | 2 | | | 2 | |
| Half-Value Wavelength | | 1100 | | | 1100 | | | 1100 | |
| Absorbance Ratio | | 43.2 | | | 43.2 | | | 43.2 | |
| Blocking Degree | | 24.8 | | | 24.8 | | | 21.9 | |
| Effect | External Light | 4 | | | 4 | | | 4 | |
| | High Humidity Sensitivity | A | | | A | | | A | |
| | Angle Dependence | 4 | | | 4 | | | 4 | |
| | Reduction in Height | A | | | A | | | A | |
| | Light Fastness | 4 | | | 4 | | | 4 | |

TABLE 6

| Name of Level | | | Example 15 | | Example 16 | | | Example 17 | | |
| --- | --- | --- | --- | --- | --- | --- | --- | --- | --- | --- |
| Visible Light Absorbing Dispersion Liquid | Name of Dispersion Liquid | | Y1 | — | R1 | Y1 | B1 | R1 | Y1 | B1 |
| | Visible Light Absorbing Pigment | Kind | VP-3 | — | VP-1 | VP-3 | VP-5 | VP-1 | VP-3 | VP-5 |
| | | Part(s) by Weight | 2 | 0 | 2 | 2 | 2 | 2 | 2 | 2 |
| | Visible Light Absorbing Derivative | Kind | VS-2 | — | VS-1 | VS-2 | VS-3 | VS-1 | VS-2 | VS-3 |
| | | Part(s) by Weight | 0.2 | 0 | 0.2 | 0.2 | 0.2 | 0.2 | 0.2 | 0.2 |
| | Dispersant | Kind | D-1 | — | D-1 | D-1 | D-1 | D-1 | D-1 | D-1 |
| | | Part(s) by Weight | 0.6 | 0 | 0.6 | 0.6 | 0.6 | 0.6 | 0.6 | 0.6 |
| | Solvent | Kind | S-1 | — | S-1 | S-1 | S-1 | S-1 | S-1 | S-1 |
| | | Part(s) by Weight | 9.2 | 0 | 9.2 | 9.2 | 9.2 | 9.2 | 9.2 | 9.2 |
| Visible Light Absorbing Dye | Kind | | VD-1 | — | — | — | — | — | — | — |
| | Part(s) by Weight | | 5 | 0 | 0 | 0 | 0 | 0 | 0 | 0 |
| Infrared Absorbing Dispersion Liquid | Name of Dispersion Liquid | | IR1 | IR2 | IR3 | IR2 | — | IR4 | IR2 | — |
| | Infrared Pigment | Kind | IP-1 | IP-2 | IP-3 | IP-2 | — | IP-4 | IP-2 | — |
| | | Maximum Absorption Wavelength | — | — | — | — | — | — | — | — |
| | | Part(s) by Weight | 2 | 2 | 2 | 2 | 0 | 2 | 2 | 0 |
| | Infrared Derivative | Kind | IS-1 | IS-2 | IS-5 | IS-2 | — | IS-6 | IS-2 | — |
| | | Part(s) by Weight | 0.4 | 0.4 | 0.4 | 0.4 | 0 | 0.4 | 0.4 | 0 |
| | Dispersant | Kind | D-1 | D-1 | D-1 | D-1 | — | D-1 | D-1 | — |
| | | Part(s) by Weight | 1.6 | 1.6 | 1.6 | 1.6 | 0 | 1.6 | 1.6 | 0 |
| | Solvent | Kind | S-1 | S-1 | S-1 | S-1 | — | S-1 | S-1 | — |
| | | Part(s) by Weight | 8 | 8 | 8 | 8 | 0 | 8 | 8 | 0 |
| Infrared Dye | Kind | | ID-2 | — | ID-2 | — | — | ID-2 | — | — |
| | Maximum Absorption Wavelength | | 1007 | — | 1007 | — | — | 1007 | — | — |
| | Part(s) by Weight | | 1.5 | 0 | 1.5 | 0 | 0 | 1.5 | 0 | 0 |
| Resin | Kind | | B-2 | — | B-2 | — | — | B-2 | — | — |
| | Part(s) by Weight | | 0.47 | 0 | 0.32 | 0 | 0 | 0.32 | 0 | 0 |
| Polymerizable Monomer | Kind | | M-1 | M-2 | M-1 | M-2 | — | M-1 | M-2 | — |
| | Part(s) by Weight | | 0.70 | 0.70 | 0.48 | 0.48 | 0 | 0.48 | 0.48 | 0 |
| Polymerization Initiator | Kind | | I-1 | — | I-1 | — | — | I-1 | — | — |
| | Part(s) by Weight | | 0.8 | 0 | 0.8 | 0 | 0 | 0.8 | 0 | 0 |
| Additive | Kind | | — | — | — | — | — | — | — | — |
| | Part(s) by Weight | | 0 | 0 | 0 | 0 | 0 | 0 | 0 | 0 |
| Polymerization Inhibitor | Kind | | In-1 | — | In-1 | — | — | In-1 | — | — |
| | Part(s) by Weight | | 0.003 | 0 | 0.003 | 0 | 0 | 0.003 | 0 | 0 |
| Surfactant | Kind | | Su-1 | — | Su-1 | — | — | Su-1 | — | — |
| | Part(s) by Weight | | 0.025 | 0 | 0.025 | 0 | 0 | 0.025 | 0 | 0 |
| Solvent | Kind | | S-1 | — | S-1 | — | — | S-1 | — | — |
| | Part(s) by Weight | | 54.8 | 0 | 36.4 | 0 | 0 | 36.4 | 0 | 0 |
| Total | | | 100.0 | | 100.0 | | | 100.0 | | |
| Dielectric | | | None | | None | | | None | | |
| Desired Thickness | | | 2 | | 2 | | | 2 | | |
| Half-Value Wavelength | | | 1100 | | 1100 | | | 1100 | | |
| Absorbance Ratio | | | 43.2 | | 40.1 | | | 35.8 | | |
| Blocking Degree | | | 22.8 | | 25.0 | | | 21.5 | | |
| Effect | External Light | | 4 | | 4 | | | 4 | | |

TABLE 6-continued

| Name of Level | Example 15 | Example 16 | Example 17 |
|---|---|---|---|
| High Humidity Sensitivity | A | A | A |
| Angle Dependence | 4 | 4 | 4 |
| Reduction in Height | A | A | A |
| Light Fastness | 4 | 4 | 4 |

TABLE 7

| | Name of Level | | Example 18 | | | Example 19 | | | Example 20 | | |
|---|---|---|---|---|---|---|---|---|---|---|---|
| | | | R1 | Y1 | B1 | R1 | Y1 | B1 | R1 | Y1 | B1 |
| Visible Light Absorbing Dispersion Liquid | Name of Dispersion Liquid | | VP-1 | VP-3 | VP-5 | VP-1 | VP-3 | VP-5 | VP-1 | VP-3 | VP-5 |
| | Visible Light Absorbing Pigment | Kind | | | | | | | | | |
| | | Part(s) by Weight | 2 | 2 | 2 | 2 | 2 | 2 | 2 | 2 | 2 |
| | Visible Light Absorbing Derivative | Kind | VS-1 | VS-2 | VS-3 | VS-1 | VS-2 | VS-3 | VS-1 | VS-2 | VS-3 |
| | | Part(s) by Weight | 0.2 | 0.2 | 0.2 | 0.2 | 0.2 | 0.2 | 0.2 | 0.2 | 0.2 |
| | Dispersant | Kind | D-1 | D-1 | D-1 | D-1 | D-1 | D-1 | D-1 | D-1 | D-1 |
| | | Part(s) by Weight | 0.6 | 0.6 | 0.6 | 0.6 | 0.6 | 0.6 | 0.6 | 0.6 | 0.6 |
| | Solvent | Kind | S-1 | S-1 | S-1 | S-1 | S-1 | S-1 | S-1 | S-1 | S-1 |
| | | Part(s) by Weight | 9.2 | 9.2 | 9.2 | 9.2 | 9.2 | 9.2 | 9.2 | 9.2 | 9.2 |
| Visible Light Absorbing Dye | | Kind | — | — | — | — | — | — | — | — | — |
| | | Part(s) by Weight | 0 | 0 | 0 | 0 | 0 | 0 | 0 | 0 | 0 |
| Infrared Absorbing Dispersion Liquid | Name of Dispersion Liquid | | IR5 | IR2 | — | IR1 | IR2 | — | IR2 | — | — |
| | Infrared Pigment | Kind | IP-5 | IP-2 | — | IP-1 | IP-2 | — | IP-2 | — | — |
| | | Maximum Absorption Wavelength | — | — | — | — | — | — | — | — | — |
| | | Part(s) by Weight | 2 | 2 | 0 | 2 | 2 | 0 | 2 | 0 | 0 |
| | Infrared Derivative | Kind | IS-7 | IS-2 | — | IS-3 | IS-2 | — | IS-2 | — | — |
| | | Part(s) by Weight | 0.4 | 0.4 | 0 | 0 | 0.4 | 0 | 0.4 | 0 | 0 |
| | Dispersant | Kind | D-1 | D-1 | — | D-1 | D-1 | — | D-1 | — | — |
| | | Part(s) by Weight | 1.6 | 1.6 | 0 | 1.6 | 1.6 | 0 | 1.6 | 0 | 0 |
| | Solvent | Kind | S-1 | S-1 | — | S-1 | S-1 | — | S-1 | — | — |
| | | Part(s) by Weight | 8 | 8 | 0 | 8.4 | 8 | 0 | 8 | 0 | 0 |
| Infrared Dye | | Kind | ID-2 | — | — | ID-2 | — | — | ID-2 | ID-7 | — |
| | | Maximum Absorption Wavelength | 1007 | — | — | 1007 | — | — | 1007 | — | — |
| | | Part(s) by Weight | 1.5 | 0 | 0 | 1.5 | 0 | 0 | 1.5 | 2 | 0 |
| Resin | | Kind | B-2 | — | — | B-2 | — | — | B-2 | — | — |
| | | Part(s) by Weight | 0.32 | 0 | 0 | 0.42 | 0 | 0 | 0.82 | 0 | 0 |
| Polymerizable Monomer | | Kind | M-1 | M-2 | — | M-1 | M-2 | — | M-1 | M-2 | — |
| | | Part(s) by Weight | 0.48 | 0.48 | 0 | 0.63 | 0.63 | 0 | 1.23 | 1.23 | 0 |
| Polymerization Initiator | | Kind | I-1 | — | — | I-1 | — | — | I-1 | — | — |
| | | Part(s) by Weight | 0.8 | 0 | 0 | 0.8 | 0 | 0 | 0.8 | 0 | 0 |
| Additive | | Kind | — | — | — | — | — | — | — | — | — |
| | | Part(s) by Weight | 0 | 0 | 0 | 0 | 0 | 0 | 0 | 0 | 0 |
| Polymerization Inhibitor | | Kind | In-1 | — | — | In-1 | — | — | In-1 | — | — |
| | | Part(s) by Weight | 0.003 | 0 | 0 | 0.003 | 0 | 0 | 0.003 | 0 | 0 |
| Surfactant | | Kind | Su-1 | — | — | Su-1 | — | — | Su-1 | — | — |
| | | Part(s) by Weight | 0.025 | 0 | 0 | 0.025 | 0 | 0 | 0.025 | 0 | 0 |
| Solvent | | Kind | S-1 | — | — | S-1 | — | — | S-1 | — | — |
| | | Part(s) by Weight | 36.4 | 0 | 0 | 36.0 | 0 | 0 | 44.4 | 0 | 0 |
| Total | | | | 100.0 | | | 100.0 | | | 100.0 | |
| Dielectric | | | | None | | | None | | | None | |
| Desired Thickness | | | | 2 | | | 2 | | | 2 | |
| Half-Value Wavelength | | | | 1100 | | | 1100 | | | 1100 | |
| Absorbance Ratio | | | | 28.4 | | | 43.2 | | | 45.4 | |
| Blocking Degree | | | | 23.0 | | | 24.8 | | | 20.4 | |
| Effect | External Light | | | 4 | | | 4 | | | 4 | |
| | High Humidity Sensitivity | | | A | | | A | | | A | |
| | Angle Dependence | | | 4 | | | 4 | | | 4 | |
| | Reduction in Height | | | A | | | A | | | A | |
| | Light Fastness | | | 4 | | | 4 | | | 4 | |

TABLE 8

| Name of Level | | | Example 21 | | | Example 22 | | | Example 23 | | |
|---|---|---|---|---|---|---|---|---|---|---|---|
| | | | R1 | Y1 | B1 | R1 | Y1 | B1 | R1 | Y1 | B1 |
| Visible Light Absorbing Dispersion Liquid | Name of Dispersion Liquid | | VP-1 | VP-3 | VP-5 | VP-1 | VP-3 | VP-5 | VP-1 | VP-3 | VP-5 |
| | Visible Light Absorbing Pigment | Kind | 2 | 2 | 2 | 2 | 2 | 2 | 2 | 2 | 2 |
| | | Part(s) by Weight | | | | | | | | | |
| | Visible Light Absorbing Derivative | Kind | VS-1 | VS-2 | VS-3 | VS-1 | VS-2 | VS-3 | VS-1 | VS-2 | VS-3 |
| | | Part(s) by Weight | 0.2 | 0.2 | 0.2 | 0.2 | 0.2 | 0.2 | 0.2 | 0.2 | 0.2 |
| | Dispersant | Kind | D-1 | D-1 | D-1 | D-1 | D-1 | D-1 | D-1 | D-1 | D-1 |
| | | Part(s) by Weight | 0.6 | 0.6 | 0.6 | 0.6 | 0.6 | 0.6 | 0.6 | 0.6 | 0.6 |
| | Solvent | Kind | S-1 | S-1 | S-1 | S-1 | S-1 | S-1 | S-1 | S-1 | S-1 |
| | | Part(s) by Weight | 9.2 | 9.2 | 9.2 | 9.2 | 9.2 | 9.2 | 9.2 | 9.2 | 9.2 |
| Visible Light Absorbing Dye | | Kind | — | — | — | — | — | — | — | — | — |
| | | Part(s) by Weight | 0 | 0 | 0 | 0 | 0 | 0 | 0 | 0 | 0 |
| Infrared Absorbing Dispersion Liquid | Name of Dispersion Liquid | | IR1 | IR2 | — | IR1 | IR2 | — | IR1 | IR2 | — |
| | Infrared Pigment | Kind | IP-1 | IP-2 | — | IP-1 | IP-2 | — | IP-1 | IP-2 | — |
| | | Maximum Absorption Wavelength | — | — | — | — | — | — | — | — | — |
| | | Part(s) by Weight | 2 | 2 | 0 | 2 | 2 | 0 | 2 | 2 | 0 |
| | Infrared Derivative | Kind | IS-1 | IS-2 | — | IS-1 | IS-2 | — | IS-1 | IS-2 | — |
| | | Part(s) by Weight | 0.4 | 0.4 | 0 | 0.4 | 0.4 | 0 | 0.4 | 0.4 | 0 |
| | Dispersant | Kind | D-1 | D-1 | — | D-1 | D-1 | — | D-1 | D-1 | — |
| | | Part(s) by Weight | 1.6 | 1.6 | 0 | 1.6 | 1.6 | 0 | 1.6 | 1.6 | 0 |
| | Solvent | Kind | S-1 | S-1 | — | S-1 | S-1 | — | S-1 | S-1 | — |
| | | Part(s) by Weight | 8 | 8 | 0 | 8 | 8 | 0 | 8 | 8 | 0 |
| Infrared Dye | | Kind | ID-3 | — | — | ID-4 | — | — | ID-5 | — | — |
| | | Maximum Absorption Wavelength | 1104 | — | — | 1156 | — | — | 1176 | — | — |
| | | Part(s) by Weight | 1.5 | 0 | 0 | 1.5 | 0 | 0 | 1.5 | 0 | 0 |
| Resin | | Kind | B-2 | — | — | B-2 | — | — | B-2 | — | — |
| | | Part(s) by Weight | 0.32 | 0 | 0 | 0.32 | 0 | 0 | 0.32 | 0 | 0 |
| Polymerizable Monomer | | Kind | M-1 | M-2 | — | M-1 | M-2 | — | M-1 | M-2 | — |
| | | Part(s) by Weight | 0.48 | 0.48 | 0 | 0.48 | 0.48 | 0 | 0.48 | 0.48 | 0 |
| Polymerization Initiator | | Kind | I-1 | — | — | I-1 | — | — | I-1 | — | — |
| | | Part(s) by Weight | 0.8 | 0 | 0 | 0.8 | 0 | 0 | 0.8 | 0 | 0 |
| Additive | | Kind | — | — | — | — | — | — | — | — | — |
| | | Part(s) by Weight | 0 | 0 | 0 | 0 | 0 | 0 | 0 | 0 | 0 |
| Polymerization Inhibitor | | Kind | In-1 | — | — | In-1 | — | — | In-1 | — | — |
| | | Part(s) by Weight | 0.003 | 0 | 0 | 0.003 | 0 | 0 | 0.003 | 0 | 0 |
| Surfactant | | Kind | Su-1 | — | — | Su-1 | — | — | Su-1 | — | — |
| | | Part(s) by Weight | 0.025 | 0 | 0 | 0.025 | 0 | 0 | 0.025 | 0 | 0 |
| Solvent | | Kind | S-1 | — | — | S-1 | — | — | S-1 | — | — |
| | | Part(s) by Weight | 36.4 | 0 | 0 | 36.4 | 0 | 0 | 36.4 | 0 | 0 |
| Total | | | | 100.0 | | | 100.0 | | | 100.0 | |
| Dielectric | | | | None | | | None | | | None | |
| Desired Thickness | | | | 2 | | | 2 | | | 2 | |
| Half-Value Wavelength | | | | 1200 | | | 1240 | | | 1270 | |
| Absorbance Ratio | | | | 23.1 | | | 30.2 | | | 22.0 | |
| Blocking Degree | | | | 24.8 | | | 24.8 | | | 24.8 | |
| Effect | External Light | | | 4 | | | 4 | | | 4 | |
| | High Humidity Sensitivity | | | A | | | A | | | A | |
| | Angle Dependence | | | 4 | | | 4 | | | 4 | |
| | Reduction in Height | | | A | | | A | | | A | |
| | Light Fastness | | | 4 | | | 4 | | | 4 | |

TABLE 9

| Name of Level | | | Example 24 | | | Example 25 | | | Example 26 | | |
|---|---|---|---|---|---|---|---|---|---|---|---|
| | | | R1 | Y1 | B1 | R1 | Y1 | B1 | R1 | Y1 | B1 |
| Visible Light Absorbing Dispersion Liquid | Name of Dispersion Liquid | | VP-1 | VP-3 | VP-5 | VP-1 | VP-3 | VP-5 | VP-1 | VP-3 | VP-5 |
| | Visible Light Absorbing Pigment | Kind | 2 | 2 | 2 | 2 | 2 | 2 | 2 | 2 | 2 |
| | | Part(s) by Weight | | | | | | | | | |
| | Visible Light Absorbing Derivative | Kind | VS-1 | VS-2 | VS-3 | VS-1 | VS-2 | VS-3 | VS-1 | VS-2 | VS-3 |
| | | Part(s) by Weight | 0.2 | 0.2 | 0.2 | 0.2 | 0.2 | 0.2 | 0.2 | 0.2 | 0.2 |
| | Dispersant | Kind | D-1 | D-1 | D-1 | D-1 | D-1 | D-1 | D-1 | D-1 | D-1 |
| | | Part(s) by Weight | 0.6 | 0.6 | 0.6 | 0.6 | 0.6 | 0.6 | 0.6 | 0.6 | 0.6 |
| | Solvent | Kind | S-1 | S-1 | S-1 | S-1 | S-1 | S-1 | S-1 | S-1 | S-1 |
| | | Part(s) by Weight | 9.2 | 9.2 | 9.2 | 9.2 | 9.2 | 9.2 | 9.2 | 9.2 | 9.2 |
| Visible Light Absorbing Dye | | Kind | — | — | — | — | — | — | — | — | — |
| | | Part(s) by Weight | 0 | 0 | 0 | 0 | 0 | 0 | 0 | 0 | 0 |

TABLE 9-continued

| Name of Level | | | Example 24 | | | Example 25 | | | Example 26 | | |
|---|---|---|---|---|---|---|---|---|---|---|---|
| Infrared Absorbing Dispersion Liquid | Name of Dispersion Liquid | | IR1 | IR2 | — | IR1 | IR2 | — | IR1 | IR2 | — |
| | Infrared Pigment | Kind | IP-1 | IP-2 | — | IP-1 | IP-2 | — | IP-1 | IP-2 | — |
| | | Maximum Absorption Wavelength | — | — | — | — | — | — | — | — | — |
| | | Part(s) by Weight | 2 | 2 | 0 | 2 | 2 | 0 | 2 | 2 | 0 |
| | Infrared Derivative | Kind | IS-1 | IS-2 | — | IS-1 | IS-2 | — | IS-1 | IS-2 | — |
| | | Part(s) by Weight | 0.4 | 0.4 | 0 | 0.4 | 0.4 | 0 | 0.4 | 0.4 | 0 |
| | Dispersant | Kind | D-1 | D-1 | — | D-1 | D-1 | — | D-1 | D-1 | — |
| | | Part(s) by Weight | 1.6 | 1.6 | 0 | 1.6 | 1.6 | 0 | 1.6 | 1.6 | 0 |
| | Solvent | Kind | S-1 | S-1 | — | S-1 | S-1 | — | S-1 | S-1 | — |
| | | Part(s) by Weight | 8 | 8 | 0 | 8 | 8 | 0 | 8 | 8 | 0 |
| Infrared Dye | Kind | | ID-8 | — | — | ID-2 | — | — | ID-2 | — | — |
| | Maximum Absorption Wavelength | | 1104 | — | — | 1007 | — | — | 1007 | — | — |
| | Part(s) by Weight | | 1.5 | 0 | 0 | 1.5 | 0 | 0 | 1.5 | 0 | 0 |
| Resin | Kind | | B-2 | — | — | B-1 | — | — | B-1 | B-2 | — |
| | Part(s) by Weight | | 0.32 | 0 | 0 | 0.32 | 0 | 0 | 0.16 | 0.16 | 0 |
| Polymerizable Monomer | Kind | | M-1 | M-2 | — | M-1 | M-2 | — | M-1 | M-2 | — |
| | Part(s) by Weight | | 0.48 | 0.48 | 0 | 0.48 | 0.48 | 0 | 0.48 | 0.48 | 0 |
| Polymerization Initiator | Kind | | I-1 | — | — | I-1 | — | — | I-1 | — | — |
| | Part(s) by Weight | | 0.8 | 0 | 0 | 0.8 | 0 | 0 | 0.8 | 0 | 0 |
| Additive | Kind | | — | — | — | — | — | — | — | — | — |
| | Part(s) by Weight | | 0 | 0 | 0 | 0 | 0 | 0 | 0 | 0 | 0 |
| Polymerization Inhibitor | Kind | | In-1 | — | — | In-1 | — | — | In-1 | — | — |
| | Part(s) by Weight | | 0.003 | 0 | 0 | 0.003 | 0 | 0 | 0.003 | 0 | 0 |
| Surfactant | Kind | | Su-1 | — | — | Su-1 | — | — | Su-1 | — | — |
| | Part(s) by Weight | | 0.025 | 0 | 0 | 0.025 | 0 | 0 | 0.025 | 0 | 0 |
| Solvent | Kind | | S-1 | — | — | S-1 | — | — | S-1 | — | — |
| | Part(s) by Weight | | 36.4 | 0 | 0 | 36.4 | 0 | 0 | 36.4 | 0 | 0 |
| Total | | | 100.0 | | | 100.0 | | | 100.0 | | |
| Dielectric | | | None | | | None | | | None | | |
| Desired Thickness | | | 2 | | | 2 | | | 2 | | |
| Half-Value Wavelength | | | 1200 | | | 1100 | | | 1100 | | |
| Absorbance Ratio | | | 23.1 | | | 43.2 | | | 43.2 | | |
| Blocking Degree | | | 24.8 | | | 24.8 | | | 24.8 | | |
| Effect | External Light | | 4 | | | 4 | | | 4 | | |
| | High Humidity Sensitivity | | A | | | A | | | A | | |
| | Angle Dependence | | 4 | | | 4 | | | 4 | | |
| | Reduction in Height | | A | | | A | | | A | | |
| | Light Fastness | | 4 | | | 4 | | | 4 | | |

TABLE 10

| Name of Level | | | Example 27 | | | Example 28 | | | Example 29 | | |
|---|---|---|---|---|---|---|---|---|---|---|---|
| Visible Light Absorbing Dispersion Liquid | Name of Dispersion Liquid | | R1 | Y1 | B1 | R1 | Y1 | B1 | R1 | Y1 | B1 |
| | Visible Light Absorbing Pigment | Kind | VP-1 | VP-3 | VP-5 | VP-1 | VP-3 | VP-5 | VP-1 | VP-3 | VP-5 |
| | | Part(s) by Weight | 2 | 2 | 2 | 2 | 2 | 2 | 2 | 2 | 2 |
| | Visible Light Absorbing Derivative | Kind | VS-1 | VS-2 | VS-3 | VS-1 | VS-2 | VS-3 | VS-1 | VS-2 | VS-3 |
| | | Part(s) by Weight | 0.2 | 0.2 | 0.2 | 0.2 | 0.2 | 0.2 | 0.2 | 0.2 | 0.2 |
| | Dispersant | Kind | D-1 | D-1 | D-1 | D-1 | D-1 | D-1 | D-1 | D-1 | D-1 |
| | | Part(s) by Weight | 0.6 | 0.6 | 0.6 | 0.6 | 0.6 | 0.6 | 0.6 | 0.6 | 0.6 |
| | Solvent | Kind | S-1 | S-1 | S-1 | S-1 | S-1 | S-1 | S-1 | S-1 | S-1 |
| | | Part(s) by Weight | 9.2 | 9.2 | 9.2 | 9.2 | 9.2 | 9.2 | 9.2 | 9.2 | 9.2 |
| Visible Light Absorbing Dye | Kind | | — | — | — | — | — | — | — | — | — |
| | Part(s) by Weight | | 0 | 0 | 0 | 0 | 0 | 0 | 0 | 0 | 0 |
| Infrared Absorbing Dispersion Liquid | Name of Dispersion Liquid | | IR1 | IR2 | — | IR1 | IR2 | — | IR1 | IR2 | — |
| | Infrared Pigment | Kind | IP-1 | IP-2 | — | IP-1 | IP-2 | — | IP-1 | IP-2 | — |
| | | Maximum Absorption Wavelength | — | — | — | — | — | — | — | — | — |
| | | Part(s) by Weight | 2 | 2 | 0 | 2 | 2 | 0 | 2 | 2 | 0 |
| | Infrared Derivative | Kind | IS-1 | IS-2 | — | IS-1 | IS-2 | — | IS-1 | IS-2 | — |
| | | Part(s) by Weight | 0.4 | 0.4 | 0 | 0.4 | 0.4 | 0 | 0.4 | 0.4 | 0 |
| | Dispersant | Kind | D-1 | D-1 | — | D-1 | D-1 | — | D-1 | D-1 | — |
| | | Part(s) by Weight | 1.6 | 1.6 | 0 | 1.6 | 1.6 | 0 | 1.6 | 1.6 | 0 |
| | Solvent | Kind | S-1 | S-1 | — | S-1 | S-1 | — | S-1 | S-1 | — |
| | | Part(s) by Weight | 8 | 8 | 0 | 8 | 8 | 0 | 8 | 8 | 0 |

TABLE 10-continued

| Name of Level | | Example 27 | | | Example 28 | | | Example 29 | | |
|---|---|---|---|---|---|---|---|---|---|---|
| Infrared Dye | Kind | ID-2 | — | — | ID-2 | — | — | ID-2 | — | — |
| | Maximum Absorption Wavelength | 1007 | — | — | 1007 | — | — | 1007 | — | — |
| | Part(s) by Weight | 1.5 | 0 | 0 | 1.5 | 0 | 0 | 1.5 | 0 | 0 |
| Resin | Kind | B-2 | — | — | B-2 | — | — | B-2 | — | — |
| | Part(s) by Weight | 0.32 | 0 | 0 | 0.32 | 0 | 0 | 0.32 | 0 | 0 |
| Polymerizable Monomer | Kind | M-3 | — | — | M-1 | — | — | M-2 | — | — |
| | Part(s) by Weight | 0.96 | 0 | 0 | 0.96 | 0 | 0 | 0.96 | 0 | 0 |
| Polymerization Initiator | Kind | I-1 | — | — | I-1 | — | — | I-1 | — | — |
| | Part(s) by Weight | 0.8 | 0 | 0 | 0.8 | 0 | 0 | 0.8 | 0 | 0 |
| Additive | Kind | — | — | — | — | — | — | — | — | — |
| | Part(s) by Weight | 0 | 0 | 0 | 0 | 0 | 0 | 0 | 0 | 0 |
| Polymerization Inhibitor | Kind | In-1 | — | — | In-1 | — | — | In-1 | — | — |
| | Part(s) by Weight | 0.003 | 0 | 0 | 0.003 | 0 | 0 | 0.003 | 0 | 0 |
| Surfactant | Kind | Su-1 | — | — | Su-1 | — | — | Su-1 | — | — |
| | Part(s) by Weight | 0.025 | 0 | 0 | 0.025 | 0 | 0 | 0.025 | 0 | 0 |
| Solvent | Kind | S-1 | — | — | S-1 | — | — | S-1 | — | — |
| | Part(s) by Weight | 36.4 | 0 | 0 | 36.4 | 0 | 0 | 36.4 | 0 | 0 |
| Total | | 100.0 | | | 100.0 | | | 100.0 | | |
| Dielectric | | None | | | None | | | None | | |
| Desired Thickness | | 2 | | | 2 | | | 2 | | |
| Half-Value Wavelength | | 1100 | | | 1100 | | | 1100 | | |
| Absorbance Ratio | | 43.2 | | | 43.2 | | | 43.2 | | |
| Blocking Degree | | 24.8 | | | 24.8 | | | 24.8 | | |
| Effect | External Light | 4 | | | 4 | | | 4 | | |
| | High Humidity Sensitivity | A | | | A | | | A | | |
| | Angle Dependence | 4 | | | 4 | | | 4 | | |
| | Reduction in Height | A | | | A | | | A | | |
| | Light Fastness | 4 | | | 4 | | | 4 | | |

TABLE 11

| Name of Level | | | Example 30 | | | Example 31 | | | Example 32 | | |
|---|---|---|---|---|---|---|---|---|---|---|---|
| Visible Light Absorbing Dispersion Liquid | Name of Dispersion Liquid | | R1 | Y1 | B1 | R1 | Y1 | B1 | R1 | Y1 | B1 |
| | Visible Light Absorbing Pigment | Kind | VP-1 | VP-3 | VP-5 | VP-1 | VP-3 | VP-5 | VP-1 | VP-3 | VP-5 |
| | | Part(s) by Weight | 2 | 2 | 2 | 2 | 2 | 2 | 2 | 2 | 2 |
| | Visible Light Absorbing Derivative | Kind | VS-1 | VS-2 | VS-3 | VS-1 | VS-2 | VS-3 | VS-1 | VS-2 | VS-3 |
| | | Part(s) by Weight | 0.2 | 0.2 | 0.2 | 0.2 | 0.2 | 0.2 | 0.2 | 0.2 | 0.2 |
| | Dispersant | Kind | D-1 | D-1 | D-1 | D-1 | D-1 | D-1 | D-1 | D-1 | D-1 |
| | | Part(s) by Weight | 0.6 | 0.6 | 0.6 | 0.6 | 0.6 | 0.6 | 0.6 | 0.6 | 0.6 |
| | Solvent | Kind | S-1 | S-1 | S-1 | S-1 | S-1 | S-1 | S-1 | S-1 | S-1 |
| | | Part(s) by Weight | 9.2 | 9.2 | 9.2 | 9.2 | 9.2 | 9.2 | 9.2 | 9.2 | 9.2 |
| Visible Light Absorbing Dye | Kind | | — | — | — | — | — | — | — | — | — |
| | Part(s) by Weight | | 0 | 0 | 0 | 0 | 0 | 0 | 0 | 0 | 0 |
| Infrared Absorbing Dispersion Liquid | Name of Dispersion Liquid | | IR1 | IR2 | — | IR1 | IR2 | — | IR1 | IR2 | — |
| | Infrared Pigment | Kind | IP-1 | IP-2 | — | IP-1 | IP-2 | — | IP-1 | IP-2 | — |
| | | Maximum Absorption Wavelength | — | — | — | — | — | — | — | — | — |
| | | Part(s) by Weight | 2 | 2 | 0 | 2 | 2 | 0 | 2 | 2 | 0 |
| | Infrared Derivative | Kind | IS-1 | IS-2 | — | IS-1 | IS-2 | — | IS-1 | IS-2 | — |
| | | Part(s) by Weight | 0.4 | 0.4 | 0 | 0.4 | 0.4 | 0 | 0.4 | 0.4 | 0 |
| | Dispersant | Kind | D-1 | D-1 | — | D-1 | D-1 | — | D-1 | D-1 | — |
| | | Part(s) by Weight | 1.6 | 1.6 | 0 | 1.6 | 1.6 | 0 | 1.6 | 1.6 | 0 |
| | Solvent | Kind | S-1 | S-1 | — | S-1 | S-1 | — | S-1 | S-1 | — |
| | | Part(s) by Weight | 8 | 8 | 0 | 8 | 8 | 0 | 8 | 8 | 0 |
| Infrared Dye | Kind | | ID-2 | — | — | ID-2 | — | — | ID-2 | — | — |
| | Maximum Absorption Wavelength | | 1007 | — | — | 1007 | — | — | 1007 | — | — |
| | Part(s) by Weight | | 1.5 | 0 | 0 | 1.5 | 0 | 0 | 1.5 | 0 | 0 |
| Resin | Kind | | B-2 | — | — | B-2 | — | — | B-2 | — | — |
| | Part(s) by Weight | | 0.32 | 0 | 0 | 0.32 | 0 | 0 | 0.32 | 0 | 0 |
| Polymerizable Monomer | Kind | | M-4 | — | — | M-3 | M-1 | — | M-1 | M-4 | — |
| | Part(s) by Weight | | 0.96 | 0 | 0 | 0.48 | 0.48 | 0 | 0.48 | 0.48 | 0 |
| Polymerization Initiator | Kind | | I-1 | — | — | I-1 | — | — | I-1 | — | — |
| | Part(s) by Weight | | 0.8 | 0 | 0 | 0.8 | 0 | 0 | 0.8 | 0 | 0 |
| Additive | Kind | | — | — | — | — | — | — | — | — | — |
| | Part(s) by Weight | | 0 | 0 | 0 | 0 | 0 | 0 | 0 | 0 | 0 |

TABLE 11-continued

| Name of Level | | Example 30 | | | Example 31 | | | Example 32 | | |
|---|---|---|---|---|---|---|---|---|---|---|
| Polymerization Inhibitor | Kind | In-1 | — | — | In-1 | — | — | In-1 | — | — |
| | Part(s) by Weight | 0.003 | 0 | 0 | 0.003 | 0 | 0 | 0.003 | 0 | 0 |
| Surfactant | Kind | Su-1 | — | — | Su-1 | — | — | Su-1 | — | — |
| | Part(s) by Weight | 0.025 | 0 | 0 | 0.025 | 0 | 0 | 0.025 | 0 | 0 |
| Solvent | Kind | S-1 | — | — | S-1 | — | — | S-1 | — | — |
| | Part(s) by Weight | 36.4 | 0 | 0 | 36.4 | 0 | 0 | 36.4 | 0 | 0 |
| Total | | 100.0 | | | 100.0 | | | 100.0 | | |
| Dielectric | | None | | | None | | | None | | |
| Desired Thickness | | 2 | | | 2 | | | 2 | | |
| Half-Value Wavelength | | 1100 | | | 1100 | | | 1100 | | |
| Absorbance Ratio | | 43.2 | | | 43.2 | | | 43.2 | | |
| Blocking Degree | | 24.8 | | | 24.8 | | | 24.8 | | |
| Effect | External Light | 4 | | | 4 | | | 4 | | |
| | High Humidity Sensitivity | A | | | A | | | A | | |
| | Angle Dependence | 4 | | | 4 | | | 4 | | |
| | Reduction in Height | A | | | A | | | A | | |
| | Light Fastness | 4 | | | 4 | | | 4 | | |

TABLE 12

| Name of Level | | | Example 33 | | | Example 34 | | | Example 35 | | |
|---|---|---|---|---|---|---|---|---|---|---|---|
| Visible Light Absorbing Dispersion Liquid | Name of Dispersion Liquid | | R1 | Y1 | B1 | R1 | Y1 | B1 | R1 | Y1 | B1 |
| | Visible Light Absorbing Pigment | Kind | VP-1 | VP-3 | VP-5 | VP-1 | VP-3 | VP-5 | VP-1 | VP-3 | VP-5 |
| | | Part(s) by Weight | 2 | 2 | 2 | 2 | 2 | 2 | 2 | 2 | 2 |
| | Visible Light Absorbing Derivative | Kind | VS-1 | VS-2 | VS-3 | VS-1 | VS-2 | VS-3 | VS-1 | VS-2 | VS-3 |
| | | Part(s) by Weight | 0.2 | 0.2 | 0.2 | 0.2 | 0.2 | 0.2 | 0.2 | 0.2 | 0.2 |
| | Dispersant | Kind | D-1 | D-1 | D-1 | D-1 | D-1 | D-1 | D-1 | D-1 | D-1 |
| | | Part(s) by Weight | 0.6 | 0.6 | 0.6 | 0.6 | 0.6 | 0.6 | 0.6 | 0.6 | 0.6 |
| | Solvent | Kind | S-1 | S-1 | S-1 | S-1 | S-1 | S-1 | S-1 | S-1 | S-1 |
| | | Part(s) by Weight | 9.2 | 9.2 | 9.2 | 9.2 | 9.2 | 9.2 | 9.2 | 9.2 | 9.2 |
| Visible Light Absorbing Dye | Kind | | — | — | — | — | — | — | — | — | — |
| | Part(s) by Weight | | 0 | 0 | 0 | 0 | 0 | 0 | 0 | 0 | 0 |
| Infrared Absorbing Dispersion Liquid | Name of Dispersion Liquid | | IR1 | IR2 | — | IR1 | IR2 | — | IR1 | IR2 | — |
| | Infrared Pigment | Kind | IP-1 | IP-2 | — | IP-1 | IP-2 | — | IP-1 | IP-2 | — |
| | | Maximum Absorption Wavelength | — | — | — | — | — | — | — | — | — |
| | | Part(s) by Weight | 2 | 2 | 0 | 2 | 2 | 0 | 2 | 2 | 0 |
| | Infrared Derivative | Kind | IS-1 | IS-2 | — | IS-1 | IS-2 | — | IS-1 | IS-2 | — |
| | | Part(s) by Weight | 0.4 | 0.4 | 0 | 0.4 | 0.4 | 0 | 0.4 | 0.4 | 0 |
| | Dispersant | Kind | D-1 | D-1 | — | D-1 | D-1 | — | D-1 | D-1 | — |
| | | Part(s) by Weight | 1.6 | 1.6 | 0 | 1.6 | 1.6 | 0 | 1.6 | 1.6 | 0 |
| | Solvent | Kind | S-1 | S-1 | — | S-1 | S-1 | — | S-1 | S-1 | — |
| | | Part(s) by Weight | 8 | 8 | 0 | 8 | 8 | 0 | 8 | 8 | 0 |
| Infrared Dye | Kind | | ID-2 | — | — | ID-2 | — | — | ID-2 | — | — |
| | Maximum Absorption Wavelength | | 1007 | — | — | 1007 | — | — | 1007 | — | — |
| | Part(s) by Weight | | 1.5 | 0 | 0 | 1.5 | 0 | 0 | 1.5 | 0 | 0 |
| Resin | Kind | | B-2 | — | — | B-2 | — | — | B-2 | — | — |
| | Part(s) by Weight | | 0.32 | 0 | 0 | 0.32 | 0 | 0 | 0.32 | 0 | 0 |
| Polymerizable Monomer | Kind | | M-1 | M-2 | — | M-1 | M-2 | — | M-1 | M-2 | — |
| | Part(s) by Weight | | 0.48 | 0.48 | 0 | 0.48 | 0.48 | 0 | 0.48 | 0.48 | 0 |
| Polymerization Initiator | Kind | | I-2 | — | — | I-3 | — | — | I-2 | I-3 | — |
| | Part(s) by Weight | | 0.8 | 0 | 0 | 0.8 | 0 | 0 | 0.4 | 0.4 | 0 |
| Additive | Kind | | — | — | — | — | — | — | — | — | — |
| | Part(s) by Weight | | 0 | 0 | 0 | 0 | 0 | 0 | 0 | 0 | 0 |
| Polymerization Inhibitor | Kind | | In-1 | — | — | In-1 | — | — | In-1 | — | — |
| | Part(s) by Weight | | 0.003 | 0 | 0 | 0.003 | 0 | 0 | 0.003 | 0 | 0 |
| Surfactant | Kind | | Su-1 | — | — | Su-1 | — | — | Su-1 | — | — |
| | Part(s) by Weight | | 0.025 | 0 | 0 | 0.025 | 0 | 0 | 0.025 | 0 | 0 |
| Solvent | Kind | | S-1 | — | — | S-1 | — | — | S-1 | — | — |
| | Part(s) by Weight | | 36.4 | 0 | 0 | 36.4 | 0 | 0 | 36.4 | 0 | 0 |
| Total | | | 100.0 | | | 100.0 | | | 100.0 | | |
| Dielectric | | | None | | | None | | | None | | |
| Desired Thickness | | | 2 | | | 2 | | | 2 | | |
| Half-Value Wavelength | | | 1100 | | | 1100 | | | 1100 | | |
| Absorbance Ratio | | | 43.2 | | | 43.2 | | | 43.2 | | |
| Blocking Degree | | | 24.8 | | | 24.8 | | | 24.8 | | |
| Effect | External Light | | 4 | | | 4 | | | 4 | | |

TABLE 12-continued

| Name of Level | Example 33 | Example 34 | Example 35 |
|---|---|---|---|
| High Humidity Sensitivity | A | A | A |
| Angle Dependence | 4 | 4 | 4 |
| Reduction in Height | A | A | A |
| Light Fastness | 4 | 4 | 4 |

TABLE 13

| | | | Example 36 | | | Example 37 | | | Example 38 | | |
|---|---|---|---|---|---|---|---|---|---|---|---|
| Name of Level | | | R1 | Y1 | B1 | R1 | Y1 | B1 | R1 | Y1 | B1 |
| Visible Light Absorbing Dispersion Liquid | Name of Dispersion Liquid | | | | | | | | | | |
| | Visible Light Absorbing Pigment | Kind | VP-1 | VP-3 | VP-5 | VP-1 | VP-3 | VP-5 | VP-1 | VP-3 | VP-5 |
| | | Part(s) by Weight | 2 | 2 | 2 | 2 | 2 | 2 | 2 | 2 | 2 |
| | Visible Light Absorbing Derivative | Kind | VS-1 | VS-2 | VS-3 | VS-1 | VS-2 | VS-3 | VS-1 | VS-2 | VS-3 |
| | | Part(s) by Weight | 0.2 | 0.2 | 0.2 | 0.2 | 0.2 | 0.2 | 0.2 | 0.2 | 0.2 |
| | Dispersant | Kind | D-1 | D-1 | D-1 | D-1 | D-1 | D-1 | D-1 | D-1 | D-1 |
| | | Part(s) by Weight | 0.6 | 0.6 | 0.6 | 0.6 | 0.6 | 0.6 | 0.6 | 0.6 | 0.6 |
| | Solvent | Kind | S-1 | S-1 | S-1 | S-1 | S-1 | S-1 | S-1 | S-1 | S-1 |
| | | Part(s) by Weight | 9.2 | 9.2 | 9.2 | 9.2 | 9.2 | 9.2 | 9.2 | 9.2 | 9.2 |
| Visible Light Absorbing Dye | Kind | | — | — | — | — | — | — | — | — | — |
| | Part(s) by Weight | | 0 | 0 | 0 | 0 | 0 | 0 | 0 | 0 | 0 |
| Infrared Absorbing Dispersion Liquid | Name of Dispersion Liquid | | IR1 | IR2 | — | IR1 | IR2 | — | IR1 | IR2 | — |
| | Infrared Pigment | Kind | IP-1 | IP-2 | — | IP-1 | IP-2 | — | IP-1 | IP-2 | — |
| | | Maximum Absorption Wavelength | — | — | — | — | — | — | — | — | — |
| | | Part(s) by Weight | 2 | 2 | 0 | 2 | 2 | 0 | 2 | 2 | 0 |
| | Infrared Derivative | Kind | IS-1 | IS-2 | — | IS-1 | IS-2 | — | IS-1 | IS-2 | — |
| | | Part(s) by Weight | 0.4 | 0.4 | 0 | 0.4 | 0.4 | 0 | 0.4 | 0.4 | 0 |
| | Dispersant | Kind | D-1 | D-1 | — | D-1 | D-1 | — | D-1 | D-1 | — |
| | | Part(s) by Weight | 1.6 | 1.6 | 0 | 1.6 | 1.6 | 0 | 1.6 | 1.6 | 0 |
| | Solvent | Kind | S-1 | S-1 | — | S-1 | S-1 | — | S-1 | S-1 | — |
| | | Part(s) by Weight | 8 | 8 | 0 | 8 | 8 | 0 | 8 | 8 | 0 |
| Infrared Dye | Kind | | ID-2 | — | — | ID-2 | — | — | ID-2 | — | — |
| | Maximum Absorption Wavelength | | 1007 | — | — | 1007 | — | — | 1007 | — | — |
| | Part(s) by Weight | | 1.5 | 0 | 0 | 1.5 | 0 | 0 | 1.5 | 0 | 0 |
| Resin | Kind | | B-2 | — | — | B-2 | — | — | B-2 | — | — |
| | Part(s) by Weight | | 0.17 | 0 | 0 | 0.27 | 0 | 0 | 0.27 | 0 | 0 |
| Polymerizable Monomer | Kind | | M-1 | M-2 | — | M-1 | M-2 | — | M-1 | M-2 | — |
| | Part(s) by Weight | | 0.25 | 0.25 | 0 | 0.40 | 0.40 | 0 | 0.40 | 0.40 | 0 |
| Polymerization Initiator | Kind | | I-1 | — | — | I-1 | — | — | I-1 | — | — |
| | Part(s) by Weight | | 0.8 | 0 | 0 | 0.8 | 0 | 0 | 0.8 | 0 | 0 |
| Additive | Kind | | A-1 | — | — | A-2 | — | — | A-3 | — | — |
| | Part(s) by Weight | | 0.6 | 0 | 0 | 0.2 | 0 | 0 | 0.2 | 0 | 0 |
| Polymerization Inhibitor | Kind | | In-1 | — | — | In-1 | — | — | In-1 | — | — |
| | Part(s) by Weight | | 0.003 | 0 | 0 | 0.003 | 0 | 0 | 0.003 | 0 | 0 |
| Surfactant | Kind | | Su-1 | — | — | Su-1 | — | — | Su-1 | — | — |
| | Part(s) by Weight | | 0.025 | 0 | 0 | 0.025 | 0 | 0 | 0.025 | 0 | 0 |
| Solvent | Kind | | S-1 | — | — | S-1 | — | — | S-1 | — | — |
| | Part(s) by Weight | | 36.4 | 0 | 0 | 36.4 | 0 | 0 | 36.4 | 0 | 0 |
| Total | | | 100.0 | | | 100.0 | | | 100.0 | | |
| Dielectric | | | None | | | None | | | None | | |
| Desired Thickness | | | 2 | | | 2 | | | 2 | | |
| Half-Value Wavelength | | | 1100 | | | 1100 | | | 1100 | | |
| Absorbance Ratio | | | 43.2 | | | 43.2 | | | 43.2 | | |
| Blocking Degree | | | 24.8 | | | 24.8 | | | 24.8 | | |
| Effect | External Light | | 4 | | | 4 | | | 4 | | |
| | High Humidity Sensitivity | | A | | | A | | | A | | |
| | Angle Dependence | | 4 | | | 4 | | | 4 | | |
| | Reduction in Height | | A | | | A | | | A | | |
| | Light Fastness | | 4 | | | 5 | | | 5 | | |

TABLE 14

| Name of Level | | | Example 39 | | | Example 40 | | | Example 41 | | |
|---|---|---|---|---|---|---|---|---|---|---|---|
| Visible Light Absorbing Dispersion Liquid | Name of Dispersion Liquid | | R1 | Y1 | B1 | R1 | Y1 | B1 | R1 | Y1 | B1 |
| | Visible Light Absorbing Pigment | Kind | VP-1 | VP-3 | VP-5 | VP-1 | VP-3 | VP-5 | VP-1 | VP-3 | VP-5 |
| | | Part(s) by Weight | 2 | 2 | 2 | 2 | 2 | 2 | 2 | 2 | 2 |
| | Visible Light Absorbing Derivative | Kind | VS-1 | VS-2 | VS-3 | VS-1 | VS-2 | VS-3 | VS-1 | VS-2 | VS-3 |
| | | Part(s) by Weight | 0.2 | 0.2 | 0.2 | 0.2 | 0.2 | 0.2 | 0.2 | 0.2 | 0.2 |
| | Dispersant | Kind | D-1 | D-1 | D-1 | D-1 | D-1 | D-1 | D-1 | D-1 | D-1 |
| | | Part(s) by Weight | 0.6 | 0.6 | 0.6 | 0.6 | 0.6 | 0.6 | 0.6 | 0.6 | 0.6 |
| | Solvent | Kind | S-1 | S-1 | S-1 | S-1 | S-1 | S-1 | S-1 | S-1 | S-1 |
| | | Part(s) by Weight | 9.2 | 9.2 | 9.2 | 9.2 | 9.2 | 9.2 | 9.2 | 9.2 | 9.2 |
| Visible Light Absorbing Dye | | Kind | — | — | — | — | — | — | — | — | — |
| | | Part(s) by Weight | 0 | 0 | 0 | 0 | 0 | 0 | 0 | 0 | 0 |
| Infrared Absorbing Dispersion Liquid | Name of Dispersion Liquid | | IR1 | IR2 | — | IR1 | IR2 | — | IR1 | IR2 | — |
| | Infrared Pigment | Kind | IP-1 | IP-2 | — | IP-1 | IP-2 | — | IP-1 | IP-2 | — |
| | | Maximum Absorption Wavelength | — | — | — | — | — | — | — | — | — |
| | | Part(s) by Weight | 2 | 2 | 0 | 2 | 2 | 0 | 2 | 2 | 0 |
| | Infrared Derivative | Kind | IS-1 | IS-2 | — | IS-1 | IS-2 | — | IS-1 | IS-2 | — |
| | | Part(s) by Weight | 0.4 | 0.4 | 0 | 0.4 | 0.4 | 0 | 0.4 | 0.4 | 0 |
| | Dispersant | Kind | D-1 | D-1 | — | D-1 | D-1 | — | D-1 | D-1 | — |
| | | Part(s) by Weight | 1.6 | 1.6 | 0 | 1.6 | 1.6 | 0 | 1.6 | 1.6 | 0 |
| | Solvent | Kind | S-1 | S-1 | — | S-1 | S-1 | — | S-1 | S-1 | — |
| | | Part(s) by Weight | 8 | 8 | 0 | 8 | 8 | 0 | 8 | 8 | 0 |
| Infrared Dye | | Kind | ID-2 | — | — | ID-2 | — | — | ID-2 | — | — |
| | | Maximum Absorption Wavelength | 1007 | — | — | 1007 | — | — | 1007 | — | — |
| | | Part(s) by Weight | 1.5 | 0 | 0 | 1.5 | 0 | 0 | 1.5 | 0 | 0 |
| Resin | | Kind | B-2 | — | — | — | — | — | B-2 | — | — |
| | | Part(s) by Weight | 0.27 | 0 | 0 | 0 | 0 | 0 | 0.22 | 0 | 0 |
| Polymerizable Monomer | | Kind | M-1 | M-2 | — | — | — | — | M-1 | M-2 | — |
| | | Part(s) by Weight | 0.40 | 0.40 | 0 | 0 | 0 | 0 | 0.33 | 0.33 | 0 |
| Polymerization Initiator | | Kind | I-1 | — | — | — | — | — | I-1 | — | — |
| | | Part(s) by Weight | 0.8 | 0 | 0 | 0 | 0 | 0 | 0.8 | 0 | 0 |
| Additive | | Kind | A-4 | — | — | A-4 | — | — | A-1 | A-2 | — |
| | | Part(s) by Weight | 0.2 | 0 | 0 | 2.5 | 0 | 0 | 0.3 | 0.1 | 0 |
| Polymerization Inhibitor | | Kind | In-1 | — | — | In-1 | — | — | In-1 | — | — |
| | | Part(s) by Weight | 0.003 | 0 | 0 | 0.003 | 0 | 0 | 0.003 | 0 | 0 |
| Surfactant | | Kind | Su-1 | — | — | Su-1 | — | — | Su-1 | — | — |
| | | Part(s) by Weight | 0.025 | 0 | 0 | 0.025 | 0 | 0 | 0.025 | 0 | 0 |
| Solvent | | Kind | S-1 | — | — | S-1 | — | — | S-1 | — | — |
| | | Part(s) by Weight | 36.4 | 0 | 0 | 36.0 | 0 | 0 | 36.4 | 0 | 0 |
| Total | | | | 100.0 | | | 100.0 | | | 100.0 | |
| Dielectric | | | | None | | | None | | | None | |
| Desired Thickness | | | | 2 | | | 2 | | | 2 | |
| Half-Value Wavelength | | | | 1100 | | | 1100 | | | 1100 | |
| Absorbance Ratio | | | | 43.2 | | | 43.2 | | | 43.2 | |
| Blocking Degree | | | | 24.8 | | | 24.8 | | | 24.8 | |
| Effect | External Light | | | 4 | | | 4 | | | 4 | |
| | High Humidity Sensitivity | | | A | | | A | | | A | |
| | Angle Dependence | | | 4 | | | 4 | | | 4 | |
| | Reduction in Height | | | A | | | A | | | A | |
| | Light Fastness | | | 4 | | | 5 | | | 5 | |

TABLE 15

| Name of Level | | | Example 42 | | | Example 43 | | | Example 44 | | |
|---|---|---|---|---|---|---|---|---|---|---|---|
| Visible Light Absorbing Dispersion Liquid | Name of Dispersion Liquid | | R1 | Y1 | B1 | R1 | Y1 | B1 | R1 | Y1 | B1 |
| | Visible Light Absorbing Pigment | Kind | VP-1 | VP-3 | VP-5 | VP-1 | VP-3 | VP-5 | VP-1 | VP-3 | VP-5 |
| | | Part(s) by Weight | 2 | 2 | 2 | 2 | 2 | 2 | 2 | 2 | 2 |
| | Visible Light Absorbing Derivative | Kind | VS-1 | VS-2 | VS-3 | VS-1 | VS-2 | VS-3 | VS-1 | VS-2 | VS-3 |
| | | Part(s) by Weight | 0.2 | 0.2 | 0.2 | 0.2 | 0.2 | 0.2 | 0.2 | 0.2 | 0.2 |
| | Dispersant | Kind | D-1 | D-1 | D-1 | D-1 | D-1 | D-1 | D-1 | D-1 | D-1 |
| | | Part(s) by Weight | 0.6 | 0.6 | 0.6 | 0.6 | 0.6 | 0.6 | 0.6 | 0.6 | 0.6 |
| | Solvent | Kind | S-1 | S-1 | S-1 | S-1 | S-1 | S-1 | S-1 | S-1 | S-1 |
| | | Part(s) by Weight | 9.2 | 9.2 | 9.2 | 9.2 | 9.2 | 9.2 | 9.2 | 9.2 | 9.2 |
| Visible Light Absorbing Dye | | Kind | — | — | — | — | — | — | — | — | — |
| | | Part(s) by Weight | 0 | 0 | 0 | 0 | 0 | 0 | 0 | 0 | 0 |

TABLE 15-continued

| Name of Level | | | Example 42 | | | Example 43 | | | Example 44 | | |
|---|---|---|---|---|---|---|---|---|---|---|---|
| Infrared Absorbing Dispersion Liquid | Name of Dispersion Liquid | | IR1 | IR2 | — | IR1 | IR2 | — | IR1 | IR2 | — |
| | Infrared Pigment | Kind | IP-1 | IP-2 | — | IP-1 | IP-2 | — | IP-1 | IP-2 | — |
| | | Maximum Absorption Wavelength | — | — | — | — | — | — | — | — | — |
| | | Part(s) by Weight | 2 | 2 | 0 | 2 | 2 | 0 | 2 | 2 | 0 |
| | Infrared Derivative | Kind | IS-1 | IS-2 | — | IS-1 | IS-2 | — | IS-1 | IS-2 | — |
| | | Part(s) by Weight | 0.4 | 0.4 | 0 | 0.4 | 0.4 | 0 | 0.4 | 0.4 | 0 |
| | Dispersant | Kind | D-1 | D-1 | — | D-1 | D-1 | — | D-1 | D-1 | — |
| | | Part(s) by Weight | 1.6 | 1.6 | 0 | 1.6 | 1.6 | 0 | 1.6 | 1.6 | 0 |
| | Solvent | Kind | S-1 | S-1 | — | S-1 | S-1 | — | S-1 | S-1 | — |
| | | Part(s) by Weight | 8 | 8 | 0 | 8 | 8 | 0 | 8 | 8 | 0 |
| Infrared Dye | | Kind | ID-2 | — | — | ID-2 | — | — | ID-2 | — | — |
| | | Maximum Absorption Wavelength | 1007 | — | — | 1007 | — | — | 1007 | — | — |
| | | Part(s) by Weight | 1.5 | 0 | 0 | 1.5 | 0 | 0 | 1.5 | 0 | 0 |
| Resin | | Kind | B-2 | — | — | B-2 | — | — | B-2 | — | — |
| | | Part(s) by Weight | 0.22 | 0 | 0 | 0.32 | 0 | 0 | 0.32 | 0 | 0 |
| Polymerizable Monomer | | Kind | M-1 | M-2 | — | M-1 | M-2 | — | M-1 | M-2 | — |
| | | Part(s) by Weight | 0.33 | 0.33 | 0 | 0.48 | 0.48 | 0 | 0.48 | 0.48 | 0 |
| Polymerization Initiator | | Kind | I-1 | — | — | I-1 | — | — | I-1 | — | — |
| | | Part(s) by Weight | 0.8 | 0 | 0 | 0.8 | 0 | 0 | 0.8 | 0 | 0 |
| Additive | | Kind | A-1 | A-2 | A-3 | — | — | — | — | — | — |
| | | Part(s) by Weight | 0.2 | 0.1 | 0.1 | 0 | 0 | 0 | 0 | 0 | 0 |
| Polymerization Inhibitor | | Kind | In-1 | — | — | In-2 | — | — | In-1 | In-2 | — |
| | | Part(s) by Weight | 0.003 | 0 | 0 | 0.003 | 0 | 0 | 0.0015 | 0.0015 | 0 |
| Surfactant | | Kind | Su-1 | — | — | Su-1 | — | — | Su-1 | — | — |
| | | Part(s) by Weight | 0.025 | 0 | 0 | 0.025 | 0 | 0 | 0.025 | 0 | 0 |
| Solvent | | Kind | S-1 | — | — | S-1 | — | — | S-1 | — | — |
| | | Part(s) by Weight | 36.4 | 0 | 0 | 36.4 | 0 | 0 | 36.4 | 0 | 0 |
| Total | | | 100.0 | | | 100.0 | | | 100.0 | | |
| Dielectric | | | None | | | None | | | None | | |
| Desired Thickness | | | 2 | | | 2 | | | 2 | | |
| Half-Value Wavelength | | | 1100 | | | 1100 | | | 1100 | | |
| Absorbance Ratio | | | 43.2 | | | 43.2 | | | 43.2 | | |
| Blocking Degree | | | 24.8 | | | 24.8 | | | 24.8 | | |
| Effect | External Light | | 4 | | | 4 | | | 4 | | |
| | High Humidity Sensitivity | | A | | | A | | | A | | |
| | Angle Dependence | | 4 | | | 4 | | | 4 | | |
| | Reduction in Height | | A | | | A | | | A | | |
| | Light Fastness | | 5 | | | 4 | | | 4 | | |

TABLE 16

| Name of Level | | | Example 45 | | | Example 46 | | | Example 47 | | |
|---|---|---|---|---|---|---|---|---|---|---|---|
| Visible Light Absorbing Dispersion Liquid | Name of Dispersion Liquid | | R1 | Y1 | B1 | R1 | Y1 | B1 | R1 | Y1 | B1 |
| | Visible Light Absorbing Pigment | Kind | VP-1 | VP-3 | VP-5 | VP-1 | VP-3 | VP-5 | VP-1 | VP-3 | VP-5 |
| | | Part(s) by Weight | 2 | 2 | 2 | 2 | 2 | 2 | 2 | 2 | 2 |
| | Visible Light Absorbing Derivative | Kind | VS-1 | VS-2 | VS-3 | VS-1 | VS-2 | VS-3 | VS-1 | VS-2 | VS-3 |
| | | Part(s) by Weight | 0.2 | 0.2 | 0.2 | 0.2 | 0.2 | 0.2 | 0.2 | 0.2 | 0.2 |
| | Dispersant | Kind | D-1 | D-1 | D-1 | D-1 | D-1 | D-1 | D-1 | D-1 | D-1 |
| | | Part(s) by Weight | 0.6 | 0.6 | 0.6 | 0.6 | 0.6 | 0.6 | 0.6 | 0.6 | 0.6 |
| | Solvent | Kind | S-1 | S-1 | S-1 | S-1 | S-1 | S-1 | S-2 | S-2 | S-2 |
| | | Part(s) by Weight | 9.2 | 9.2 | 9.2 | 9.2 | 9.2 | 9.2 | 9.2 | 9.2 | 9.2 |
| Visible Light Absorbing Dye | | Kind | — | — | — | — | — | — | — | — | — |
| | | Part(s) by Weight | 0 | 0 | 0 | 0 | 0 | 0 | 0 | 0 | 0 |
| Infrared Absorbing Dispersion Liquid | Name of Dispersion Liquid | | IR1 | IR2 | — | IR1 | IR2 | — | IR1 | IR2 | — |
| | Infrared Pigment | Kind | IP-1 | IP-2 | — | IP-1 | IP-2 | — | IP-1 | IP-2 | — |
| | | Maximum Absorption Wavelength | — | — | — | — | — | — | — | — | — |
| | | Part(s) by Weight | 2 | 2 | 0 | 2 | 2 | 0 | 2 | 2 | 0 |
| | Infrared Derivative | Kind | IS-1 | IS-2 | — | IS-1 | IS-2 | — | IS-1 | IS-2 | — |
| | | Part(s) by Weight | 0.4 | 0.4 | 0 | 0.4 | 0.4 | 0 | 0.4 | 0.4 | 0 |
| | Dispersant | Kind | D-1 | D-1 | — | D-1 | D-1 | — | D-1 | D-1 | — |
| | | Part(s) by Weight | 1.6 | 1.6 | 0 | 1.6 | 1.6 | 0 | 1.6 | 1.6 | 0 |
| | Solvent | Kind | S-1 | S-1 | — | S-1 | S-1 | — | S-2 | S-2 | — |
| | | Part(s) by Weight | 8 | 8 | 0 | 8 | 8 | 0 | 8 | 8 | 0 |

TABLE 16-continued

| Name of Level | | Example 45 | | | Example 46 | | | Example 47 | | |
|---|---|---|---|---|---|---|---|---|---|---|
| Infrared Dye | Kind | ID-2 | — | — | ID-2 | — | — | ID-2 | — | — |
| | Maximum Absorption Wavelength | 1007 | — | — | 1007 | — | — | 1007 | — | — |
| | Part(s) by Weight | 1.5 | 0 | 0 | 1.5 | 0 | 0 | 1.5 | 0 | 0 |
| Resin | Kind | B-2 | — | — | B-2 | — | — | B-2 | — | — |
| | Part(s) by Weight | 0.32 | 0 | 0 | 0.32 | 0 | 0 | 0.32 | 0 | 0 |
| Polymerizable Monomer | Kind | M-1 | M-2 | — | M-1 | M-2 | — | M-1 | M-2 | — |
| | Part(s) by Weight | 0.48 | 0.48 | 0 | 0.48 | 0.48 | 0 | 0.48 | 0.48 | 0 |
| Polymerization Initiator | Kind | I-1 | — | — | I-1 | — | — | I-1 | — | — |
| | Part(s) by Weight | 0.8 | 0 | 0 | 0.8 | 0 | 0 | 0.8 | 0 | 0 |
| Additive | Kind | — | — | — | — | — | — | — | — | — |
| | Part(s) by Weight | 0 | 0 | 0 | 0 | 0 | 0 | 0 | 0 | 0 |
| Polymerization Inhibitor | Kind | In-1 | — | — | In-1 | — | — | In-1 | — | — |
| | Part(s) by Weight | 0.003 | 0 | 0 | 0.003 | 0 | 0 | 0.003 | 0 | 0 |
| Surfactant | Kind | Su-2 | — | — | Su-1 | Su-2 | — | Su-1 | — | — |
| | Part(s) by Weight | 0.025 | 0 | 0 | 0.0125 | 0.0125 | 0 | 0.025 | 0 | 0 |
| Solvent | Kind | S-1 | — | — | S-1 | — | — | S-2 | — | — |
| | Part(s) by Weight | 36.4 | 0 | 0 | 36.4 | 0 | 0 | 36.4 | 0 | 0 |
| Total | | 100.0 | | | 100.0 | | | 100.0 | | |
| Dielectric | | None | | | None | | | None | | |
| Desired Thickness | | 2 | | | 2 | | | 2 | | |
| Half-Value Wavelength | | 1100 | | | 1100 | | | 1100 | | |
| Absorbance Ratio | | 43.2 | | | 43.2 | | | 43.2 | | |
| Blocking Degree | | 24.8 | | | 24.8 | | | 24.8 | | |
| Effect | External Light | 4 | | | 4 | | | 4 | | |
| | High Humidity Sensitivity | A | | | A | | | A | | |
| | Angle Dependence | 4 | | | 4 | | | 4 | | |
| | Reduction in Height | A | | | A | | | A | | |
| | Light Fastness | 4 | | | 4 | | | 4 | | |

TABLE 17

| Name of Level | | | Example 48 | | | Example 49 | | | Example 50 | | Example 51 | |
|---|---|---|---|---|---|---|---|---|---|---|---|---|
| Visible Light Absorbing Dispersion Liquid | Name of Dispersion Liquid | | R1 | Y1 | B1 | R1 | Y1 | B1 | — | — | — | — |
| | Visible Light Absorbing Pigment | Kind | VP-1 | VP-3 | VP-5 | VP-1 | VP-3 | VP-5 | — | — | — | — |
| | | Part(s) by Weight | 2 | 2 | 2 | 2 | 2 | 2 | 0 | 0 | 0 | 0 |
| | Visible Light Absorbing Derivative | Kind | VS-1 | VS-2 | VS-3 | VS-1 | VS-2 | VS-3 | — | — | — | — |
| | | Part(s) by Weight | 0.2 | 0.2 | 0.2 | 0.2 | 0.2 | 0.2 | 0 | 0 | 0 | 0 |
| | Dispersant | Kind | D-1 | D-1 | D-1 | D-1 | D-1 | D-1 | — | — | — | — |
| | | Part(s) by Weight | 0.6 | 0.6 | 0.6 | 0.6 | 0.6 | 0.6 | 0 | 0 | 0 | 0 |
| | Solvent | Kind | S-3 | S-3 | S-3 | S-1 | S-1 | S-1 | — | — | — | — |
| | | Part(s) by Weight | 9.2 | 9.2 | 9.2 | 9.2 | 9.2 | 9.2 | 0 | 0 | 0 | 0 |
| Visible Light Absorbing Dye | Kind | | — | — | — | — | — | — | VD-1 | — | VD-1 | — |
| | Part(s) by Weight | | 0 | 0 | 0 | 0 | 0 | 0 | 7.2 | 0 | 8.4 | 0 |
| Infrared Absorbing Dispersion Liquid | Name of Dispersion Liquid | | IR1 | IR2 | — | IR1 | IR2 | — | IR1 | IR2 | IR1 | — |
| | Infrared Pigment | Kind | IP-1 | IP-2 | — | IP-1 | IP-2 | — | IP-1 | IP-2 | IP-2 | — |
| | | Maximum Absorption Wavelength | — | — | — | — | — | — | — | — | — | — |
| | | Part(s) by Weight | 2 | 2 | 0 | 2 | 2 | 0 | 2.4 | 2.4 | 2.8 | 0 |
| | Infrared Derivative | Kind | IS-1 | IS-2 | — | IS-1 | IS-2 | — | IS-1 | IS-2 | IS-2 | — |
| | | Part(s) by Weight | 0.4 | 0.4 | 0 | 0.4 | 0.4 | 0 | 0.48 | 0.48 | 0.56 | 0 |
| | Dispersant | Kind | D-1 | D-1 | — | D-1 | D-1 | — | D-1 | D-1 | D-1 | — |
| | | Part(s) by Weight | 1.6 | 1.6 | 0 | 1.6 | 1.6 | 0 | 1.92 | 1.92 | 2.24 | 0 |
| | Solvent | Kind | S-1 | S-1 | — | S-1 | S-1 | — | S-1 | S-1 | S-1 | — |
| | | Part(s) by Weight | 8 | 8 | 0 | 8 | 8 | 0 | 9.6 | 9.6 | 11.2 | 0 |
| Infrared Dye | Kind | | ID-2 | — | — | ID-2 | — | — | ID-2 | — | ID-2 | ID-7 |
| | Maximum Absorption Wavelength | | 1007 | — | — | 1007 | — | — | 1007 | — | 1007 | — |
| | Part(s) by Weight | | 1.5 | 0 | 0 | 1.5 | 0 | 0 | 1.8 | 0 | 2.1 | 2.8 |
| Resin | Kind | | B-2 | — | — | B-2 | — | — | B-2 | — | B-2 | — |
| | Part(s) by Weight | | 0.32 | 0 | 0 | 0.32 | 0 | 0 | 0.14 | 0 | 0.07 | 0 |
| Polymerizable Monomer | Kind | | M-1 | M-2 | — | M-1 | M-2 | — | M-1 | M-2 | M-1 | M-2 |
| | Part(s) by Weight | | 0.48 | 0.48 | 0 | 0.48 | 0.48 | 0 | 0.21 | 0.21 | 0.10 | 0.10 |
| Polymerization Initiator | Kind | | I-1 | — | — | I-1 | — | — | I-1 | — | I-1 | — |
| | Part(s) by Weight | | 0.8 | 0 | 0 | 0.8 | 0 | 0 | 0.8 | 0 | 0.8 | 0 |
| Additive | Kind | | — | — | — | — | — | — | — | — | — | — |
| | Part(s) by Weight | | 0 | 0 | 0 | 0 | 0 | 0 | 0 | 0 | 0 | 0 |

TABLE 17-continued

| Name of Level | | Example 48 | | | Example 49 | | | Example 50 | | Example 51 | |
|---|---|---|---|---|---|---|---|---|---|---|---|
| Polymerization Inhibitor | Kind | In-1 | — | — | In-1 | — | — | In-1 | — | In-1 | — |
| | Part(s) by Weight | 0.003 | 0 | 0 | 0.003 | 0 | 0 | 0.003 | 0 | 0.003 | 0 |
| Surfactant | Kind | Su-1 | — | — | Su-1 | — | — | Su-1 | — | Su-1 | — |
| | Part(s) by Weight | 0.025 | 0 | 0 | 0.025 | 0 | 0 | 0.025 | 0 | 0.025 | 0 |
| Solvent | Kind | S-3 | — | — | S-1 | S-2 | — | S-1 | — | S-1 | — |
| | Part(s) by Weight | 36.4 | 0 | 0 | 18.2 | 18.2 | 0 | 60.8 | 0 | 68.8 | 0 |
| Total | | 100.0 | | | 100.0 | | | 100.0 | | 100.0 | |
| Dielectric | | None | | | None | | | None | | None | |
| Desired Thickness | | 2 | | | 2 | | | 1.6 | | 1.4 | |
| Half-Value Wavelength | | 1100 | | | 1100 | | | 1100 | | 1100 | |
| Absorbance Ratio | | 43.2 | | | 43.2 | | | 68.9 | | 68.9 | |
| Blocking Degree | | 24.8 | | | 24.8 | | | 21.9 | | 21.9 | |
| Effect | External Light | 4 | | | 4 | | | 4 | | 4 | |
| | High Humidity Sensitivity | A | | | A | | | A | | A | |
| | Angle Dependence | 4 | | | 4 | | | 4 | | 4 | |
| | Reduction in Height | A | | | A | | | A | | A | |
| | Light Fastness | 4 | | | 4 | | | 4 | | 4 | |

TABLE 18

| Name of Level | | | Example 52 | | | Example 53 | | | Example 54 | | |
|---|---|---|---|---|---|---|---|---|---|---|---|
| Visible Light Absorbing Dispersion Liquid | Name of Dispersion Liquid | | R1 | Y1 | B1 | R1 | Y1 | B1 | R1 | Y1 | B1 |
| | Visible Light Absorbing Pigment | Kind | VP-1 | VP-3 | VP-5 | VP-1 | VP-3 | VP-5 | VP-1 | VP-3 | VP-5 |
| | | Part(s) by Weight | 1 | 1 | 1 | 0.4 | 0.4 | 0.4 | 0.04 | 0.04 | 0.04 |
| | Visible Light Absorbing Derivative | Kind | VS-1 | VS-2 | VS-3 | VS-1 | VS-2 | VS-3 | VS-1 | VS-2 | VS-3 |
| | | Part(s) by Weight | 0.1 | 0.1 | 0.1 | 0.04 | 0.04 | 0.04 | 0.004 | 0.004 | 0.004 |
| | Dispersant | Kind | D-1 | D-1 | D-1 | D-1 | D-1 | D-1 | D-1 | D-1 | D-1 |
| | | Part(s) by Weight | 0.6 | 0.3 | 0.3 | 0.12 | 0.12 | 0.12 | 0.012 | 0.012 | 0.012 |
| | Solvent | Kind | S-1 | S-1 | S-1 | S-1 | S-1 | S-1 | S-1 | S-1 | S-1 |
| | | Part(s) by Weight | 4.3 | 4.6 | 4.6 | 1.84 | 1.84 | 1.84 | 0.184 | 0.184 | 0.184 |
| Visible Light Absorbing Dye | Kind | | — | — | — | — | — | — | — | — | — |
| | Part(s) by Weight | | 0 | 0 | 0 | 0 | 0 | 0 | 0 | 0 | 0 |
| Infrared Absorbing Dispersion Liquid | Name of Dispersion Liquid | | IR1 | IR2 | — | IR1 | IR2 | — | IR1 | IR2 | — |
| | Infrared Pigment | Kind | IP-1 | IP-2 | — | IP-1 | IP-2 | — | IP-1 | IP-2 | — |
| | | Maximum Absorption Wavelength | — | — | — | — | — | — | — | — | — |
| | | Part(s) by Weight | 1 | 1 | 0 | 0.4 | 0.4 | 0 | 0.04 | 0.04 | 0 |
| | Infrared Derivative | Kind | IS-1 | IS-2 | — | IS-1 | IS-2 | — | IS-1 | IS-2 | — |
| | | Part(s) by Weight | 0.2 | 0.2 | 0 | 0.08 | 0.08 | 0 | 0.008 | 0.008 | 0 |
| | Dispersant | Kind | D-1 | D-1 | — | D-1 | D-1 | — | D-1 | D-1 | — |
| | | Part(s) by Weight | 0.8 | 0.8 | 0 | 0.32 | 0.32 | 0 | 0.032 | 0.032 | 0 |
| | Solvent | Kind | S-1 | S-1 | — | S-1 | S-1 | — | S-1 | S-1 | — |
| | | Part(s) by Weight | 4 | 4 | 0 | 1.6 | 1.6 | 0 | 0.16 | 0.16 | 0 |
| Infrared Dye | Kind | | ID-2 | — | — | ID-2 | — | — | ID-2 | — | — |
| | Maximum Absorption Wavelength | | 1007 | — | — | 1007 | — | — | 1007 | — | — |
| | Part(s) by Weight | | 0.75 | 0 | 0 | 0.3 | 0 | 0 | 0.03 | 0 | 0 |
| Resin | Kind | | B-2 | — | — | B-2 | — | — | B-2 | — | — |
| | Part(s) by Weight | | 2.48 | 0 | 0 | 3.90 | 0 | 0 | 4.70 | 0 | 0 |
| Polymerizable Monomer | Kind | | M-1 | M-2 | — | M-1 | M-2 | — | M-1 | M-2 | — |
| | Part(s) by Weight | | 3.72 | 3.72 | 0 | 5.85 | 5.85 | 0 | 7.06 | 7.06 | 0 |
| Polymerization Initiator | Kind | | I-1 | — | — | I-1 | — | — | I-1 | — | — |
| | Part(s) by Weight | | 0.8 | 0 | 0 | 0.8 | 0 | 0 | 0.8 | 0 | 0 |
| Additive | Kind | | — | — | — | — | — | — | — | — | — |
| | Part(s) by Weight | | 0 | 0 | 0 | 0 | 0 | 0 | 0 | 0 | 0 |
| Polymerization Inhibitor | Kind | | In-1 | — | — | In-1 | — | — | In-1 | — | — |
| | Part(s) by Weight | | 0.003 | 0 | 0 | 0.003 | 0 | 0 | 0.003 | 0 | 0 |
| Surfactant | Kind | | Su-1 | — | — | Su-1 | — | — | Su-1 | — | — |
| | Part(s) by Weight | | 0.025 | 0 | 0 | 0.025 | 0 | 0 | 0.025 | 0 | 0 |
| Solvent | Kind | | S-1 | — | — | S-1 | — | — | S-1 | — | — |
| | Part(s) by Weight | | 58.5 | 0 | 0 | 71.28 | 0 | 0 | 79.1 | 0 | 0 |
| Total | | | 100.0 | | | 100.0 | | | 100.0 | | |
| Dielectric | | | None | | | None | | | None | | |
| Desired Thickness | | | 4 | | | 10 | | | 100 | | |
| Half-Value Wavelength | | | 1100 | | | 1100 | | | 1100 | | |
| Absorbance Ratio | | | 43.2 | | | 43.2 | | | 43.2 | | |
| Blocking Degree | | | 24.8 | | | 24.8 | | | 24.8 | | |
| Effect | External Light | | 4 | | | 4 | | | 4 | | |

TABLE 18-continued

| Name of Level | Example 52 | Example 53 | Example 54 |
| --- | --- | --- | --- |
| High Humidity Sensitivity | A | A | A |
| Angle Dependence | 4 | 4 | 4 |
| Reduction in Height | A | A | A |
| Light Fastness | 4 | 4 | 4 |

TABLE 19

| | Name of Level | | Example 55 | | | Example 56 | | | Example 57 | | |
| --- | --- | --- | --- | --- | --- | --- | --- | --- | --- | --- | --- |
| Visible Light Absorbing Dispersion Liquid | Name of Dispersion Liquid | | R1 | Y1 | B1 | R1 | Y1 | B1 | R1 | Y1 | B1 |
| | Visible Light Absorbing Pigment | Kind | VP-1 | VP-3 | VP-5 | VP-1 | VP-3 | VP-5 | VP-1 | VP-3 | VP-5 |
| | | Part(s) by Weight | 1 | 2 | 2 | 2 | 1 | 2 | 2 | 2 | 1 |
| | Visible Light Absorbing Derivative | Kind | VS-1 | VS-2 | VS-3 | VS-1 | VS-2 | VS-3 | VS-1 | VS-2 | VS-3 |
| | | Part(s) by Weight | 0.1 | 0.2 | 0.2 | 0.2 | 0.1 | 0.2 | 0.2 | 0.2 | 0.1 |
| | Dispersant | Kind | D-1 | D-1 | D-1 | D-1 | D-1 | D-1 | D-1 | D-1 | D-1 |
| | | Part(s) by Weight | 0.3 | 0.6 | 0.6 | 0.6 | 0.3 | 0.6 | 0.6 | 0.6 | 0.3 |
| | Solvent | Kind | S-1 | S-1 | S-1 | S-1 | S-1 | S-1 | S-1 | S-1 | S-1 |
| | | Part(s) by Weight | 4.6 | 9.2 | 9.2 | 9.2 | 4.6 | 9.2 | 9.2 | 9.2 | 4.6 |
| Visible Light Absorbing Dye | Kind | | — | — | — | — | — | — | — | — | — |
| | Part(s) by Weight | | 0 | 0 | 0 | 0 | 0 | 0 | 0 | 0 | 0 |
| Infrared Absorbing Dispersion Liquid | Name of Dispersion Liquid | | IR1 | IR2 | — | IR1 | IR2 | — | IR1 | IR2 | — |
| | Infrared Pigment | Kind | IP-1 | IP-2 | — | IP-1 | IP-2 | — | IP-1 | IP-2 | — |
| | | Maximum Absorption Wavelength | — | — | — | — | — | — | — | — | — |
| | | Part(s) by Weight | 2 | 2 | 0 | 2 | 2 | 0 | 2 | 2 | 0 |
| | Infrared Derivative | Kind | IS-1 | IS-2 | — | IS-1 | IS-2 | — | IS-1 | IS-2 | — |
| | | Part(s) by Weight | 0.4 | 0.4 | 0 | 0.4 | 0.4 | 0 | 0.4 | 0.4 | 0 |
| | Dispersant | Kind | D-1 | D-1 | — | D-1 | D-1 | — | D-1 | D-1 | — |
| | | Part(s) by Weight | 1.6 | 1.6 | 0 | 1.6 | 1.6 | 0 | 1.6 | 1.6 | 0 |
| | Solvent | Kind | S-1 | S-1 | — | S-1 | S-1 | — | S-1 | S-1 | — |
| | | Part(s) by Weight | 8 | 8 | 0 | 8 | 8 | 0 | 8 | 8 | 0 |
| Infrared Dye | Kind | | ID-2 | — | — | ID-2 | — | — | ID-2 | — | — |
| | Maximum Absorption Wavelength | | 1007 | — | — | 1007 | — | — | 1007 | — | — |
| | Part(s) by Weight | | 1.5 | 0 | 0 | 1.5 | 0 | 0 | 1.5 | 0 | 0 |
| Resin | Kind | | B-2 | — | — | B-2 | — | — | B-2 | — | — |
| | Part(s) by Weight | | 0.67 | 0 | 0 | 0.67 | 0 | 0 | 0.67 | 0 | 0 |
| Polymerizable Monomer | Kind | | M-1 | M-2 | — | M-1 | M-2 | — | M-1 | M-2 | — |
| | Part(s) by Weight | | 1.00 | 1.00 | 0 | 1.00 | 1.00 | 0 | 1.00 | 1.00 | 0 |
| Polymerization Initiator | Kind | | I-1 | — | — | I-1 | — | — | I-1 | — | — |
| | Part(s) by Weight | | 0.8 | 0 | 0 | 0.8 | 0 | 0 | 0.8 | 0 | 0 |
| Additive | Kind | | — | — | — | — | — | — | — | — | — |
| | Part(s) by Weight | | 0 | 0 | 0 | 0 | 0 | 0 | 0 | 0 | 0 |
| Polymerization Inhibitor | Kind | | In-1 | — | — | In-1 | — | — | In-1 | — | — |
| | Part(s) by Weight | | 0.003 | 0 | 0 | 0.003 | 0 | 0 | 0.003 | 0 | 0 |
| Surfactant | Kind | | Su-1 | — | — | Su-1 | — | — | Su-1 | — | — |
| | Part(s) by Weight | | 0.025 | 0 | 0 | 0.025 | 0 | 0 | 0.025 | 0 | 0 |
| Solvent | Kind | | S-1 | — | — | S-1 | — | — | S-1 | — | — |
| | Part(s) by Weight | | 41 | 0 | 0 | 41 | 0 | 0 | 41 | 0 | 0 |
| Total | | | 100.0 | | | 100.0 | | | 100.0 | | |
| Dielectric | | | None | | | None | | | None | | |
| Desired Thickness | | | 2 | | | 2 | | | 2 | | |
| Half-Value Wavelength | | | 1100 | | | 1100 | | | 1100 | | |
| Absorbance Ratio | | | 43.2 | | | 43.2 | | | 43.2 | | |
| Blocking Degree | | | 18.2 | | | 24.8 | | | 14.9 | | |
| Effect | External Light | | 3 | | | 4 | | | 3 | | |
| | High Humidity Sensitivity | | A | | | A | | | A | | |
| | Angle Dependence | | 4 | | | 4 | | | 4 | | |
| | Reduction in Height | | A | | | A | | | A | | |
| | Light Fastness | | 4 | | | 4 | | | 4 | | |

TABLE 20

| Name of Level | | | Example 58 | | | Example 59 | | | Example 60 | | |
|---|---|---|---|---|---|---|---|---|---|---|---|
| Visible Light Absorbing Dispersion Liquid | Name of Dispersion Liquid | | R1 | Y1 | B1 | R1 | Y1 | B1 | R1 | Y1 | B1 |
| | Visible Light Absorbing Pigment | Kind | VP-1 | VP-3 | VP-5 | VP-1 | VP-3 | VP-5 | VP-1 | VP-3 | VP-5 |
| | | Part(s) by Weight | 2 | 2 | 2 | 2 | 2 | 2 | 2 | 2 | 2 |
| | Visible Light Absorbing Derivative | Kind | VS-1 | VS-2 | VS-3 | VS-1 | VS-2 | VS-3 | VS-1 | VS-2 | VS-3 |
| | | Part(s) by Weight | 0.2 | 0.2 | 0.2 | 0.2 | 0.2 | 0.2 | 0.2 | 0.2 | 0.2 |
| | Dispersant | Kind | D-1 | D-1 | D-1 | D-1 | D-1 | D-1 | D-1 | D-1 | D-1 |
| | | Part(s) by Weight | 0.6 | 0.6 | 0.6 | 0.6 | 0.6 | 0.6 | 0.6 | 0.6 | 0.6 |
| | Solvent | Kind | S-1 | S-1 | S-1 | S-1 | S-1 | S-1 | S-1 | S-1 | S-1 |
| | | Part(s) by Weight | 9.2 | 9.2 | 9.2 | 9.2 | 9.2 | 9.2 | 9.2 | 9.2 | 9.2 |
| Visible Light Absorbing Dye | | Kind | — | — | — | — | — | — | — | — | — |
| | | Part(s) by Weight | 0 | 0 | 0 | 0 | 0 | 0 | 0 | 0 | 0 |
| Infrared Absorbing Dispersion Liquid | Name of Dispersion Liquid | | IR1 | IR2 | — | IR1 | IR2 | — | IR1 | IR2 | — |
| | Infrared Pigment | Kind | IP-1 | IP-2 | — | IP-1 | IP-2 | — | IP-1 | IP-2 | — |
| | | Maximum Absorption Wavelength | — | — | — | — | — | — | — | — | — |
| | | Part(s) by Weight | 1 | 2 | 0 | 2 | 1 | 0 | 2 | 2 | 0 |
| | Infrared Derivative | Kind | IS-1 | IS-2 | — | IS-1 | IS-2 | — | IS-1 | IS-2 | — |
| | | Part(s) by Weight | 0.2 | 0.4 | 0 | 0.4 | 0.2 | 0 | 0.4 | 0.4 | 0 |
| | Dispersant | Kind | D-1 | D-1 | — | D-1 | D-1 | — | D-1 | D-1 | — |
| | | Part(s) by Weight | 0.8 | 1.6 | 0 | 1.6 | 0.8 | 0 | 1.6 | 1.6 | 0 |
| | Solvent | Kind | S-1 | S-1 | — | S-1 | S-1 | — | S-1 | S-1 | — |
| | | Part(s) by Weight | 4 | 8 | 0 | 8 | 4 | 0 | 8 | 8 | 0 |
| Infrared Dye | | Kind | ID-2 | — | — | ID-2 | — | — | ID-2 | — | — |
| | | Maximum Absorption Wavelength | 1007 | — | — | 1007 | — | — | 1007 | — | — |
| | | Part(s) by Weight | 1.5 | 0 | 0 | 1.5 | 0 | 0 | 0.75 | 0 | 0 |
| Resin | | Kind | B-2 | — | — | B-2 | — | — | B-2 | — | — |
| | | Part(s) by Weight | 0.82 | 0 | 0 | 0.82 | 0 | 0 | 0.51 | 0 | 0 |
| Polymerizable Monomer | | Kind | M-1 | M-2 | — | M-1 | M-2 | — | M-1 | M-2 | — |
| | | Part(s) by Weight | 1.23 | 1.23 | 0 | 1.23 | 1.23 | 0 | 0.76 | 0.76 | 0 |
| Polymerization Initiator | | Kind | I-1 | — | — | I-1 | — | — | I-1 | — | — |
| | | Part(s) by Weight | 0.8 | 0 | 0 | 0.8 | 0 | 0 | 0.8 | 0 | 0 |
| Additive | | Kind | — | — | — | — | — | — | — | — | — |
| | | Part(s) by Weight | 0 | 0 | 0 | 0 | 0 | 0 | 0 | 0 | 0 |
| Polymerization Inhibitor | | Kind | In-1 | — | — | In-1 | — | — | In-1 | — | — |
| | | Part(s) by Weight | 0.003 | 0 | 0 | 0.003 | 0 | 0 | 0.003 | 0 | 0 |
| Surfactant | | Kind | Su-1 | — | — | Su-1 | — | — | Su-1 | — | — |
| | | Part(s) by Weight | 0.025 | 0 | 0 | 0.025 | 0 | 0 | 0.025 | 0 | 0 |
| Solvent | | Kind | S-1 | — | — | S-1 | — | — | S-1 | — | — |
| | | Part(s) by Weight | 40.4 | 0 | 0 | 40.4 | 0 | 0 | 36.4 | 0 | 0 |
| Total | | | 100.0 | | | 100.0 | | | 100.0 | | |
| Dielectric | | | None | | | None | | | None | | |
| Desired Thickness | | | 2 | | | 2 | | | 2 | | |
| Half-Value Wavelength | | | 1100 | | | 1100 | | | 1085 | | |
| Absorbance Ratio | | | 43.2 | | | 43.2 | | | 12.6 | | |
| Blocking Degree | | | 22.7 | | | 17.9 | | | 12.6 | | |
| Effect | External Light | | 4 | | | 3 | | | 3 | | |
| | High Humidity Sensitivity | | A | | | A | | | A | | |
| | Angle Dependence | | 4 | | | 4 | | | 4 | | |
| | Reduction in Height | | A | | | A | | | A | | |
| | Light Fastness | | 4 | | | 4 | | | 4 | | |

TABLE 21

| Name of Level | | | Example 61 | | | Example 62 | | | Example 63 | | |
|---|---|---|---|---|---|---|---|---|---|---|---|
| Visible Light Absorbing Dispersion Liquid | Name of Dispersion Liquid | | R1 | Y1 | B1 | R1 | Y1 | B1 | R1 | Y1 | B1 |
| | Visible Light Absorbing Pigment | Kind | VP-1 | VP-3 | VP-5 | VP-1 | VP-3 | VP-5 | VP-1 | VP-3 | VP-5 |
| | | Part(s) by Weight | 2 | 2 | 2 | 2 | 2 | 2 | 2 | 2 | 2 |
| | Visible Light Absorbing Derivative | Kind | VS-1 | VS-2 | VS-3 | VS-1 | VS-2 | VS-3 | VS-1 | VS-2 | VS-3 |
| | | Part(s) by Weight | 0.2 | 0.2 | 0.2 | 0.2 | 0.2 | 0.2 | 0.2 | 0.2 | 0.2 |
| | Dispersant | Kind | D-1 | D-1 | D-1 | D-1 | D-1 | D-1 | D-1 | D-1 | D-1 |
| | | Part(s) by Weight | 0.6 | 0.6 | 0.6 | 0.6 | 0.6 | 0.6 | 0.6 | 0.6 | 0.6 |
| | Solvent | Kind | S-1 | S-1 | S-1 | S-1 | S-1 | S-1 | S-1 | S-1 | S-1 |
| | | Part(s) by Weight | 9.2 | 9.2 | 9.2 | 9.2 | 9.2 | 9.2 | 9.2 | 9.2 | 9.2 |
| Visible Light Absorbing Dye | | Kind | — | — | — | — | — | — | — | — | — |
| | | Part(s) by Weight | 0 | 0 | 0 | 0 | 0 | 0 | 0 | 0 | 0 |

TABLE 21-continued

| Name of Level | | | Example 61 | | | Example 62 | | | Example 63 | | |
|---|---|---|---|---|---|---|---|---|---|---|---|
| Infrared Absorbing Dispersion Liquid | Name of Dispersion Liquid | | IR1 | IR2 | — | IR1 | IR2 | — | IR1 | IR2 | — |
| | Infrared Pigment | Kind | IP-1 | IP-2 | — | IP-1 | IP-2 | — | IP-1 | IP-2 | — |
| | | Maximum Absorption Wavelength | — | — | — | — | — | — | — | — | — |
| | | Part(s) by Weight | 2 | 2 | 0 | 2 | 2 | 0 | 2 | 2 | 0 |
| | Infrared Derivative | Kind | IS-1 | IS-2 | — | IS-1 | IS-2 | — | IS-1 | IS-2 | — |
| | | Part(s) by Weight | 0.4 | 0.4 | 0 | 0.4 | 0.4 | 0 | 0.4 | 0.4 | 0 |
| | Dispersant | Kind | D-1 | D-1 | — | D-1 | D-1 | — | D-1 | D-1 | — |
| | | Part(s) by Weight | 1.6 | 1.6 | 0 | 1.6 | 1.6 | 0 | 1.6 | 1.6 | 0 |
| | Solvent | Kind | S-1 | S-1 | — | S-1 | S-1 | — | S-1 | S-1 | — |
| | | Part(s) by Weight | 8 | 8 | 0 | 8 | 8 | 0 | 8 | 8 | 0 |
| Infrared Dye | | Kind | ID-2 | — | — | ID-2 | — | — | ID-2 | — | — |
| | | Maximum Absorption Wavelength | 1007 | — | — | 1007 | — | — | 1007 | — | — |
| | | Part(s) by Weight | 1.5 | 0 | 0 | 1.5 | 0 | 0 | 1.5 | 0 | 0 |
| Resin | | Kind | B-2 | — | — | B-2 | — | — | B-2 | — | — |
| | | Part(s) by Weight | 0.13 | 0 | 0 | 0.64 | 0 | 0 | 0.22 | 0 | 0 |
| Polymerizable Monomer | | Kind | M-1 | M-2 | — | M-1 | M-2 | — | M-1 | M-2 | — |
| | | Part(s) by Weight | 0.57 | 0.57 | 0 | 0.32 | 0.32 | 0 | 0.33 | 0.33 | 0 |
| Polymerization Initiator | | Kind | I-1 | — | — | I-1 | — | — | I-1 | — | — |
| | | Part(s) by Weight | 0.8 | 0 | 0 | 0.8 | 0 | 0 | 1.2 | 0 | 0 |
| Additive | | Kind | — | — | — | — | — | — | — | — | — |
| | | Part(s) by Weight | 0 | 0 | 0 | 0 | 0 | 0 | 0 | 0 | 0 |
| Polymerization Inhibitor | | Kind | In-1 | — | — | In-1 | — | — | In-1 | — | — |
| | | Part(s) by Weight | 0.003 | 0 | 0 | 0.003 | 0 | 0 | 0.003 | 0 | 0 |
| Surfactant | | Kind | Su-1 | — | — | Su-1 | — | — | Su-1 | — | — |
| | | Part(s) by Weight | 0.025 | 0 | 0 | 0.025 | 0 | 0 | 0.025 | 0 | 0 |
| Solvent | | Kind | S-1 | — | — | S-1 | — | — | S-1 | — | — |
| | | Part(s) by Weight | 36.4 | 0 | 0 | 36.4 | 0 | 0 | 36.4 | 0 | 0 |
| Total | | | 100.0 | | | 100.0 | | | 100.0 | | |
| Dielectric | | | None | | | None | | | None | | |
| Desired Thickness | | | 2 | | | 2 | | | 2 | | |
| Half-Value Wavelength | | | 1100 | | | 1100 | | | 1100 | | |
| Absorbance Ratio | | | 43.2 | | | 43.2 | | | 43.2 | | |
| Blocking Degree | | | 24.8 | | | 24.8 | | | 24.8 | | |
| Effect | External Light | | 4 | | | 4 | | | 4 | | |
| | High Humidity Sensitivity | | A | | | A | | | A | | |
| | Angle Dependence | | 4 | | | 4 | | | 4 | | |
| | Reduction in Height | | A | | | A | | | A | | |
| | Light Fastness | | 4 | | | 4 | | | 4 | | |

TABLE 22

| Name of Level | | | Example 64 | | | Example 65 | | | Example 66 | | |
|---|---|---|---|---|---|---|---|---|---|---|---|
| Visible Light Absorbing Dispersion Liquid | Name of Dispersion Liquid | | R1 | Y1 | B1 | R1 | Y1 | B1 | R1 | Y1 | B1 |
| | Visible Light Absorbing Pigment | Kind | VP-1 | VP-3 | VP-5 | VP-1 | VP-3 | VP-5 | VP-1 | VP-3 | VP-5 |
| | | Part(s) by Weight | 2 | 2 | 2 | 2 | 2 | 2 | 2 | 2 | 2 |
| | Visible Light Absorbing Derivative | Kind | VS-1 | VS-2 | VS-3 | VS-1 | VS-2 | VS-3 | VS-1 | VS-2 | VS-3 |
| | | Part(s) by Weight | 0.2 | 0.2 | 0.2 | 0.2 | 0.2 | 0.2 | 0.2 | 0.2 | 0.2 |
| | Dispersant | Kind | D-1 | D-1 | D-1 | D-1 | D-1 | D-1 | D-1 | D-1 | D-1 |
| | | Part(s) by Weight | 0.6 | 0.6 | 0.6 | 1 | 1 | 1 | 0.2 | 0.2 | 0.2 |
| | Solvent | Kind | S-1 | S-1 | S-1 | S-1 | S-1 | S-1 | S-1 | S-1 | S-1 |
| | | Part(s) by Weight | 9.2 | 9.2 | 9.2 | 8.8 | 8.8 | 8.8 | 9.6 | 9.6 | 9.6 |
| Visible Light Absorbing Dye | | Kind | — | — | — | — | — | — | — | — | — |
| | | Part(s) by Weight | 0 | 0 | 0 | 0 | 0 | 0 | 0 | 0 | 0 |
| Infrared Absorbing Dispersion Liquid | Name of Dispersion Liquid | | IR1 | IR2 | — | IR1 | IR2 | — | IR1 | IR2 | — |
| | Infrared Pigment | Kind | IP-1 | IP-2 | — | IP-1 | IP-2 | — | IP-1 | IP-2 | — |
| | | Maximum Absorption Wavelength | — | — | — | — | — | — | — | — | — |
| | | Part(s) by Weight | 2 | 2 | 0 | 2 | 2 | 0 | 2 | 2 | 0 |
| | Infrared Derivative | Kind | IS-1 | IS-2 | — | IS-1 | IS-2 | — | IS-1 | IS-2 | — |
| | | Part(s) by Weight | 0.4 | 0.4 | 0 | 0.4 | 0.4 | 0 | 0.4 | 0.4 | 0 |
| | Dispersant | Kind | D-1 | D-1 | — | D-1 | D-1 | — | D-1 | D-1 | — |
| | | Part(s) by Weight | 1.6 | 1.6 | 0 | 1.6 | 1.6 | 0 | 1.6 | 1.6 | 0 |
| | Solvent | Kind | S-1 | S-1 | — | S-1 | S-1 | — | S-1 | S-1 | — |
| | | Part(s) by Weight | 8 | 8 | 0 | 8 | 8 | 0 | 8 | 8 | 0 |

TABLE 22-continued

| Name of Level | | Example 64 | | | Example 65 | | | Example 66 | | |
|---|---|---|---|---|---|---|---|---|---|---|
| Infrared Dye | Kind | ID-2 | — | — | ID-2 | — | — | ID-2 | — | — |
| | Maximum Absorption Wavelength | 1007 | — | — | 1007 | — | — | 1007 | — | — |
| | Part(s) by Weight | 1.5 | 0 | 0 | 1.5 | 0 | 0 | 1.5 | 0 | 0 |
| Resin | Kind | B-2 | — | — | B-2 | — | — | B-2 | — | — |
| | Part(s) by Weight | 0.42 | 0 | 0 | 0.01 | 0 | 0 | 0.62 | 0 | 0 |
| Polymerizable Monomer | Kind | M-1 | M-2 | — | M-1 | M-2 | — | M-1 | M-2 | — |
| | Part(s) by Weight | 0.63 | 0.63 | 0 | 0.03 | 0.03 | 0 | 0.93 | 0.93 | 0 |
| Polymerization Initiator | Kind | I-1 | — | — | I-1 | — | — | I-1 | — | — |
| | Part(s) by Weight | 0.4 | 0 | 0 | 0.8 | 0 | 0 | 0.8 | 0 | 0 |
| Additive | Kind | — | — | — | — | — | — | — | — | — |
| | Part(s) by Weight | 0 | 0 | 0 | 0 | 0 | 0 | 0 | 0 | 0 |
| Polymerization Inhibitor | Kind | In-1 | — | — | In-1 | — | — | In-1 | — | — |
| | Part(s) by Weight | 0.003 | 0 | 0 | 0.003 | 0 | 0 | 0.003 | 0 | 0 |
| Surfactant | Kind | Su-1 | — | — | Su-1 | — | — | Su-1 | — | — |
| | Part(s) by Weight | 0.025 | 0 | 0 | 0.025 | 0 | 0 | 0.025 | 0 | 0 |
| Solvent | Kind | S-1 | — | — | S-1 | — | — | S-1 | — | — |
| | Part(s) by Weight | 36.4 | 0 | 0 | 37.6 | 0 | 0 | 35.2 | 0 | 0 |
| Total | | 100.0 | | | 100.0 | | | 100.0 | | |
| Dielectric | | None | | | None | | | None | | |
| Desired Thickness | | 2 | | | 2 | | | 2 | | |
| Half-Value Wavelength | | 1100 | | | 1100 | | | 1100 | | |
| Absorbance Ratio | | 43.2 | | | 43.2 | | | 43.2 | | |
| Blocking Degree | | 24.8 | | | 24.8 | | | 24.8 | | |
| Effect | External Light | 4 | | | 4 | | | 4 | | |
| | High Humidity Sensitivity | A | | | A | | | A | | |
| | Angle Dependence | 4 | | | 4 | | | 4 | | |
| | Reduction in Height | A | | | A | | | A | | |
| | Light Fastness | 4 | | | 4 | | | 4 | | |

TABLE 23

| Name of Level | | | Example 67 | | | Example 68 | | |
|---|---|---|---|---|---|---|---|---|
| Visible Light Absorbing Dispersion Liquid | Name of Dispersion Liquid | | R1 | Y1 | B1 | R1 | Y1 | B1 |
| | Visible Light Absorbing Pigment | Kind | VP-1 | VP-3 | VP-5 | VP-1 | VP-3 | VP-5 |
| | | Part(s) by Weight | 2 | 2 | 2 | 2 | 2 | 2 |
| | Visible Light Absorbing Derivative | Kind | VS-1 | VS-2 | VS-3 | VS-1 | VS-2 | VS-3 |
| | | Part(s) by Weight | 0.2 | 0.2 | 0.2 | 0.2 | 0.2 | 0.2 |
| | Dispersant | Kind | D-1 | D-1 | D-1 | D-1 | D-1 | D-1 |
| | | Part(s) by Weight | 0.6 | 0.6 | 0.6 | 0.6 | 0.6 | 0.6 |
| | Solvent | Kind | S-1 | S-1 | S-1 | S-1 | S-1 | S-1 |
| | | Part(s) by Weight | 9.2 | 9.2 | 9.2 | 9.2 | 9.2 | 9.2 |
| Visible Light Absorbing Dye | Kind | | — | — | — | — | — | — |
| | Part(s) by Weight | | 0 | 0 | 0 | 0 | 0 | 0 |
| Infrared Absorbing Dispersion Liquid | Name of Dispersion Liquid | | IR1 | IR2 | — | IR1 | IR2 | — |
| | Infrared Pigment | Kind | IP-1 | IP-2 | — | IP-1 | IP-2 | — |
| | | Maximum Absorption Wavelength | — | — | — | — | — | — |
| | | Part(s) by Weight | 2 | 2 | 0 | 2 | 2 | 0 |
| | Infrared Derivative | Kind | IS-1 | IS-2 | — | IS-1 | IS-2 | — |
| | | Part(s) by Weight | 0.4 | 0.4 | 0 | 0.4 | 0.4 | 0 |
| | Dispersant | Kind | D-1 | D-1 | — | D-1 | D-1 | — |
| | | Part(s) by Weight | 2.4 | 2.4 | 0 | 0.4 | 0.4 | 0 |
| | Solvent | Kind | S-1 | S-1 | — | S-1 | S-1 | — |
| | | Part(s) by Weight | 7.2 | 7.2 | 0 | 9.2 | 9.2 | 0 |
| Infrared Dye | Kind | | ID-2 | — | — | ID-2 | — | — |
| | Maximum Absorption Wavelength | | 1007 | — | — | 1007 | — | — |
| | Part(s) by Weight | | 1.5 | 0 | 0 | 1.5 | 0 | 0 |
| Resin | Kind | | B-2 | — | — | B-2 | — | — |
| | Part(s) by Weight | | 0.92 | 0 | 0 | 0.92 | 0 | 0 |
| Polymerizable Monomer | Kind | | M-1 | M-2 | — | M-1 | M-2 | — |
| | Part(s) by Weight | | 1.38 | 1.38 | 0 | 1.38 | 1.38 | 0 |
| Polymerization Initiator | Kind | | I-1 | — | — | I-1 | — | — |
| | Part(s) by Weight | | 0.8 | 0 | 0 | 0.8 | 0 | 0 |
| Additive | Kind | | — | — | — | — | — | — |
| | Part(s) by Weight | | 0 | 0 | 0 | 0 | 0 | 0 |

TABLE 23-continued

| Name of Level | | Example 67 | | | Example 68 | | |
|---|---|---|---|---|---|---|---|
| Polymerization Inhibitor | Kind | In-1 | — | — | In-1 | — | — |
| | Part(s) by Weight | 0.003 | 0 | 0 | 0.003 | 0 | 0 |
| Surfactant | Kind | Su-1 | — | — | Su-1 | — | — |
| | Part(s) by Weight | 0.025 | 0 | 0 | 0.025 | 0 | 0 |
| Solvent | Kind | S-1 | — | — | S-1 | — | — |
| | Part(s) by Weight | 34 | 0 | 0 | 34 | 0 | 0 |
| Total | | 100.0 | | | 100.0 | | |
| Dielectric | | None | | | None | | |
| Desired Thickness | | 2 | | | 2 | | |
| Half-Value Wavelength | | 1100 | | | 1100 | | |
| Absorbance Ratio | | 43.2 | | | 43.2 | | |
| Blocking Degree | | 24.8 | | | 24.8 | | |
| Effect | External Light | 4 | | | 4 | | |
| | High Humidity Sensitivity | A | | | A | | |
| | Angle Dependence | 4 | | | 4 | | |
| | Reduction in Height | A | | | A | | |
| | Light Fastness | 4 | | | 4 | | |

TABLE 24

| Name of Level | | | Example 69 | | | Example 70 | | | Example 71 | | |
|---|---|---|---|---|---|---|---|---|---|---|---|
| Visible Light Absorbing Dispersion Liquid | Name of Dispersion Liquid | | — | — | — | — | — | — | — | — | — |
| | Visible Light Absorbing Pigment | Kind | — | — | — | — | — | — | — | — | — |
| | | Part(s) by Weight | 0 | 0 | 0 | 0 | 0 | 0 | 0 | 0 | 0 |
| | Visible Light Absorbing Derivative | Kind | — | — | — | — | — | — | — | — | — |
| | | Part(s) by Weight | 0 | 0 | 0 | 0 | 0 | 0 | 0 | 0 | 0 |
| | Dispersant | Kind | — | — | — | — | — | — | — | — | — |
| | | Part(s) by Weight | 0 | 0 | 0 | 0 | 0 | 0 | 0 | 0 | 0 |
| | Solvent | Kind | — | — | — | — | — | — | — | — | — |
| | | Part(s) by Weight | 0 | 0 | 0 | 0 | 0 | 0 | 0 | 0 | 0 |
| Visible Light Absorbing Dye | Kind | | VD-1 | — | — | VD-1 | — | — | VD-1 | — | — |
| | Part(s) by Weight | | 6 | 0 | 0 | 6 | 0 | 0 | 6 | 0 | 0 |
| Infrared Absorbing Dispersion Liquid | Name of Dispersion Liquid | | — | — | — | — | — | — | — | — | — |
| | Infrared Pigment | Kind | — | — | — | — | — | — | — | — | — |
| | | Maximum Absorption Wavelength | — | — | — | — | — | — | — | — | — |
| | | Part(s) by Weight | 0 | 0 | 0 | 0 | 0 | 0 | 0 | 0 | 0 |
| | Infrared Derivative | Kind | — | — | — | — | — | — | — | — | — |
| | | Part(s) by Weight | 0 | 0 | 0 | 0 | 0 | 0 | 0 | 0 | 0 |
| | Dispersant | Kind | — | — | — | — | — | — | — | — | — |
| | | Part(s) by Weight | 0 | 0 | 0 | 0 | 0 | 0 | 0 | 0 | 0 |
| | Solvent | Kind | — | — | — | — | — | — | — | — | — |
| | | Part(s) by Weight | 0 | 0 | 0 | 0 | 0 | 0 | 0 | 0 | 0 |
| Infrared Dye | Kind | | ID-1 | ID-2 | ID-7 | ID-1 | ID-2 | ID-7 | ID-1 | ID-2 | ID-7 |
| | Maximum Absorption Wavelength | | — | 1007 | — | — | 1007 | — | — | 1007 | — |
| | Part(s) by Weight | | 2 | 1.5 | 2 | 2 | 1.5 | 2 | 2 | 1.5 | 2 |
| Resin | Kind | | B-3 | — | — | B-4 | — | — | B-5 | — | — |
| | Part(s) by Weight | | 2.08 | 0 | 0 | 2.08 | 0 | 0 | 2.08 | 0 | 0 |
| Polymerizable Monomer | Kind | | — | — | — | — | — | — | — | — | — |
| | Part(s) by Weight | | 0 | 0 | 0 | 0 | 0 | 0 | 0 | 0 | 0 |
| Polymerization Initiator | Kind | | — | — | — | — | — | — | — | — | — |
| | Part(s) by Weight | | 0 | 0 | 0 | 0 | 0 | 0 | 0 | 0 | 0 |
| Additive | Kind | | — | — | — | — | — | — | — | — | — |
| | Part(s) by Weight | | 0 | 0 | 0 | 0 | 0 | 0 | 0 | 0 | 0 |
| Polymerization Inhibitor | Kind | | — | — | — | — | — | — | — | — | — |
| | Part(s) by Weight | | 0 | 0 | 0 | 0 | 0 | 0 | 0 | 0 | 0 |
| Surfactant | Kind | | Su-2 | — | — | Su-2 | — | — | Su-2 | — | — |
| | Part(s) by Weight | | 0.025 | 0 | 0 | 0.025 | 0 | 0 | 0.025 | 0 | 0 |
| Solvent | Kind | | S-4 | — | — | S-4 | — | — | S-4 | — | — |
| | Part(s) by Weight | | 86.4 | 0 | 0 | 86.4 | 0 | 0 | 86.4 | 0 | 0 |
| Total | | | 100.0 | | | 100.0 | | | 100.0 | | |
| Dielectric | | | None | | | None | | | None | | |
| Desired Thickness | | | 2 | | | 2 | | | 2 | | |
| Half-Value Wavelength | | | 1100 | | | 1100 | | | 1100 | | |
| Absorbance Ratio | | | 43.2 | | | 43.2 | | | 43.2 | | |
| Blocking Degree | | | 24.8 | | | 24.8 | | | 24.8 | | |
| Effect | External Light | | 4 | | | 4 | | | 4 | | |

TABLE 24-continued

| Name of Level | Example 69 | Example 70 | Example 71 |
| --- | --- | --- | --- |
| High Humidity Sensitivity | A | A | A |
| Angle Dependence | 4 | 4 | 4 |
| Reduction in Height | A | A | A |
| Light Fastness | 4 | 4 | 4 |

TABLE 25

| | | | Example 72 | | | Example 73 | | | |
| --- | --- | --- | --- | --- | --- | --- | --- | --- | --- |
| | Name of Level | | | | | | | | |
| Visible Light Absorbing Dispersion Liquid | Name of Dispersion Liquid | | R1 | Y1 | B1 | RYBV1 | | | |
| | Visible Light Absorbing Pigment | Kind | VP-1 | VP-3 | VP-5 | VP-1 | VP-3 | VP-5 | VP-7 |
| | | Part(s) by Weight | 2 | 2 | 2 | 1 | 2 | 2 | 1 |
| | Visible Light Absorbing Derivative | Kind | VS-4 | VS-5 | VS-6 | VS-4 | VS-5 | VS-6 | VS-6 |
| | | Part(s) by Weight | 0.2 | 0.2 | 0.2 | 0.1 | 0.2 | 0.2 | 0.1 |
| | Dispersant | Kind | D-2 | D-2 | D-2 | D-2 | | | |
| | | Part(s) by Weight | 0.6 | 0.6 | 0.6 | 1.8 | | | |
| | Solvent | Kind | S-1 | S-1 | S-1 | S-1 | | | |
| | | Part(s) by Weight | 9.2 | 9.2 | 9.2 | 27.6 | | | |
| Visible Light Absorbing Dye | Kind | | — | — | — | — | — | — | — |
| | Part(s) by Weight | | 0 | 0 | 0 | 0 | 0 | 0 | 0 |
| Infrared Absorbing Dispersion Liquid | Name of Dispersion Liquid | | IR1 | IR2 | — | IR1 | IR2 | — | — |
| | Infrared Pigment | Kind | IP-1 | IP-2 | — | IP-1 | IP-2 | — | — |
| | | Maximum Absorption Wavelength | — | — | — | — | — | — | — |
| | | Part(s) by Weight | 2 | 2 | 0 | 2 | 2 | 0 | 0 |
| | Infrared Derivative | Kind | IS-4 | IS-4 | — | IS-4 | IS-4 | — | — |
| | | Part(s) by Weight | 0.4 | 0.4 | 0 | 0.4 | 0.4 | 0 | 0 |
| | Dispersant | Kind | D-2 | D-2 | — | D-2 | D-2 | — | — |
| | | Part(s) by Weight | 1.6 | 1.6 | 0 | 1.6 | 1.6 | 0 | 0 |
| | Solvent | Kind | S-1 | S-1 | — | S-1 | S-1 | — | — |
| | | Part(s) by Weight | 8 | 8 | 0 | 8 | 8 | 0 | 0 |
| Infrared Dye | Kind | | ID-2 | — | — | ID-2 | — | — | — |
| | Maximum Absorption Wavelength | | 1007 | — | — | 1007 | — | — | — |
| | Part(s) by Weight | | 1.5 | 0 | 0 | 1.5 | 0 | 0 | 0 |
| Resin | Kind | | B-2 | — | — | B-2 | — | — | — |
| | Part(s) by Weight | | 0.32 | 0 | 0 | 0.32 | 0 | 0 | 0 |
| Polymerizable Monomer | Kind | | M-1 | M-2 | — | M-1 | M-2 | — | — |
| | Part(s) by Weight | | 0.48 | 0.48 | 0 | 0.48 | 0.48 | 0 | 0 |
| Polymerization Initiator | Kind | | I-1 | — | — | I-1 | — | — | — |
| | Part(s) by Weight | | 0.8 | 0 | 0 | 0.8 | 0 | 0 | 0 |
| Additive | Kind | | — | — | — | — | — | — | — |
| | Part(s) by Weight | | 0 | 0 | 0 | 0 | 0 | 0 | 0 |
| Polymerization Inhibitor | Kind | | In-1 | — | — | In-1 | — | — | — |
| | Part(s) by Weight | | 0.003 | 0 | 0 | 0.003 | 0 | 0 | 0 |
| Surfactant | Kind | | Su-1 | — | — | Su-1 | — | — | — |
| | Part(s) by Weight | | 0.025 | 0 | 0 | 0.025 | 0 | 0 | 0 |
| Solvent | Kind | | S-1 | — | — | S-1 | — | — | — |
| | Part(s) by Weight | | 36.4 | 0 | 0 | 36.4 | 0 | 0 | 0 |
| Total | | | | 100.0 | | | 100.0 | | |
| Dielectric | | | | None | | | None | | |
| Desired Thickness | | | | 2 | | | 2 | | |
| Half-Value Wavelength | | | | 1100 | | | 1100 | | |
| Absorbance Ratio | | | | 43.2 | | | 43.2 | | |
| Blocking Degree | | | | 24.8 | | | 24.8 | | |
| Effect | External Light | | | 4 | | | 4 | | |
| | High Humidity Sensitivity | | | A | | | A | | |
| | Angle Dependence | | | 4 | | | 4 | | |
| | Reduction in Height | | | A | | | A | | |
| | Light Fastness | | | 4 | | | 4 | | |

TABLE 26

| | Name of Level | | Example 74 | | | Example 75 | | | Example 76 | | |
|---|---|---|---|---|---|---|---|---|---|---|---|
| Visible Light Absorbing Dispersion Liquid | Name of Dispersion Liquid | | RBYIR1 | | | Bk-3 | — | | R1 | Y1 | B1 |
| | Visible Light Absorbing Pigment | Kind | VP-1 | VP-3 | VP-5 | VP-10 | — | | VP-1 | VP-3 | VP-5 |
| | | Part(s) by Weight | 2 | 2 | 2 | 6 | 0 | | 2 | 2 | 2 |
| | Visible Light Absorbing Derivative | Kind | VS-1 | VS-2 | VS-3 | — | — | | VS-1 | VS-2 | VS-3 |
| | | Part(s) by Weight | 0.2 | 0.2 | 0.2 | 0 | 0 | | 0.2 | 0.2 | 0.2 |
| | Dispersant | Kind | — | — | — | D-1 | — | | D-1 | D-1 | D-1 |
| | | Part(s) by Weight | 0 | 0 | 0 | 1.8 | 0 | | 0.6 | 0.6 | 0.6 |
| | Solvent | Kind | — | — | — | S-1 | — | | S-1 | S-1 | S-1 |
| | | Part(s) by Weight | 0 | 0 | 0 | 28.2 | 0 | | 9.2 | 9.2 | 9.2 |
| Visible Light Absorbing Dye | | Kind | — | — | — | — | — | | — | — | — |
| | | Part(s) by Weight | 0 | 0 | 0 | 0 | 0 | | 0 | 0 | 0 |
| Infrared Absorbing Dispersion Liquid | Name of Dispersion Liquid | | — | IR1 | IR2 | IR1 | IR2 | | IR1 | IR2 | — |
| | Infrared Pigment | Kind | — | IP-1 | IP-2 | IP-1 | IP-2 | | IP-1 | IP-2 | — |
| | | Maximum Absorption Wavelength | — | — | — | — | — | | — | — | — |
| | | Part(s) by Weight | 0 | 2 | 2 | 2 | 2 | | 2 | 2 | 0 |
| | Infrared Derivative | Kind | — | IS-1 | IS-2 | IS-1 | IS-2 | | IS-1 | IS-2 | — |
| | | Part(s) by Weight | 0 | 0.4 | 0.4 | 0.4 | 0.4 | | 0.4 | 0.4 | 0 |
| | Dispersant | Kind | D-1 | | | D-1 | D-1 | | D-1 | D-1 | — |
| | | Part(s) by Weight | 6 | | | 1.6 | 1.6 | | 1.6 | 1.6 | 0 |
| | Solvent | Kind | S-1 | | | S-1 | S-1 | | S-1 | S-1 | — |
| | | Part(s) by Weight | 32.6 | | | 8 | 8 | | 8 | 8 | 0 |
| Infrared Dye | | Kind | ID-2 | — | — | ID-2 | — | | ID-2 | — | — |
| | | Maximum Absorption Wavelength | 1007 | — | — | 1007 | — | | 1007 | — | — |
| | | Part(s) by Weight | 1.5 | 0 | 0 | 1.5 | 0 | | 1.5 | 0 | 0 |
| Resin | | Kind | B-2 | — | — | B-2 | — | | B-2 | — | — |
| | | Part(s) by Weight | 0.07 | 0 | 0 | 0.47 | 0 | | 0.32 | 0 | 0 |
| Polymerizable Monomer | | Kind | M-1 | M-2 | — | M-1 | M-2 | | M-1 | M-2 | — |
| | | Part(s) by Weight | 0.10 | 0.66 | 0 | 0.70 | 0.70 | | 0.48 | 0.48 | 0 |
| Polymerization Initiator | | Kind | I-1 | — | — | I-1 | — | | I-1 | — | — |
| | | Part(s) by Weight | 0.8 | 0 | 0 | 0.8 | 0 | | 0.8 | 0 | 0 |
| Additive | | Kind | — | — | — | — | — | | — | — | — |
| | | Part(s) by Weight | 0 | 0 | 0 | 0 | 0 | | 0 | 0 | 0 |
| Polymerization Inhibitor | | Kind | In-1 | — | — | In-1 | — | | In-1 | — | — |
| | | Part(s) by Weight | 0.003 | 0 | 0 | 0.003 | 0 | | 0.003 | 0 | 0 |
| Surfactant | | Kind | Su-1 | — | — | Su-1 | — | | Su-1 | — | — |
| | | Part(s) by Weight | 0.025 | 0 | 0 | 0.025 | 0 | | 0.025 | 0 | 0 |
| Solvent | | Kind | S-1 | — | — | S-1 | — | | S-1 | — | — |
| | | Part(s) by Weight | 46.7 | 0 | 0 | 35.8 | 0 | | 36.4 | 0 | 0 |
| Total | | | 100.0 | | | 100.0 | | | 100.0 | | |
| Dielectric | | | None | | | None | | | None | | |
| Desired Thickness | | | 2 | | | 2 | | | 2 | | |
| Half-Value Wavelength | | | 1100 | | | 1100 | | | 1100 | | |
| Absorbance Ratio | | | 43.2 | | | 12.5 | | | 43.2 | | |
| Blocking Degree | | | 24.8 | | | 12.5 | | | 24.8 | | |
| Effect | External Light | | 4 | | | 3 | | | 5 | | |
| | High Humidity Sensitivity | | A | | | A | | | A | | |
| | Angle Dependence | | 4 | | | A | | | 4 | | |
| | Reduction in Height | | A | | | A | | | A | | |
| | Light Fastness | | 4 | | | 4 | | | 4 | | |

TABLE 27

| | Name of Level | | Example 77 | | Example 78 | | | Example 79 | | |
|---|---|---|---|---|---|---|---|---|---|---|
| Visible Light Absorbing Dispersion Liquid | Name of Dispersion Liquid | | — | — | R1 | Y1 | B1 | R1 | Y1 | B1 |
| | Visible Light Absorbing Pigment | Kind | — | — | VP-1 | VP-3 | VP-5 | VP-1 | VP-3 | VP-5 |
| | | Part(s) by Weight | 0 | 0 | 2 | 2 | 2 | 2 | 2 | 2 |
| | Visible Light Absorbing Derivative | Kind | — | — | VS-1 | VS-2 | VS-3 | VS-1 | VS-2 | VS-3 |
| | | Part(s) by Weight | 0 | 0 | 0.2 | 0.2 | 0.2 | 0.2 | 0.2 | 0.2 |
| | Dispersant | Kind | — | — | D-1 | D-1 | D-1 | D-1 | D-1 | D-1 |
| | | Part(s) by Weight | 0 | 0 | 0.6 | 0.6 | 0.6 | 0.6 | 0.6 | 0.6 |
| | Solvent | Kind | — | — | S-1 | S-1 | S-1 | S-1 | S-1 | S-1 |
| | | Part(s) by Weight | 0 | 0 | 9.2 | 9.2 | 9.2 | 9.2 | 9.2 | 9.2 |
| Visible Light Absorbing Dye | | Kind | — | — | — | — | — | — | — | — |
| | | Part(s) by Weight | 0 | 0 | 0 | 0 | 0 | 0 | 0 | 0 |
| Infrared | Name of Dispersion Liquid | | IR1 | IR2 | — | — | — | IR1 | IR2 | — |

TABLE 27-continued

| Name of Level | | | Example 77 | | | Example 78 | | | Example 79 | | |
|---|---|---|---|---|---|---|---|---|---|---|---|
| Absorbing Dispersion Liquid | Infrared Pigment | Kind | IP-2 | IP-2 | — | — | — | — | IP-2 | IP-2 | — |
| | | Maximum Absorption Wavelength | — | — | — | — | — | — | — | — | — |
| | | Part(s) by Weight | 2 | 2 | 0 | 0 | 0 | 0 | 2 | 2 | 0 |
| | Infrared Derivative | Kind | IS-2 | IS-2 | — | — | — | — | IS-2 | IS-2 | — |
| | | Part(s) by Weight | 0.4 | 0.4 | 0 | 0 | 0 | 0 | 0.4 | 0.4 | 0 |
| | Dispersant | Kind | D-1 | D-1 | — | — | — | — | D-1 | D-1 | — |
| | | Part(s) by Weight | 1.6 | 1.6 | 0 | 0 | 0 | 0 | 1.6 | 1.6 | 0 |
| | Solvent | Kind | S-1 | S-1 | — | — | — | — | S-1 | S-1 | — |
| | | Part(s) by Weight | 8 | 8 | 0 | 0 | 0 | 0 | 8 | 8 | 0 |
| Infrared Dye | | Kind | ID-2 | — | ID-2 | — | — | ID-2 | — | — | — |
| | | Maximum Absorption Wavelength | 1007 | — | 1007 | — | — | 1007 | — | — | — |
| | | Part(s) by Weight | 1.5 | 0 | 1.5 | 0 | 0 | 0.2 | 0 | 0 | 0 |
| Resin | | Kind | B-2 | — | B-2 | — | — | B-2 | — | — | — |
| | | Part(s) by Weight | 2.42 | 0 | 2.32 | 0 | 0 | 0.64 | 0 | 0 | 0 |
| Polymerizable Monomer | | Kind | M-1 | M-2 | M-1 | M-2 | — | M-1 | M-2 | — | — |
| | | Part(s) by Weight | 3.63 | 3.63 | 3.48 | 3.48 | 0 | 0.96 | 0.96 | 0 | 0 |
| Polymerization Initiator | | Kind | I-1 | — | I-1 | — | — | I-1 | — | — | — |
| | | Part(s) by Weight | 0.8 | 0 | 0.8 | 0 | 0 | 0.8 | 0 | 0 | 0 |
| Additive | | Kind | — | — | — | — | — | — | — | — | — |
| | | Part(s) by Weight | 0 | 0 | 0 | 0 | 0 | 0 | 0 | 0 | 0 |
| Polymerization Inhibitor | | Kind | In-1 | — | In-1 | — | — | In-1 | — | — | — |
| | | Part(s) by Weight | 0.003 | 0 | 0.003 | 0 | 0 | 0.003 | 0 | 0 | 0 |
| Surfactant | | Kind | Su-1 | — | Su-1 | — | — | Su-1 | — | — | — |
| | | Part(s) by Weight | 0.025 | 0 | 0.025 | 0 | 0 | 0.025 | 0 | 0 | 0 |
| Solvent | | Kind | S-1 | — | S-1 | — | — | S-1 | — | — | — |
| | | Part(s) by Weight | 64 | 0 | 52.4 | 0 | 0 | 36.4 | 0 | 0 | 0 |
| Total | | | 100.0 | | | 100.0 | | | 100.0 | | |
| Dielectric | | | Present | | | Present | | | Present | | |
| Desired Thickness | | | 2 | | | 2 | | | 2 | | |
| Half-Value Wavelength | | | 1100 | | | 1100 | | | 1055 | | |
| Absorbance Ratio | | | 43.2 | | | 43.2 | | | 5.1 | | |
| Blocking Degree | | | 2.4 | | | 1.8 | | | 5.1 | | |
| Effect | External Light | | 3 | | | 3 | | | 3 | | |
| | High Humidity Sensitivity | | A | | | A | | | A | | |
| | Angle Dependence | | 4 | | | 4 | | | 3 | | |
| | Reduction in Height | | A | | | A | | | A | | |
| | Light Fastness | | 4 | | | 4 | | | 4 | | |

TABLE 28

| Name of Level | | | Comparative Example 1 | | | Comparative Example 2 | | | Comparative Example 3 | | |
|---|---|---|---|---|---|---|---|---|---|---|---|
| Visible Light Absorbing Dispersion Liquid | Name of Dispersion Liquid | | R1 | Y1 | B1 | R1 | Y1 | B1 | R1 | Y1 | B1 |
| | Visible Light Absorbing Pigment | Kind | VP-1 | VP-3 | VP-5 | VP-1 | VP-3 | VP-5 | VP-1 | VP-3 | VP-5 |
| | | Part(s) by Weight | 2 | 2 | 2 | 2 | 2 | 2 | 2 | 2 | 2 |
| | Visible Light Absorbing Derivative | Kind | VS-1 | VS-2 | VS-3 | VS-1 | VS-2 | VS-3 | VS-1 | VS-2 | VS-3 |
| | | Part(s) by Weight | 0.2 | 0.2 | 0.2 | 0.2 | 0.2 | 0.2 | 0.2 | 0.2 | 0.2 |
| | Dispersant | Kind | D-1 | D-1 | D-1 | D-1 | D-1 | D-1 | D-1 | D-1 | D-1 |
| | | Part(s) by Weight | 0.6 | 0.6 | 0.6 | 0.6 | 0.6 | 0.6 | 0.6 | 0.6 | 0.6 |
| | Solvent | Kind | S-1 | S-1 | S-1 | S-1 | S-1 | S-1 | S-1 | S-1 | S-1 |
| | | Part(s) by Weight | 9.2 | 9.2 | 9.2 | 9.2 | 9.2 | 9.2 | 9.2 | 9.2 | 9.2 |
| Visible Light Absorbing Dye | | Kind | — | — | — | — | — | — | — | — | — |
| | | Part(s) by Weight | 0 | 0 | 0 | 0 | 0 | 0 | 0 | 0 | 0 |
| Infrared Absorbing Dispersion Liquid | Name of Dispersion Liquid | | IR1 | IR2 | — | IR1 | IR2 | — | IR1 | IR2 | — |
| | Infrared Pigment | Kind | IP-1 | IP-2 | — | IP-1 | IP-2 | — | IP-1 | IP-2 | — |
| | | Maximum Absorption Wavelength | — | — | — | — | — | — | — | — | — |
| | | Part(s) by Weight | 2 | 2 | 0 | 2 | 2 | 0 | 2 | 2 | 0 |
| | Infrared Derivative | Kind | IS-1 | IS-2 | — | IS-1 | IS-2 | — | IS-1 | IS-2 | — |
| | | Part(s) by Weight | 0.4 | 0.4 | 0 | 0.4 | 0.4 | 0 | 0.4 | 0.4 | 0 |
| | Dispersant | Kind | D-1 | D-1 | — | D-1 | D-1 | — | D-1 | D-1 | — |
| | | Part(s) by Weight | 1.6 | 1.6 | 0 | 1.6 | 1.6 | 0 | 1.6 | 1.6 | 0 |
| | Solvent | Kind | S-1 | S-1 | — | S-1 | S-1 | — | S-1 | S-1 | — |
| | | Part(s) by Weight | 8 | 8 | 0 | 8 | 8 | 0 | 8 | 8 | 0 |

TABLE 28-continued

|  | Name of Level |  | Comparative Example 1 | | | Comparative Example 2 | | | Comparative Example 3 | | |
|---|---|---|---|---|---|---|---|---|---|---|---|
| Infrared Dye | Kind | | — | — | — | — | — | — | ID-6 | — | — |
| | Maximum Absorption Wavelength | | — | — | — | — | — | — | 1311 | — | — |
| | Part(s) by Weight | | 0 | 0 | 0 | 0 | 0 | 0 | 1.5 | 0 | 0 |
| Resin | Kind | | B-2 | — | — | B-2 | — | — | B-2 | — | — |
| | Part(s) by Weight | | 0.69 | 0 | 0 | 0.69 | 0 | 0 | 0.32 | 0 | 0 |
| Polymerizable Monomer | Kind | | M-1 | M-2 | — | M-1 | M-2 | — | M-1 | M-2 | — |
| | Part(s) by Weight | | 1.04 | 1.04 | 0 | 1.04 | 1.04 | 0 | 0.48 | 0.48 | 0 |
| Polymerization Initiator | Kind | | I-1 | — | — | I-1 | — | — | I-1 | — | — |
| | Part(s) by Weight | | 0.8 | 0 | 0 | 0.8 | 0 | 0 | 0.8 | 0 | 0 |
| Additive | Kind | | — | — | — | — | — | — | — | — | — |
| | Part(s) by Weight | | 0 | 0 | 0 | 0 | 0 | 0 | 0 | 0 | 0 |
| Polymerization Inhibitor | Kind | | In-1 | — | — | In-1 | — | — | In-1 | — | — |
| | Part(s) by Weight | | 0.003 | 0 | 0 | 0.003 | 0 | 0 | 0.003 | 0 | 0 |
| Surfactant | Kind | | Su-1 | — | — | Su-1 | — | — | Su-1 | — | — |
| | Part(s) by Weight | | 0.025 | 0 | 0 | 0.025 | 0 | 0 | 0.025 | 0 | 0 |
| Solvent | Kind | | S-1 | — | — | S-1 | — | — | S-1 | — | — |
| | Part(s) by Weight | | 36.4 | 0 | 0 | 36.4 | 0 | 0 | 36.4 | 0 | 0 |
| Total | | | 100.0 | | | 100.0 | | | 100.0 | | |
| Dielectric | | | None | | | Present | | | None | | |
| Desired Thickness | | | 2 | | | 2 | | | 2 | | |
| Half-Value Wavelength | | | 965 | | | 965 | | | 1320 | | |
| Absorbance Ratio | | | 43.2 | | | 43.2 | | | 43.2 | | |
| Blocking Degree | | | 24.8 | | | 24.8 | | | 24.8 | | |
| Effect | External Light | | 2 | | | 3 | | | 4 | | |
| | High Humidity Sensitivity | | A | | | A | | | B | | |
| | Angle Dependence | | 4 | | | 1 | | | 4 | | |
| | Reduction in Height | | A | | | A | | | A | | |
| | Light Fastness | | 4 | | | 4 | | | 4 | | |

TABLE 29

|  | Name of Level |  | Comparative Example 4 | | | Comparative Example 5 | | | Comparative Example 6 | | |
|---|---|---|---|---|---|---|---|---|---|---|---|
| Visible Light Absorbing Dispersion Liquid | Name of Dispersion Liquid | | R1 | Y1 | B1 | Bk-4 | — | | R1 | Y1 | B1 |
| | Visible Light Absorbing Pigment | Kind | VP-1 | VP-3 | VP-5 | VP-11 | — | | VP-1 | VP-3 | VP-5 |
| | | Part(s) by Weight | 2 | 2 | 2 | 6 | 0 | | 0.016 | 0.016 | 0.016 |
| | Visible Light Absorbing Derivative | Kind | VS-1 | VS-2 | VS-3 | VS-2 | — | | VS-1 | VS-2 | VS-3 |
| | | Part(s) by Weight | 0.2 | 0.2 | 0.2 | 0.6 | 0 | | 0.0016 | 0.0016 | 0.0016 |
| | Dispersant | Kind | D-1 | D-1 | D-1 | D-1 | — | | D-1 | D-1 | D-1 |
| | | Part(s) by Weight | 0.6 | 0.6 | 0.6 | 1.8 | 0 | | 0.0048 | 0.0048 | 0.0048 |
| | Solvent | Kind | S-1 | S-1 | S-1 | S-1 | — | | S-1 | S-1 | S-1 |
| | | Part(s) by Weight | 9.2 | 9.2 | 9.2 | 27.6 | 0 | | 0.0736 | 0.0736 | 0.0736 |
| Visible Light Absorbing Dye | Kind | | — | — | — | — | — | | — | — | — |
| | Part(s) by Weight | | 0 | 0 | 0 | 0 | 0 | | 0 | 0 | 0 |
| Infrared Absorbing Dispersion Liquid | Name of Dispersion Liquid | | IR1 | IR2 | — | IR1 | IR2 | | IR1 | IR2 | — |
| | Infrared Pigment | Kind | IP-1 | IP-2 | — | IP-1 | IP-2 | | IP-1 | IP-2 | — |
| | | Maximum Absorption Wavelength | — | — | — | — | — | | — | — | — |
| | | Part(s) by Weight | 2 | 2 | 0 | 2 | 2 | | 0.016 | 0 | 0.016 |
| | Infrared Derivative | Kind | IS-1 | IS-2 | — | IS-1 | IS-2 | | IS-1 | IS-2 | — |
| | | Part(s) by Weight | 0.4 | 0.4 | 0 | 0.4 | 0.4 | | 0.0032 | 0 | 0.0032 |
| | Dispersant | Kind | D-1 | D-1 | — | D-1 | D-1 | | D-1 | D-1 | — |
| | | Part(s) by Weight | 1.6 | 1.6 | 0 | 1.6 | 1.6 | | 0.0128 | 0 | 0.0128 |
| | Solvent | Kind | S-1 | S-1 | — | S-1 | S-1 | | S-1 | S-1 | — |
| | | Part(s) by Weight | 8 | 8 | 0 | 8 | 8 | | 0.064 | 0 | 0.064 |
| Infrared Dye | Kind | | ID-2 | — | — | ID-2 | — | | ID-2 | — | — |
| | Maximum Absorption Wavelength | | 1007 | — | — | 1007 | — | | 1007 | — | — |
| | Part(s) by Weight | | 0.1 | 0 | 0 | 1.5 | 0 | | 0 | 0 | 0 |
| Resin | Kind | | B-2 | — | — | B-2 | — | | B-2 | — | — |
| | Part(s) by Weight | | 0.67 | 0 | 0 | 0.32 | 0 | | 4.76 | 0 | 0 |
| Polymerizable Monomer | Kind | | M-1 | M-2 | — | M-1 | M-2 | | M-1 | M-2 | — |
| | Part(s) by Weight | | 1.00 | 1.00 | 0 | 0.48 | 0.48 | | 7.14 | 7.14 | 0 |
| Polymerization Initiator | Kind | | I-1 | — | — | I-1 | — | | I-1 | — | — |
| | Part(s) by Weight | | 0.8 | 0 | 0 | 0.8 | 0 | | 0.8 | 0 | 0 |

TABLE 29-continued

| Name of Level | | Comparative Example 4 | | | Comparative Example 5 | | Comparative Example 6 | | |
|---|---|---|---|---|---|---|---|---|---|
| Additive | Kind | — | | | — | | — | | |
| | Part(s) by Weight | 0 | 0 | 0 | 0 | 0 | 0 | 0 | 0 |
| Polymerization Inhibitor | Kind | In-1 | — | — | In-1 | — | In-1 | — | — |
| | Part(s) by Weight | 0.003 | 0 | 0 | 0.003 | 0 | 0.003 | 0 | 0 |
| Surfactant | Kind | Su-1 | — | — | Su-1 | — | Su-1 | — | — |
| | Part(s) by Weight | 0.025 | 0 | 0 | 0.025 | 0 | 0.025 | 0 | 0 |
| Solvent | Kind | S-1 | — | — | S-1 | — | S-1 | — | — |
| | Part(s) by Weight | 36.4 | 0 | 0 | 36.4 | 0 | 79.7 | 0 | 0 |
| Total | | 100.0 | | | 100.0 | | 100.0 | | |
| Dielectric | | Present | | | None | | None | | |
| Desired Thickness | | 2 | | | 2 | | 125 | | |
| Half-Value Wavelength | | 1050 | | | None | | 1215 | | |
| Absorbance Ratio | | 4.0 | | | None | | 4.6 | | |
| Blocking Degree | | 4 | | | None | | 4.6 | | |
| Effect | External Light | 2 | | | Not Measurable | | 4 | | |
| | High Humidity Sensitivity | A | | | Not Measurable | | A | | |
| | Angle Dependence | 2 | | | Not Measurable | | 4 | | |
| | Reduction in Height | A | | | Not Measurable | | B | | |
| | Light Fastness | 4 | | | 4 | | 4 | | |

In Tables 1 to 29, the details of compounds represented by reference numerals are as follows.

[Visible Light Absorbing Pigment (Visible Light Absorbing Compound)]
VP-1: C.I. Pigment Red 254
VP-2: C.I. Pigment Red 122
VP-3: C.I. Pigment Yellow 139
VP-4: C.I. Pigment Yellow 185
VP-5: C.I. Pigment Blue 15:6
VP-6: C.I. Pigment Blue 16
VP-7: C.I. Pigment Violet 23
VP-8: IRGAPHOR BLACK X11 (manufactured by BASF SE)
VP-9: C.I. Pigment Black 32
VP-10: Particles of Si Alone
VP-11: C.I. Pigment Black 7

[Visible Light Absorbing Derivative (Pigment Derivative)]
VS-1: C.I. Pigment Red 254—$SO_3H$ derivative
VS-2: C.I. Pigment Yellow 139—$SO_3H$ derivative
VS-3: C.I. Pigment Blue 15:6—$SO_3H$ derivative
VS-4: C.I. Pigment Red 254—$NH_2$ derivative
VS-5: C.I. Pigment Yellow 139—$NH_2$ derivative
VS-6: C.I. Pigment Blue 15:6—$NH_2$ derivative (Dispersant)
D-1: a compound having the following structure
D-2: a compound having the following structure

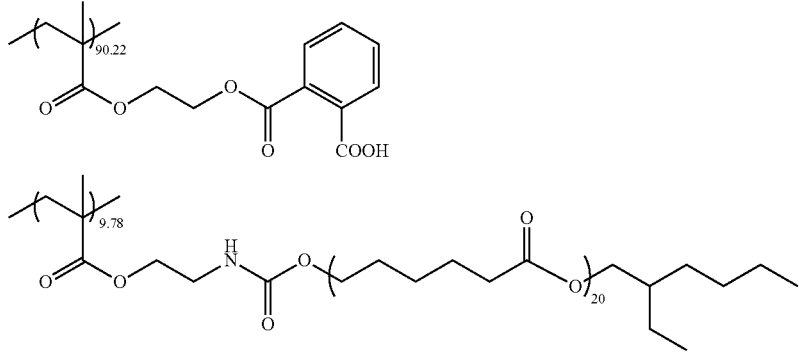

D-1

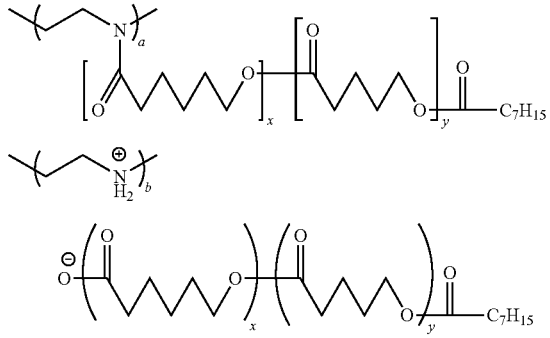

D-2

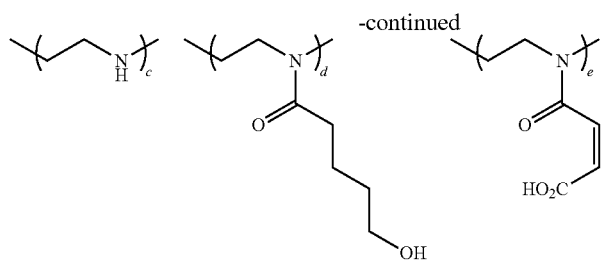

a/b/c/d/e = 36/4/35/1/24 (mol %)
x = 48 y = 12

[Solvent]
S-1: PGMEA (propylene glycol monomethyl ether acetate)
S-2: PGME (propylene glycol monomethyl ether)
S-3: Cyclopentanone

[Visible Light Absorbing Dye (Visible Light Absorbing Compound)]
VD-1: RDW-K01 (manufactured by Fujifilm Wako Pure Chemical Corporation)

[Infrared Pigment (Other Infrared Absorber)]

IP-1: a compound having the following structure
IP-2: a compound having the following structure
IP-3: a compound having the following structure
IP-4: a compound having the following structure
IP-5: a compound having the following structure

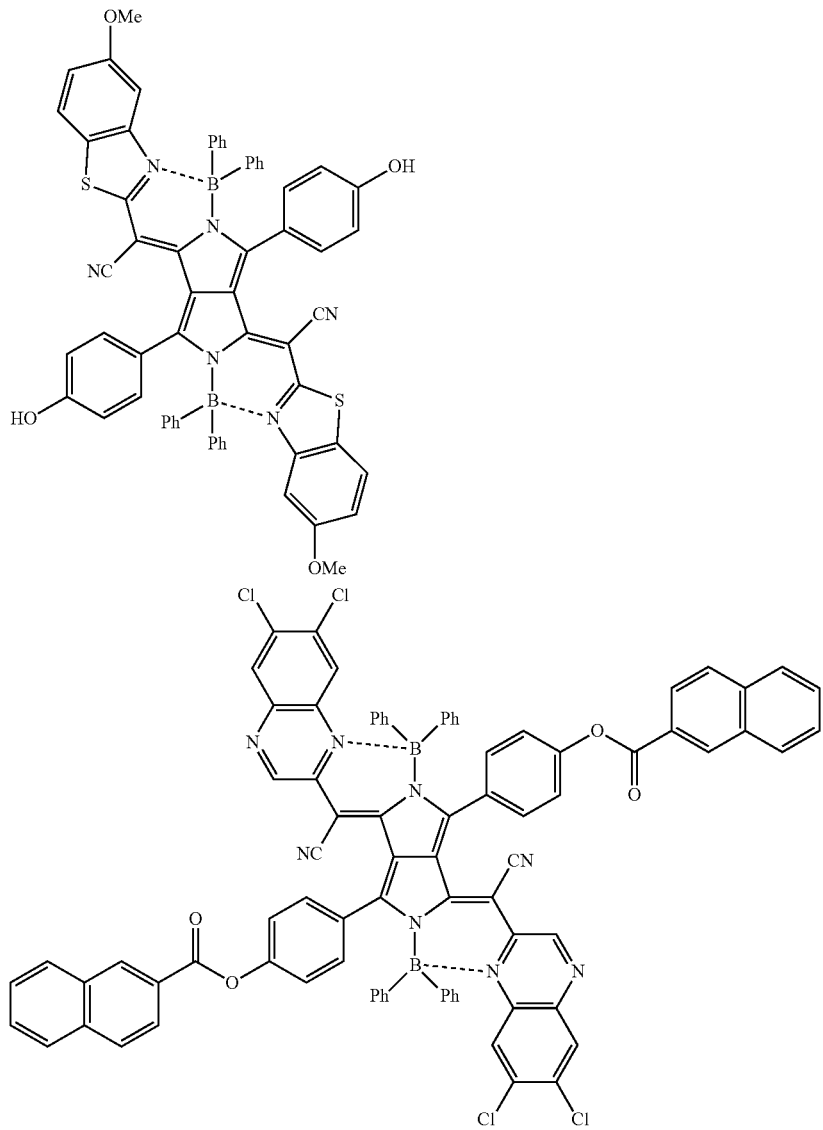

-continued

IP-3

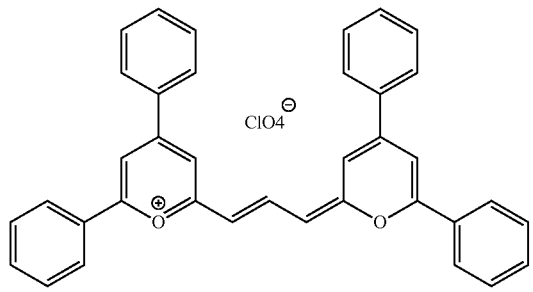

IP-4

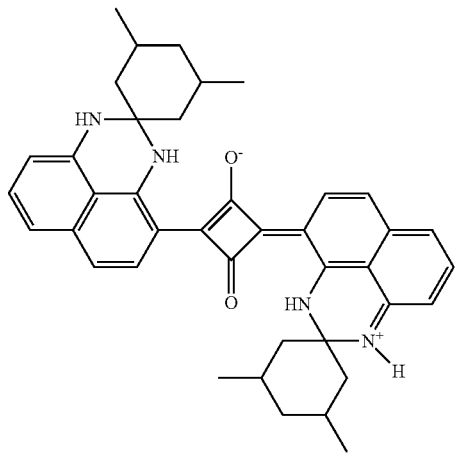

IP-5

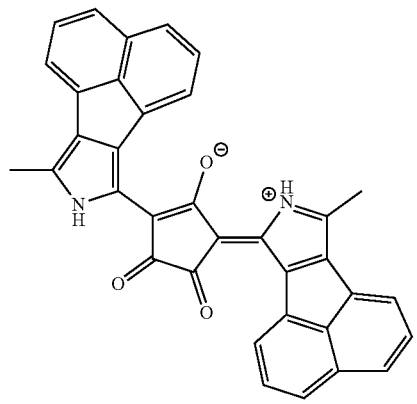

[Infrared Absorbing Derivative (Pigment Derivative)]
 IS-1: a compound having the following structure
 IS-2: a compound having the following structure
 IS-3: a compound having the following structure
 IS-4: a compound having the following structure
 IS-5: a compound having the following structure
 IS-6: a compound having the following structure
 IS-7: a compound having the following structure

IS-1

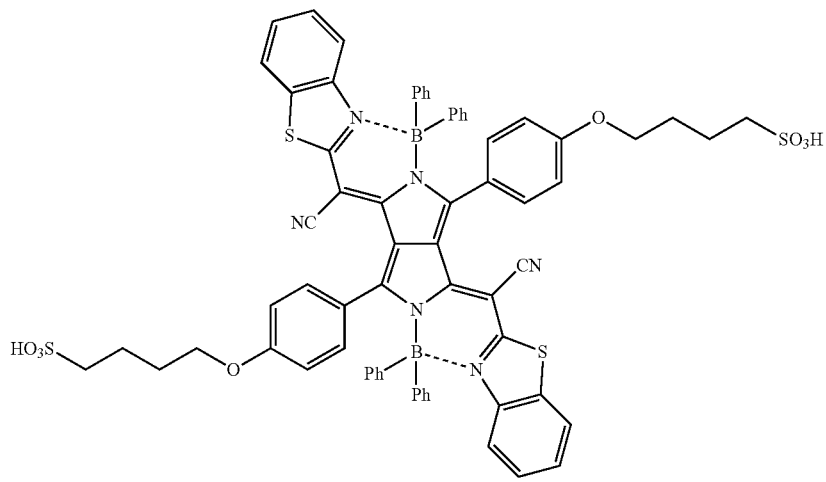

IS-2
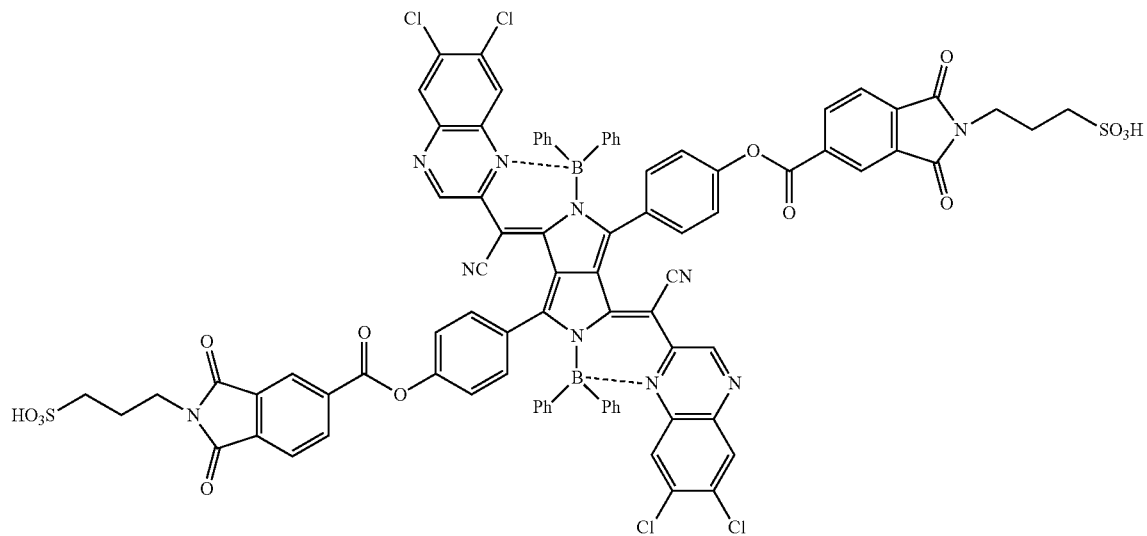
IS-3
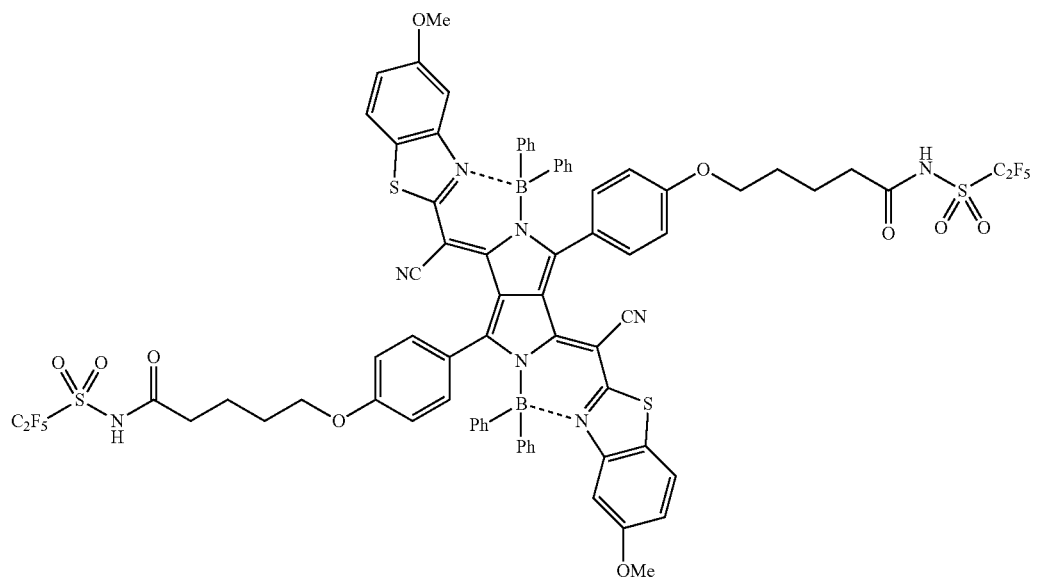

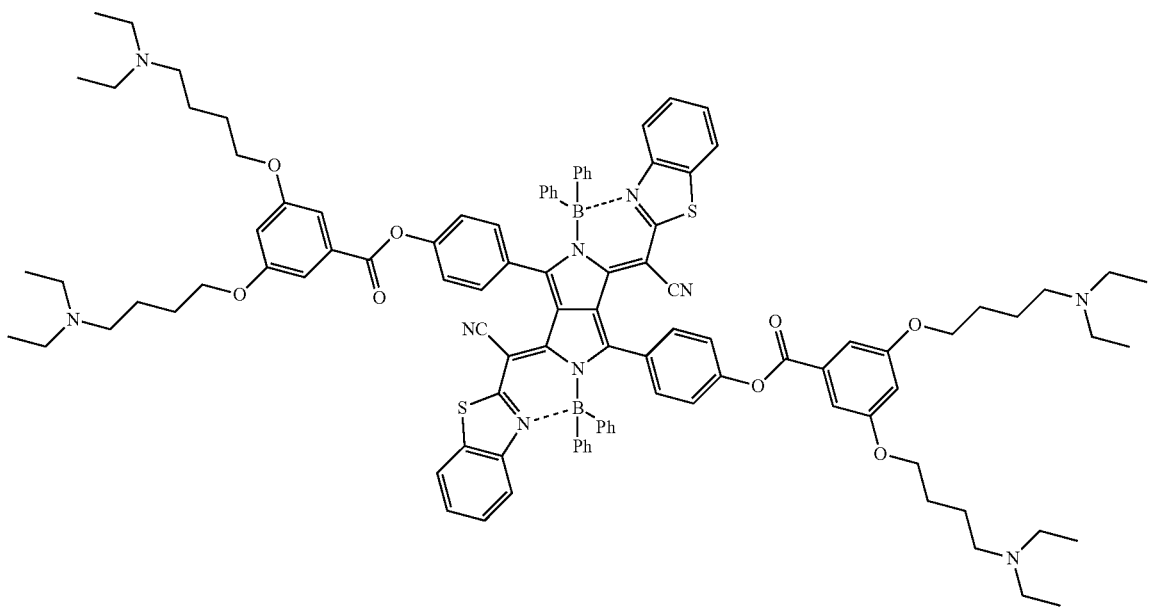

IS-4

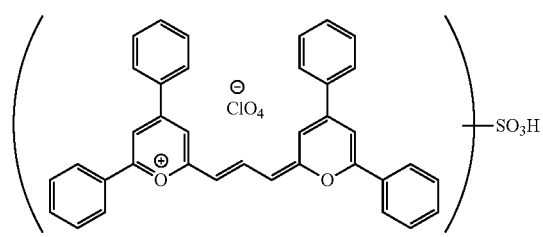

IS-5

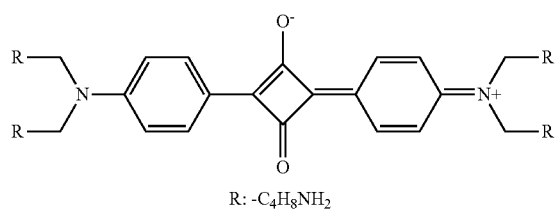

IS-6

R: -C₄H₈NH₂

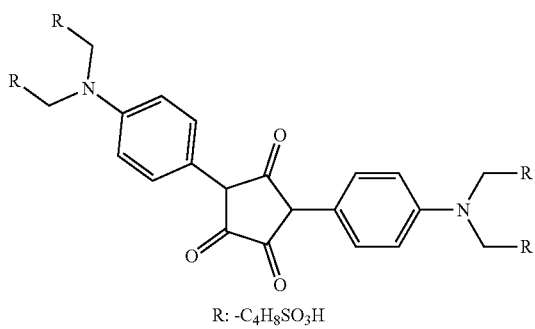

IS-7

R: -C₄H₈SO₃H

[Infrared Dye (Infrared Absorber)]

ID-1: a compound having the following structure (maximum absorption wavelength: 902 nm)

ID-2: a compound having the following structure (maximum absorption wavelength: 1,007 nm)

ID-3: a compound having the following structure (maximum absorption wavelength: 1,104 nm)

ID-4: a compound having the following structure (maximum absorption wavelength: 1,156 nm)

ID-5: a compound having the following structure (maximum absorption wavelength: 1,176 nm)

ID-6: a compound having the following structure (maximum absorption wavelength: 1,311 nm)

ID-7: ST7/4 (manufactured by Syntech)

ID-8: CIR-RL (manufactured by Japan Carlit Co., Ltd.) (maximum absorption wavelength: 1,104 nm)

ID-1
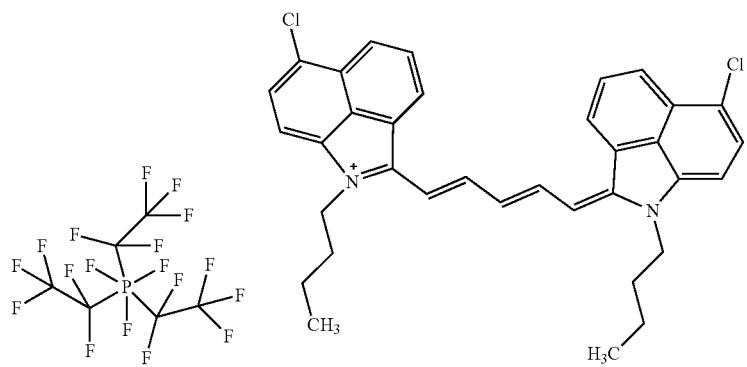
ID-2
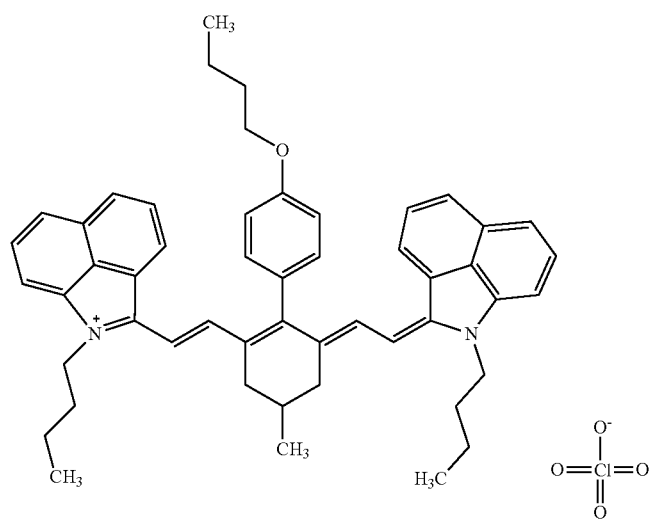
ID-3
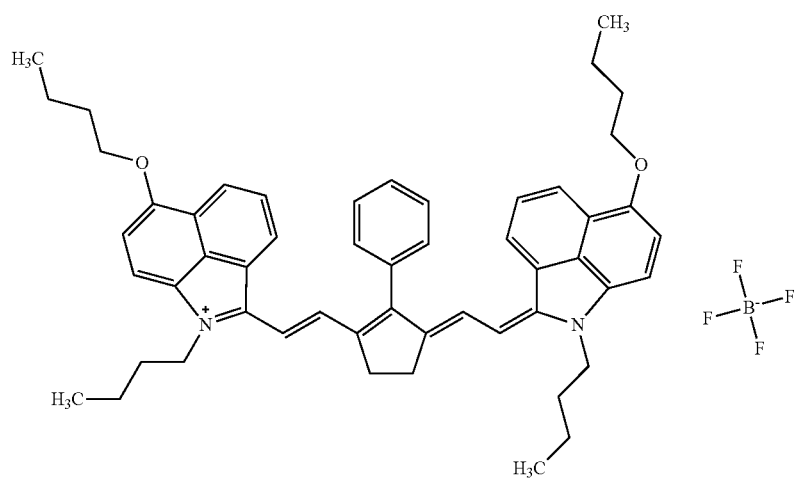

-continued
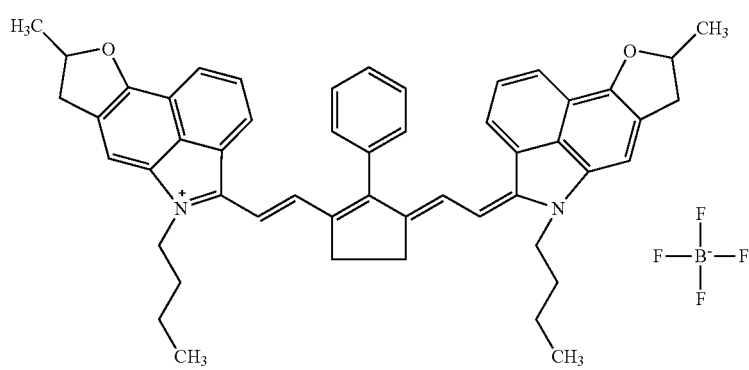
ID-4
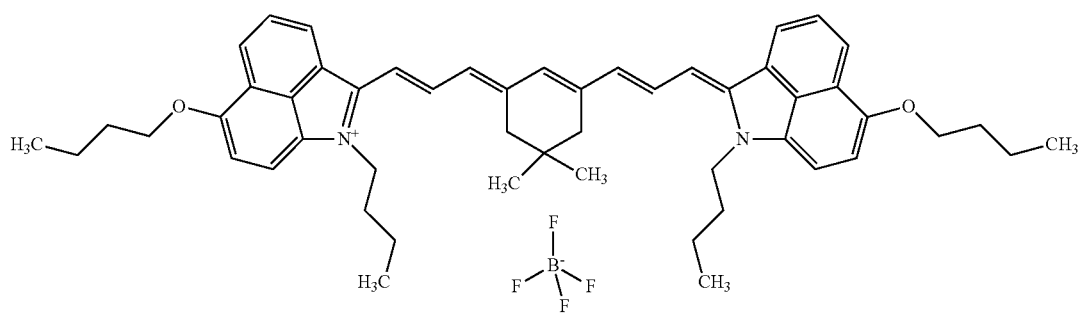
ID-5
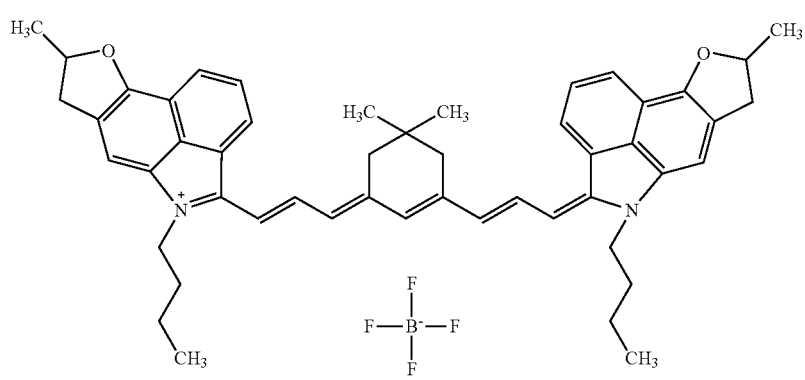
ID-6
[Resin]
B-1: a compound having the following structure
B-2: a compound having the following structure
B-3: ARTON F4520 (manufactured by JSR Corporation)
B-4: ARTON D4540 (manufactured by JSR Corporation)
B-5: NEOPULIM S-200 (manufactured by Mitsubishi Gas Chemical Company Inc.)
-continued
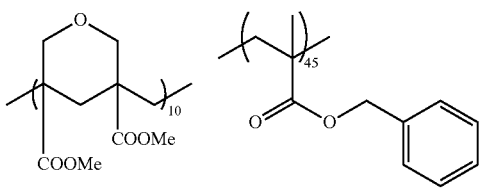
B-2
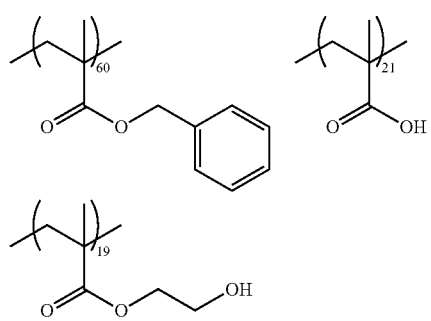
B-1
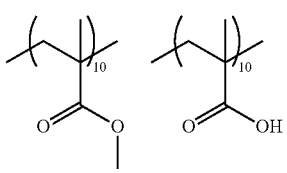

-continued

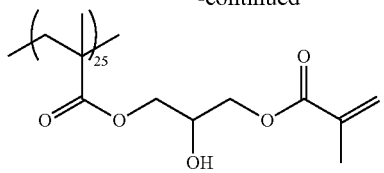

[Polymerizable Monomer (Curable Compound)]
  M-1: a compound having the following structure
  M-2: a compound having the following structure
  M-3: A-DPH (manufactured by Shin-Nakamura Chemical Co., Ltd.)
  M-4: A-BPE-10 (manufactured by Shin-Nakamura Chemical Co., Ltd.)

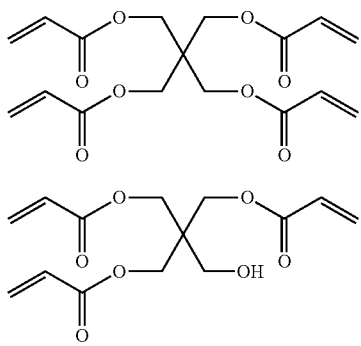

[Polymerization Initiator]
  I-1: IRGACURE OXE01 (manufactured by BASF SE)
  I-2: IRGACURE 369 (manufactured by BASF SE)
  I-3: NCI-930 (manufactured by Adeka Corporation)
[Additive]
  A-1: a compound having the following structure
  A-2: AO-80 (manufactured by Adeka Corporation)
  A-3: LA-82 (manufactured by Adeka Corporation)
  A-4: OGSOL PG-100 (manufactured by Osaka Gas Chemicals Co., Ltd.)

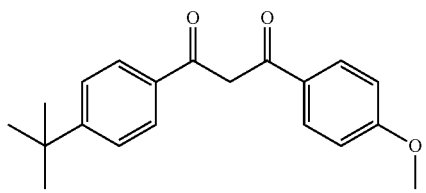

[Polymerization Inhibitor]
  In-1: p-methoxyphenol
  In-2: 1,2-dimethoxyphenol
[Surfactant]
  Su-1: Megafac F-781F (manufactured by DIC Corporation)
  Su-2: Megafac F-554F (manufactured by DIC Corporation)
(Evaluation)
<Preparation of Cured Film>
An example of the method of preparing the cured film that was performed in each of Examples or Comparative Examples will be shown below, but the cured film according to the embodiment of the present disclosure is not limited thereto.

For example, a cured film was formed with the following film forming method using the curable composition obtained in each of Examples or Comparative Examples other than Examples 69 to 71.

Each of the compositions was applied to the support by spin coating such that the thickness of the post-baked film was a desired thickness (unit: μm) shown in the tables, and was heated using a hot plate at 100° C. for 120 seconds.

Next, the applied curable composition (coating film) was exposed through a photomask having a given size using an i-ray stepper exposure device FPA-3000 i5+(manufactured by Canon Corporation) at an exposure dose for obtaining a desired pattern size.

Next, the substrate on which the exposed coating film was formed was placed on a horizontal rotary table of a spin-shower developing machine (DW-30, manufactured by Chemitronics Co., Ltd.) and underwent puddle development at 23° C. for 60 seconds using CD-2060 (a tetramethylammonium hydroxide aqueous solution, manufactured by Fujifilm Electronic Materials Co., Ltd.) to form a cured film.

The substrate on which the pattern of the cured film was formed was rinsed with pure water and was dried by spinning. Further, the coating film was further heated (post-baked) using a hot plate at 200° C. for 300 seconds to form a cured film.

Regarding each of Examples 69 to 71, a cured composition layer was formed by applying and heating the composition using the same method as described above and heating the coating film using a hot plate at 220° C. for 300 seconds.

Next, a positive type photoresist "FHi622BC" (manufactured by Fujifilm Electronic Materials Co., Ltd.) was applied to the cured composition layer, and then the cured composition layer was pre-baked at 110° C. for 1 minute. As a result, a photoresist layer having a thickness of 3.0 μm was formed.

Next, using an i-ray stepper (manufactured by Canon Corporation) the photoresist layer was exposed to form a pattern at an exposure dose of 200 mJ/cm$^2$ and then was heated for 1 minute at a temperature where the temperature of the photoresist layer or the atmosphere temperature was 90° C. Next, the photoresist layer was developed using a developer "FHD-5" (manufactured by Fujifilm Electronic Materials Co., Ltd.) for 1 minute and was further post-baked at 110° C. for 1 minute to form a resist pattern.

Next, the cured composition layer was dry-etched in the following procedure by using the resist pattern as an etching mask.

First etching was performed thereon for 80 seconds using a dry etching machine (manufactured by Hitachi High-Technologies Corporation, U-621) under conditions of RF power: 800 W, antenna bias: 400 W, wafer bias: 200 W, internal pressure of chamber: 4.0 Pa, substrate temperature: 50° C., and kinds and flow rates of gases in mixed gas: $CF_4$ (80 mL/min), $O_2$ (40 mL/min), Ar (800 mL/min).

Next, in the same etching chamber, second etching was performed for 28 seconds and over etching was performed under conditions of RF power: 600 W, antenna bias: 100 W, wafer bias: 250 W, internal pressure of chamber: 2.0 Pa, substrate temperature: 50° C., and kinds and flow rates of gases in mixed gas: $N_2$ (500 mL/min), $O_2$ (50 mL/min), Ar (500 mL/min) ($N_2/O_2/Ar=10/1/10$).

After the dry etching was performed under the above-described conditions, a peeling treatment was performed for 120 seconds using a photoresist peeling solution "MS230C"

(manufactured by Fujifilm Electronic Materials Co., Ltd.) to remove the resist. Further, the substrate was rinsed with pure water and was dried by spinning. Further, a dehydration baking treatment was performed at 100° C. for 2 minutes. As a result, a cured film on which a desired pattern was formed was formed.

Using the above-described film forming method, the cured film was formed between a substrate 11 and a lens 17 in Example 1 described in WO2017/159130A, and a sensor with the cured film was prepared.

Regarding each of Examples for which "Present" is shown in the column "Dielectric", the dielectric multi-layer film was vapor-deposited on the substrate 11, and the cured film was formed using the above-described film forming method, the lens 17 was formed, and the sensor was prepared.

<Measurement of Half-Value Wavelength, Absorbance Ratio, and Blocking Degree>

In each of Examples or Comparative Examples, a half-value wavelength, an absorbance ratio, and a blocking degree of the obtained cured film were measured.

In each of Examples or Comparative Examples, the half-value wavelength (the above-described wavelength Tb), the absorbance ratio (the above-described A/C), and the blocking degree (the above-described A'/C) of the obtained cured film were measured using an ultraviolet-visible-near infrared spectrophotometer (manufactured by Hitachi High-Technologies Corporation, U-4100).

The measurement results are shown in Tables 1 to 29.

<Measurement of Noise Generated from Visible Light>

In a darkroom, two white diffusion plates having a homogeneous light diffusion ability in a wavelength range of 400 nm to 2,000 nm were provided.

One white diffusion plate was irradiated with light having a wavelength excluding a wavelength range of 300 nm to 400 nm and a longer wavelength than 800 nm under a condition of AM 1.5 G, and another white diffusion plate was irradiated with light emitted from an infrared light emitting diode (LED) light source having an emitted surface intensity of 1.0 μW/cm$^2$ and a predetermined wavelength. Specifically, the wavelength of the infrared LED light source was 1300 nm in each of Examples 21 to 24, was 1100 nm in Example 79, and was 1200 nm in each of other Examples.

Next, while imaging the two diffusion plates using the prepared image pickup element, an emission intensity was decreased by interposing a light reduction plate between the two diffusion plates without any change in spectral shape from the condition of AM 1.5 G.

Signal intensities of the two diffusion plates were compared, and in a case where an intensity Iv on the AM 1.5 G side reached 1/10 of an intensity I on the infrared LED side, a light reduction ratio was recorded and was evaluated based on the following evaluation standards. The evaluation results are shown in the column "External Light" of Tables 1 to 29.

[Evaluation Standards]
  5: the intensity IV reached 1/10 of the intensity I at a light reduction ratio of 0%
  4: the intensity IV reached 1/10 of the intensity I at a light reduction ratio of 90%
  3: the intensity IV reached 1/10 of the intensity I at a light reduction ratio of 99%
  2: the intensity IV reached 1/10 of the intensity I at a light reduction ratio of 99.9%
  1: the intensity IV did not reach 1/10 of the intensity I even at a light reduction ratio of 99.9%

It can be said that, as the numerical value (1 to 5) increases, the measurement result is more satisfactory.

It is presumed that, with the composition of which the test result was satisfactory, an infrared image having a small amount of noise (external light noise) generated from visible light can be acquired, for example, even in the presence of sunlight.

<Evaluation of High Humidity Sensitivity>

In the sensor (the sensor including the cured film according to the embodiment of the present disclosure) in which the curable composition according to Examples prepared in "Preparation of Cured Film" was used, a desired image obtained at a desired wavelength before 300 m in a space at a temperature of 20° C. and a relative humidity of 95% and a desired image obtained at a desired wavelength before 300 m in a space at a temperature of 20° C. and a relative humidity of 10% were the same (determined as A).

On the other hand, in the sensor in which the composition according to Comparative Example 3 was used, image blurring at a high humidity was significantly observed (determined as B). Specifically, in the sensor in which the composition according to Comparative Example 3 was used, in a desired image obtained at a desired wavelength before 300 m in a space at a temperature of 20° C. and a relative humidity of 95%, blurring was more significant than in a desired image obtained at a desired wavelength before 300 m in a space at a temperature of 20° C. and a relative humidity of 10%.

The sensor using the curable composition of which the test result was satisfactory (determined as A) is less dependent on a humidity, and an excellent image can be obtained.

<Evaluation of Angle Dependence>

In a case where light in a wavelength range of 400 nm to 1,800 nm was emitted at 0 degrees and 30 degrees from a normal direction of a light receiving surface of the sensor according to each of Examples or Comparative Examples prepared above in "Preparation of Cured Film", a signal was acquired per incidence angle.

For each of the signals, a half-width was measured using an ultraviolet-visible-near infrared spectrophotometer (manufactured by Hitachi High-Technologies Corporation, U-4100), and a change in half-width (an absolute value of a difference between the half-width at 0 degrees and the half-width at 30 degrees) was obtained. The angle dependence was evaluated based on the following evaluation standards, and the evaluation results are shown in Tables 1 to 29.

[Evaluation Standards]
  5: the half-width does not change at all
  4: the change in half-width is less than 10 nm
  3: the change in half-width is 10 nm to 20 nm
  2: the change in half-width is 20 nm to 30 nm
  1: the change in half-width is more than 30 nm It can be said that, as the numerical value (1 to 5) increases, the measurement result is more satisfactory.

With the composition of which the test result was satisfactory, a difference in sensitivity between a center portion and an end portion of an image is not likely to be generated, and an excellent image can be obtained.

<Evaluation of Reduction in Height>

In each of Examples or Comparative Examples, the composition film (cured film) was formed on a glass substrate using the above-described method, and a portion where the pattern was present and a portion where the pattern was not present were evaluated as follows using the sense of touch.

Testers were five persons in their twenties, and the testers touched the presented film with the forefingers of their dominant arms without visual inspection. The testers were instructed to apply a force to a stimulus piece only in a vertical direction without tracing the film. The applied force was always displayed on a liquid crystal monitor such that the testers adjusted the applied force to 1 N.

The tester was instructed to select an answer from two choices of whether or not the touched surface was uneven. In order to prevent the tester from finding a clue of the unevenness from movement of heat, the substrate was held on a constant-temperature plate (manufactured by Nissin Rika, NHP-45N) at 32° C. before performing each of the tests. The test was performed on each of the substrates ten times. A reduction in height was evaluated based on the following evaluation standards, and the evaluation results are shown in Tables 1 to 29.

[Evaluation Standards]
 A: the percentage of testers who answered that the unevenness was present was 50% or lower
 B: the percentage of testers who answered that the unevenness was present was higher than 50%

It is presumed that, even in a case the composition film of which the test result was satisfactory (A) was introduced into the sensor, a significant increase in height is not likely to occur.

<Evaluation of Light Fastness>

In each of Examples or Comparative Examples, a cured film was formed on a glass substrate using the above-described method and was put into a light fastness tester (illuminance: 10,000 Lx, temperature: 50° C., relative humidity: 50%) for six months, and the light fastness was evaluated.

Regarding the film, transmittances T % of light in a wavelength range of 400 nm to 1,300 nm before and after the evaluation of light fastness were measured, and a difference $\Delta T\% = |T\%\text{ (before Light Fastness Test)} - T\%\text{ (after Light Fastness Test)}|$ was obtained to evaluate light fastness. The light fastness was evaluated based on the following evaluation standards, and the evaluation results are shown in Tables 1 to 29.

[Evaluation Standards]
 5: $\Delta T\% < 3\%$
 4: $3\% \leq \Delta T\% < 5\%$
 3: $5\% \leq \Delta T\% < 10\%$
 2: $10\% \leq \Delta T\% < 20\%$
 1: $20\% \leq \Delta T\%$ It can be seen from the results of Tables 1 to 29 that, in the cured film obtained by curing the curable composition according to the embodiment of the present disclosure, the generation of noise from visible light is suppressed, high humidity sensitivity is excellent, angle dependence is excellent, and a reduction in height can be realized.

In Example 1, in both a case where the polymerization inhibitor was not added and a case where the surfactant was not added, the results were the same as that of Example 1.

It can be seen that, since the curable composition according to Comparative Example 1 did not include the infrared absorber satisfying Expression 1 ($Y > X \times 0.5$), in the cured film obtained by curing the curable composition, the generation of noise from visible light was not suppressed.

It can be seen that, since the curable composition according to Comparative Example 2 included only the dielectric multi-layer film without including the infrared absorber satisfying Expression 1 ($Y > X \times 0.5$), the generation of noise from visible light was suppressed but the angle dependence was poor.

It can be seen that, since the curable composition according to Comparative Example 3 did not include the infrared absorber satisfying Expression 1 ($Y > X \times 0.5$), in the cured film obtained by curing the curable composition, the high humidity sensitivity was poor.

It can be seen that, since the value of A/C in the curable composition according to Comparative Example 4 was lower than 4.5, in the cured film obtained by curing the curable composition, the generation of noise from visible light was not suppressed.

It can be seen that, since the wavelength Tb of the curable composition according to Comparative Example 5 was not present in a wavelength range of 1,000 nm to 1,300 nm and infrared light was not likely to transmit through the cured film obtained by curing the curable composition, an infrared image was not able to be obtained.

It can be seen that, since the wavelength Tb of the curable composition according to Comparative Example 6 was not present in a wavelength range of 1,000 nm to 1,300 nm, in a case where the curable composition was applied at any thickness of 0.1 μm to 100 μm, Tb was not present and a reduction in height was poor.

EXPLANATION OF REFERENCES

110: solid-state imaging element
111: infrared cut filter
112: color filter
114: infrared transmitting filter
115: microlens
116: planarizing layer
120: second infrared transmitting filter

What is claimed is:

1. A curable composition comprising:
 an infrared absorber;
 a photopolymerization initiator; and
 a curable compound,
 wherein the photopolymerization initiator is at least one of an oxime compound or an α-aminoketone compound;
 wherein the infrared absorber includes at least one compound selected from the group consisting of a phthalocyanine compound, a squarylium compound, a croconium compound, a diimmonium compound, a perylene compound, a pyrrolopyrrole compound, a metal complex, and a compound semiconductor; and
 wherein an absorbance X of the infrared absorber at a maximum absorption wavelength in a wavelength range of 400 nm to 1,300 nm and a maximum absorbance Y in a wavelength range of longer than 950 nm and 1,300 nm or shorter satisfy Expression 1,
 in a case where the curable composition is applied at any thickness of 0.1 μm to 100 μm, a wavelength Tb having a transmittance of 50% is present in a wavelength range of 1,000 nm to 1,300 nm, and
 in a case where a wavelength that is shorter than the wavelength Tb by 200 nm is represented by Ta and a wavelength that is longer than the wavelength Tb by 200 nm is represented by Tc, a ratio A/C of a minimum value A of an absorbance in a wavelength range of the wavelength Ta±50 nm to a maximum value C of an absorbance in a wavelength range of the wavelength Tc±50 nm is 4.5 or higher, $Y > X \times 0.5$      Expression 1.

2. The curable composition according to claim 1, further comprising a compound having a maximum absorption wavelength in a wavelength range of 400 nm to 700 nm,
wherein in a case where a wavelength that is shorter than the wavelength Tb by 150 nm is represented by Ta', a ratio A'/C of a minimum value A' of an absorbance in a wavelength range of 400 nm to the wavelength Ta' to the maximum value C is 4.5 or higher.

3. The curable composition according to claim 2, comprising:
two or more compounds having a maximum absorption wavelength in a wavelength range of 400 nm to 700 nm.

4. The curable composition according to claim 2, comprising:
at least one compound selected from the group consisting of a red colorant, a blue colorant, a green colorant, a yellow colorant, a black colorant, a violet colorant, and a brown colorant as the compound having a maximum absorption wavelength in a wavelength range of 400 nm to 700 nm.

5. The curable composition according to claim 1, further comprising:
an infrared absorber that does not satisfy Expression 1.

6. The curable composition according to claim 1, which is used for forming an infrared transmitting filter.

7. A cured film which is formed by curing the curable composition according to claim 1.

8. An infrared transmitting filter comprising:
the cured film according to claim 7.

9. A laminate comprising:
the cured film according to claim 7; and
a dielectric multi-layer film.

10. A solid-state imaging element comprising:
the cured film according to claim 7.

11. A sensor comprising:
the cured film according to claim 7.

12. A pattern forming method comprising:
exposing a curable composition layer including the curable composition according to claim 1 in a pattern shape; and
removing a non-exposed portion to form a pattern.

13. A curable composition comprising:
an infrared absorber;
a curable compound; and
a compound that blocks light in a wavelength range of 450 nm to 650 nm, wherein an absorbance X of the infrared absorber at a maximum absorption wavelength in a wavelength range of 400 nm to 1,300 nm and a maximum absorbance Y in a wavelength range of longer than 950 nm and 1,300 nm or shorter satisfy Expression 1,
in a case where the curable composition is applied at any thickness of 0.1 μm to 100 μm, a wavelength Tb having a transmittance of 50% is present in a wavelength range of 1,000 nm to 1,300 nm,
in a case where a wavelength that is shorter than the wavelength Tb by 200 nm is represented by Ta and a wavelength that is longer than the wavelength Tb by 200 nm is represented by Tc, a ratio A/C of a minimum value A of an absorbance in a wavelength range of the wavelength Ta±50 nm to a maximum value C of an absorbance in a wavelength range of the wavelength Tc±50 nm is 4.5 or higher, and $Y > X \times 0.5$     Expression 1 in a case where a wavelength that is shorter than the wavelength Tb by 150 nm is represented by Ta', a ratio A'/C of a minimum value A' of an absorbance in a wavelength range of 400 nm to the wavelength Ta' to the maximum value C is 4.5 or higher.

14. A curable composition comprising:
an infrared absorber;
a photopolymerization initiator; and
a curable compound,
wherein the photopolymerization initiator is at least one of an oxime compound or an α-aminoketone compound;
wherein the curable compound includes a monomer which has a group having an ethylenically unsaturated bond; and
wherein an absorbance X of the infrared absorber at a maximum absorption wavelength in a wavelength range of 400 nm to 1,300 nm and a maximum absorbance Y in a wavelength range of longer than 950 nm and 1,300 nm or shorter satisfy Expression 1,
in a case where the curable composition is applied at any thickness of 0.1 μm to 100 μm, a wavelength Tb having a transmittance of 50% is present in a wavelength range of 1,000 nm to 1,300 nm, and
in a case where a wavelength that is shorter than the wavelength Tb by 200 nm is represented by Ta and a wavelength that is longer than the wavelength Tb by 200 nm is represented by Tc, a ratio A/C of a minimum value A of an absorbance in a wavelength range of the wavelength Ta±50 nm to a maximum value C of an absorbance in a wavelength range of the wavelength Tc±50 nm is 4.5 or higher, $Y > X \times 0.5$     Expression 1.

* * * * *